US012080162B2

(12) United States Patent
French et al.

(10) Patent No.: US 12,080,162 B2
(45) Date of Patent: Sep. 3, 2024

(54) HIGH RESOLUTION ENCODING AND TRANSMISSION OF TRAFFIC INFORMATION

(71) Applicant: Sirius XM Radio Inc., New York, NY (US)

(72) Inventors: Leslie John French, Princeton, NJ (US); John Edward Dombrowski, Willis, MI (US)

(73) Assignee: Sirius XM Radio Inc., New York, NY (US)

(*) Notice: Subject to any disclaimer, the term of this patent is extended or adjusted under 35 U.S.C. 154(b) by 759 days.

(21) Appl. No.: 17/026,608

(22) Filed: Sep. 21, 2020

(65) Prior Publication Data

US 2021/0264776 A1 Aug. 26, 2021

Related U.S. Application Data

(63) Continuation of application No. 14/852,608, filed on Sep. 13, 2015, now Pat. No. 10,783,777, which is a (Continued)

(51) Int. Cl.
*G08G 1/00* (2006.01)
*G08G 1/01* (2006.01)
(Continued)

(52) U.S. Cl.
CPC ........... *G08G 1/0141* (2013.01); *G08G 1/012* (2013.01); *G08G 1/0129* (2013.01); *G08G 1/091* (2013.01); *G08G 1/092* (2013.01); *H04H 20/55* (2013.01)

(58) Field of Classification Search
CPC .... G08G 1/0129; G08G 1/012; G08G 1/0141; G08G 1/091; G08G 1/092; G08G 1/01;
(Continued)

(56) References Cited

U.S. PATENT DOCUMENTS

2003/0100990 A1* 5/2003 Clapper ............... G08G 1/0104 340/907
2008/0069032 A1* 3/2008 Liu ....................... H04L 69/326 370/328
(Continued)

*Primary Examiner* — Truc M Do
(74) *Attorney, Agent, or Firm* — Kramer Levin Naftalis & Frankel LLP

(57) ABSTRACT

Systems and methods are provided for increasing geospatial resolution of traffic information by dividing known location intervals into a fixed number of sub-segments not tied to any one map providers format, efficient coding of traffic information, and distribution of traffic information to end-user consuming devices over one or more satellite based broadcast transport medium and data communications network. Nationwide traffic service which can be encoded and distributed through a single broadcast service may be described herein. Aggregating traffic data from segments of multiple location intervals, into predefined and predetermined flow vectors, and sending flow vectors within a data stream to users may be described herein. Confidence levels obtained from raw traffic data can (i) be disclosed to drivers/users to supplement a very low signal (or no signal) speed and congestion report, and (ii) used in various system algorithms that decide what local anomalies or aberrations to filter out as noise.

7 Claims, 54 Drawing Sheets

TMC TABLES

EXEMPLARY POINT NUMBERINGS

POSSIBLE POINT NUMBERINGS

Related U.S. Application Data continuation-in-part of application No. PCT/US2014/029221, filed on Mar. 14, 2014.

(60) Provisional application No. 61/785,663, filed on Mar. 14, 2013.

(51) Int. Cl.
*G08G 1/09* (2006.01)
*H04H 20/55* (2008.01)

(58) Field of Classification Search
CPC .... G08G 1/0104; G08G 1/0112; G08G 1/015; G08G 1/042; G08G 1/0962; G08G 1/096716; G08G 1/096725; G08G 1/096741; G08G 1/096775; G08G 1/096811; G08G 1/096827; G08G 1/096844; G08G 1/096872; G08G 1/096883; G08G 1/096888; H04H 20/55
See application file for complete search history.

(56) References Cited

U.S. PATENT DOCUMENTS

2012/0072096 A1* 3/2012 Chapman ............. G08G 1/0133
701/117
2014/0278052 A1* 9/2014 Slavin ................ G01C 21/3492
701/400

* cited by examiner

TMC TABLES

LINEARS AND POINTS

RAMP TYPES

TMC SEGMENTS

| POINT | POSITIVE | NEGATIVE |
|---|---|---|
| 4100 | 4101 | (BLANK) |
| 4101 | 4102 | 4100 |
| 4102 | (BLANK) | 4101 |

EXEMPLARY POINT NUMBERINGS

| POINT | POSITIVE | NEGATIVE |
|---|---|---|
| 4102 | 4101 | (BLANK) |
| 4101 | 4100 | 4102 |
| 4100 | (BLANK) | 4101 |

| POINT | POSITIVE | NEGATIVE |
|---|---|---|
| 3590 | (BLANK) | 8306 |
| 4100 | 8306 | (BLANK) |
| 8306 | 3590 | 4101 |

POSSIBLE POINT NUMBERINGS

FIG. 7A
Jodec Road
TMC-4098
TMC-4635
Joneboro Road
TMC-4099
HUDSON BRIDGE ROAD

---- BLUE

TMC SUB-SEGMENTS

SUB-SEGMENTS OFFSETS

| POINT | POSITIVE | NEGATIVE |
|---|---|---|
| 4100 | 4101 | (BLANK) |
| 4101 | 4102 | 4100 |
| 4102 | (BLANK) | 4101 |

MEAN-BOUNDING RECTANGLES

An MBR that can be skipped

An MBR that must be processed

BSA AND LINEAR CODE

SXM-TMC Table Structure

Linears and BSAs

Extended Linear MBRs

CONSTRUCTION MARKERS

APOGEE CODING WITH ADDED POINT

APOGEE CODING WITH ADDED POINT

Pattern References

PATTERN 14 ISOLATED

PATTERN 14 UPDATED

PATTERN 14 IN USE AGAIN

TRANSPORT LAYERS

AU GROUPS FOR FLOW DATA

GENERAL APPLICATION DATA FLOW

SMS OVERVIEW

SMS INTEGRATION

EXEMPLARY TMC TABLE

DETAIL OF LINEARS

FIG. 36
Hamtramck
Highland Park
Detroit
Dearborn
Melvindale

TMC COVERED ROADS

ROADS OVERLAID ONTO FULL ROAD MESH

Extended Linear MBRs

Extended Linear MBRs (Very long segments)

Three Stage Process

The Traffic Model, Format Block Divided Into Two Sections

The Traffic Model, Filter Block Divided Into Two Components

Overall Traffic Engine Architecture

TRANSPORT FRAMING

Receiver Components

Data Partitioning

SPIKE REMOVEL

MEAN VALUE SMOOTHING

TMC RAMP COVERAGE AROUND ANN ARBOR

DOT CLASS A13 RAMPS FOR THE SAME AREA

HIGH RESOLUTION ENCODING AND TRANSMISSION OF TRAFFIC INFORMATION

CROSS-REFERENCE TO RELATED APPLICATIONS

This application is a continuation-in-part of co-pending International Application No. PCT/US2014/029221, designating the United States, with an international filing date of Mar. 14, 2014, and also claims the benefit of U.S. Provisional Application No. 61/785,663 filed on Mar. 14, 2013, to which benefit and priority were claimed in PCT/US2014/029221, the disclosures of each which are incorporated herein by reference in their entireties.

TECHNICAL FIELD

The present invention relates to traffic information coding and transmission, and in particular to a method of increasing the geospatial resolution of traffic information by dividing known location intervals into a fixed number of sub-segments, efficient coding of the traffic information, and the distribution of the traffic information to end-user consuming devices over a satellite based broadcast transport medium.

BACKGROUND OF THE INVENTION

Various proposals have been presented for improving the accuracy of traffic information broadcast over a communications channel. The currently-accepted RDS/TMC standard uses a coding method called Alert-C which allocates identifiers to fixed points on the ground and to the segments of roadway the run between those points. An alternative standard, called TPEG, supports the TMC model and also arbitrary points identified by geographic (longitude/latitude) coordinates or by free text that can be used in conjunction with a mapping database (e.g. "W 54$^{th}$ St, New York"). An additional proposal has been made where the Alert-C format is enhanced by means of a "Precise Location Reference (PLR)" which indicates a point, and an extent from that point, in distance units (e.g. yards or miles) from one of the pre-defined location points.

Both of these proposals, TPEG and PLR, suffer from a number of disadvantages when applied to a broadcast distribution medium such as a satellite radio channel.

What is needed in the art are improved systems and methods for obtaining and processing accurate traffic information so that such information may be broadcast to users over a communications channel.

BRIEF DESCRIPTION OF THE DRAWINGS

It is noted that the U.S. patent or application file contains at least one drawing executed in color. Copies of this patent or patent application publication with color drawings will be provided by the U.S. Patent Office upon request and payment of the necessary fee.

SUMMARY OF THE INVENTION

Figure 1:
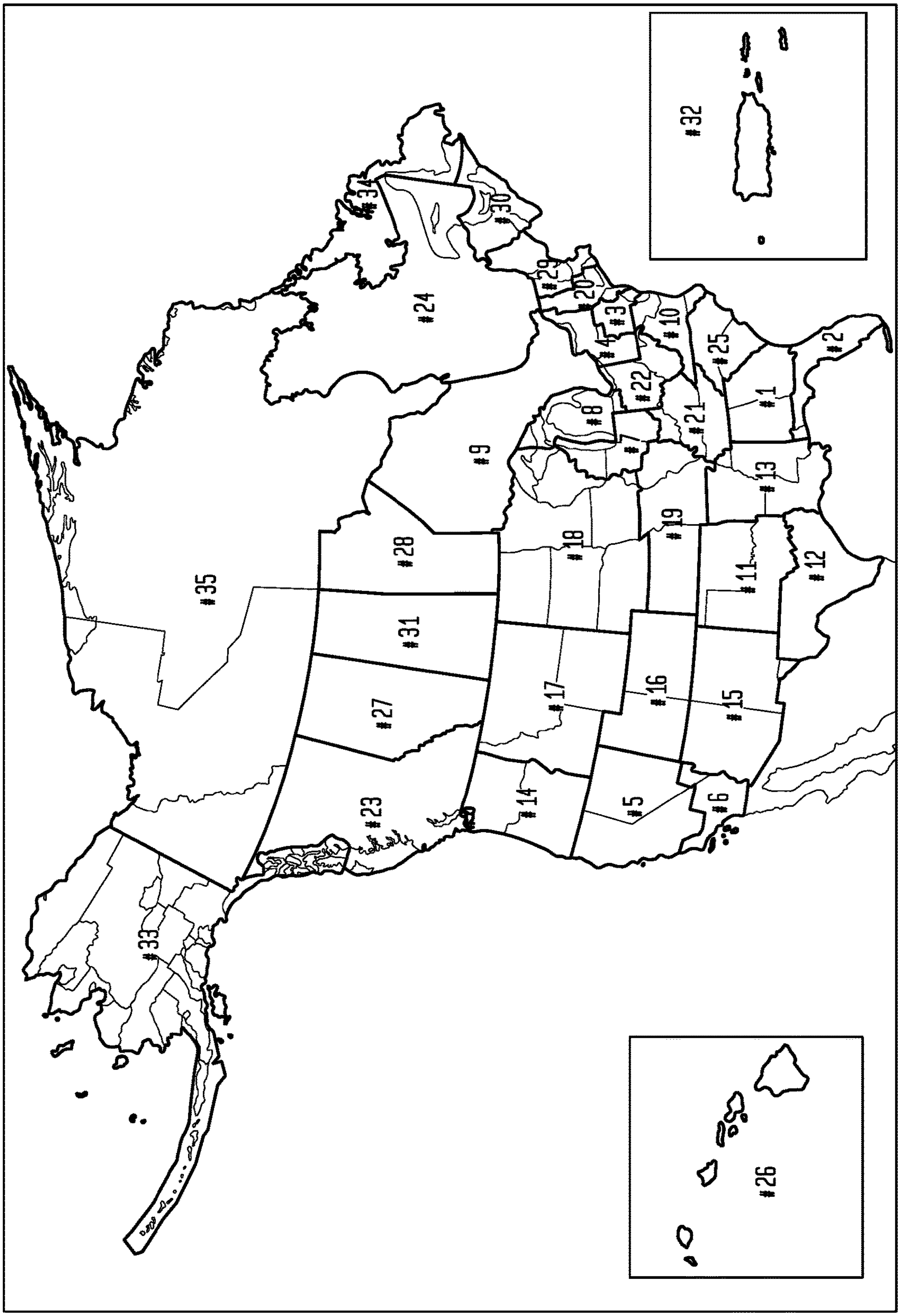
FIG. 1 depicts TMC Tables according to an exemplary embodiment of the present invention.

Systems and methods are provided for increasing the geospatial resolution of traffic information by dividing known location intervals into a fixed number of sub-segments not tied to any one map providers format, efficient coding of the traffic information, and distribution of the traffic information to end-user consuming devices over one or more of a satellite based broadcast transport medium and a data communications network. Exemplary embodiments of the present invention detail a nationwide traffic service which can be encoded and distributed through a single broadcast service, such as, for example, an SDARS service, or a broadcast over a data network. Exemplary embodiments include aggregating the traffic data from segments of multiple location intervals, into predefined and predetermined flow vectors, and sending the flow vectors within a data stream to users.

Exemplary embodiments of the present invention detail a high resolution nationwide traffic service which can be encoded and distributed through a single broadcast service, such as, for example, the SDARS services provided by Sirius XM Radio Inc.

In exemplary embodiments of the present invention, the following novel approaches and coding techniques may be used:

1. Divide each pre-defined road segment into a fixed number of smaller, higher resolution, spatial units called sub-segments (typically 4, 8 or 16), and encode all location references in units of the sub-segment size.
2. Divide linears (sequences of segments that follow a roadway) into geospatial areas according to the division of the traffic data by Broadcast Service Area (BSA).
3. Define a method whereby highway linear segments that traverse two or more broadcast service areas can be broken at the service boundaries, and reassembled again at the application level with no possibility of gaps in coverage.
4. Define a method where traffic event messages that originate within one BSA domain and have a traffic backup queue that extends into an adjacent BSA's, can be represented with a message in the adjacent BSA domain and that message will provide information on the originating location of the message.
5. Associate a unique index with each linear in a specific BSA such that the linear is then referenced by its position in an ordered list, rather than by an explicit linear or point index.
6. Further order the linear indexes such that the most important roads in a BSA appear first in the index-ordered list.
7. Implement a data delivery mechanism where large segments of the traffic service can be filtered by data type and regional areas by the receiver hardware.
8. Implement a data delivery mechanism where large volumes of data that do not need to be processed by a specific application can be efficiently detected, filtered out and discarded by the processing software reducing the volume of information that must be managed for a localized regional area.
9. Further efficiently divide the data delivery mechanism into multiple temporal domains (e.g. current, predictive, forecast and historical periods) each of which may be independently filtered.
10. Classify traffic-related events into two major categories: dynamic events (incidents) and planned events (construction).

In exemplary embodiments of the present invention, confidence levels obtained from raw traffic data (along with speed and congestion data) can both (i) be disclosed to drivers/users to supplement a very low signal (or no signal) speed and congestion report, and (ii) can also be used in various system algorithms that decide what local anomalies or aberrations to filter out as noise, or to disclose as accurate information and thus more granularly depict the roadway in question (and use additional bits to do so) as an actual highly localized traffic condition.

DETAILED DESCRIPTION OF THE INVENTION

Exemplary embodiments of the present invention eliminate various disadvantages from the conventional approaches described above. In particular, the TPEG proposal requires a large number of bits to encode location references, typically between 10 and 100 times what this invention requires. The TPEG coding scheme is a severe disadvantage when transmitting traffic information over a bandwidth-constrained channel.

Moreover, PLR or offset references are not independent of a map database. Since different maps may calculate the length of a road differently, the same length offset will appear at different places on different maps. If the encoding system is tied to a specific map database, this is a disadvantage for systems that choose to obtain their maps from a different vendor.

Additionally, named streets or places are typically only used in apparatus that also contains a full street atlas which limits their use to the more expensive 'full navigation unit' systems in vehicles.

Finally, the Alert-C encoding method limits the amount of information to simple predefined events or phrases. This invention provides the ability to transmit free text descriptions of the traffic events thereby providing additional valuable commentary information to supplement encoded event values.

Various exemplary embodiments of the present invention solve these problems, and provide for a robust nationwide traffic service which can be encoded and distributed through a single broadcast service.

It is noted that in what follows a particular exemplary embodiment is described in detail. It is often referred to as either "Apogee" or "Apogee Traffic" which is the internal name used by Applicant for this technology. The described Apogee system is only exemplary, and any element of it is also understood to be exemplary. Moreover, because the Apogee technology was developed for Applicant, there are numerous references to aspects of Applicant's satellite broadcast service, including its various data services which are auxiliary to its digital audio service, including its legacy traffic data service. The interactions of Apogee with these services, and their various standards, protocols and conventions are also all exemplary, the disclosed invention not being limited to any particular embodiment. For ease of reading what follows, the exemplary and illustrative nature of Apogee, Apogee Traffic, or a service or component of the Sirius XM Radio Inc. SDARS or data service (referred to as "SXM", "SXM service", etc.) will not be repeated each time such a reference is made. It being understood as a global fact.

The following specification includes three parts. A first part, Part I, which includes an exemplary protocol and implementation, and general description of the invention. A second part, Part II, which includes an exemplary overall architecture and proposed implementation of the Apogee Traffic Service, and finally a third part, Part III, which describes an exemplary interface to the Apogee Traffic service.

Part I—Protocol and Implementation

The following defines a protocol and implementation of the transmission of an exemplary embodiment of the Apogee Traffic Service, and also provides guidance for the reception and decoding of the data for a receiving product.

Number Formatting

This specification uses the following notations to indicate the numbering system base of the displayed number:

No prefix or suffix indicates a decimal number.

A number in single quotes, e.g. '01 1010' indicates a binary coded number.

A number with a 0x prefix, e.g. 0x1A, indicates a hexadecimal coded number.

Acronyms and Definitions

The following acronyms will be used in the description:

| | |
|---|---|
| AU | Access Unit. |
| BSA | Broadcast Service Area. A group of counties typically covered by a single broadcast radio station for legacy terrestrial radio services. |
| DMI | Data Multiplex Identifier. |
| DSI | Data Stream Identifier. |
| FTA | Free-To-Air. Data that are available to an application without a service subscription. |
| LSB | Least Significant Bit. |
| MBR | Mean Bounding Rectangle. The smallest rectangle defined by two lon/lat points that fully encloses all points in a specified area. |
| MSB | Most Significant Bit. |
| RFU | Reserved for Future Use. |
| S/F | Speed and Flow. |
| SDTP | SiriusXM Dynamic Transport Protocol. |
| SID | SiriusXM Service Identifier. An 8- or 10-bit integer which uniquely identifies a particular channel in the SXM bitstream. |
| TMC | Traffic Management Channel. |
| Carousel | A method of delivering data in a unidirectional system that includes no means to request data. Data is delivered in a repeating loop that may include time gaps between the end of one loop of data and the beginning of the next loop. |
| Compliant | Obeys requirements. |
| Informative | Information provided for background purposes. |
| Normative | Information requiring receiver adherence for compliant use of the service. |
| May | Part of a non-mandatory normative statement. |
| Must | Part of a mandatory normative statement indicating a performance requirement. |
| Non-Volatile | Persistent memory whose content is sustained through a power cycle. |

-continued

| | |
|---|---|
| Memory | Examples are Flash, NV-RAM, and Hard Disk Drive. |
| Receiver | The combination of radio receiver and head unit. |
| Shall | Part of a mandatory normative statement indicating a functional requirement. |
| Should | Part of a mandatory normative statement that is dependent on a condition. E.g. If Y then X should. |

REFERENCES

The following are separate documents and resources, referenced by this specification and/or useful to product developers implementing the Apogee Traffic service. Numbers in brackets, e.g. [1], are used elsewhere in this specification to refer to these documents and resources.

[1] Antares, Vega, Pleiades—A suite of PC-based data analysis software tools useful for capturing, parsing, simulating, and presenting over-the-air SXM data. Available under license from Sirius XM.

[2] CRC Algorithm Reference—Portable Networks Graphics Specification [http://www.w3.org/TR/PNG/or ISO/IEC 15948:2003(E)].

[3] ZLIB—RFC 1950. Information can be obtained from http://www.zlib.net/

[4] Traffic and Traveler Information (TTI) EN ISO 14819 (3 parts). Part 3 contains the Location Referencing scheme used by Alert-C and Apogee.

[5] Location Coding Handbook. Published by the Traffic Message Channel (TMC) Forum (TMCF-LCH-v07.pdf). Further definitions of TMC locations.

[6] FIPS County Codes. Federal Information Processing Standard 6-4 lists the codes assigned to each of the counties in the Unites States. See http://www.itl.nist.gov/fipspubs/co-codes/states.txt Service Overview Apogee is a next-generation traffic-based service, which is contemplated to be provided by Sirius XM Radio. Based on over seven years of real-world experience with the TMC/Alert-C based traffic data service, SiriusXM has developed the new ground-up Apogee service that eliminates several constraints in the current TMC/Alert-C standard and improves upon the new TPEG standard. Although much of what follows describes an exemplary embodiment contemplated to be provided by Sirius XM Radio Inc., this is understood to be in no way limiting, and various exemplary embodiments in various contexts are all included.

In exemplary embodiments of the present invention, there may be four key elements to Apogee technology:

1. Most comprehensive traffic coverage

At launch, Apogee will offer more than 300,000 miles of speed/flow coverage in 150 U.S./Canada cities (including 15 major Canadian cities). It will offer blanket coverage on all U.S. national highways coast to coast and extensive arterial coverage around the highways and near city centers. Incident (accidents and construction) coverage will surpass 1,000,000 miles. Predictive traffic will also be offered. No other broadcast traffic data service will rival the above mentioned coverage. Key benefit: The navigation routing engine can now use traffic on arterials to reroute the driver around congestion on the highways.

2. Higher resolution traffic data

Apogee is TMC compatible and the location resolution is 8 times the TMC segment resolution. Speed granularity is significantly improved using consistent 5 mph increments, which will improve travel time calculations. HOV/Express lane and exit/entry lanes that are coded either with explicit TMCs or without TMCs are supported. Ramps coded with TMCs or without TMCs are supported. Traffic data will be augmented by visual traffic camera images. All real-time traffic data will be broadcast into the vehicle at carousel rates of 30 to 60 seconds. Key benefits: Consumers can rely on the traffic data service because it's now more granular and the travel times are accurate. The navigation routing engine can reroute the driver accurately.

3. Improved accuracy

Apogee is just not a better technical standard. It also offers reference-quality traffic service inasmuch as SiriusXM contemplates adding its own GPS probe data points to whatever a given traffic data provider is already using. SiriusXM is targeting to add 5 times the current industry probe density. With these additions, the accuracy of Apogee can, for example, be significantly higher than any other service offered in North America, and unique to SiriusXM feeds.

4. Receiver complexity minimized

Apogee protocol minimizes the receiver complexity relative to any traffic standard developed to-date. Apogee standard is bandwidth efficient and traffic-receiver (memory and processor) friendly. The protocol and the data structures permit a receiver to reduce the number of references to TMC table or map database and minimize the number of dynamic point calculations. In exemplary embodiments of the present invention, the receiver can process a subset of traffic data in a city while skipping the rest of the data in that city. SXM module level filtering, SMS (SXM module software) and pseudo-code for decoding help minimize the memory and processor requirements in the receiver while simplifying development effort by Tier-1's.

The service is usable in vehicles without a GPS system; the system may display traffic information around a fixed location specified by the user (for example using a city name or selecting a point on a map display). For systems with GPS information data, the system may display traffic information around the vehicle's current location, automatically adjusting the extent of the information presented as the vehicle moves. For systems with full navigation (routing) capabilities; the traffic data may be used to estimate travel times, and make better estimates for arrival times by taking into account the time of day, and using both current and predicted future traffic conditions.

This Part I is divided into two major parts. A first portion describing the features of the Apogee Protocol and how those features can be used to create a full traffic service by a product or application, and a section portion describing how to decode an exemplary bitstream protocol transmitted over an exemplary satellite data stream to extract the service elements required in the first portion.

Apogee and Existing Standards

Apogee uses elements from existing traffic protocols to leverage existing work and to promote the reuse of software that is already based on these standards.

- TMC Location References. Using the TMC-supplied traffic tables, road locations can be specified by a table number and a small (16-bit) integer. Apogee uses this form wherever possible to reference sections of roadways and to place incident and construction events at TMC-coded locations. Apogee also maintains the TMC-table and BSA boundaries in its broadcast, as described in sections 4 and 5.
- Alert-C event codes. The RDS Alert-C protocol encodes a large list of messages using an 11-bit code, divided into a number of classes or types. Apogee uses a subset of these messages to encode common construction events and incidents. The code may also be used to select an appropriate icon for placing on a map.
- Flow Vectors. Apogee uses the flow vector concept from TPEG to organize speed and flow data at the linear level, rather than at the individual segment level as used in Alert-C. The SXM encoding format provides a more compact representation that is much easier to decode and filter than either TPEG or Alert-C transmission schemes.
- For locations that are not represented by TMC locations, Apogee uses a model that is similar to the TPEG extended location references, using a longitude/latitude pair and a textual description of the location that can be referenced to an existing map database.

Although Apogee leverages existing standards where it can, the transmission format is completely unrelated to either RDS-TMC or TPEG. The reason for doing this is to support more service elements than are defined by RDS, while avoiding the excessive decoding burden of TPEG. It is noted that:

- The encoding format is not Alert-C, though the Alert-C location codes and event codes are used when needed.
- Speed-and-flow services use a linear-by-linear coding scheme, not based on 70-76 and 124 codes of existing services. Congestion levels and transit times are explicitly encoded, not inferred from the Alert-C code.
- The protocols are carousel-based, not message-by-message. There are no 'cancel' messages in the Apogee protocol, and there is no requirement to maintain state between carousels. Unlike RDS-TMC there is no requirement that a message must be received more than once before it is considered valid.
- The RDS-TMC requirement of 'Only one message of each class at each location' does not apply in Apogee.

These concepts are developed further in the following sections.

Service Elements

The complete Apogee traffic service is built up from a set of service elements, not all of which need to implemented for every system.

TABLE 1

| | Service Elements | | | |
|---|---|---|---|---|
| | Road S/F | Ramp S/F | Construction | Incidents |
| Real-Time | ✓ | ✓ | ✓ | ✓ |
| Predictive | ✓ | x | [✓] | [✓] |
| Forecast | ✓ | x | [✓] | x |
| Historical | ✓ | x | x | x |
| Base | ✓ | x | x | x |

Table 1 shows the individual service elements present in Apogee traffic. The eight elements marked by a ✓ are explicitly transmitted as part of the protocol. x elements are not currently supported and [✓] elements are implicitly supported by their effect on the road or ramp S/F elements. Some service elements, for example predictive ramp speed and flow, may be introduced over time while others, for example the ability to forecast accidents, do not make sense.

Service Elements by Time

The service elements may be further divided by time:

1. The real-time component contains S/F and incident data collected and processed within the last few minutes as well as current road construction activities and corresponds to the current conditions on that roadway.
2. The predictive component projects the current conditions up to 1 hour into the future, taking into account all the known factors that contributed to the real-time analysis.
3. The forecast component estimates conditions for up to 3 hours into the future, using the base coverage that most closely resembles the forecast.
4. The historical component provides base coverages for different times of the day across the week, not just for the current period.
5. The base coverage component provides a stored, updatable, set of linear S/F coverage patterns for many road conditions that can be presented to the user when more accurate data are not available.

Table 1 also indicates, with the x mark, that in various embodiments, not all time-based components are present for all services.

Road S/F

The road S/F service elements contains both speed and flow information for more than 300,000 roadway miles of major highways and arterials across most of the United States and Canada. There are two types of information presented by the service:

1. The expected transit time for a length of roadway, expressed as a speed in mph. This information can be used to provide travel-time estimates for route calculations. For arterial roadways the transit time also includes the expected delays at stop lights and non-controlled intersections.
2. The perceived congested level of a length of roadway, as an integer in the range 0-7. This information can be used to color each side of a roadway on a map display to inform the user how likely it is that a particular section of a roadway will be congested. For arterials, the congestion level is derived from a combination of the transit time, speed restrictions, and intersection delays.

Unlike transit times, which are calculated, congestion values are perceived quantities related to the "out of the window" driver experience. They are affected by traffic density and posted speed limits. In exemplary embodiments, all the available information for a road segment may be aggregated to determine its perceived congestion level and encoded this as a small integer which can be used to color the traffic map.

Ramp S/F

The ramp S/F service element provides Speed and Flow data for on- and off-ramps used to connect other roadways to the major Controlled-Access highways such as freeways and interstates. The service supports all the Controlled-Access-to-Controlled-Access ramps and many of the intersections between Controlled-Access roads and other major highways. Ramp locations that are coded in the TMC tables are represented using that encoding, while the additional ramps defined for Apogee are encoded as described below.

The information can be used to color a map or to suggest alternative routes when a particular exit or entrance is reported as being heavily congested.

Construction

The construction service element provides information about actual and planned roadworks along more than 1,000,000 roadway miles in the United States and Canada. Information includes the extent of the affected roadway, the impact on traffic, the number of lanes closed or with restricted flow and the operating times of the construction when known. This information can be presented to the user through an icon on a map display, a list of construction events, or a modified road color to indicate construction. The detailed information may be presented as a pop-up display or drill-down from a list menu. The information may also be used by a routing engine to modify estimated travel times or suggest alternative routes.

A single service element carries all the construction data, both current (active) and future (planned). The short-term impact of construction events is contained within the predictive and forecast S/F data when it affects the transit time (speed) or congestion level (flow) at that time. This impact is calculated as part of the service data, the application does not need to process construction events additionally to determine their impact.

Incident

The incident service element provides information about non-construction events across the whole of the country. The service contains information about accidents, lane blockages, and special events that affect the flow of traffic in that area. The information can be presented to the user through an icon on a map with additional information available through pop-up or drill-down menus. The information may also be used to make short-term routing changes, particularly for severe accidents that have closed part of a roadway.

Since the duration of accident-type incidents cannot easily be predicted, only current incidents are reported by the service. When an estimate of duration is given, that information may be used to modify the predicted S/F data.

Implementation Options

Not all service elements need to be implemented. The following levels of implementation may serve as a guide when considering what makes the best Apogee service for a given vehicle platform:

1. Full Real-Time. Full Real-Time includes the Real-Time Road and Ramp S/F components plus the data for construction, road closures and accidents (the top row of Table 1), without requiring access to any stored historical data. This can be implemented without requiring any real-time data storage in non-volatile memory, or any updates to stored baseline files. However developers are encouraged to support Ramp Table updates received using RFD. Receiving and storing historical pattern data is not level for this level of service.
2. Real-Time+Historical Only. A receiver may use only the Real-Time components for a 'current' view, and fall back to simple Historical for all other time periods. This implementation choice does not require the receiver to process the Predictive and Forecast components.
3. Real-Time+Predictive+Historical. Allows near-term projections without requiring updatable pattern support.
4. Full Service. Includes Predictive, Forecast and all Real-Time components, and supports all the service elements listed in Table 1. Receives and processes base coverage patterns and mapping table updates using carousel and RFD protocols.

Even without a subscription for Apogee traffic, the receiver is still able to receive and process Free-to-Air baseline updates using RFD. Applications are encouraged to support these updates wherever possible, to give the best customer experience when a valid subscription is started Service Packages (Normative)

The following defines the authentication, addressing and decoding aspects of the Apogee traffic service that are required in order to access and process the service elements described above.

DSI Allocation

The Apogee traffic service may be split between two DSIs. Both DSIs are enabled as part of the Apogee Travel-Link subscription. It is still possible to receive and process table updates when the rest of the service is unsubscribed, since the DMIs providing table updates are carried on a Free-To-Air channel.

TABLE 2

| DSI definitions | |
|---|---|
| DSI | Blocks |
| 490 | A and D |
| 491 | B and C |

Subscription Status Reporting

When determining and reporting the overall subscription status of the Apogee service, the application must consider the subscription status of each of the two service DSIs as shown in Table 3: Subscription Status.

TABLE 3

| Subscription Status | | | | | |
|---|---|---|---|---|---|
| DSI Subscription Status Reported by Receiver | | Application Behavior | | | |
| | | Apogee Subscription Status Reported to | OK to Display Apogee | OK to Process RFD-based | |
| DSI = 490 | DSI = 491 | User | Data? | updates? | Comments |
| Fully Subscribed | Fully Subscribed | Subscribed | Yes | Yes | Normal status for a product subscribed to Apogee. |
| Partially Subscribed | Unsubscribed | Unsubscribed | No | Yes | Normal status for a product not subscribed to Apogee. |
| All Other Status Combinations | | Unsubscribed | No | No | Product should treat other combinations as a transient condition (i.e., typically resolving to one of the states above after a minute in good live signal) |

DMI Allocation

There are three main blocks of DMIs used to carry the Apogee traffic service. Each block contains 32 DMIs and there is a fixed relation between the offset from the base DMI and a traffic table, as described in section 4. The fourth block of DMIs is used to carry baseline update information using the RFD protocol. The mapping between offset and traffic table is given in section 4.

TABLE 4

| DMI Allocations | | | | | |
|---|---|---|---|---|---|
| Block | DSI | DMI Range | FTA | Description | Count of DMIs |
| A | 490 | 640-671 | No | Construction and Incidents | 32 |
| B | 491 | 672-703 | No | Real-Time Flow and Ramps | 32 |
| C | 491 | 704-735 | No | Predictive and Forecasts | 32 |
| D | 490 | 736-739 | Yes | RFD metadata and block update data | 4 |

The mapping between the DSI monitor response and the block values is given in Table 4 above.

Carousels

Within the DMIs a carousel identifier indicates the type of content within the Access Unit. The type of data contained within each carousel is listed in Table 5.

TABLE 5

| Carousel Identifiers | |
|---|---|
| CARID | Contents |
| 0 | Real-time S/F data for roads |
| 1 | Real-time S/F data for ramps |
| 2 | [Real-Time] Construction Data |
| 3 | [Real-Time] Incident/Accident Data |
| 4 | Predictive Data |
| 5 | Forecast Data |
| 6 | RFD file updates |
| 7 | RFD metadata |
| 8-15 | Reserved for future use |

The format of Carousels 6 and 7 are fixed by the RFD protocol.

Service Rates and Sizes (Informative)

The Apogee traffic service does not define the minimum and maximum service rates (the rate at which a particular carousel or DMI will repeat or be rebroadcast) for the various service elements. However, the target update rates given in Table 6 may be used when estimating resource requirements.

TABLE 6

| Service Rates | |
|---|---|
| Data Type | Target Update Rate |
| Speed/Flow Data | <60 seconds |
| Incident Data | <30 seconds |
| Construction Data | <30 seconds |
| Predictive Data | <120 seconds |
| Forecast or historical data profile | 2 minutes |
| RFD baseline update file (any single file) | 40 minutes × 30 days |

The RFD value indicates that a receiver may expect to collect a complete update file after approximately 30 days with the receiver being powered on for 40 minutes each day. The 40 minute value is derived from the typical drive commute times (20-25 minutes each way) reported by the U.S Census Bureau.

Table 7 may be used as a guide when estimating the sizes of the data carousels being transmitted using the service. The division into BSAs is described in section 4, and map filtering is described in section 5.

TABLE7

| Maximum Carousel Sizes | |
|---|---|
| Data Type | Data Size |
| Speed/Flow Data | 32 kbytes per BSA |
| Ramp Data | 32 kbytes per BSA |
| Incident Data | 16 kbytes per BSA |
| Construction Data | 16 kbytes per BSA |
| Predictive Data | 32 kbytes per BSA per period |
| Forecast or historical data profile | 32 kbytes per BSA |
| RFD baseline update file (any single file) | 32 kbytes per BSA per pattern |

When estimating storage requirements, these values must be multiplied by the number of TMC tables, BSAs, data types and patterns used by the various service elements being implemented by a particular product or application.

The values in Table 7 represent the maximum size of any single BSA. The aggregate size over a collection area is usually much less than the number of BSA multiplied by the values above. The following factors may help in determining the size of any individual data structure.

| Value | Actual Maximum | Implementation Maximum |
|---|---|---|
| Number of BSAs in one table | 54 | 64 |
| Number of Linears in a BSA | 1048 | 1600 |
| Number of Segments in a Linear | 119 | 128 |

For a 'reasonable' collection area comprising a rectangle extending 60 miles (100 km) to either side of the vehicle the follows limits apply wherever the rectangle is placed in the continental US.

| Value | Measured Limit |
|---|---|
| Number of Tables in area | 5 |
| Number of BSAs in area | 32 |
| Number of Linears in all covered BSAs | 4636 |
| Number of Linears filtered by area | 3588 |
| Number of flow-enabled linears in covered BSAs | 3744 |
| Number of flow-enabled linears filtered by area | 3023 |

The 'all covered BSAs' linear count is the number of linears within all the BSAs required to cover the map area, including those that lie outside the map. The 'filtered' values are the counts after applying the map area filter. These are exact limits based on the 4Q2012 TMC consortium tables and the current Apogee Traffic coverage.

Implementations should plan for up to 6,000 Flow Vectors within a 120 mile square. The application is not required to reserve storage for all 6,000 potential Flow Vectors, it may choose to extract and process them individually, or it may extract them all at once.

Decoding Location Elements

This section describes how the geospatial location elements are contained within the Apogee Traffic Protocol. The general approach is to follow the TISA Traffic Management Channel structure and to base almost all of the geospatial references on their published tables and the ISO-14819-3 international standard [8] and the Location Coding Handbook [9].

Traffic Tables

Apogee Traffic data covers the United States of America and most of the Canadian Provinces. The whole of North America is divided up into a number of traffic tables by the North American TMC Alliance as shown in FIG. 1 below.

The initial Apogee service will cover at least 28 of the 36 tables shown above. Each table is a transmitted as an independent unit for each service element, so an application need only receive and process data for those tables in its immediate vicinity. In some cases, more than one table may be required to completely cover an area, for example between Washington and Philadelphia on the East Coast. In no case does a 100 mile map extent require more than five tables for complete coverage.

Each table shown in FIG. 1 is represented by a single file supplied by the North American Traffic Alliance. Each file is a Microsoft Excel spreadsheet with the columns as defined in Table 8.

TABLE 8

| TMC Table Fields | |
|---|---|
| Field Name | Contents |
| TABLE | TMC Table Number or special field marker |
| LOCATION CODE | The reference number for this TMC object |
| (SUB)TYPE | The type of record (Area, Linear, Point) |
| ROAD NUMBER | A road designation like 'I-95' or 'US-1011 |
| ROAD NAME | A street-type name like 'GLADSTONE ST' |
| FIRST NAME | Usually a direction indicator for the positive direction like |
| SECOND NAME | Usually a direction indicator for the negative direction like |
| AREA REFERENCE | The BSA in which the record lies |
| LINEAR | The linear on which the Point lies, for point records |
| NEGATIVE OFFSET | The next Point on the linear in the positive direction |
| POSITIVE OFFSET | The next Point on the linear in the negative direction |
| LATITUDE | The latitude of the Point |
| LONGITUDE | The longitude of the Point |

The use of some of these columns is further described below.

Broadcast Service Areas

Within each traffic table, the geographic region is further divided into Broadcast Service Areas (BSAs). This division arose from the terrestrial radio origins of the traffic service. Each BSA is a small number of counties that might be covered by a single traditional radio transmission service.

Figure 2:
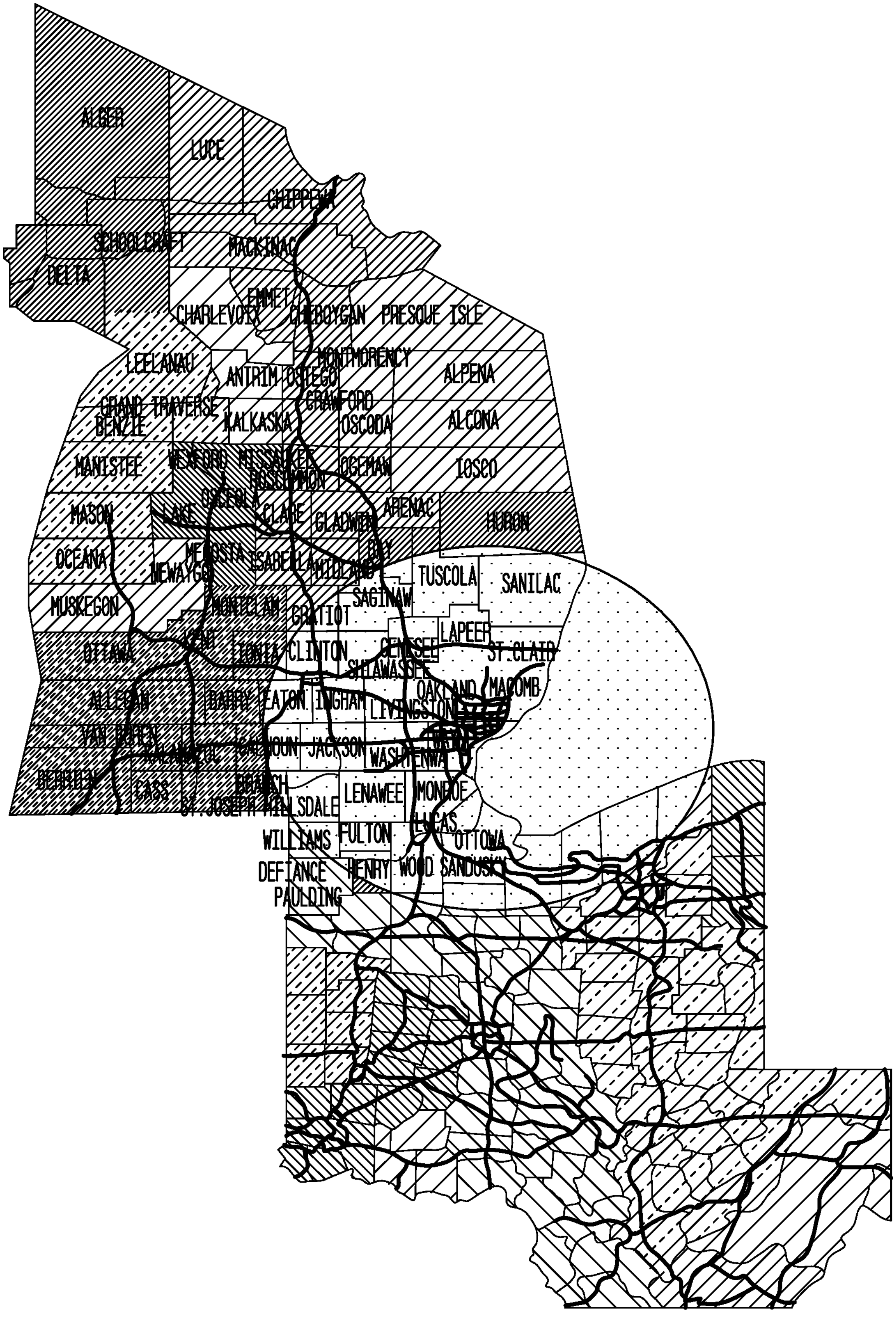
FIG. 2 depicts an exemplary Broadcast Services Areas (BSAs) structure for Tables 8 and 22 covering Michigan and Ohio. Each BSA is shaded in a different color according to an exemplary embodiment of the present invention.

FIG. 2 shows the BSA structure for tables 8 and 22 covering Michigan and Ohio. Each BSA is shaded in a different color. The Apogee broadcast format preserves the boundaries between BSAs in the transmitted data. This allows an application to decode only the BSAs within the table that are needed to present traffic data to the user, as indicated by the blue oval.

The term 'market' sometimes appears in traffic literature. However, the word has two quite distinct meanings. In some cases a 'market' means a whole traffic table, on other cases the word 'market' is used to mean a single city or a group of BSAs. To avoid confusion the term 'market' is not used within the Apogee Traffic specification.

Within each Broadcast Service Area there are a number of roads. Each road is defined as a linear sequence of TMC points. A TMC point is usually at the intersection of two roads (one point on each roadway) or close to an exit off a freeway or other controlled-access roads. Each point has a longitude and latitude and so can be plotted on a map. The road itself runs between the set of points in the linear.

Figure 3:
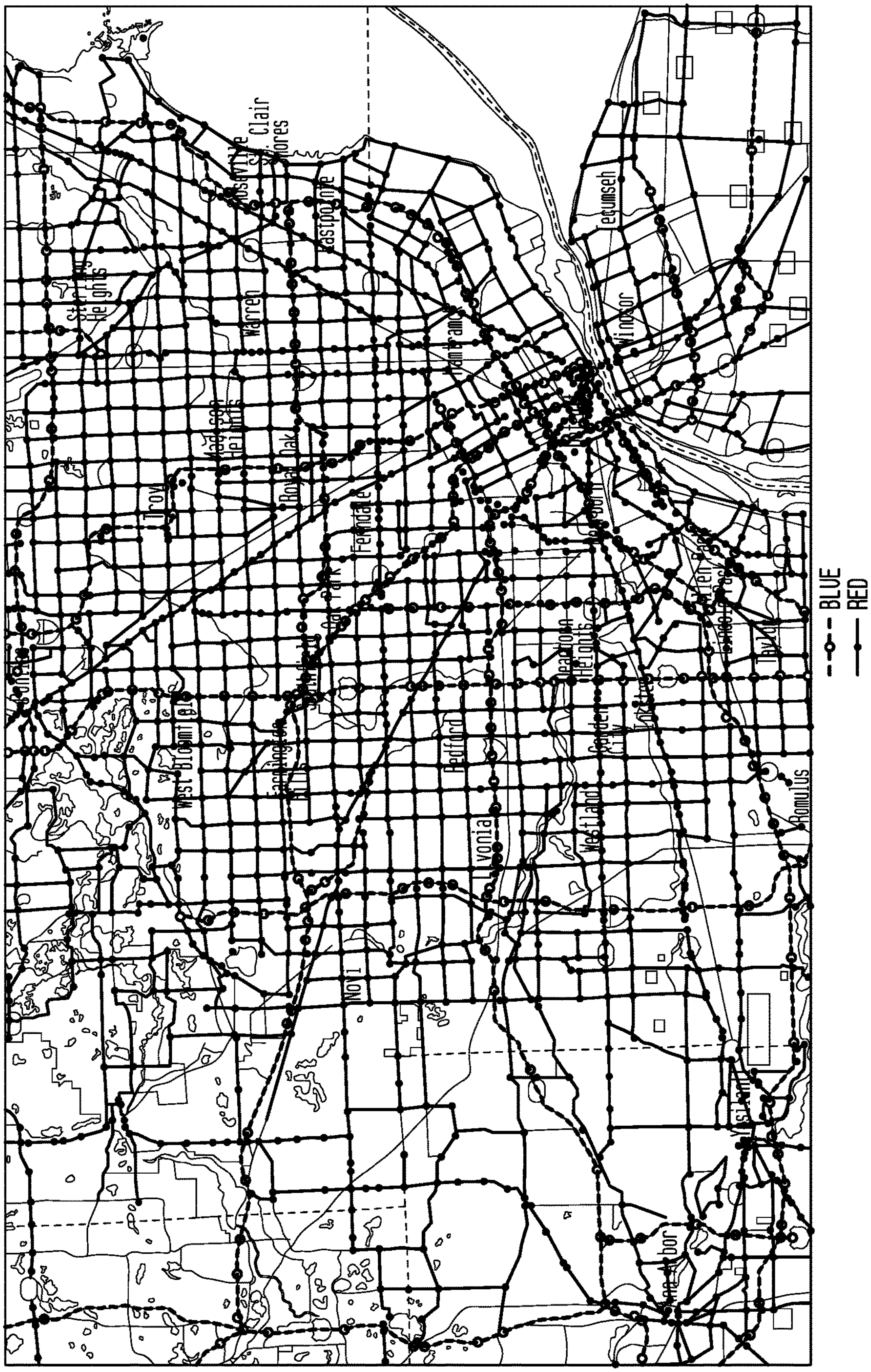
FIG. 3 depicts exemplary linears and points according to an exemplary embodiment of the present invention.

FIG. 3 shows the array of points around the Detroit Area, and how those points are joined to form roadway linears. The lines in blue are the major freeways and controlled-access roads, the lines in red are the 'arterial' roads that distribute traffic to and from the freeways. Below this level are the local roads for which there is no speed and flow coverage.

Lanes

Major highways usually comprise more than one lane in each direction. Where available the Apogee speed and flow service will report individual values for the different classes of lanes on each roadbed.

Figure 4:
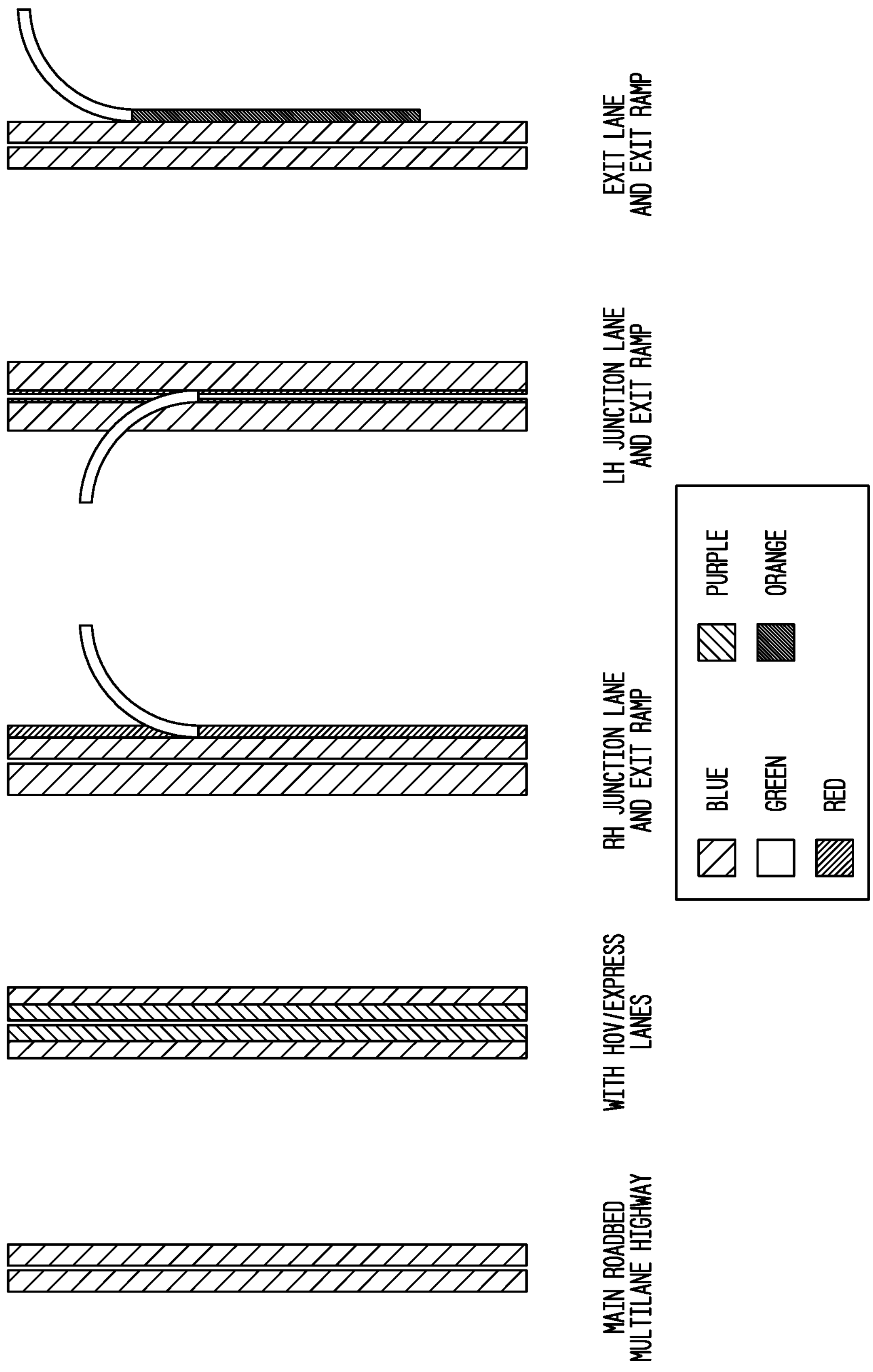
FIG. 4 depicts exemplary lane types according to an exemplary embodiment of the present invention.

FIG. 4 shows the definition of the lane types for Apogee. Except for the exit ramps (and the corresponding entrance ramps), the lane types are encoded in the broadcast using the category values shown in Table 9.

TABLE 9

| Lane Encoding | |
|---|---|
| Category | Type |
| 0 | Main roadbed, or all lanes of the highway (blue) |
| 1 | HOV or other express-category lane (purple) |
| 2 | Right-Hand Junction lane (red) |
| 3 | Left-Hand Junction lane (red) |
| 4 | Exit-only lane, to the side of the Junction lane usually |

Ramps

Entrance and exit ramps, shown in green on FIG. 4 have their own encoding scheme, and are transmitted on a separate carousel from the main roadbed data. The ramps that interconnect freeways and other controlled-access roads have been allocated numbers in the TMC tables. Other ramps are defined by SiriusXM specifically for the Apogee traffic service to provide better coverage of key intersections. In all cases, these other ramps are associated with existing TMC points, and each ramp is defined by its TMC number plus a shape value.

Figure 5:
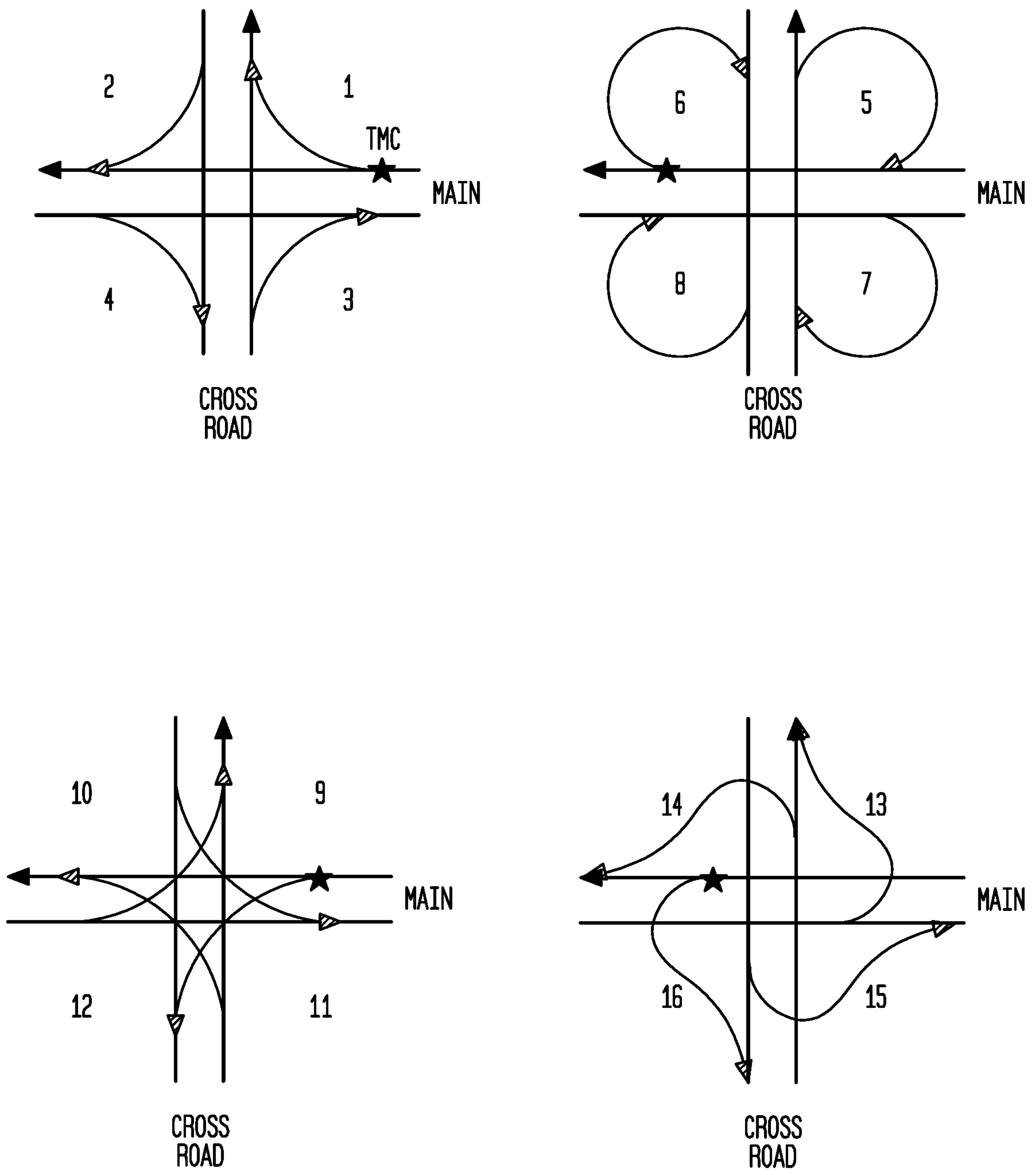
FIG. 5 depicts various exemplary ramp types according to an exemplary embodiment of the present invention.

FIG. 5 shows the 16 possible shapes for a ramp, relative to the TMC point on the more major highway. Ramp shapes that do not follows exactly these models will be assigned to the closest defined ramp type, based on the direction of the exit or entrance and how it is placed relative to the more minor road.

Segments and Direction

The Apogee Protocol defines a segment as the stretch of roadway between two adjacent location points in the TMC table. The points are usually defined to be intersections with other roadways or ramps, so the segments may often be many miles long. For each point within a linear, the TMC table defines the next point in the 'positive' direction and the next point in the 'negative' direction. Endpoints have next points in only one direction.

Figure 6:
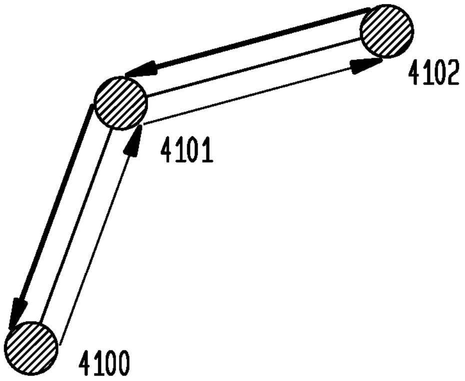
FIG. 6 depicts TMC segments according to an exemplary embodiment of the present invention.

FIG. 6 illustrates how a roadway is divided using 3 TMC points and 2 segments. A linear is traversed in either the positive direction (i.e. starting at 4100 and driving to 4102 along the green line) or the negative direction (starting at 4102 and driving to 4100 along the blue line). The driving direction is opposite to the TMC direction (shown by the arrowheads), because the TMC direction defines the direction in which a traffic queue will increase as congestion builds up. From this direction, the three other common meanings of direction can be derived or approximated as shown in Table 10.

TABLE 10

| Directions | |
|---|---|
| Type | Derived from |
| -bound | The FIRST and SECOND NAME fields in the TMC table for the linear to which the point belongs gives the general direction of travel (EASTBOUND, NORTHBOUND etc.) as used on the road signage. |
| Side of Road | The side of the road is the left-hand-side in the direction of travel. That is, standing in the median at the current point, and facing the next point in the positive direction, the lanes to the left are defined as the positive direction, and the lanes to the right are the negative direction. |
| bearing | The compass bearing of the direction of travel is not encoded in either the direction field or the TMC table. It can be approximated using the longitude and latitude of the two points but the accuracy will depend on road topology. In general, compass bearings should not be indicated for direction of travel. |

Figure 7:
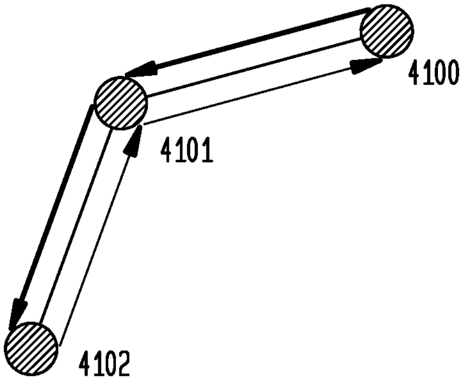
FIG. 7 depicts the same topology as is shown in FIG. 6, but with different point values according to an exemplary embodiment of the present invention.
Figure 7:
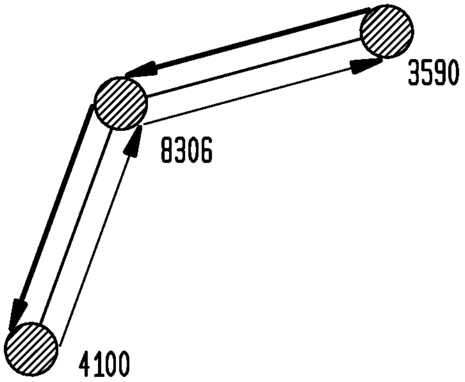

The direction of travel is determined solely by the POSITIVE and NEGATIVE entries in the TMC table, not by the actual point values (i.e. there is no requirement that POSITIVE means North etc.). FIG. 7 shows the same topology as FIG. 6, but with different point values.

The points are listed in numerical order within the SXM-supplied TMC file, and the examples above demonstrate possible ordering of the points within the file. It is not possible to assume that the first entry for a linear represents the start of the linear, or that the last entry is the end of the linear, the endpoints are only determined by the blank values in the POSITIVE and NEGATIVE columns of the TMC table.

Segments and Map Links

Although the TMC tables use point values to mark locations, in reality these locations extend over some portion of the roadway, particularly when the location contains a high-speed intersection, with ramps. Each of the major map vendors further defines the precise location of the start and end of each segment, in each direction, by referencing their own internal map database, where multiple map links are used to represent a single segment. The following diagrams use map links from the Navteq/Nokia map database, but other vendors' maps will be similar.

Figure 7A:
FIGS. 7A-D depict TMC-table representation of part of 1-75 in Georgia, including, inter alia, TMC points 4098, 4099 and others, according to an exemplary embodiment of the present invention.

FIG. 7A shows the TMC-table representation of part of 1-75 in Georgia. The linkage in the positive direction is from 4635 to 4098 to 4099 (i.e. proceeding northwards, in this example) as shown below: Apogee follows the same convention as Alert-C for converting direction to side-of-road.

The positive direction indicates that the traffic queue is building up towards the next point in the positive direction. Since queues build up at the end, the queue direction is the opposite of the travel direction.

If there was congestion (or an accident) in the southbound lane of 1-75 above at the Jodec Road exit (TMC-4098), then the traffic would start to back up towards TMC-4099. When it reached the point at TMC-4099, this would be represented in Alert-C by a message located at TMC-4098, with an extent of 1, extending in the positive direction. In Apogee this would also be represented as part of the positive Flow Vector.

In order to color the positive Flow Vector, these points must be converted to map database links, on the correct side of the road.

Figure 7B:
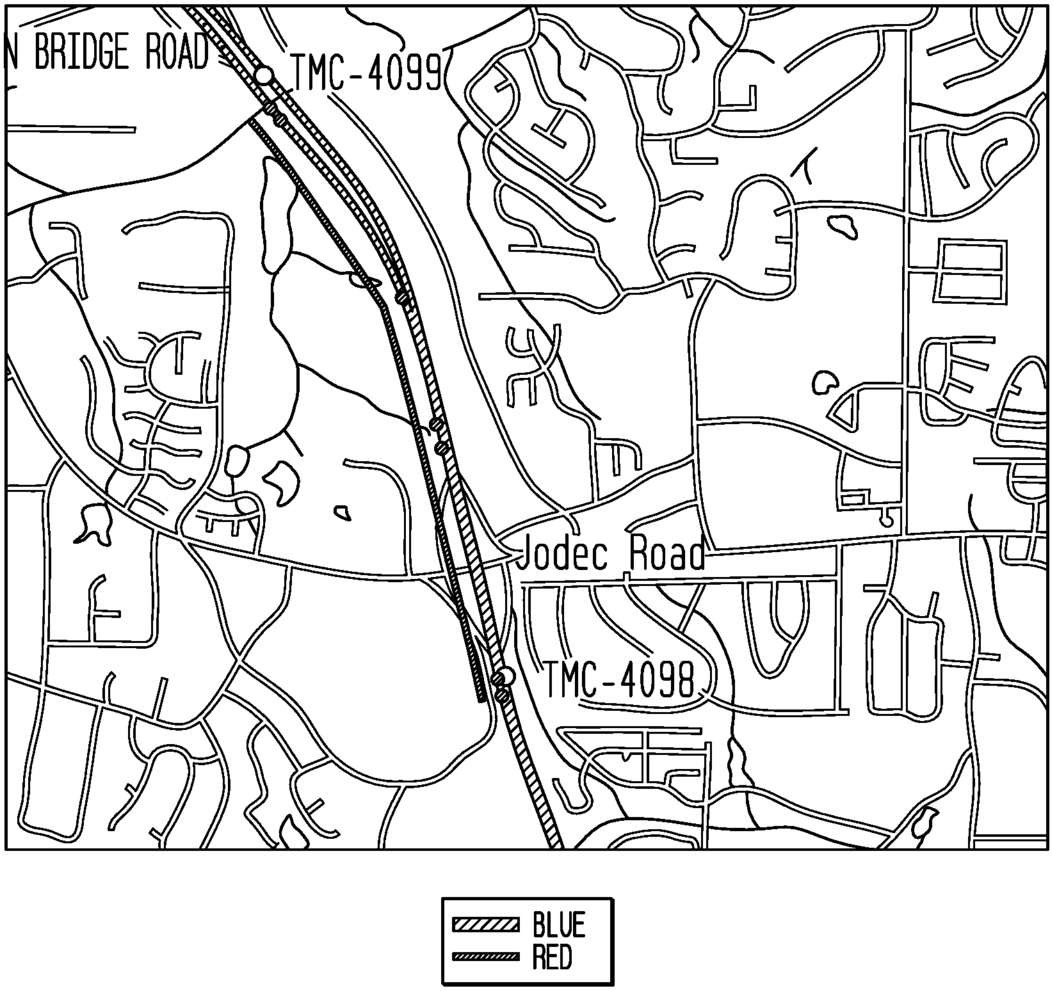

FIG. 7B shows there are six map links along the positive segment (the ends of the links are shown by red dots), and those links follow the southbound lane as it splits near TMC 4099.

Figure 7C:
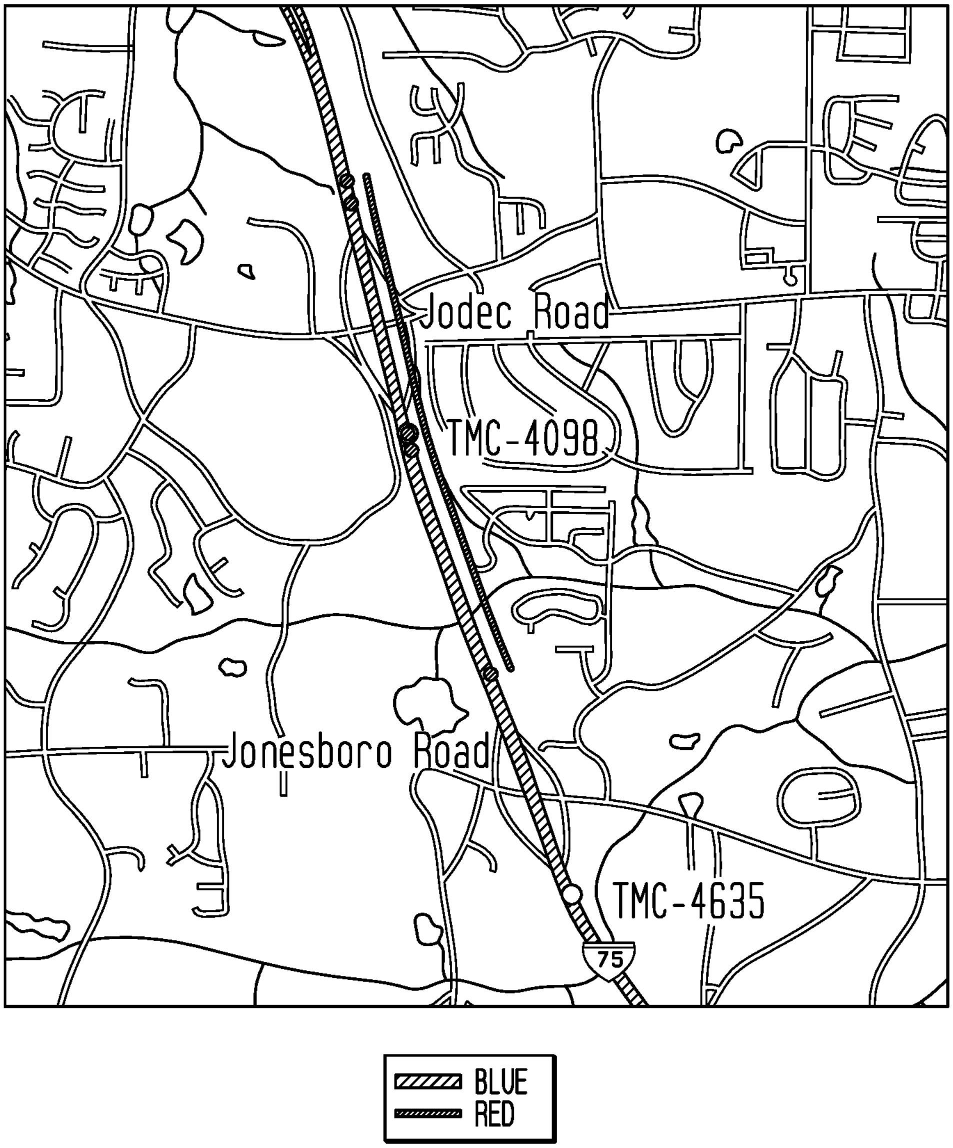

As shown in FIG. 7C, in the negative direction, driving from 4635 to 4098, the segment starts at the end of the entrance ramp from Jonesboro road and continues 'past' 4098 up to the end of the entrance ramp from Jodec Road.

Figure 7D:
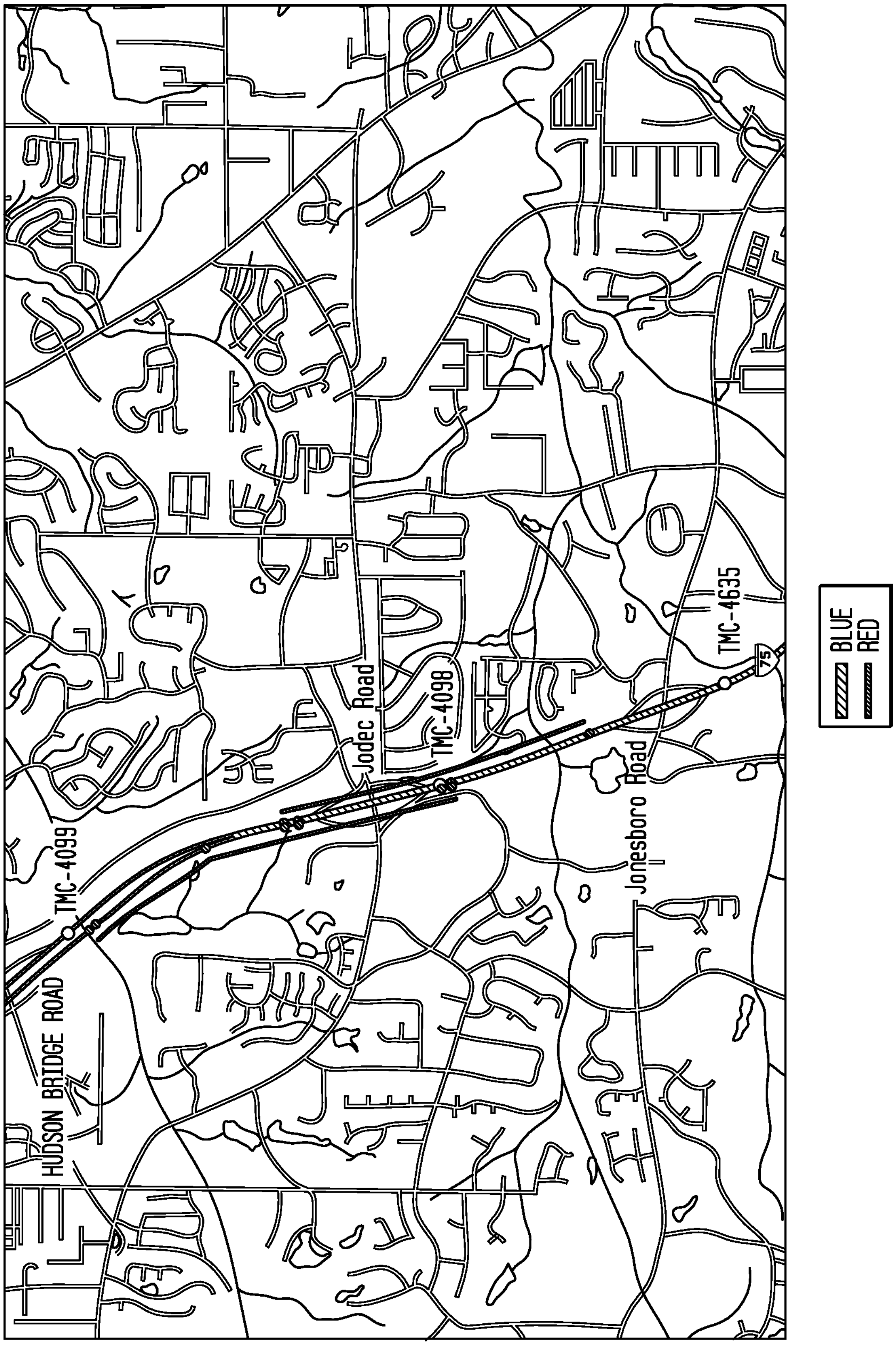

Finally, as shown in FIG. 7D, placing both segments onto the same map shows how 4098-to-4099 should be colored in the positive direction (left-hand red line), and how 4098-to-4635 should to colored in the negative direction (right-hand red line).

Sub-Segments

Figure 8:
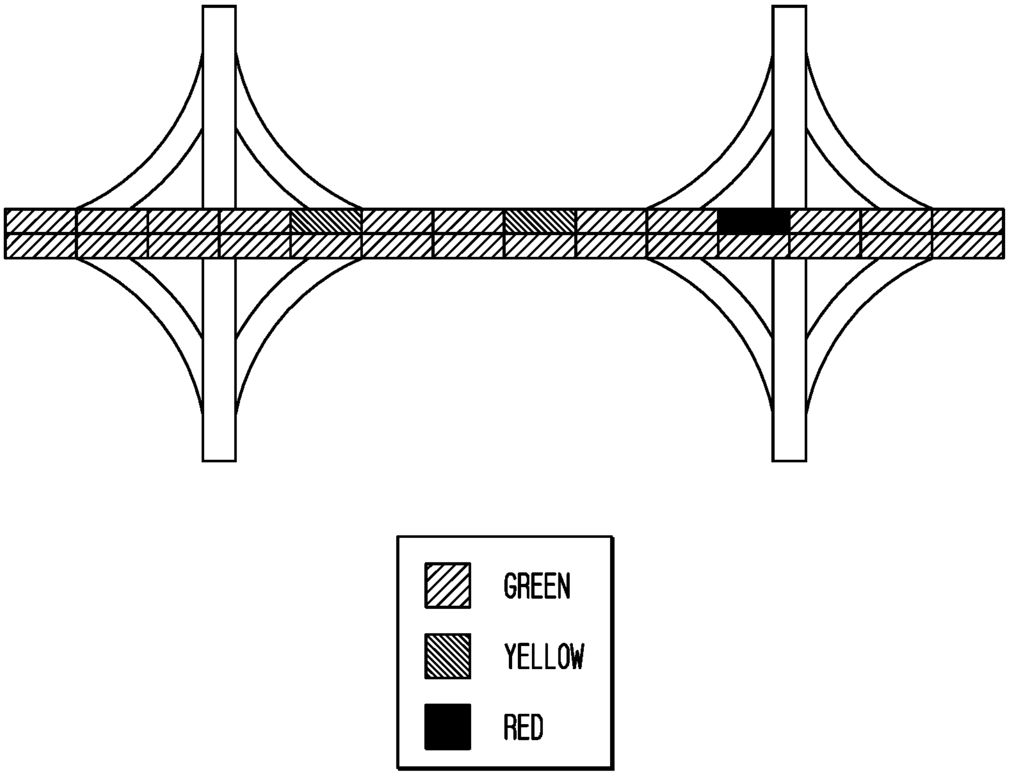
FIG. 8 depicts exemplary TMC sub-segments according to an exemplary embodiment of the present invention.

In exemplary embodiments according to the present invention, a traffic service divides each segment into eight sub-segments, as shown in FIG. 8.

Sub-segmenting a linear allows incidents to be accurately positioned along the roadway, and gives much better accuracy of speed and flow data, which translates into improved journey time calculations and better re-routing choices.

The choice of a fixed number (8) of sub-segments is a balance between increased accuracy and processing requirements, both during map preparation and within the vehicle application. The average TMC segment is under 2 miles long, which gives ¼-mile resolution. The resolution represents 15 seconds of travel time at 60 mph and 30 seconds of travel time at 30 mph. These numbers are generally faster than the latency of the speed-and-flow calculation and distribution times, and there is little to be gained, other than a false sense of accuracy, by presenting data with greater precision.

Almost all TMC segments are less than 4 miles long, and ⅛ of this gives half-mile resolution. Very long segments, for example the roads through the Everglades in Florida, have much longer sub-segment lengths. Even in this case the ability to locate an incident along an 8-mile sub-segment is far superior to placing it at the starting point.

Variable-length coding, as used in TPEG, has the advantage of arbitrary precision, but places a large processing burden on the vehicle application, since the application must dynamically calculate the position according to its internal map database. Length-based coding (e.g. 1 mile past TMC point 4100) is not independent of the choice of map database, unlike the SXM approach of division into fixed fractions.

Using a fixed number of sub-segments allows the sub-segment offset to be presented in a known, fixed, number of bits (3 in this case) unlike, say a 0.1 mile distance offset. This simplifies the decoding in the receiver, and also implicitly limits the number of different messages that can be associated with a single segment, providing a much simpler interface between the protocol decoder and the application.

Applications that are already capable of converting distance-based offsets for display can easily convert ⅛-segment positions to their internal format then use their existing system to render the result on the display.

Sub-segment offsets also follow the direction of travel and are presented in units of ⅛-segment.

Figure 9:
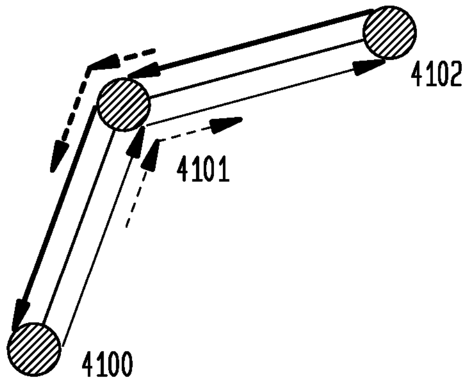
FIG. 9 depicts exemplary sub-segment offsets according to an exemplary embodiment of the present invention.

The purple line in FIG. 9 represents a stretch of roadway starting ⅝ of the way between 4100 and 4101 and extending ⅜ of the way past 4101 in the 'positive' direction of queue-growth. This line would be coded as:

| | | |
|---|---|---|
| LOCATION | 4100 | |
| OFFSET | 5 | |
| EXTENT | 6 | (i.e. 3 extents to reach point 4101, and 3 beyond) |
| DIRECTION | 0 | (positive) |

The brown line represents a stretch of roadway starting ⅞ of the way between 4102 and 4101 and extending % way to 4100, in the 'negative' direction of queue-growth. This line would be coded as:

| | | |
|---|---|---|
| LOCATION | 4012 | |
| OFFSET | 7 | |
| EXTENT | 5 | (1 extent to reach 4101, and 4 beyond) |
| DIRECTION | 1 | (negative) |

The offset value is relative to the direction of travel, so 4101+⅛ is not the same point as 4101-⅛, as well as being on opposite sides of the road.

The Apogee traffic service reports the speed and flow state separately for each direction in the linear, first for the positive direction and then for the negative direction.

Ramps, which are generally much shorter than segments, do not have sub-segment codes.

Links

Even though a TMC segment is defined as the path between two TMC points, the actual roadbed is unlikely to be a straight line between those two points. In order to draw the roadbed, indicate congestion, and place incident markers, the TMC segment must be converted to a set of map links. A map link is a straight-line drawn between two points, at sufficient resolution that the map follows the actual road topology for a map at a given zoom level.

Links are supplied from a map database, which must be purchased from a map vendor. SiriusXM does not require a specific map-link database, nor does it require the map be obtained from a particular vendor. The Apogee protocol is vendor- and database-agnostic. It is the responsibility of the application developer to obtain both a map database and the TMC consortium traffic tables and to integrate them into their product.

Data Filtering and Data Volume Reduction

There are two reasons to consider a data filtering strategy when implementing the Apogee traffic service:

1. Reducing the application input processing resource requirements.
2. Avoiding display clutter and unusable map displays.

Recognizing these needs, SiriusXM provides support in both the baseline database files and in the transmission protocol to allow an efficient implementation of the service within the application in the head unit. There are two levels of filtering:

1. Service Level Filtering. An application need only receive data packets for the services it needs to process.
2. Geospatial Filtering. An application need only receive data packets for the TMC tables it wishes to process. Within the tables, the data are structured to allow filtering at the BSA and individual linear levels. These filtering decisions are made on intersecting mean-bounding-rectangles.

Filtering by Mean Bounding Rectangle (MBR)

Figure 10:
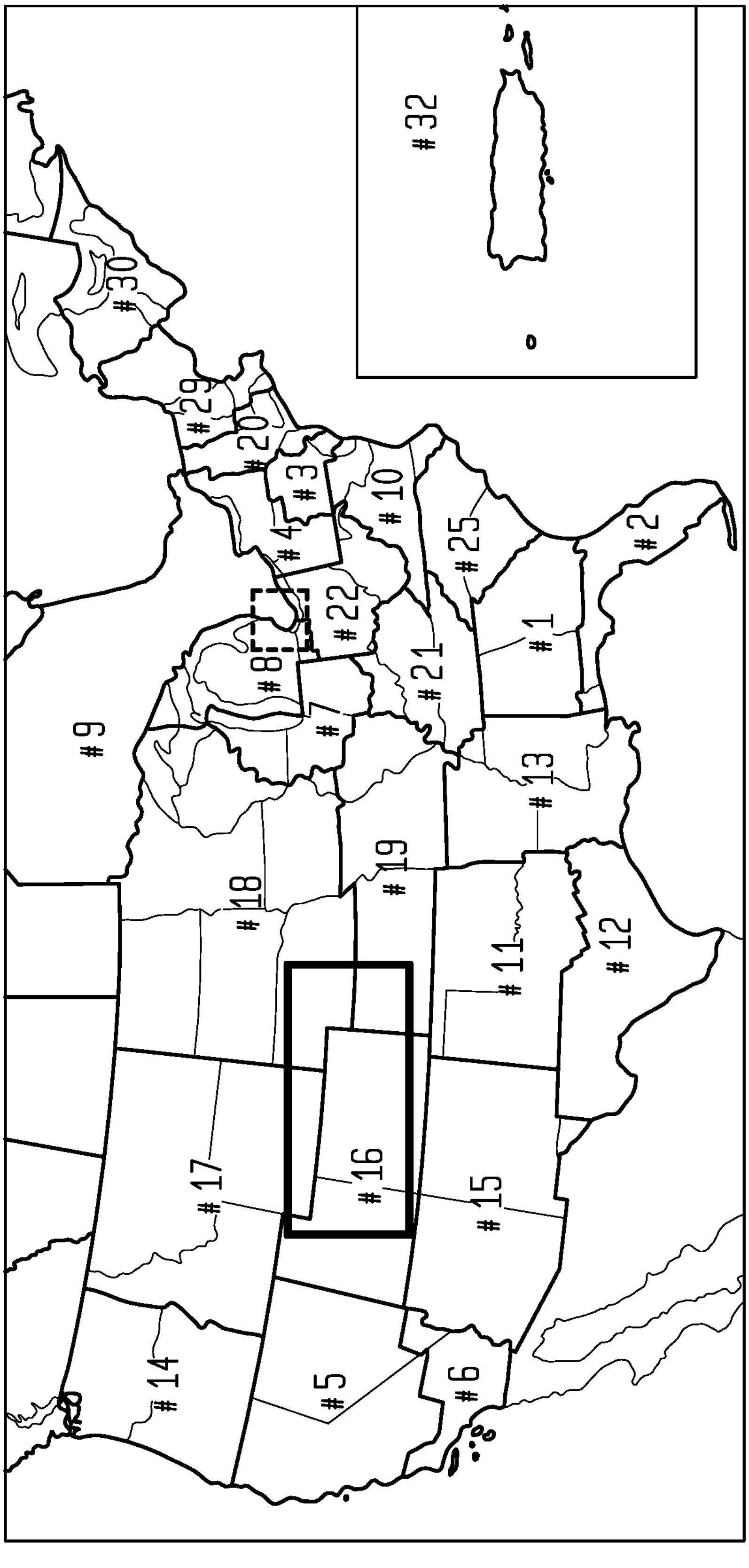
FIG. 10 depicts exemplary mean bounding rectangles according to an exemplary embodiment of the present invention.

If the vehicle map display is centered around Detroit (the blue rectangle in FIG. 10), then no data are required from table #19 (the black rectangle) in order to display the traffic around the vehicle. This is determined from the observation that the largest extent of table 19 (its mean-bounding-rectangle) lies entirely outside the mean-bounding rectangle of the display. However, parts of table #8, table #9 and table #22 do lie within the area of interest, and must be considered.

Calculating the intersection of two rectangles is a quick and easy operation requiring only comparisons between values (no square roots or trigonometric functions) and can be implemented using fixed-point integer arithmetic. The Bounding Boxes allow the application to skip over areas that lie completely outside the Map Area.

Figure 11:
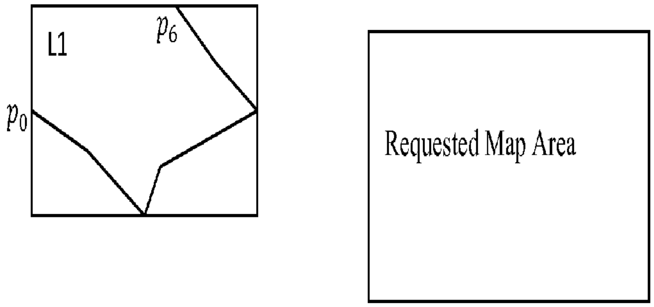
FIG. 11 depicts an exemplary MBR that can be skipped according to an exemplary embodiment of the present invention.

The MBR for an area is calculated as the smallest possible area that could be covered by the contained data considering all the points that lie within it. An MBR is defined by two points, the longitude and latitude of the bottom-left corner, and the longitude and latitude of the upper-right corner, in a geographic projection (i.e. lines of longitude and latitude are a right angles to each other). FIG. 11 shows an area that lies completely outside the displayable map area, whereas FIG. 12 below shows an area that intersects the map area and so must be processed. Using MBR filtering can significantly reduce the amount of processing required when a map is zoomed in to a very small area within a BSA.

As well as MBRs at the table level, Apogee also supports MBRs at the BSA level, and the individual linear level. Using the example in FIG. 2, many of the BSAs in table #8 and table #22 do not need to be processed. In this example, even though table #9 intersects the map area at the table level, none of its BSAs lie within the map area, so in this case table #9 would not need to be processed at all.

Even within a BSA, not all linears may lie within the map window, and can be skipped when extracting and processing the data. This leads to the overall structure shown in FIG. 13 where MBR filtering can be applied at the Table, MBR and linear level for speed-and-flow data.

MBR filtering is, of course, optional, and an application may choose to process all the linears in a table or BSA even if they are not all destined for the display at that time.

Figure 13:
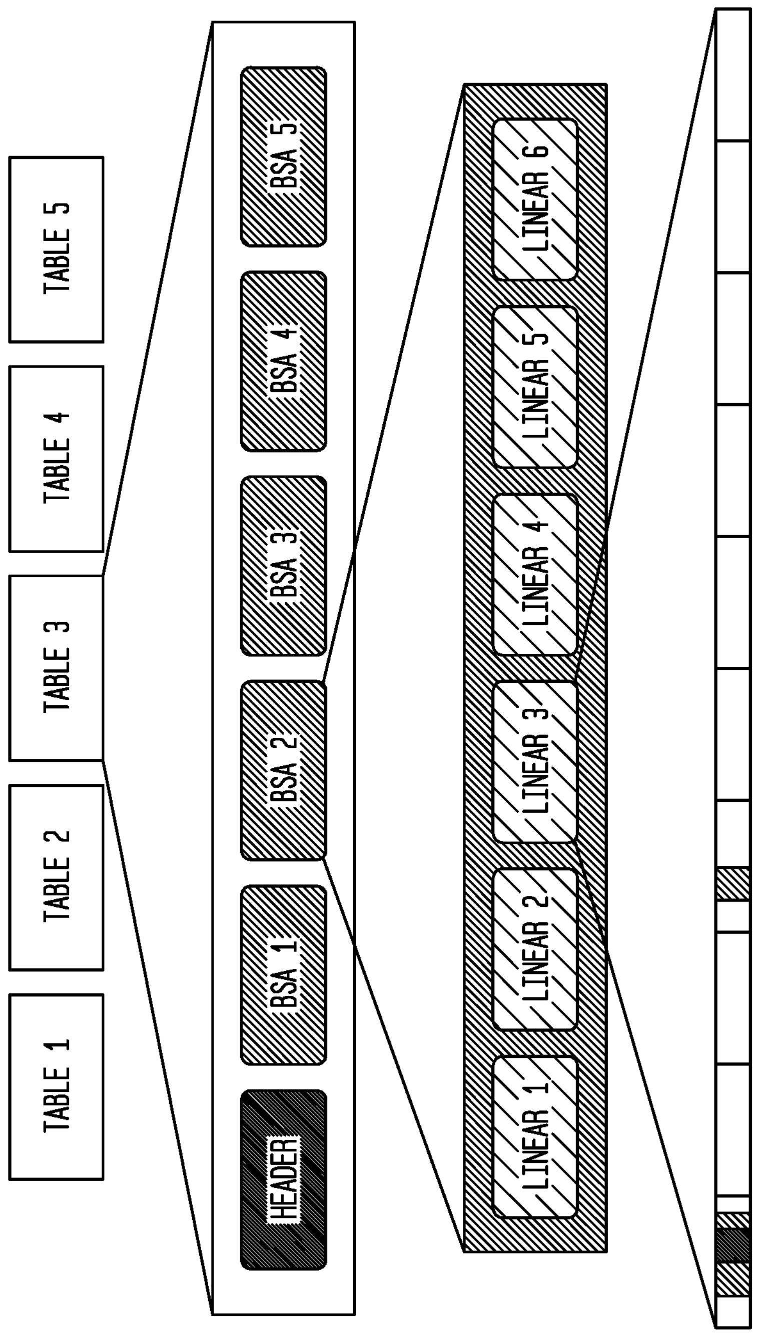
FIG. 13 depicts an exemplary BSA and linear coding according to an exemplary embodiment of the present invention.

Although each transmission unit contains data for a whole table, the data are divided internally by BSA as shown in FIG. 13, so that only the BSAs within an area, and that have changed, need to be processed. The information to extract individual BSAs is held in the BSA directory in the Header at the start of the unit.

SXM Additional Table Data

SiriusXM supplies a separate 'locations' file to accompany each TMC table supplied by the TMC consortium. This file is a Microsoft Excel spreadsheet that defines the index order of the BSA and linears. It supplies the additional information used to implement the spatial filtering methods used to reduce the processing time in the application. The first row of the table contains column headers for the remaining rows as defined in Table 11.

TABLE 11

SXM-defined TMC fields

| Column Header | Contents |
|---|---|
| LOCATION | The value of the LOCATION column in the corresponding TMC table. Format: Integer, always present. The value '0' indicates the table as a whole |
| SXMNEW | Contains the value 'N' if this is a location that was added since the SiriusXM Baseline table was created (see section 7.1 for the use of this field). Format: Character |
| SXLLLON | The longitude of the lower-left corner of the mean-bounding-rectangle for the area, or linear Format: Float, or empty |
| SXLLLAT | The latitude of the lower-left corner of the mean-bounding-rectangle for the area, or linear Format: Float, or empty |
| SXURLON | The longitude of the upper-right corner of the mean-bounding-rectangle for the area, or linear Format: Float, or empty |
| SXURLAT | The latitude of the upper-right corner of the mean-bounding-rectangle for the area, or linear Format: Float, or empty |
| SXFIPS | The Federal Information Processing Standard code for the county Format: Integer, or empty |
| SXSTART | The starting TMC point of the linear within the BSA Format: Integer, or empty |
| SXEND | The ending TMC point of the linear within the BSA Format: Integer, or empty |
| SXCOUNT | The number of TMC segments in this portion of the linear |

The data records within this file have been re-ordered with respect to the TMC table to create a hierarchical structure of elements that allows filtering by individual BSA and linear. Not all rows have data for all of these columns. The following sections describe how the columns are populated and used.

Service Filtering

Service Elements are grouped into blocks of DMIs by service type, so that a receiver need only monitor the DMIs for the services it is implementing. The DataServiceFilterCmd operation within SXi will restrict the DMIs that are passed from the module to the application for any given DSI. The block structure is shown in Table 4 above. If a receiver is only processing and displaying real-time information around a vehicle it need only select the appropriate tables from DMI blocks A and B and it will never see the Predictive flow information from block C, those data will never leave the module.

Table Filtering

All Apogee data are structured around the TMC table definitions and their geographic extents. Within each block of DMIs, data for a particular TMC table will always be sent on the same DMI, and no other. This allows the receiver to monitor only the DMIs for tables that it needs. To assist in determining the required coverage, fields in the SXM locations file the table-definition record contain the geographic bounding rectangle of the table coverage.

TABLE 12

| SXM field value for Table Lines | |
|---|---|
| Identification | SXM Fields Present |
| When TABLE is 00 | SXLLLON, SXLLAT, SXURLON, SXURLAT |
| Example | |
| LOCATION = 0 SXLLON = −87.32598 SXLLAT = 40.98953 SXURLON = −82.42448 SXURLAT = 46.67064 | |

Table 12 describes the additional information available at the table level. If the map display does not intersect the table bounding rectangle, the application is not required to accept and process the data for that table.

Table 13 shows the mapping between the TMC traffic table numbers and the DMIs on which the data for those tables are transmitted. In some cases more than one table is carried on a single DMI. These are low-volume areas where the overhead of receiving multiple tables is not significant.

Three DMIs, 640, 672 and 704 are currently reserved for future use. SiriusXM will not change the assigned DMIs for the lifetime of Protocol Version 1. SiriusXM may add additional tables to existing DMIs, therefore the receiver must check the table identifier inside the protocol header to verify it is processing the correct table.

TABLE 13

DMI Assignments

| Table ID | Incident DMI | Flow DMI | Forecast DMI | Table Name |
|---|---|---|---|---|
| 1 | 641 | 673 | 705 | Atlanta |
| 2 | 642 | 674 | 706 | Florida |
| 3 | 643 | 675 | 707 | Philadelphia |
| 4 | 644 | 676 | 708 | Pittsburgh |
| 5 | 645 | 677 | 709 | San Francisco |
| 6 | 646 | 678 | 710 | Los Angeles |
| 7 | 647 | 679 | 711 | Chicago |
| 8 | 648 | 680 | 712 | Detroit |
| 9 | 649 | 681 | 713 | Ontario |
| 10 | 650 | 682 | 714 | Baltimore |
| 11 | 651 | 683 | 715 | Dallas |
| 12 | 652 | 684 | 716 | Houston |
| 13 | 653 | 685 | 717 | Memphis |
| 14 | 654 | 686 | 718 | Seattle |
| 15 | 655 | 687 | 719 | Phoenix |
| 16 | 656 | 688 | 720 | Denver |
| 17 | 657 | 689 | 721 | IO-MT-WY |
| 18 | 658 | 690 | 722 | Minneapolis |
| 19 | 659 | 691 | 723 | St. Louis |
| 20 | 660 | 692 | 724 | New York |
| 21 | 661 | 693 | 725 | Nashville |
| 22 | 662 | 694 | 726 | Cincinnati |
| 23 | 663 | 695 | 727 | B. Columbia |
| 24 | 664 | 696 | 728 | Quebec |
| 25 | 665 | 697 | 729 | Charlotte |
| 26 | 666 | 698 | 730 | (Hawai'i) |
| 27 | 667 | 699 | 731 | (Alberta) |
| 28 | 668 | 700 | 732 | (Manitoba) |
| 29 | 669 | 701 | 733 | Boston |
| 30 | 670 | 702 | 734 | New Brunswick |
| 31 | 670 | 702 | 734 | (Saskatchewan) |
| 33 | 670 | 702 | 734 | (Alaska) |
| 34 | 670 | 702 | 734 | (Newfoundland) |
| 35 | 670 | 702 | 734 | (NW Territories) |
| 36 | 671 | 703 | 735 | (Mexico) |

BSA Indexing

As FIG. 2 shows, even within a table, not all of the BSAs need to be decoded in order to completely cover a map. The SiriusXM locations file supports filtering by BSA, by reordering the linears in the table to bring all the linears and points within a single BSA into a contiguous group of records.

Figure 14:
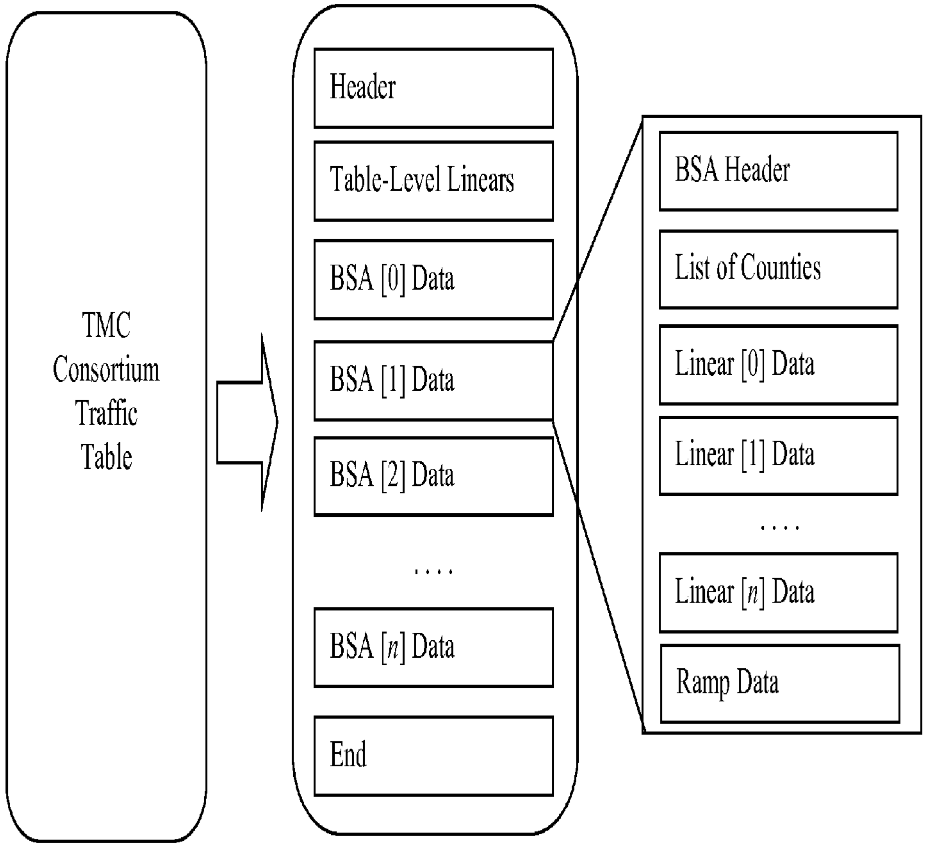
FIG. 14 depicts an exemplary SXM-TMC table Structure according to an exemplary embodiment of the present invention.

FIG. 14 shows how the SXM locations file is structured. All the records needed to decode a single BSA are grouped together. SiriusXM also supplies additional data for the BSA Header and County records to assist applications in deciding which BSAs are required as shown in Table 14.

TABLE 14

| BSA Extensions | |
|---|---|
| Identification | SXM Fields Present |
| When (SUB)TYPE is A12.0 (BSA definition) | SXLLLON, SXLLAT, SXURLON, SXURLAT |
| When (SUB)TYPE is A8.0 (County definition) | SXFIPS |
| Example | |
| LOCATION = 7 SXLLON = −84.40643 SXLLAT = 41.71613 SXURLON = −83.76626 SXLLAT = 42.14881 LOCATION = 60139 FIPS = 26091 | |

Adding the standard FIPS identification code to the county definitions allows a receiver without GPS support to select the appropriate BSA for display based on a user-selectable list of counties in a State.

Linear Indexing

There are three types of linears defined by the TMC tables:

1. 'superlinears' extend across many BSAs and are composed of multiple normal linears joined end-to-end;
2. normal linears comprise the main body of the tables and define the roadways and directions from the points within them;
3. ramp linears define on- and off-ramps and usually have only a single point defining them.

Figure 15:
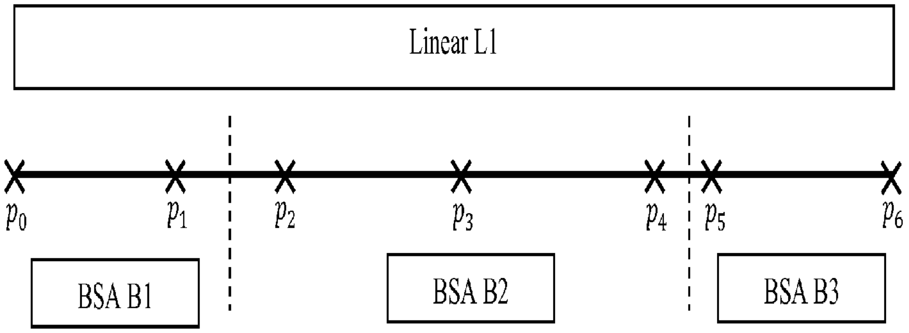
FIG. 15 depicts exemplary linears and BSAs according to an exemplary embodiment of the present invention.

In the standard TMC tables, even normal linears will cross BSA boundaries, as shown in FIG. 15.

The TMC definition of this example would be as shown in Table 15.

TABLE 15

Linear Example

| Point | In BSA | In Linear | Negative Link | Positive Link |
|---|---|---|---|---|
| $p_0$ | B1 | L1 | (blank) | $p_1$ |
| $p_1$ | B1 | L1 | $p_0$ | $p_2$ |
| $p_2$ | B2 | L1 | $p_1$ | $p_3$ |
| $p_3$ | B2 | L1 | $p_2$ | $p_4$ |
| $p_4$ | B2 | L1 | $p_3$ | $p_5$ |
| FIG. 15. Linears and BSAs | | | | |
| $p_5$ | B3 | L1 | $p_4$ | $p_6$ |
| $p_6$ | B3 | L1 | $p_5$ | (blank) |

In order to maintain the standard table structure, this definition is retained in the Apogee version of the table, so that each point exists in only one BSA. However, the Apogee table also includes the bounding rectangle for the linear, which includes all segments that cross the linear boundary, and the full range of points needed to cover the BSA. In the example above, points $p_1$ and $p_5$ are considered to be within BSA B2 when calculating the MBR for that BSA B2. This ensures that the segments crossing the BSA boundary will be included when the list of BSAs is built from the current map rectangle.

Figure 16:
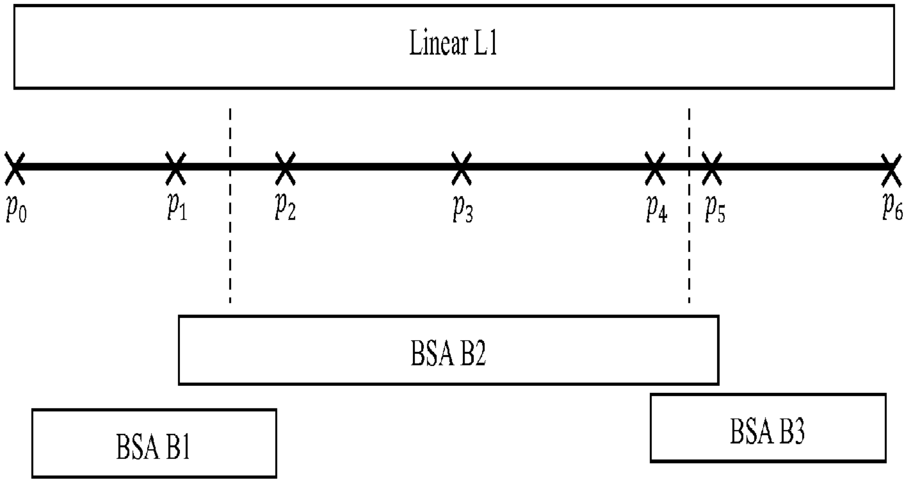
FIG. 16 depicts exemplary extended linear MBRs according to an exemplary embodiment of the present invention.

FIG. 16 shows the extended bounding rectangles for the three linear components in each BSA. The Apogee definition for this linear is then calculated from the representation in FIG. 16.

TABLE 16

| Linear MBR Calculation | | |
|---|---|---|
| Linear | In BSA | MBR |
| L1 | B1 | $[p_0 \ldots p_2]$ |
| L1 | B2 | $[p_1 \ldots p_5]$ |
| L1 | B3 | $[p_4 \ldots p_6]$ |

This representation leads to the table structure shown in Table 17.

TABLE 17

Extended TMC Table Structure

| | | | Negative Link | Positive Link |
|---|---|---|---|---|
| BSA B1 | Linear L1 MBR = $[p_0 \ldots p_2]$ | Point $p_0$ | (blank) | $p_1$ |
| | | Point $p_1$ | $p_0$ | $p_2$ |
| BSA B2 | Linear L1 MBR = $[p_1 \ldots p_5]$ | Point $p_2$ | $p_1$ | $p_3$ |
| | | Point $p_3$ | $p_2$ | $p_4$ |
| | | Point $p_4$ | $p_3$ | $p_5$ |
| BSA B3 | Linear L1 MBR = $[p_4 \ldots p_6]$ | Point $p_5$ | $p_4$ | $p_6$ |
| | | Point $p_6$ | $p_5$ | (blank) |

The MBR and range values are contained in the extended SXM field within the TMC table as shown in Table 18.

TABLE 18

Linear Extensions

| Identification | SXM Fields Present |
|---|---|
| When (SUB)TYPE is L (Linear definition) | SXLLLON, SXLLAT, SXURLON, SXURLAT, SXSTART, SXEND |

Example
LOCATION = 403 SXLLON = −84.08600 SXLLAT = 42.07215 SXURLON = −84.01814 SXURLAT = 42.07331 SXTART = 6696 SXEND = 6699

There are no SXM-defined extensions for the Point values within the TMC table.

Flow Vectors

In the Alert-C protocol, each 'message' (5 or 10 byte quantity) is an isolated unit that can be decoded independently of the messages preceding or following it. This has obvious advantages in the noisy or lossy radio environment for which RDS-TMC was developed. For the much more reliable SXM broadcast system this model places unnecessary burdens on the decoding application, mainly:

1. Each message requires a database lookup to determine its starting point and the linear on which it lies.
2. There is no guarantee that messages for a particular linear appear together in the broadcast, so all messages must be processed even if only one or two linears are required for that map coverage.

These concerns are addressed to some extent in the TPEG protocol by the introduction of a Flow Vector, which is essentially the set of speed and flow values along a particular linear arranged so that the messages are in the correct order (following the positive or negative table pointers). The intermediate TMC locations can then be removed since they can be inferred from the position in the flow vector.

The SXM transmission protocol takes the TPEG model one step further. Since the locations file defines the order of the linears within a BSA, the starting point of each speed and flow segment is defined by its index position in the broadcast carousel, and no TMC locations are required in the broadcast.

The following paragraphs describe how Flow Vectors are used within the Apogee traffic service. For the purposes of this introduction, three simplifications have been made:

1. Congestion values are represented as 'Red', 'Yellow' and 'Green' rather than the 0-7 values that are actually transmitted.
2. Only congestion values are used. Each vector contains both a congestion value and a transit speed value (in mph), but the speed values are not shown.
3. Congestion (color) changes occur only at the ends of the TMC segments. Usually, color changes will happen in the middle of a segment, but that affects only the extent values used in the Flow Vector, not the flow vector concept.

Figure 17:
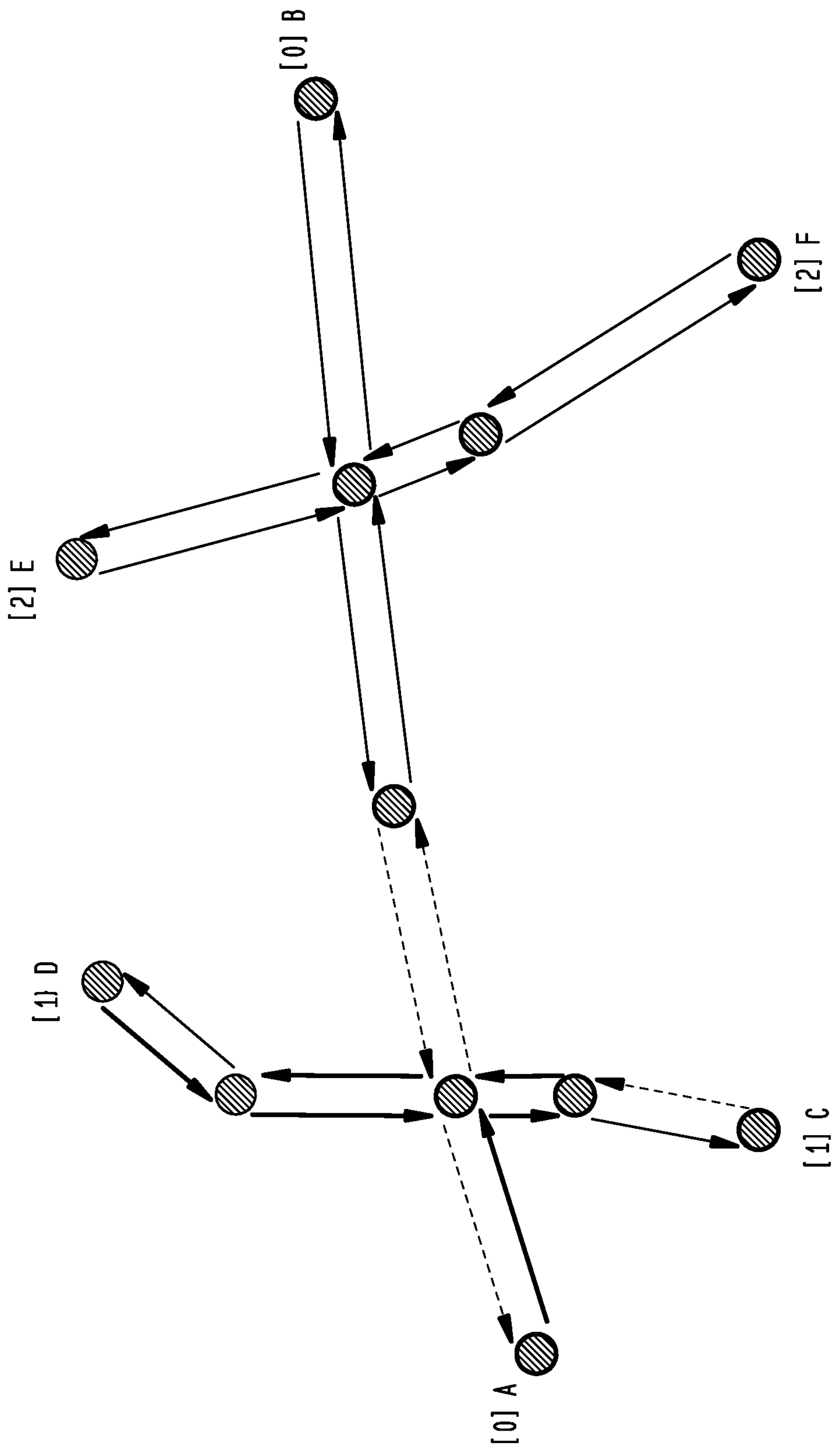
FIG. 17 depicts exemplary flow vectors according to an exemplary embodiment of the present invention.

FIG. 17 shows a BSA containing three linears. Even though this illustration assumes that the flow values happen to change only at segment boundaries, the extent values are fully coded at ⅛-subsegment resolution. This leads to the data representation in the broadcast datastream shown in Table 19.

TABLE 19

Flow Vector Representation

| Linear Index | TMC Point Range | Flow Vectors |
|---|---|---|
| [0] | A-B | Positive: Red: 8 + Yellow: 8 + Green: 16<br>Negative: Green: 16 + Yellow: 16 |
| [1] | C-D | Positive: Yellow: 8 + Red: 16 + Green: 8<br>Negative: Red: 24 + Green: 8 |
| [2] | E-F | All: Green |

Again, for illustration, Table 19 uses the color values rather than the congestion codes. This gives the simple structure derived directly from the last column of Table 19 that is used in both the broadcast bitstream and in the pattern tables described in section 7.3.

Ramp Tables

Ramps between Controlled-Access highways are encoded in the TMC traffic tables, as a pair of rows, an L7.0 linear and a single P4.0 point. All the TMC-defined ramps are collected together at the end of the BSA table.

SiriusXM also defines additional ramps, in a table that accompanies each standard TMC Table. The ramps file is a Microsoft Excel spreadsheet that defines the additional ramp locations and types for those ramps not covered by TMC locations. The first row of the table contains column headers for the remaining rows as defined in Table 20.

TABLE 20

SXM Ramp Table Columns

| Column Header | Contents |
|---|---|
| INDEX | The index value of this entry (incrementing values from 0) |
| LOCATION | The value of the LOCATION column in the corresponding TMC table.<br>Format: Integer |
| TYPE | The topological type of the ramp at that location as defined in FIG. 5<br>Format: Integer |
| SXLLLON | The longitude of the lower-left corner of the mean-bounding-rectangle for the ramp.<br>Format: Float |
| SXLLLAT | The latitude of the lower-left corner of the mean-bounding-rectangle for the ramp.<br>Format: Float |

TABLE 20-continued

SXM Ramp Table Columns

| Column Header | Contents |
| --- | --- |
| SXURLON | The longitude of the upper-right corner of the mean-bounding-rectangle for the ramp. Format: Float |
| SXURLAT | The latitude of the upper-right corner of the mean-bounding-rectangle for the ramp. Format: Float |

The two types of ramps (within TMC and SXM additions) are indexed separately, so that additions can be made to either table without requiring changes to the other table. The SXM-defined ramp tables will be updated over the air, as new ramps are added to the service. The TMC-based ramp tables will follow the publication schedule of the consortium and will only be incorporated into new vehicles.

Displaying the Data

This section discusses options for displaying Apogee traffic data.

Speed and Flow Data

The conventional Alert-C coding uses a single message to indicate both congestion and an expected transit speed (e.g. "Congestion: 35 mph") as well as a simple "Traffic Flowing Freely" message. Without knowledge of the road speed limits it is difficult to gauge if 35 mph represents heavy congestion (on a 75 mph interstate) or light congestion (on a 45 mph arterial). The Apogee speed and flow service separates these two concepts and provides both a congestion indicator and an expected transit speed indicator. This also allows for greater precision in transit times than is supported by the Alert-C event codes.

The usual means of displaying congestion data is by colored lines adjacent to the roadway on a graphical map display. Table 21 gives two sets of suggested colorings, one for displays that can use multiple shades to indicate congestion, and one for displays that with to limit the palette to only three colors.

The congestion lines should follow the path of the roadbed as defined on the underlying map, not simply appear as straight lines between the points as defined in the TMC tables.

TABLE 21

Congestion Colors

| Code | Full-Color | 3-Color | Indicator |
| --- | --- | --- | --- |
| 0 | Light Green | Green | Traffic flowing at or near posted speed |
| 1 | Teal/Blue-Green | Green | Light congestion |
| 2 | Yellow | Yellow | Moderate Congestion |
| 3 | Orange | Yellow | Medium-to-Heavy Congestion |
| 4 | Red | Red | Heavy Congestion, stop-and-go traffic |
| 5 | — | — | Undefined |
| 6 | Black | None (or Black) | Road closed |
| 7 | None | None | No congestion information available |

Congestion levels for ramps are more broadly defined. Table 22 shows the suggested colors for indicating ramp congestion.

TABLE 22

Ramp Congestion Colors

| Code/Color | Ramp State |
| --- | --- |
| 0/None | Ramp state unknown, do not color |
| 1/Green | Ramp flowing at or near its expected advised speed |
| 2/Orange | Ramp flow at 50% or below of its advised speed limit |
| 3/Red | Stop-and-Go traffic on the Ramp |

Map Zoom Levels

The Apogee traffic service transmits a large amount of information, more than can reasonably be presented on a small display covering a large geographic area. It is expected that applications would limit the amount of information shown according to the zoom level of the map. There are two main strategies that can be combined to improve information presentation:

1. Suppressing information for more minor roads (i.e. those with a higher Functional-Class number).
2. Limiting displayed information to a specific route, or set of alternate routes.

For example a long-range trip-planner might show only the free-flow and congestion 'hot-spots' along the main interstates to facilitate a broad route selection (i.e. "North then West vs West then North"). Zooming the map in might show the congestion levels of the feeder roads used to access the interstates and so on. Table 23 gives a suggested set of information to display for an application supporting multiple map zoom levels, from multi-state coverage (level 1) down to a few miles in each direction (level 4).

TABLE 23

Congestion Information by Zoom Level

| | |
| --- | --- |
| 1 | All FC1 coverage |
| 2 | All FC2 coverage |
| 3 | All FC3 |
| 4 | All covered roadways |

Ramp data display may be determined by zoom level, or ramp data may be displayed once a route has been determined for only those ramps on the route, even at the multi-state coverage.

BSA Patterns

All broadcast speed and flow data are encoded as a difference from a 'pattern' which is a pre-defined or previously-transmitted set of speed and flow data for a single BSA that can be used to color all the supported roadways and ramps within that BSA.

There is an implicit NULL pattern which is "No coverage within this BSA" (i.e. do not draw anything). This is the pattern that should be used when no other pattern can be found for a BSA. For example if there are no supported roadways within BSA 19 in a particular table, no data will be transmitted for BSA 19 in the broadcast stream and the application should not color any roadways for that BSA when displaying data on the map.

Delta Codes

Real-time speed and flow data are always coded against the NULL pattern described above. For the first predictive dataset, the pattern is the most recently-received real-time speed and flow pattern. The second predictive dataset is delta-coded from the first, and so on. All forecast and historical patterns are delta-coded from the NULL pattern.

The definition of the delta coding is one of the following operations:

a. Leave the underlying value unchanged.

b. Replace the underlying value with a specific speed+congestion value.

c. Replace the underlying value with 'no coverage' (i.e. do not color the road).

The specific values are coded as absolute values, and so are independent of the value being replaced. This means that for predictive datasets, the actual pattern used as the base pattern is not critical, the outcome of applying the predictive dataset will always be a closer approximation to the prediction that whatever is being used as the current speed and flow dataset.

The default for any segment not explicitly addressed is option 'a', leave it unchanged.

Extents

For each direction along a linear, the transit speed and congestion level values are run-length encoded in the Apogee broadcast. This is similar to the Alert-C 'extent' coding format but with some simplifications:

1. Extents are coded in ⅛-segment units up to a maximum of 16 full segments (see section 4.7).

2. Extents are implicitly joined end-to-end along a linear, so explicit TMC point references are not required (see the Flow Vector description in section 5.7).

Because Apogee traffic has greater resolution than existing Alert-C encodings, the standard rules for Alert-C do not apply. In particular there may be more than one speed/flow state associated with a single TMC segment, and an extent may start and stop in the middle of a TMC segment.

Incident Data

This section describes how construction, accident, and other incident data should be displayed.

Displaying Incident and Construction Data

There are two aspects to the display of incident and construction data. The first is an indication of the presence of an event, the second is informing the user of the nature of the event. Apogee uses the event codes from [8] to indicate the nature of an event. It does not use the 'event class' system to limit the number of events at any one location. Multiple events at the same location are permitted in the Apogee traffic system.

Indicating the existence of an event is usually done by placing an icon on the map such as a triangle with a red or yellow border and a graphic to suggest the nature of the event. Selecting the icon, or requesting an event display, should display more information, either a summary with details on a separate screen, or display all the information on the screen at the same time.

When the map shows a large area of the country, icons should be aggregated, or merged, to avoid clutter on the screen. A generic 'Accident' icon could represent the 5-10 events in that area which are then listed when the icon is selected. Other options to reduce clutter include suppressing minor events and limiting the display to events on or near a selected route.

Figure 18:
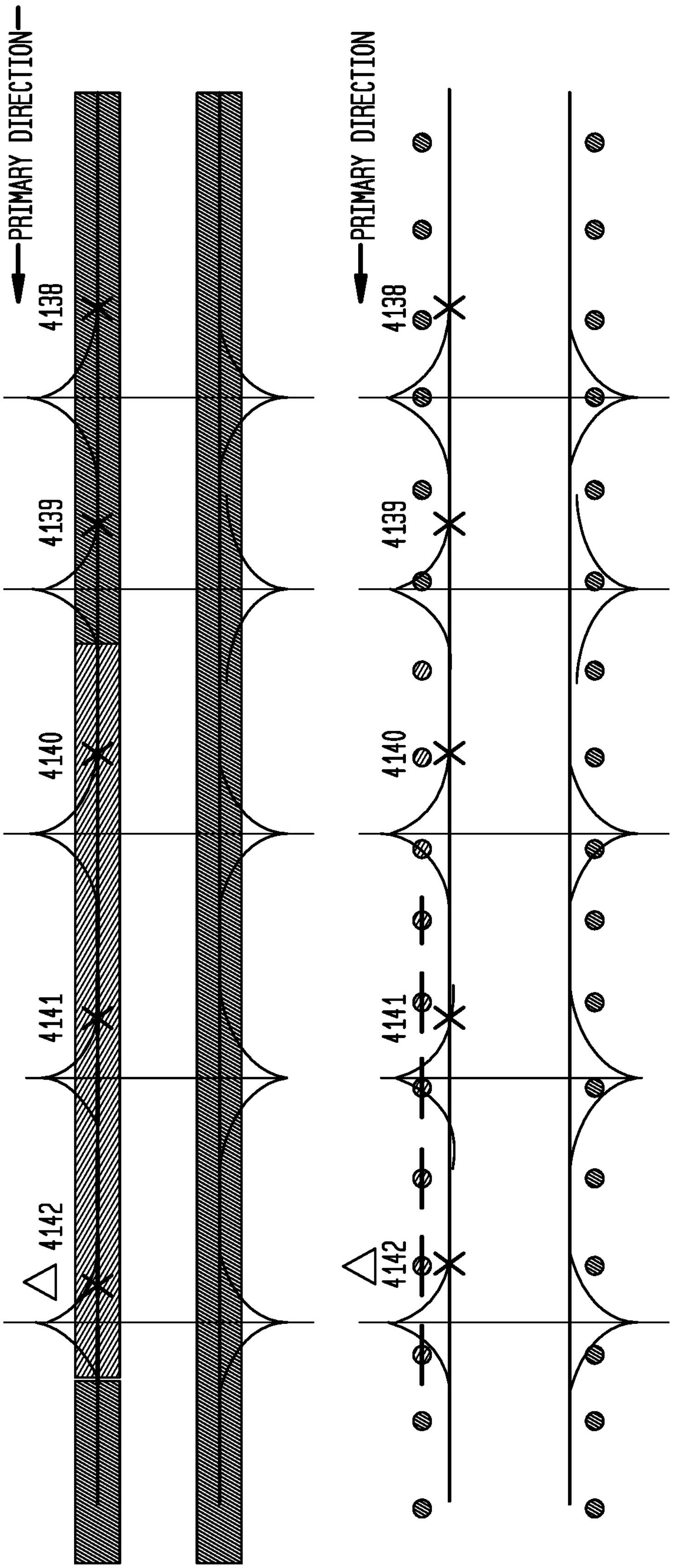
FIG. 18 depicts exemplary construction markers according to an exemplary embodiment of the present invention.

Some incident data will have extent information: highlighting the congestion queue that may result from an accident; indicating the number of sub-segments affected by lane construction; showing the length of road that is closed in a road-closure announcement; or describing the extent of a major accident or other incident. Extent information can be used to augment the standard congestion coloring for that part of the roadway, for example to color a closed road as black or a construction as a yellow/black barberpole when congestion is caused as a result of the construction, as shown in FIG. 18.

Applications usually choose to place the icon for road construction at the start of the extent (when the driver will first encounter it), and to place an accident or incident icon at the end of the extent (at the point at which the event is occurring).

The textual display of incident and construction data is built up from three components:

1. The stored textual description of the Alert-C event code from ISO 14189-2.

2. The textual description of the location. This is derived from:

a. The stored TMC table for a TMC-based reference.

b. The transmitted text string of a geographic-based reference.

3. The event description transmitted in the protocol.

An example of TMC-coded accident in Detroit is shown in Table 24.

TABLE 24

TMC-coded accident

| Field | Encoding | String |
|---|---|---|
| Event Code | 534 | Broken-down trucks. Danger |
| Location | TMC-4156 | I-94 at I-275/Exit 194 |
| Offset | 2 | |
| Text | String table offset | Tractor-Trailer blocking right-hand lane. Police and Emergency Vehicles on scene. |

The offset value can be incorporated into the textual description by using location phrases such as 'at', 'near', 'just past', 'past', 'just before' etc.

A non-TMC coded event on a specific roadway is shown in Table 25. By including a map-matchable street address a specific road can be identified, even when it is not explicitly TMC coded.

TABLE 25

Non-TMC coded roadway

| Field | Encoding | String |
|---|---|---|
| Event Code | 1149 | Parade |
| Location | −73.9797, 40.7636 + String table offset | W 55$^{th}$ St |
| Text | String table offset | Road closed because of Jet's celebration parade |

A non-TMC-coded construction event for an unspecified roadway is shown in Table 26. In this case there is insufficient information to identify specific roads within the mall complex but the event can still be geo-located and the user informed of the nature of the event.

TABLE 26

Non-TMC-coded construction

| Field | Encoding | String |
|---|---|---|
| Event Code | 833 | Roadworks during the day |
| Location | −83.225, 42.317 + String table offset | Fairlane Town Center Mall |

TABLE 26-continued

| Non-TMC-coded construction | | |
|---|---|---|
| Field | Encoding | String |
| Text | String table offset | Resurfacing on Mall Access Roads. Some lots closed. |

The list of Event Codes that can appear in either a construction message or an incident message is shown in Table 27.

TABLE 27

| Event Codes used in Apogee | | |
|---|---|---|
| Update Class | Description | Apogee Use |
| 1 | Level of Service | Incident Only |
| 2 | Expected Level of Service | Incident Only |
| 3 | Accidents | Incident Only |
| 4 | Incidents | Incident Only |
| 5 | Closures and Lane Restrictions | Event Codes 51, 735-741, 743-745, 776-778, 835-839, 793-798 in Construction. All others in Incident |
| 6 | Carriageway Restrictions | Incident Only |
| 7 | Exit Restrictions | Construction Only |
| 8 | Entry Restrictions | Construction Only |
| 9 | Traffic Restrictions | Incident Only |
| 10 | Carpool Information | Not used in Apogee |
| 11 | Roadworks | Construction Only |
| 12 | Obstruction Hazards | Incident Only |
| 13 | Dangerous Situations | Incident Only |
| 14 | Road Conditions | Incident Only |
| 15 | Temperatures | Not used in Apogee |
| 16 | Precipitation and Visibility | Incident Only |
| 17 | Wind and Air Quality | Incident Only |
| 18 | Activities | Incident Only |
| 19 | Security Alerts | Incident Only |
| 20 | Delays | Incident Only |
| 21 | Cancellations | Not used in Apogee |
| 22 | Travel Time Information | Not used in Apogee |
| 23 | Dangerous Vehicles | Incident Only |
| 24 | Exceptional Loads/Vehicles | Incident Only |
| 25 | Traffic Equipment Status | Incident Only |
| 26 | Size and Weight Limits | Not used in Apogee |
| 27 | Parking Restrictions | Not used in Apogee |
| 28 | Parking | Not used in Apogee |
| 29 | Reference to Audio Broadcasts | Not used in Apogee |
| 30 | Service Messages | Not used in Apogee |
| 31 | Special Messages | Not used in Apogee |
| 32 | Level of Service Forecast | Incident Only |
| 33 | Weather Forecast | Not used in Apogee |
| 34 | Road Conditions Forecast | Incident Only |
| 35 | Environment | Not used in Apogee |
| 36 | Wind Forecast | Incident Only |
| 37 | Temperature Forecast | Incident Only |
| 38 | Delay Forecast | Incident Only |
| 39 | Cancellation Forecast | Not used in Apogee |

Text String Compression

Textual strings use the ISO-8859 (8-bit Latin) repertoire. Each text string is terminated by a byte containing 0x00 (the NUL value), i.e. following the convention C-language representation.

Individual text strings are gathered together to form a String Table, and references to strings are represented as byte offsets into the string table, starting at offset 0. All the strings that are used within a single TMC table for a particular service element are contained within a single string table (it is not divided by BSA).

Figure 19:
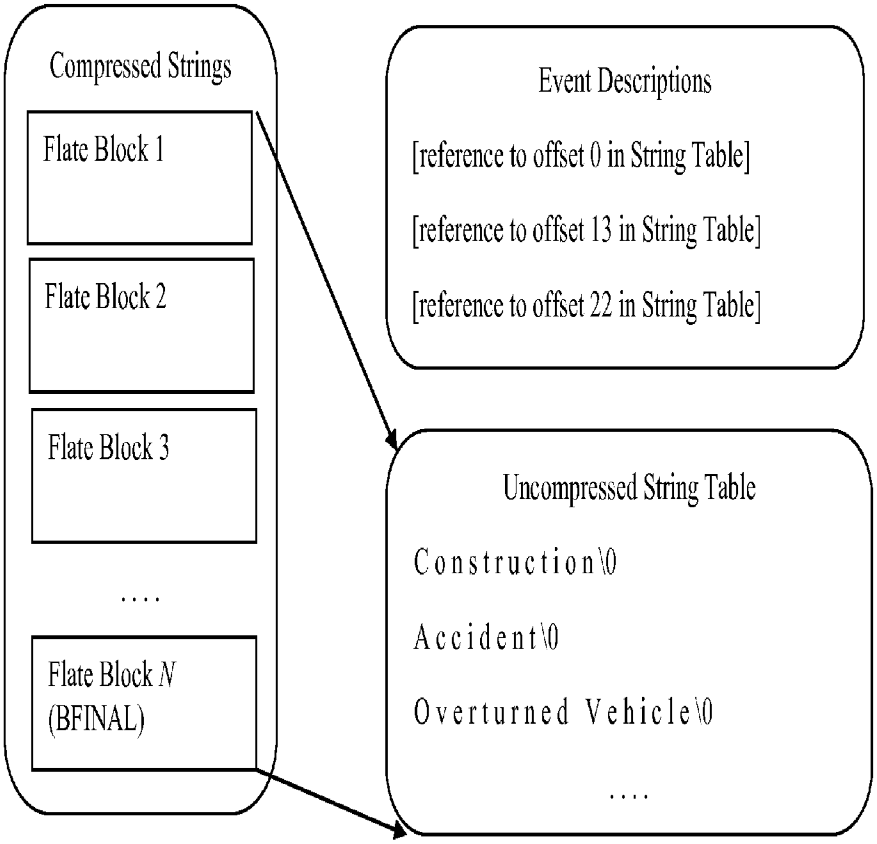
FIG. 19 depicts exemplary compressed text format according to an exemplary embodiment of the present invention.

Text strings are transmitted in a zip-compressed string table, one for each TMC table. The application must decompress the string table and locate the references within it in order to present the textual information to the user. The overall structure of the String Table and String References is shown in FIG. 19.

The string table is compressed for transmission using the 'flate' protocol as defined by the 'zlib' RFC document (RFC 1950, reference [8]). The compressed data does not represent a file (gzip) or directory of files (zip), so the additional headers defined for these aspects of RFC encodings are not present. The compression uses only the block-compression scheme from RFC 1950 and RFC 1951.

The first two bytes of the transmitted data are the 'Compression Method and Flags' byte and the 'Flag' byte of RFC 1950. These are always 0x78 and 0xda respectively.

These bytes are immediately followed by one or more blocks in RFC 1951 format, i.e. a BFINAL bit, followed by 2 bits of BTYPE followed by compressed data.

The flate blocks are followed by the gzip version 4.3 trailer as defined in RFC 1952, comprising a 4-byte CRC-32 followed by a 4-byte integer containing the uncompressed length of the String Table. An application that wishes to allocate memory for the String Table dynamically may use the uncompressed length field, which will be the last 4 bytes of the Access Unit immediately before the Access Unit checksum, to determine the amount of memory to allocate.

The string table is reconstructed using the following pseudo-code:

```
read and interpret method byte
read and interpret flag byte
while next_bit==0
    decode compressed block according to next two bits
compare next 4 bytes with computed checksum of data
```

The resulting byte array can then be directly indexed from the String Reference protocol elements. A string extends from the reference index position up to the next following NUL character in the array.

Information that Crosses BSA Boundaries

An incident, particularly a large-scale construction event, may cover multiple BSAs along a single highway. Since the application may be filtering at the BSA level, and may not be processing the BSA in which the incident starts, incidents that cross BSA boundaries are reported in each BSA that they impact. In such cases, the BSAs that do not contain the start point contain a back-reference to that start point as part of the event message. This allows the application to recognize extended events and only provide one icon for the event, even for multiple messages.

Including the event in all relevant BSAs simplifies the processing within the application, since the application does not need to scan adjacent BSAs, or tables, to determine if there are any events that impact the BSAs being displayed.

Stored Baseline Files

This section discusses the processing that is required to utilize the SXM-supplied baseline files and the over-the-air updates for those baselines.

TMC Consortium Tables

The Consortium and SXM-supplied TMC traffic tables usually require processing before they are usable in a vehicle display system. The individual point locations need to be referenced against the internal map database used by the display. The correlation must be done for both the positive and the negative directions, since for some widely-divided highways, separate map vectors may be used for the two directions.

In many cases there will be more than one map vector between two TMC points (for example when a road curves between the two points). All the map vector components must be considered when calculating the offset points (⅛-segment points). Any coloring of the roads to indicate congestion must follow the map vectors, not assume a single line between the TMC points.

A system that supports multiple map scales (zoom levels) may also need to calculate which of the linears are to be displayed at each zoom level.

The system may also wish to extract the MBR values for the Tables, BSAs and Linears from the SXM-supplied locations table to provide a rapid method for determining which tables and BSAs are required for any given map extent. A system that does not use a GPS sensor to detect position may also wish to extract the county values for each BSA to allow a user to select a location based on State and City or County menus.

Handling Location Table Updates

SiriusXM realizes that there is significant cost and complexity associated with updating in-vehicle navigation and map database systems. The Apogee location referencing model has been designed to work across all future versions of the TMC location tables, as they are released.

Figure 20:
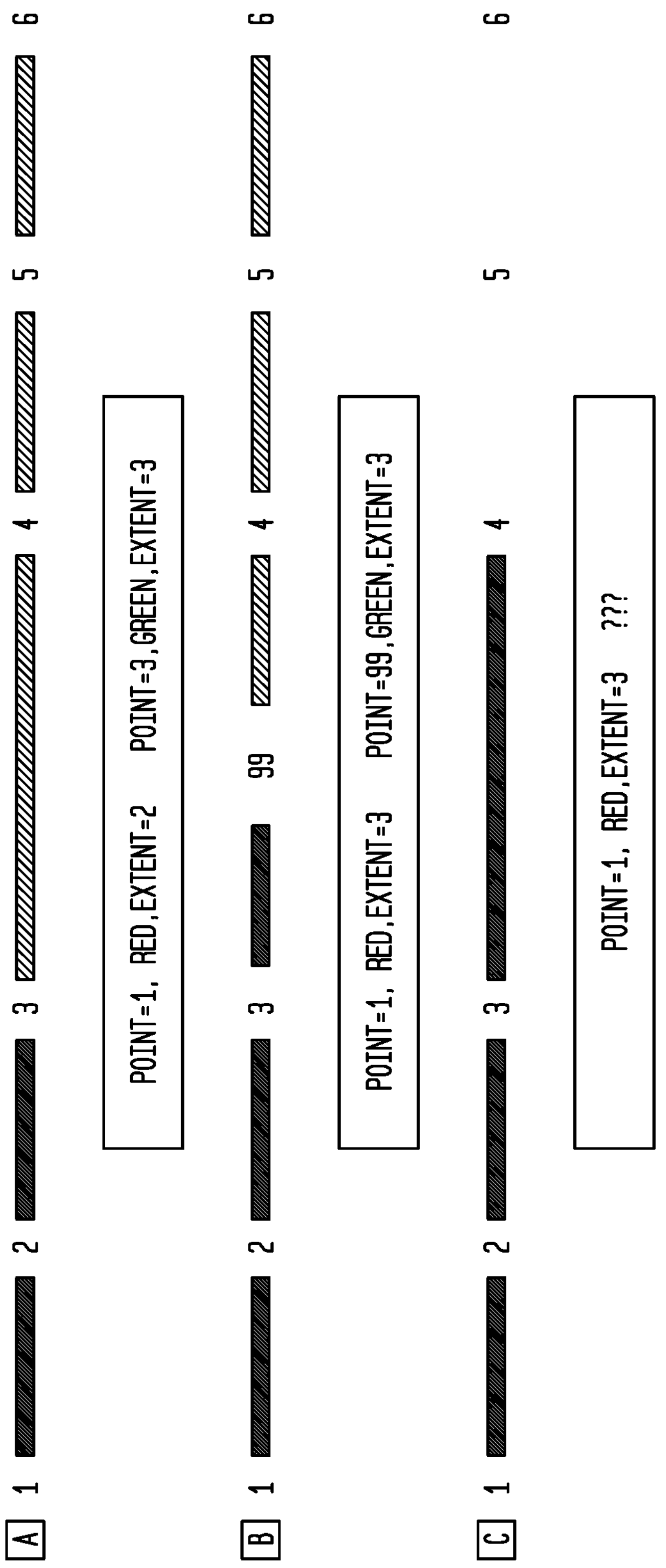
FIG. 20 depicts exemplary changes to the TMC Table (Alert-C coding) according to an exemplary embodiment of the present invention.

Legacy Alert-C coding can cause gaps or overruns in speed-and-flow data, or missed incidents on existing highways, when a TMC point is used that is not in the version of the TMC location table that is built in to the application, as shown in FIG. 20, for the case where a new point '99' is added in to an existing linear running from 1-6.

A receiver that is built with version 'A' of the TMC table will correctly interpret the Alert-C that references Points 1 and 3. If a new version 'B' of the TMC table is issued that inserts point 99 (because a new intersection was constructed), then systems that are built against that table will correctly interpret references to points 1 and 99. However, the legacy system, shown as 'C' above will color segment 3, using its notion of extents, then be unable to color segments from 4 and 5 because it cannot decode a reference to point 99. Similarly, an incident at point 99 would not appear on its map, even though it has a road at that point.

In the case of North America specifically, the TMC tables are essentially complete for the main highway system as it exists today. There are only three cases where significant point additions are being made:

1. The creation of new intersections (as illustrated in FIG. 20). These are rare.
2. The creation of new linears, or the extension of existing linears due to road construction.
3. The addition of more codes for ramps, or minor roads that do not currently have TMC codes.

When a point is added into the middle of a linear ('99' above) SiriusXM marks this point as 'New' in its Locations.xls file. This instructs the map-matching process to ignore that point when calculating the positions of the ⅛-sub-segment boundaries along the linear. SXM will continue to transmit speed-and-flow data for the linear according to the original table definition. Since it is likely that a new intersection changes the pattern at the new location, there is likely to be a break in the flow pattern at that point. This is simply reflected in a change in the sub-segment coloring at that point.

Figure 21:
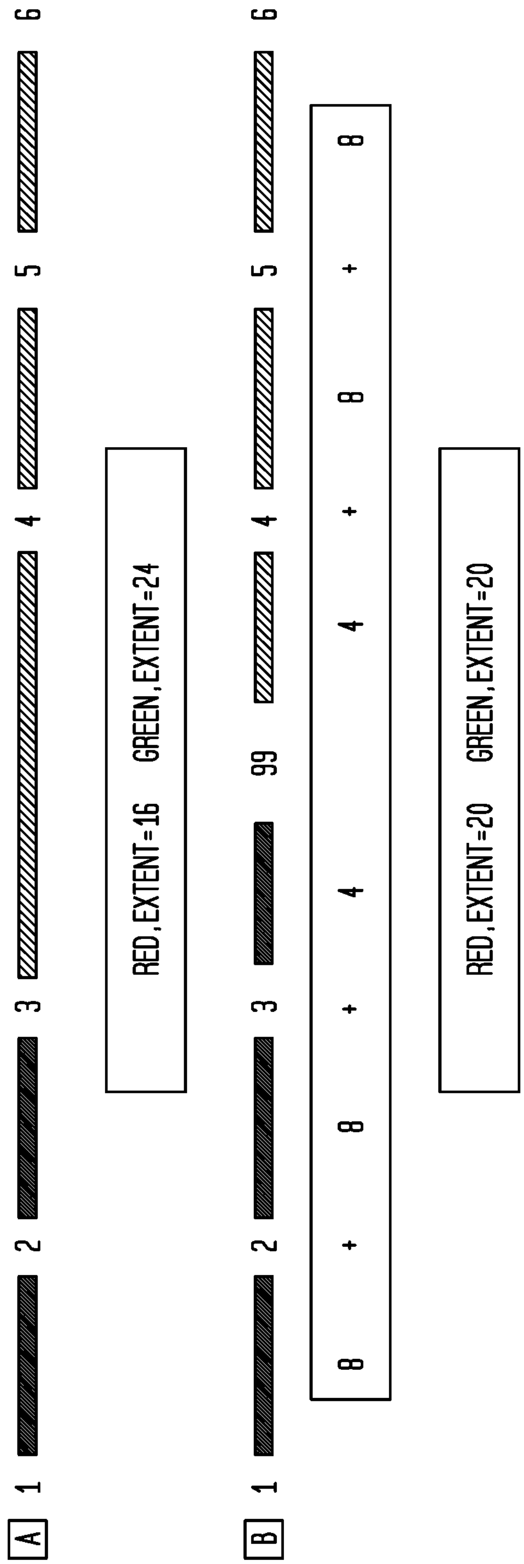
FIG. 21 depicts exemplary Apogee Coding with Added Point according to an exemplary embodiment of the present invention.

FIG. 21 shows the 'before and after' coding corresponding to FIG. 20 above, assuming that the added point lies halfway between the existing points 3 and 4. In both cases, there are 40 sub-segments in the linear, and the sub-segment coding is used to indicate there is a color change 'close to' the new intersection.

On older units this will appear as a color change in the middle of a segment. On newer units that render the added intersection, the color change will appear close to the added point. In all cases the remaining segments will be colored correctly, irrespective of the underlying TMC table version.

For new construction that results in the extension of a current linear, or the creation of a new linear in the TMC location tables, SXM will create a new linear index at the end of its table for that BSA, even if this is extending an existing indexed linear. These points do not have the 'New' flag set and so will be included in the ⅛-segment calculations when the TMC table is integrated into the map database. There will always be an extent break at the junction of the old and new parts of the roadway. Newer systems that have integrated the added points into their map database (and the corresponding SXM Locations.xls file) will be able to display the extension, while older units will ignore it. In both cases the speed-and-flow coverage is consistent with the underlying map as displayed to the user.

Incidents on existing highways will use the original location and offset (like speed-and-flow). Incidents on newly-constructed highways will appear only on new systems. This prevents users from seeing an 'Overturned Vehicle' icon in the middle of what is still a field on their maps. Vital incident information can always be carried using the explicit lon/lat format if it is essential to convey that information to all vehicles irrespective of their map status.

If a new intersection results in new ramp TMC codes being allocated, these will be carried at the end of the current ramp table for the BSA. Since they lie beyond the table extent being decoded by older receivers, they will not be displayed.

SXM Ramp Location Tables

Ramp Tables must be correlated against the underlying map database used for the vehicle system display. For TMC-coded points, the point value must be reconciled against a location of a ramp vector in the map database. For SXM-coded points, the TMC location and ramp topology type must be used to select the appropriate ramp vector. Ramps are unidirectional, there are no 'positive' and 'negative' flow directions, so only one flow value is supplied for a ramp.

New ramps will always be added to the end of the ramp table for a particular BSA. These ramps may use added TMC codes (for example a ramp associated with location '99' added by new construction). Since these codes are always associated with a specific TMC table version, only applications that have integrated that TMC location table will process and display these ramps.

BSA Speed and Flow Patterns

Figure 22:
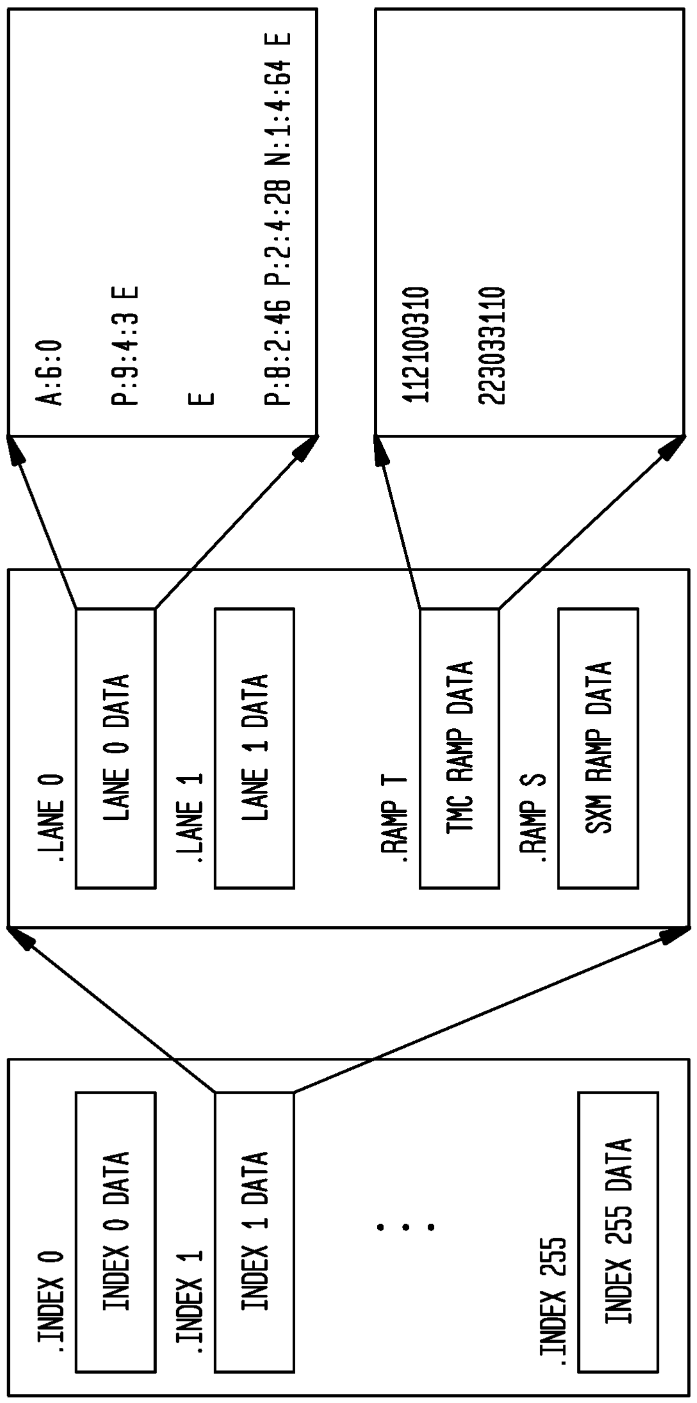
FIG. 22 depicts an exemplary baseline pattern file structure according to an exemplary embodiment of the present invention.
Figure 23:
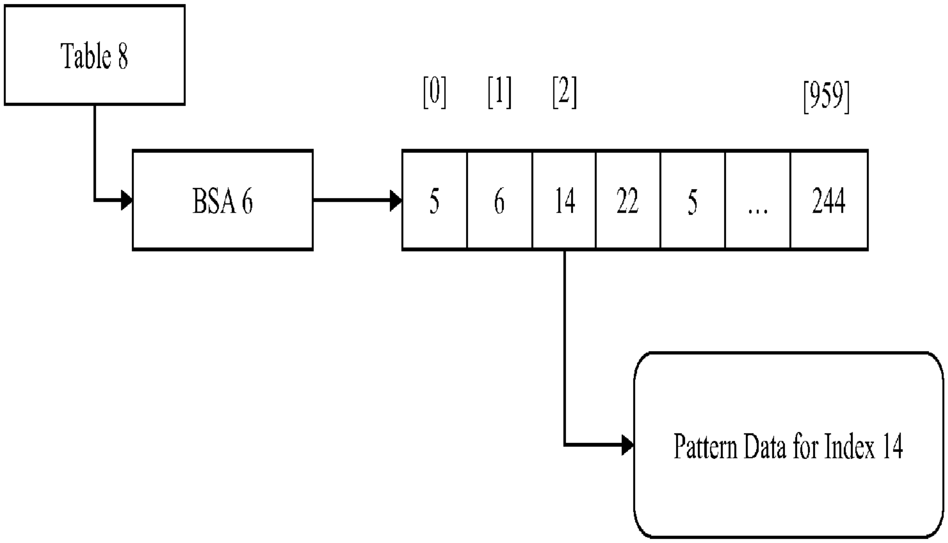
FIG. 23 depicts exemplary pattern references according to an exemplary embodiment of the present invention.

A pattern is a stored set of speed and flow data for a single BSA. There can be up to 256 stored patterns for each BSA. Each baseline pattern file (one for each BSA in the table) contains a set of pattern definitions, in ASCII text. The format of the file is shown in FIG. 22.

Each file contains up to 256 pattern entries. Each pattern entry starts with the line:

.index P where P is the index number of the pattern (0-255). Each pattern contains one or more lane-coloring patterns, an optional list of TMC-coded ramp values and an optional set of SXM-coded ramp values.

Each lane-group starts with the line:

lane L where L is the lane type as defined in Table 35 below. Lane 0 data will always be present. Following the header line are one or more linear definition lines, in SXM-index order. Each line corresponds to a single linear in the indexed list for that BSA. The values on the line correspond to the speed-and-flow data as it would be encoded in the broadcast carousel as defined in Table 28:

TABLE 28

Linear Data Decoding

| Key | Broadcast Code | Meaning | Values |
|---|---|---|---|
| A | '11' | All | Bucket: Clevel |
| E | '00' | End | (none) |
| N | '10' | Negative | Bucket: Clevel: Extent |
| P | '01' | Positive | Bucket: Clevel: Extent |

Broadcast Code: as defined in Table 37.

Bucket: Speed bucket as defined in Table 38.

Clevel: Congestion level as defined in Table 39.

Extent: as defined in section 9.3.5.

The ramp data section (if_present) starts with the line:

| | |
|---|---|
| .ramp T | for TMC-coded ramps |
| .ramp S | for SXM-coded ramps |

This is followed by lines containing the ramp state information for that pattern, as define in Table 43. The ramp data continue until the next .ramp or .index line, or the end of the file.

Historical Pattern Maps

In exemplary embodiments of the present invention, there can be a single history file for the whole of the Apogee service. Each individual entry can, for example, contain a list of 1344 index values, each in the range 0-255, which comprise the values for the history pattern table for that BSA. Each index value refers to one of the stored pattern values and so provides a way to color that BSA with speed and flow data.

An exemplary file format can be as follows:

```
.bsa 1 0 20
    .summer
        .sunday
            19 19 19 19 19 19 19 19 19 19 19 19 19 3 . . .
        .monday
            3 3 19 3 3 3 19 3 19 19 19 19 19 19 19 19 19 . . .
        . . .
    .winter
. . . .
```

In this exemplary format, each BSA starts with a .bsa line followed by 3 integers: the first integer is the table number (1 in the example above); the second integer is the BSA index number (0 in the example above); and the third integer is the number of distinct pattern values in this BSA (20 above).

Each BSA section can, for example, be divided into two blocks, by the lines .summer and .winter, for the summer and winter pattern sets, respectively.

Each block may contains 7 sections of 96 values. The sections represent conditions for the following days, in order. Before each section is a line identifying the day 1. Sunday
2. Monday
3. Tuesday
4. Wednesday
5. Thursday
6. Friday
7. Saturday Public Holidays and days when work places generally do not open, should use the entries for 'Sunday'

The 96 values represent 15-minute periods throughout the day. The first value presents conditions from 00:00-00:15UTC, the second from 00:15-00:30UTC and so on.

The times used in the index value are always UTC.

The application must determine the appropriate UTC time from the timezone, and Daylight-Savings-Time setting. Even if the particular location does not participate in observing DST, the correct pattern ('Winter' or 'Summer') must still be used. This is because the congestion pattern at local time 5 pm is maintained as the time zone moves to and from daylight savings time. The application is responsible for determining the correct day of the week, and if that day is a Public Holiday for each of the TMC tables in a map display.

Distribution Format

The S×M baselines may be distributed as a single ZIP archive named Apogee_vxxx.zip where xxx is the version number of the baseline fileset. The archive contains the following directory structure:

The S×M baselines are distributed as a single ZIP archive named Apogee_vxxx.zip where xxx is the version number of the baseline fileset. The archive contains the following directory structure:

```
SXMData/
    History.txt
    TableN/
        Locations.xls
        Ramps.xls
        BSAM_patterns.txt
```

There may thus be one directory for each TMC table (TableN). Within that directory is one file containing the SXM additions to the TMC location tables (Locations.xls); one file containing the SXM-defined ramp locations (Ramps.xls). There is one file for each BSA in that table for the M BSAs in that table, containing all the baseline patterns for that BSA (BSAM_patterns.txt). A single file in the top-level directory contains the mapping of time-slots to pattern indexes (History.txt).

Stored File Updates

Two sets of database files are updated over the air, SXM ramp tables and History+Pattern files.

File Selection and RFD Processing

Update files may be transmitted using the SiriusXM Reliable File Delivery (RFD) Protocol, for example, or, in other embodiments, by any file transfer system that allows a large file (up to 4 MByte) to be received as a series of smaller blocks (usually 4 kBytes each) over multiple engine-on cycles and reassembled in the receiver. The RFD distribution protocol, for example, comprises two types of channel, the metadata channel and one or more block data channels.

The metadata channel is carried on the first DMI in block D of Table 4. It contains a list of all the files being transmitted for the service, with their filenames, file identifiers, and the DMI on which the data channel is carried. The file name determines the type of contents (e.g. Ramp Table Update) and the version number of the update. The general approach to handling update files follows these 10 steps:

1. Monitor the metadata channel and receive the RFD metadata packets.
2. Select which update files are needed from the list of files being transmitted.
3. Initialize the RFD decoders (one per file).
4. Monitor the data channel DMIs on which the file data blocks will arrive.
5. Check the fileid of the incoming RFD data blocks.
6. Pass the blocks for the files being collected to the RFD decoder.
7. If the file is not yet complete continue to collect blocks (Step 5).
8. Apply the changes from the newly-received file.
9. Recover the resources used to acquire the file (disk space and RFD decoder space).
10. Unmonitor the data channel DMI if no more blocks are being received on that DMI.

Once the application is up to date, it need only monitor the RFD metadata channel and does not need to receive or process any of the data packets.

Ramp Table Updates

Only SXM-defined ramps are updated in the ramp tables, not ramps defined by TMC locations. All ramp updates extend the existing tables, so ramp index values are never re-used. This means that a receiver that does not process ramp updates will always see consistent data for its version of the ramp table, but may see data for ramp values beyond the end of the stored table.

Figure 24:
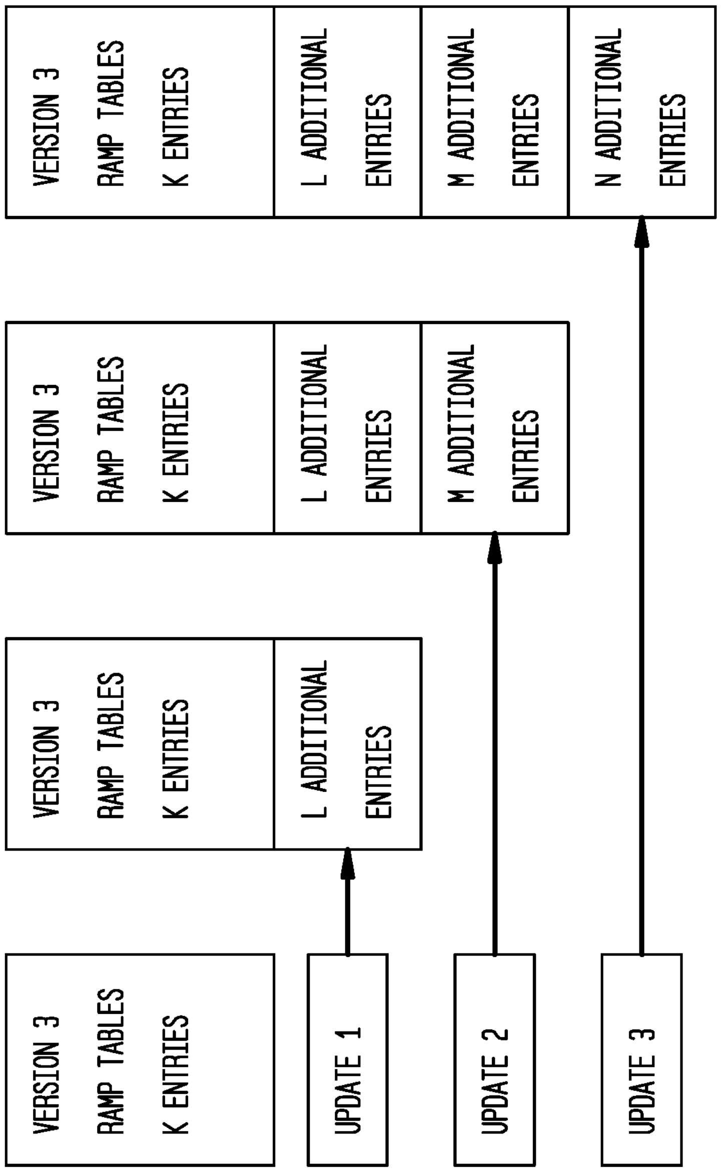
FIG. 24 depicts exemplary ramp table updates according to an exemplary embodiment of the present invention.

Given a ramp table at version V with K+L+M entries, an update to version V+1 will append a further N entries, giving a total of K+L+M+N entries after the update is applied, as shown in FIG. 24. Because the updates always extend the file, it is safe to restart an update by truncating the file to the original K+L+M entries then adding the new entries from the update file.

As entries are added to the file, the entries must be correlated with the underlying map database as described in section 7.2.

History and Pattern File Updates

The history and pattern file update changes both the pattern dataset and the history map at the same time. Because the update file may be large, and may take some time to apply, SXM has structured the update file into a sequence of 'micro-updates'. Each micro-update can be applied in a short period of time, and the contents of the history and pattern tables are always consistent at the end of each micro-update.

Micro-Update Strategy

Each individual pattern update has three micro-updates:

1. Isolate. All references to the pattern in the history map are removed.
2. Update. The pattern itself is updated.
3. Use. Slots in the history map can now reference the new pattern.

Using this method, the update can be applied incrementally, one micro-update at a time, over multiple engine-on cycles, with no risk of corruption or inconsistent data. Also, the application can continue to use the pattern data during the update. The history service is not locked-out from the application during the update.

Figure 25:
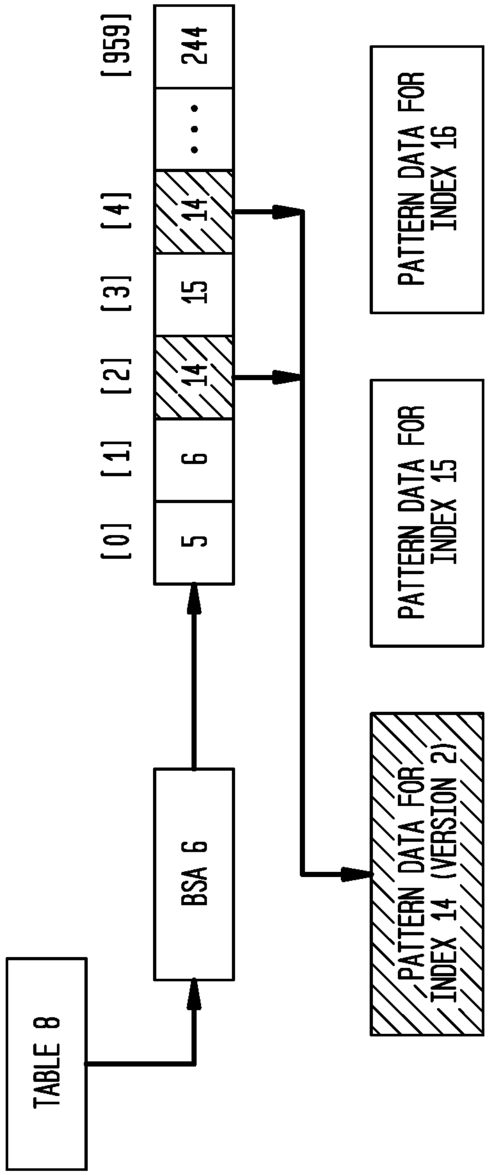
FIG. 25 depicts an exemplary original pattern according to an exemplary embodiment of the present invention.

FIG. 25 shows a history map in which exactly two slots (2 and 4) reference pattern number 14 at version 2. The example below describes how this would be updated so that index 4 uses pattern number 16 and index 2 uses an updated pattern 14 at version 3.

Step 1. Isolate

The isolation step removes all references to pattern index 14 from the history map.

In Table 8, BSA 6, set index [2] to pattern 16, and index [4] to pattern 16.

Figure 26:
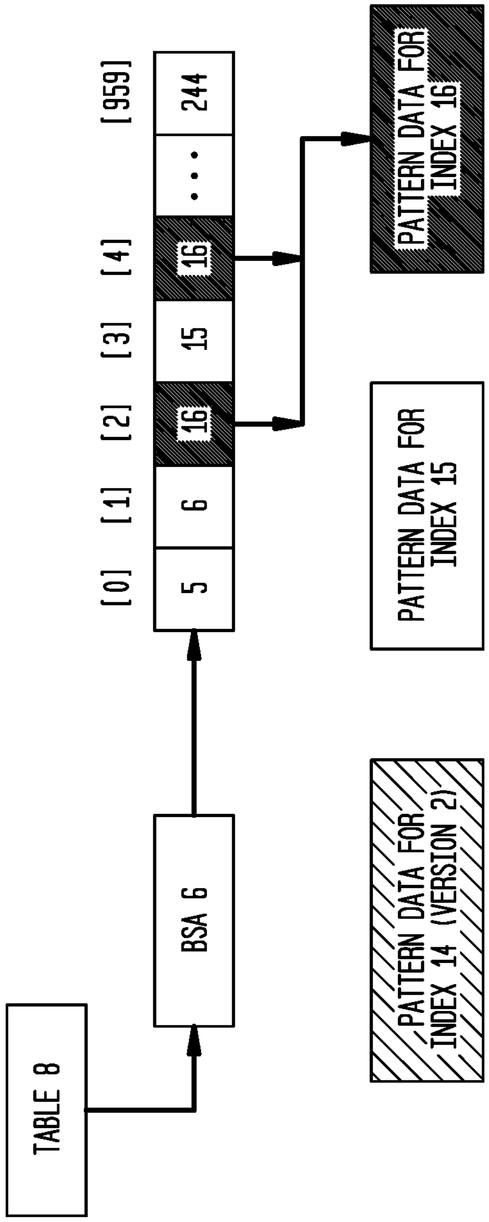
FIG. 26 depicts Pattern 14 as isolated according to an exemplary embodiment of the present invention.

After this step, the history table contains the values shown in FIG. 26.

Step 2. Update

After step 1 has completed, nothing references pattern 14 any more so the application can now update the pattern dataset with the new pattern 14 at version 3. During this step, the application can still ask for the history pattern for slots 2 or 4, and it will be given pattern 16.

Figure 27:
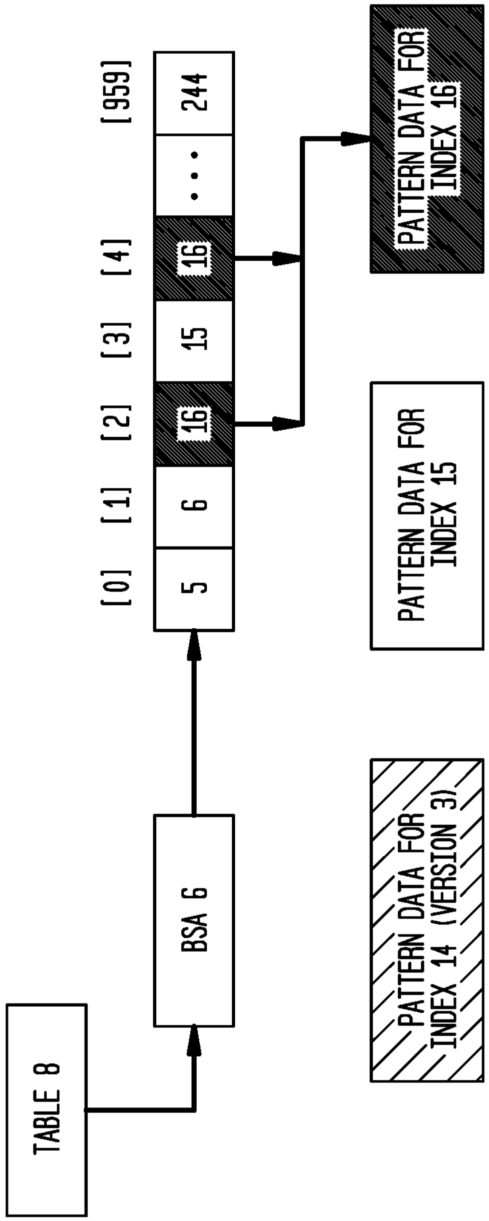
FIG. 27 depicts Pattern 14 as updated according to an exemplary embodiment of the present invention.

The result of applying step 2 is shown in FIG. 27. At this point the pattern is still isolated.

Step 3. Use

Once the new pattern 14 has been successfully written into the pattern file, it can be used by the history table. The final step of the update for pattern 14 is to use it again for slot 2:

In Table 8, BSA 6, set index [2] to pattern 14.

Figure 28:
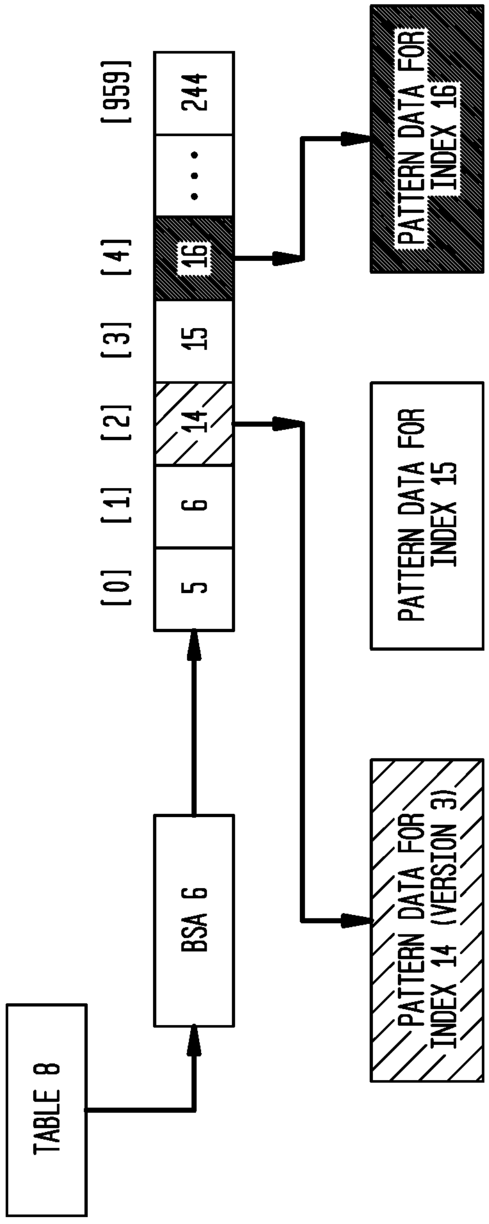
FIG. 28 depicts Pattern 14 in use again according to an exemplary embodiment of the present invention.

At this point the update for Table8-BSA6-Pattern 14 is complete and the state is shown in FIG. 28. The application can now start to process the next update in the file.

Updates Over Multiple Engine-on Cycles

The update protocol has been designed so that the process can be interrupted at any point, even in the middle of a micro-update, as long as the application keeps a record of the last successful micro-update that it applied. Each step writes a new value into a history or pattern slot, without needing to know the value that it is replacing, so it is always safe to restart a micro-update at the beginning. However, the individual steps must be applied in the correct order to ensure consistent data.

The Update File

Each pattern update file contains a set of updates for the base patterns and history tables that will bring a receiver from version N−1 to version N of the tables. The name of the update file is Pxxx (e.g. P004) meaning an update from version 3 to version 4.

The update mechanism relies on the system being able to select a 'good' backup pattern, which requires that the system is in a known state when the update is applied. For this reason, the application is required to process aj. updates in order (i.e. P001, P002 and P003 must be applied before P004 is applied).

If the receiver is not already at version 3 it must first get the P003 file and apply that before trying to apply P004. Each pattern file is delivered using RFD, and there may be multiple version of the update file (e.g. P001, P002 P003 and P004) being sent at the same time. The application should use the RFD metadata information (which includes the file name) to decide which, if any, of the updates it needs to collect and process. If an application requires more than one file, it may collect all the files in parallel (multiple RFD decodes) or collect and apply them one at a time, depending on receiver resources.

Implementation Strategy

The following exemplary pseudo-code provides a strategy for implementing the update process once the correct update file has been received and re-assembled from the RFD data stream.

```
update_pattern = 1
  state = 1
Restart:
  if history database version == update file version
    Stop.
  while update_pattern <= number of updates in the file
    if state == 1
      apply first set of history moves
      state = 2;
    if state == 2
      create temporary pattern file
      merge old and new patterns into temporary file
      replace old pattern file with temporary pattern file
      state = 3
    if state == 3
      apply second set of history moves
      state = 1
      increment update_pattern
  set history database version to update file version
  Stop.
```

This assumes that update_pattern and state are saved to permanent storage whenever they are changed (or as part of the engine-shutdown save-to-disk operations). As long as each step can be completed within an engine-on cycle, this process will terminate, and at all points the data saved to disk will be consistent and usable, as long as operations like 'replace file' are atomic in the filing system. Because the steps are each individually self-consistent, it does not matter (other than disk wear) how many times each step is executed.

Decoding SDTP and Access Units

This part of the document defines the protocol encoding used to transmit the Apogee traffic service elements and describes the process of extracting information elements from the encoded data.

The bitstream protocol is defined below by a set of Protocol Tables giving the structure of the bitstream and how to decode it. A generic protocol table usually has 4 columns, as shown in Table 29.

TABLE 29

Example Protocol Table

| Item | | Label | Size in Bits | Comments |
|---|---|---|---|---|
| 1 | | SIZE | 4 | Size of the VALUE field |
| 2 | | COUNT | 8 | Number of VALUEs following |
| | 3 | VALUE | [SIZE] + 1 | value |

Item 3 repeats COUNT+1 times.

Protocol Table entries are transmitted in the order defined by the Item field in the Protocol Tables. The second column of the Item field is used to indicate repeating elements. The item number also indicates the section or sub-section following in which that item is defined. The label field may appear as a cross-reference between items when a value is used later. In the example above, the four-bit SIZE field determines the number of bits used to decode the VALUE field. A value of '0011' in the SIZE field means 4 bits (3+1) are used for the value. The comment below the table explains how to determine the number of times VALUE appears in the bitstream.

Some fields defined in this specification may not always be present in the bitstream. The presence of such a field is indicated by a single-bit Presence Flag, immediately before the field's place in the bitstream. When set to '1' the Presence Flag indicates that the subsequent field is present. When set to '0', the field is not present.

The use of the Presence Flag is indicated by an "F+" added to the start of the field label, in the Protocol Tables.

Service payloads are carried over the SDTP protocol according to the Normative requirements of [4]. Within the data stream, data are transmitted most significant bit first. The first protocol bit is the 0x80 bit of the first received byte; the second is the 0x40 bit and so on.

Figure 29:
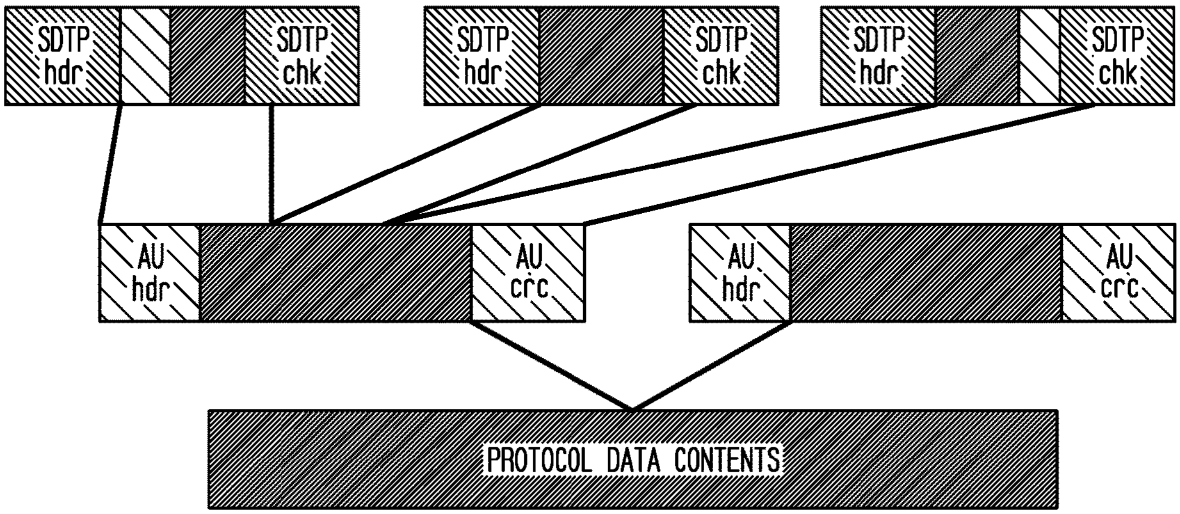
FIG. 29 depicts exemplary transport layers according to an exemplary embodiment of the present invention.

As shown in FIG. 29, the basic unit of transmission is the SDTP packet, containing up to 1,024 bytes of data payload. The sequencing and reassembly data contained in the SDTP header allows the application to join sequences of SDTP packets together to form Access Units. Multiple SDTP packets are required when the Access Unit contains more than 1,024 bytes of data.

Each Access Unit contains a protocol-specific header and a 32-bit cyclic redundancy check value in the last 4 bytes. Multiple Access Units may themselves be joined together to form an Access Unit group. The AU group is the largest protocol unit transmitted by the service and contains sufficient protocol data to allow the application to decode and present information for a single table for any of the service elements (carousels) defined below.

SDTP and DMI Filtering

Each SDTP packet contains the DMI of which its data is a part as part of its header. The mapping between DMIs and Service elements is shown in Table 5 above. Each DMI for which the receiver is authorized can be individually enabled or disabled at the SXi level using the DataSvcFilterCmd operation. This can be done is real time, once the service (DSI) is being monitored. The overall process is:

1. Monitor the DSIs for which the receiver is authorized (490 and/or 491 from Table 2).
2. Retrieve the list of DMIs for the service and determine the starting block numbers for Table 4.
3. From the vehicle's current position, and the map zoom level, calculate the mean-bounding-rectangle of the map display area.
4. Using the MBR data for the TMC tables and the BSAs, determine which tables are required to color the map display.
5. Using Table 13 select only the DMIs that are needed from the broadcast.

Steps 3-5 must be repeated at the vehicle moves or the user changes the map zoom level or view. If the application is also performing route calculations and travel-time estimates, more tables may be needed to give full coverage over the calculated routes, but the principle remains the same.

Access Units

The maximum size of any Access Unit is 5,120 bytes.

Protocol Version Number

The Protocol Version Number (PVN) occupies the first 4 bits in the header of each Access Unit. It refers to the Protocol Version in use for a particular Access Unit within a data service, and specifies the format of the payload type in the message that follows (for the fields that follow). This feature allows Sirius XM to add new Access Unit formats to existing data streams (DMIs), where new receivers can parse them, while older ones ignore them.

If the PVN field of an Access Unit is different from the one defined in this document, then the contents of the Access Unit will contain syntax not decodable by a receiver compliant with this specification. Receivers shall process all Access Units to the point where the PVN is located. If the PVN value of the Access Unit is not valid for this specification then the entire Access Unit is discarded.

The PVN Value for this specification is '0001'.

AU-CRC

The last 32 bits of each Access Unit contains a 32-bit CRC value. This allows the receiver to validate the data in the Access Unit. The CRC algorithm is identical to the CRC-32 used in [6]. The CRC shall be calculated using the following polynomial:

$$x^{32}+x^{26}+x^{23}+x^{22}+x^{16}+x^{12}+x^{11}+x^{1}+x^{8}+x^{7}+x^{5}+x^{4}+x^{2}+x+1$$

with an initial residue of 0xffffffff and inversion (one's complement) after all the bytes have been processed. Bytes are processed from the least significant bit to the most significant bit, and the least significant bit of the CRC is the coefficient of the $x^{31}$ term. This is equivalent to a 32-bit table generator of 0xedb88320 [see Annex D of [6] for an example].

A receiver may discard an Access Unit before checking the CRC, for example if the PVN field does not match the specification or if the carousel is not one that is required. However, the CRC value shall be checked before any data in the access unit are acted upon. A receiver shall ignore any AU whose check value does not match the calculated value.

Each Access Unit contains data from only one carousel type.

Multi-AU Service Elements

A service element may require more than 5,120 bytes to contain all the information. In this case the information is transmitted in a group of Access Units. Each Access Unit Group contains three protocol elements which control re-assembly of the information content.

TABLE 30

Multi-AU protocol

| Item | Label | Size in Bits | Comments |
|---|---|---|---|
| 1 | F + CTSIZE | 1 + 4 | Used to calculate the size of the AUTOT and AUCT fields |
| 2 | AUTOT | [CTSIZE] + 1 | AU Total |
| 3 | AUCT | [CTSIZE] + 1 | AU Sequence Number |

These are optional fields, all three are controlled by the initial F+ bit.

Presence Flag+Count Size (CTSIZE)

CTSIZE is a four bit field whose value determines the size of the two subsequent fields. [CTSIZE]+1 is the size, in bits, of the AUTOT and AUCT fields. If the Presence Flag for CTSIZE is '0', CTSIZE, AUTOT, and AUCT all are not present, and the Access Unit is the only one required to transmit data for this service element.

Access Unit Total (AUTOT)

AUTOT indicates the number of Access Units used to transmit the Grid Definition data for this service element. The number of Access Units is [AUTOT]+1.

Access Unit Count (AUCT)

AUCT is the sequence number of this Access Unit in the Group of Access Units. AUCT is valid in the range 0 to AUTOT.

AU Group Example

The following table gives an example of an AU group containing 4 AUs, using 2 bits to contain the counters:

TABLE 31

AU Groups

| AU Number | F + CTSIZE | AUTOT | AUCNT |
|---|---|---|---|
| 1 | '1' + '01' | '11' | '00' |
| 2 | '1' + '01' | '11' | '01' |
| 3 | '1' + '01' | '11' | '10' |
| 4 | '1' + '01' | '11' | '11' |

CTSIZE of '01' means 2 bits are used for the following 2 fields. The values may be read as '0 of 3', '1 of 3', '2 of 3' and '3 of 3'.

When assembling a multi-AU group the receiver shall start with an AU having AUCNT value 0 and continue to assemble contiguous AUs having increment sequence numbers. If an AU for that DMI is discarded for any reason, or an AU is received with the wrong AUCNT sequence number, the whole AU group shall be discarded.

Real-Time Lane Speed and Flow (CARID 0)

Carousel id 0 contains the data for real-time speed and flow.

TABLE 32

CARID 0 Structure

| Item | | | Description | Comments |
|---|---|---|---|---|
| 1 | | | AU Header | Access Unit header and BSA directory |
| | 2 | | Lane Data | Data for 1$^{st}$ BSA in directory |
| | | 3 | Linear Data | Data for main roadbed |
| | | 3 | Linear Data | Data for (e.g.) HOV lanes |
| | 4 | | PAD | Alignment bits |
| | 2 | | Lane Data | Data for 2$^{nd}$ BSA in directory |
| | | 3 | Linear Data | Data for main roadbed |
| | 4 | | PAD | Alignment bits |

Repeat 2-4 for remaining BSAs

The overall structure of the carousel is show in Table 32 for an Access Unit covering 2 BSAs. Each AU group starts with an AU header that lists the BSAs covered by that Access Unit. This is followed by data for each BSA in the directory. The per-BSA data comprises a list of lane types covered, then blocks of linear data, one block for each lane type. Padding bits are inserted between the BSA data to align the start of the following BSA data on a byte boundary.

AU Header

Each Access Unit in carousel 0 contains the common header shown in Table 33.

TABLE 33

CARID 0 AU Header

| Item | | Label | in Bits | Comments |
|---|---|---|---|---|
| 1 | | PVN | 4 | '0001', protocol version number |
| 2 | | CARID | 4 | '0000', carousel id |
| 3 | | TABLE | 8 | Table Identifier |
| 4 | | F + CTSIZE | 1 + 4 | AU group data. Field Size |
| | 4a | AUTOT | [CTSIZE] + 1 | Total AUs in group |
| | 4b | AUCT | [CTSIZE] + 1 | AU sequence number |
| 5 | | COUNT | 8 | Number of BSAs in this AU |
| | 6 | BID | 8 | BSA index in traffic table |
| | 7 | OFFSET | 16 | Byte offset into AUGroup of BSA data |

TABLE 33-continued

| CARID 0 AU Header | | | |
|---|---|---|---|
| Item | Label | in Bits | Comments |
| 8 | SIG | 16 | Signature of BSA data |
| 9 | PAD | 0-7 | Alignment bits |

Items 4a and 4b are only present when item 4 is present (F='1'). Items 6-8 repeat COUNT+1 times.

PVN

The PVN field always contains the value '0001' to identify this AU as conforming to version 1 of the Apogee Protocol.

CARID

The CARID field always contains the value '0000' to identify this carousel as a real-time speed and flow carousel.

TABLE

The TABLE field contains the number of the corresponding TMC traffic table. Although the different traffic tables are carried on different DMIs, SXM may multiplex multiple low-volume tables on a single DMI. The application must use the TABLE value to determine that this table is one that is in its current list of tables to process. The TABLE field is byte-wide and byte-aligned so that it can easily be inspected when filtering out multiple tables on the same DMI.

F+AUGROUP

As defined in section 8.2.3.

For carousel 0, a multi-group Access Unit will only be used when data for a single BSA will not fit into one Access Unit. When F+AUGROUP is present, the BSADIR will contain only a single entry.

Figure 30:
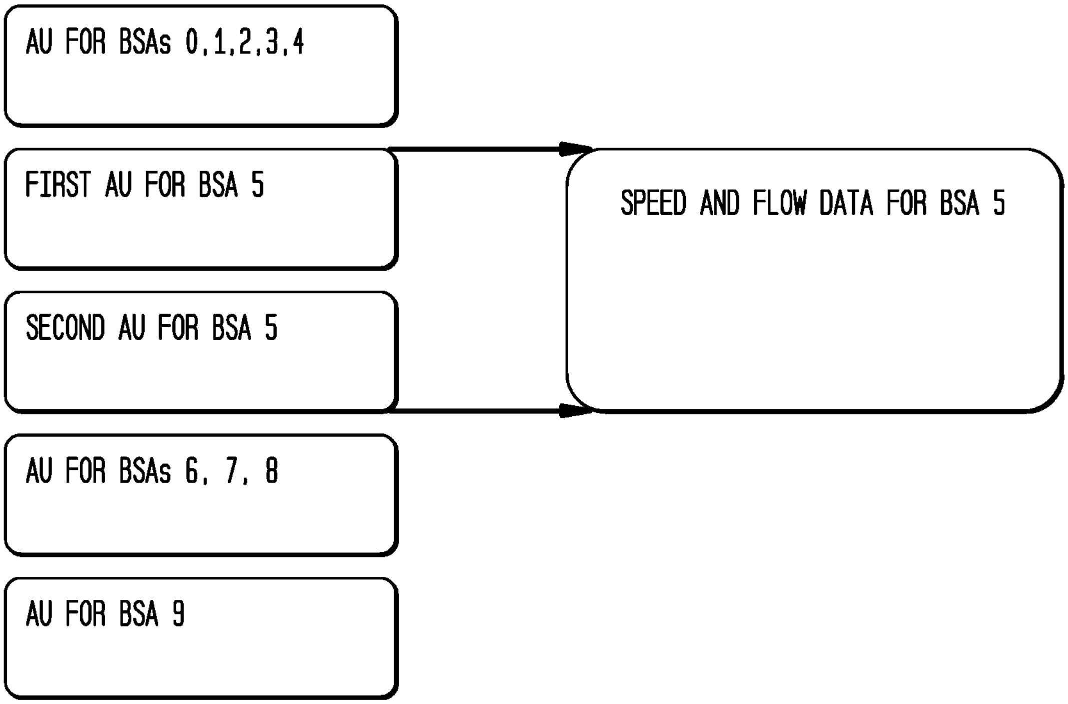
FIG. 30 depicts exemplary AU groups for flow data according to an exemplary embodiment of the present invention.

When assembling multi-group AUs, only Access Units containing the same BSA and SIG must be concatenated. The resulting protocol data comprises the header from the first AU and all the bytes between the end of the PAD fields and the start of AU-CRC fields, joined end-to-end to form a single continuous bitstream which is then decoded as described below. FIG. 30 illustrates how a single BSA (5 in this case) would be split over multiple AUs. The encoding restarts at the start of BSA 6, so it is never necessary to accumulate a multi-group AU except when the single BSA that it contains is required for the display.

Count of Entries (COUNT)

The COUNT field contains the number of directory entries that follow. There are COUNT+1 following entries.

BSA ID (BID)

The BID field contains the BSA index of this entry in the directory. This is the index value in the order defined by the SXM version of the appropriate TMC traffic table, it is not the TMC reference number for the BSA.

Offset to BSA Data (OFFSET)

The OFFSET field contains the byte offset from the start of the Access Unit group at which the data for this BSA starts.

Change Detection Signature (SIG)

The SIG field contains a signature value computed over the data for this BSA. An application can use this value to decide if the data have changed since the last time the application processed an Access Unit for this BSA. If the signature value differs from the one previously processed, the contents of that BSA has definitely changed. If the value is the same, the contents are probably unchanged (with a 1 in 65,536 chance of missing a real change).

PAD

The PAD field contains from zero to seven bits to bring the header up to a byte boundary.

Lane Data

Each BSA in the AU group starts with an optional Lane Data index. If this BSA contains speed and flow data for more than one lane type the fields in Table 34 are present, otherwise the lane data is encoded as '0' and only data for the main roadbed is present.

TABLE 34

| Lane Data | | | |
|---|---|---|---|
| Item | Label | Size in Bits | Comments |
| 1 | F + LANES | 1 + 3 | Number of LTYPEs − 1 |
| 2 | LTYPE | 3 | Lane Type |

Item 2 repeats LANES+1 times,

F+LANES

If lane data are present, the F field is '1' and the LANES field contains the count of LTYPE value following. The number of LTYPEs in this BSA is LANES+1.

LTYPE

The LTYPE field encodes the type of lane in that section of the following speed and flow data using the values in Table 35.

TABLE 35

| LTYPE Values | |
|---|---|
| LType | Type |
| 0 | Main roadbed, or all lanes of the highway |
| 1 | HOV or other express lanes |
| 2 | Right-hand junction lane |
| 3 | Left-hand junction lane |
| 4 | Exit-only lane, to the side of the junction lane |

The main roadbed will always be the first entry in the set of lane data linear blocks. The order of the other lane types within that BSA is not defined.

Linear Data

For each BSA in the AU group, the data in Table 36 are repeated once for each lane type defined by the Lane Data index. The data for each lane follows immediately from the data for the previous set of lanes, with no intermediate padding bits.

TABLE 36

| Linear Data | | | |
|---|---|---|---|
| Item | Label | Size in Bits | Comments |
| 1 | LCOUNT | 14 | Number of linears in this BSA |
| 2 | CODE | 2 | Data type code |
| When code is '00' there are no further fields following for that linear | | | |
| When code is '11' | | | |
| 3 | BUCKET | 4 | Speed bucket |
| 4 | CLEVEL | 3 | Congestion level |
| When code is '01' or 10' | | | |
| 3 | BUCKET | 4 | Speed bucket |
| 4 | CLEVEL | 3 | Congestion level |
| 5 | EXTENT | 7 | Linear extent |

Items 2-5 repeat for each linear in the BSA for LCOUNT+1 linears. The order in which the linears appear in the bitstream is the same order as they are defined in the SXM locations spreadsheet, as described in section 5.

The following exemplary pseudo-code decodes the linear data for a single lane type within a BSA.

```
for LCOUNT+1 linears in the table
    read 2 code bits
    if (code bits == '00')
        nothing for this linear
    if (code bits == '11')
        read 4 bits of speed bucket for the whole linear
        read 3 bits of congestion level for the whole linear
    else
        starting at the beginning of the linear
        while (code bits == '01')
            read 4 bits of speed bucket
            read 3 bits of congestion level
            read 7 bits of extent in the positive direction
            read 2 code bits
        starting at the end of the linear
        while (code bits == '10')
            read 4 bits of speed bucket
            read 3 bits of congestion level
            read 7 bits of extent in the negative direction
            read 2 code bits
```

The sequence of '01' and '10' coded values terminates when the code bits are '00' indicating no further changes to that linear.

LCOUNT

The LCOUNT field contains the number of linears for which data are present in the following data group. The number of values following is LCOUNT+1. The first data are for linear 0 in the BSA according to the SXM traffic table index of linears, the next data are for linear 1, and so on. Note that the number of linears in the data block may be different for each lane type.

CODE

Each linear is represented by one or more CODE values with the meanings shown in Table 37.

TABLE 37

CODE Values

| CODE | Meaning |
|---|---|
| '00' | Code '00' indicates the end of the data for that linear. The next code value applies to the next linear in the index. |
| '01' | Code '01' encodes the next speed/flow data in the positive direction. Linear coloring begins at the 'start' point of the linear as defined in the TMC table and proceeds in the positive direction according to the table |
| '10' | Code '10' encodes the next speed/flow data in the negative direction. Linear coloring begins at the 'end' point of the linears as defined in the TNC table and proceeds in the negative direction according to the table |
| '11' | Code '11' indicates that a uniform speed/flow coloring should be applied to both directions of this linear for as far as the linear extends within this BSA. The next code value applies to the next linear in the index. |

Code values '01' and '10' are always terminated with an explicit '00' code. This allows the application to skip over a linear without requiring access to the TMC tables to determine the length of the linear.

BUCKET

The BUCKET field encodes the expected transit segment over the linear extent using the values in Table 38.

TABLE 38

BUCKET Values

| BUCKET | Meaning |
|---|---|
| 0 | Use existing BUCKET value.<br>in Real-Time: 'no coverage'<br>in Predictive: 'keep value from previous time-vector'. |
| 1-13 | Transit speed is in the range 5 × (BUCKET − 1) − 5 × BUCKET in miles/hr |
| 14 | Transit speed is 65 mph or above. |
| 15 | No coverage available.<br>in Real-Time: 'no coverage'<br>in Predictive: 'do not show any coverage. |

CLEVEL

The CLEVEL field encodes the perceived congestion level over the linear extent using the values in Table 39.

TABLE 39

CLEVEL Values

| CLEVEL | Meaning |
|---|---|
| 0 | Traffic flowing at or near posted speed indicator |
| 1 | Light congestion |
| 2 | Moderate congestion |
| 3 | Medium-to-Heavy congestion |
| 4 | Heavy congestion, stop-and-go traffic |
| 5 | Use existing CLEVEL value and color. This implies 'no coverage' for carousel 0 and 'same as previous time-vector' for predictive data. |
| 6 | Road Closed |
| 7 | No congestion information available |

EXTENT

The EXTENT field encodes the number of sub-segments (⅛ segment) for which the BUCKET and CLEVEL apply. The field is only present when the CODE value is '01' or '10'. The actual number of sub-segments covered is EXTENT+1.

PAD

Each complete BSA entry may be followed by 0-7 zero bits to align the bitstream to a byte boundary. Note that this means the application must use the BSA directory information to locate the start of each BSA within the Access Unit, it cannot assume that the bits for one BSA start where the last BSA ended.

Real-Time Ramp Flow (CARID 1)

Carousel id 1 contains the data for real-time flow data for ramps.

TABLE 40

CARID 1 Structure

| Item | Description | Comments |
|---|---|---|
| 1 | AU Header | Access Unit header and BSA directory |
| 2 | Ramp Data | Data for $1^{st}$ BSA in directory |
| 3 | PAD | Alignment bits |
| 2 | Ramp Data | Data for $2^{nd}$ BSA in directory |
| 3 | PAD | Alignment bits |

Items 2 and 3 repeat for the remaining BSAs in the table.

Table 40 above shows the overall structure of carousel 1 for a table containing ramp data for 2 BSAs.

AU Header

Each Access Unit in carousel 1 contains a common header defined in Table 41.

TABLE 41

CARID 1 AU Header

| Item | Label | Size in Bits | Comments |
|---|---|---|---|
| 1 | PVN | 4 | '0001', protocol version number |
| 2 | CARID | 4 | '0001', carousel id |
| 3 | TABLE | 8 | Table Identifier |
| 4 | F + CTSIZE | 1 + 4 | AU group data. Field Size |
| 4a | AUTOT | [CTSIZE] + 1 | Total AUs in group |
| 4b | AUCT | [CTSIZE] + 1 | AU sequence number |
| 5 | COUNT | 8 | Number of BSAs in this AU |
| 6 | BID | 8 | BSA index in traffic table |
| 7 | OFFSET | 16 | Byte offset in AUGroup of BSA |
| 8 | SIG | 16 | Signature of BSA data |
| 9 | PAD | 0-7 | Alignment bits |

PVN

The PVN field always contains the value '0001' to identify this AU as conforming to version 1 of the Apogee Protocol.

CARID

The CARID field always contains the value '0001' to identify this carousel as a real-time ramp flow carousel.

TABLE

The TABLE field contains the number of the corresponding TMC traffic table. Although the different traffic tables are carried on different DMIs, SXM may multiplex multiple low-volume tables on a single DMI. The application must use the TABLE value to determine that this table is one that is in its current list of tables to process. The TABLE field is byte-wide and byte-aligned so that it can easily be inspected when filtering out multiple tables on the same DMI.

F+AUGROUP

As defined in section 8.2.3 and shown in FIG. 30.

For carousel 1, a multi-group Access Unit will only be used when data for a single BSA will not fit into one Access Unit. When F+AUGROUP is present, the BSADIR will contain only a single entry. When assembling multi-group AUs, only Access Units containing the same BSA and SIG must be concatenated. The resulting protocol data comprises the header from the first AU and all the bytes between the end of the PAD fields and the start of AU-CRC fields, joined end-to-end to form a single continuous bitstream which is then decoded as described below.

Count of Entries (COUNT)

The COUNT field contains the number of directory entries that follow. There are COUNT+1 following entries. These entries determine how to decode the Ramp Data that follows, the BSA directory for ramp data is complete separate from the directory values used to interpret the speed-and-flow data.

BSA ID (BID)

The BID field contains the BSA index of this entry in the directory. This is the index value in the order defined by the SXM version of the appropriate TMC traffic table, it is not the TMC reference number for the BSA.

Offset to BSA Data (OFFSET)

The OFFSET field contains the byte offset from the start of the Access Unit group at which the data for this BSA starts.

Change Detection Signature (SIG)

The SIG field contains a signature value computed over the data for this BSA. An application can use this value to decide if the data have changed since the last time the application processed an Access Unit for this BSA. If the signature value differs from the one previously processed, the contents of that BSA has definitely changed. If the value is the same, the contents are probably unchanged (with a 1 in 65,536 chance of missing a real change).

PAD

The PAD field contains from zero to seven bits to bring the header up to a byte boundary.

Ramp Data

Each BSA in the Access Unit contains the data defined in Table 42.

TABLE 42

Ramp Data

| Item | Label | in Bits | Comments |
|---|---|---|---|
| 1 | COUNT1 | 12 | Number of TMC ramps in this BSA |
| 2 | COUNT2 | 12 | Number of SXM ramps in this BSA |
| 3a | RLEVEL1 | 2 | Ramp Congestion Level for TMC Ramps |
| 3b | RLEVEL2 | 2 | Ramp Congestion Level for SXM Ramps |

Item 3a repeats for COUNT1 entries. This is followed by Item 3b which repeats for COUNT2 entries.

COUNT1

The COUNT1 field contains the number of RLEVEL entries that are indexed by direct TMC code in the main TMC traffic table. If this field is zero, there are no directly-coded TMC entries in this BSA.

COUNT2

The COUNT2 field contains the number of RLEVEL entries that are indexed additional SXM-defined ramp codes. These RLEVEL values follow immediately after the directly-coded TMC ramp values. If this value is zero, there are not SXM-defined ramp entries in this BSA.

RLEVEL

The RLEVEL field contains the congestion level indicator for that ramp, according to the values in Table 43.

TABLE 43

RLEVEL Values

| RLEVEL | Meaning |
|---|---|
| 0 | Ramp state unknown. Do not color |
| 1 | Ramp flowing at or near its expected or advised speed limit |
| 2 | Ramp flowing at 50% or below of its advised speed limit |
| 3 | Stop-and-go traffic on the ramp |

PAD

The PAD field contains from 0-7 zero bits to align the BSA data onto a byte boundary.

Construction Data (CARID 2)

Carousel id 2 contains data for construction events.

TABLE 44

CARID 2 Structure

| Item | Description | Comments |
|---|---|---|
| 1 | AU Header | Access Unit header |
| 2 | AU Group Header | Offsets and BSA directory |
| 3 | Construction Data | Data for $1^{st}$ BSA in directory |
| 4 | PAD | Alignment bits |

TABLE 44-continued

| CARID 2 Structure | | |
|---|---|---|
| Item | Description | Comments |
| 3 | Construction Data | Data for $2^{nd}$ BSA in directory |
| 4 | PAD | Alignment bits |
| Items 3 and 4 repeat for each BSA in the TMC table | | |
| 5 | Strings | Zipped String Table |

Table 44 shows the structure of carousel 2 for a table with construction data in 2 BSAs. The construction data are followed by a single block of data containing the zipped string table for the whole of the TMC table.

AU Header

Each Access Unit in carousel 2 contains a common header defined in Table 45.

TABLE 45

| CARID 2 AU Header | | | |
|---|---|---|---|
| Item | Label | Size in Bits | Comments |
| 1 | PVN | 4 | '0001', protocol version number |
| 2 | CARID | 4 | '0010', carousel id |
| 3 | TABLE | 8 | Table Identifier |
| 4 | F + CTSIZE | 1 + 4 | AU group data. Field Size |
| 4a | AUTOT | [CTSIZE] + 1 | Total AUs in group |
| 4b | AUCNT | [CTSIZE] + 1 | AU sequence number |
| 4c | AUID | 16 | AU assembly identifier |
| 5 | PAD | 0-7 | Alignment bits |

Items 4a-4c are only present when item 4 is present (F='1').

PVN

The PVN field always contains the value '0001' to identify this AU as conforming to version 1 of the Apogee Protocol.

CARID

The CARID field always contains the value '0010' to identify this carousel as a construction data carousel.

TABLE

The TABLE field contains the number of the corresponding TMC traffic table. Although the different traffic tables are carried on different DMIs, SXM may multiplex multiple low-volume tables on a single DMI. The application must use the TABLE value to determine that this table is one that is in its current list of tables to process. The TABLE field is byte-wide and byte-aligned so that it can easily be inspected when filtering out multiple tables on the same DMI.

F+AUGROUP

As defined in section 8.3.3.

For carousel 2, a multi-group Access Unit will be used whenever the access unit needed to contain the construction data for the whole of a TMC table exceeds 5,120 bytes. The application should concatenate the payload data (following the AU Header) for each Access Unit in the group, and then process the resulting bitstream according to the following protocol. Only Access Units with the same AUID should be joined to form the final group.

PAD

The PAD field contains from 0-7 bits to align the AU Header to a byte boundary.

AU Group Header

Each AU Group starts with an AU group header, immediately following the AU Header of the first AU in the group.

| Item | Label | Size in Bits | Comments |
|---|---|---|---|
| 1 | STRINGOFF | 16 | Offset to start of string table |
| 2 | STRINGLEN | 16 | Length of string table |
| 3 | COUNT | 8 | Number of BSAs in this AU |
| 4 | BID | 8 | BSA index in traffic table |
| 5 | OFFSET | 16 | Byte offset in AUGroup of BSA data |
| 6 | SIG | 16 | Signature of BSA data |

All of the items in the AU Group Header are multiples of 8 bits, so there is no padding required at the end of the Group Header. The length of each BSA entry is the difference between the start of the next entry (or the start of the string table) at the start of the current entry.

STRINGOFF

The STRINGOFF field contains the offset of the first byte of the string table, in bytes from the start of the AU Group Header.

STRINGLEN

The STRINGLEN field contains the number of bytes in the compressed string table.

Count of Entries (COUNT)

The COUNT field contains the number of directory entries that follow. There are COUNT+1 following entries. These entries determine how to decode the Construction Data that follows, the BSA directory for ramp data is complete separate from the directory values used to interpret the speed-and-flow or incident data.

BSA ID (BID)

The BID field contains the BSA index of this entry in the directory. This is the index value in the order defined by the SXM version of the appropriate TMC traffic table, it is not the TMC reference number for the BSA.

Offset to BSA Data (OFFSET)

The OFFSET field contains the byte offset from the start of the Access Unit group at which the data for this BSA starts.

Change Detection Signature (SIG)

The SIG field contains a signature value computed over the data for this BSA. An application can use this value to decide if the data have changed since the last time the application processed an Access Unit for this BSA. If the signature value differs from the one previously processed, the contents of that BSA has definitely changed. If the value is the same, the contents are probably unchanged (with a 1 in 65,536 chance of missing a real change).

Construction Data

Each BSA contains a set of construction data elements defined by Table 46.

TABLE 46

| Construction Data | | | |
|---|---|---|---|
| Item | Label | Size in Bits | Comments |
| 1 | LOCATION | var | Location of start of event within BSA |
| 2 | EVENT | 11 | Alert-C event code |
| 3 | SEVERITY | 2 | Severity/Impact Code |
| 4 | F + ID | 1 + 8 | Event Identifier |
| 5 | LANG | 2 | Language Marker |
| 6 | TEXT | 16 | Textual description (offset into string table) |

TABLE 46-continued

| Construction Data | | | |
|---|---|---|---|
| Item | Label | Size in Bits | Comments |
| 7 | F+ | 1 | additional text fields |
| 7a | LANG | 2 | Language Marker |
| 7b | TEXT | 16 | Text offset |
| 8 | F + EXT | 1 + var | Extension field |

Items 7, 7a and 7b repeat while the F+ flag (item 7) is '1'.

LOCATION

The LOCATION field determines the format of the primary location reference within this BSA. The first bit of the location field determines the type of the location reference.

Type '0' is a TMC-based reference, type '1' is a lon/lat value.

TMC-Referenced Location

TABLE 47

| TMC-based Location | | | |
|---|---|---|---|
| Item | Label | Size in Bits | Comments |
| 1 | LOCTYPE | 1 | '0' |
| 2 | TMC | 16 | TMC Point Identifier |
| 3 | OFFSET | 3 | Sub-segment offset |
| 4 | DIRECTION | 1 | Direction from reference point |
| 5 | EXTENT | 7 | Extent of event in 1/8-segment units |
| 6 | F + FULLSTART | 1 + 19 | Actual start if not within BSA |
| 7 | TMC | [16] | TMC Point Identifier |
| 8 | OFFSET | [3] | Sub-segment offset |

LOCTYPE

The LOCTYPE field contains '0' to identify this as a TMC-based location reference.

TMC

The TMC field contains a TMC Point value in the current table.

OFFSET

The OFFSET field contains a ⅛-subsegment offset from the TMC point.

DIRECTION

The DIRECTION field specifies how the TMC table is traversed to build up a sequence of segments into a linear extent. It is a single bit with the following meaning:

TABLE 48

| Direction | |
|---|---|
| Value | Meaning |
| '0' | The segment goes from the current point to the next point as defined by the POSITIVE column in the TMC table |
| '1' | The segment goes from the current point to the next point as defined by the NEGATIVE column in the TMC table |

If construction events occur on both sides of the road at the same location, two separate messages will be present in the bitstream, one for each direction.

EXTENT

The EXTENT field defines the extent of the construction, from the starting point, in the specified direction.

F+FULLSTART

If the construction starts outside the current BSA, then the FULLSTART field contains the starting location in another BSA. If the construction starts in this BSA, but extends into another BSA, this field is not present.

TMC

The TMC field contains a TMC Point value in the current table at which the construction starts. This field is only present if FULLSTART is present.

OFFSET

The OFFSET field contains a ⅛-subsegment offset from the TMC point at which the construction starts. The direction of the offset is the same as the DIRECTION field for the main location. This field is only present if FULLSTART is present.

Geographic-Referenced Location

TABLE 49

| Geographic-based Location | | | |
|---|---|---|---|
| Item | Label | Size in Bits | Comments |
| 1 | LOCTYPE | 1 | '1' |
| 2 | LONGITUDE | 25 | Longitude of Point |
| 3 | LATITUDE | 24 | Latitude of Point |
| 4 | LOCATIONTEXT | 16 | Textual description (offset into string table) |

LOCTYPE

The LOCTYPE field contains '1' to identify this as a geographic-based reference.

LONGITUDE

The LONGITUDE field contains a fixed-point integer in the range [−180-0] in 8.17 format. The actual value is:

$-1\times$LONGITUDE/131072.0 degrees

LATITUDE

The LATITUDE field contains a fixed-point integer in the range [0-90] in 7.17 format.

The actual value is:

LATITUDE/131072.0 degrees

LOCATIONTEXT

The LOCATIONTEXT field contains a description of the location (since no TMC location is available). This may be a generic location ("Quakerbridge Mall") or a specific point not referenced by TMC ("The Rest Area off Rt.1 at Wake Forest").

EVENT

The EVENT field contains an Alert-C event code from the list in Table 27. The application may wish to use this field to select an appropriate icon for the event on the display.

SEVERITY

The SEVERITY field contains a value to indicate the expected impact of this construction on traffic flow and travel times. The values are defined in Table 50.

TABLE 50

| SEVERITY values | |
|---|---|
| Code | Meaning |
| '00' | Unknown severity or impact |
| '01' | Light impact, no delays or hardly noticeable delays/congestion are expect |
| '10' | Moderate impact, expect delays and/or congestion |
| '11' | Severe impact. Expect major delays. Consider alternate route if possible. |

The severity code may be used to color the border of an icon, or to suppress lesser-impact events when more severe events must be presented.

F+ID

The optional ID field contains am 8-bit value that identifies a unique event at this location (by TMC or georeference). An application can use this field to determine if two events received in different carousels are for the same underlying physical event. If the field is absent, the ID shall be treated as zero for comparison purposes.

LANG

The LANG field describes the language of the following text field. The values are defined in Table 51

TABLE 51

| Language Codes | |
|---|---|
| Code | Meaning |
| '00' | English |
| '01' | Spanish |
| '10' | French |
| '11' | Unknown or unspecified |

TEXT

The TEXT field contains a byte offset into the string table. The string value contains the text description of the construction to be displayed as the 'details' in a list or pop-up display.

F+LANG/TEXT

In the case where the same text message is available in more than one language, the optional F+ fields contain additional language+text values. The list of additional values is terminated with the '0' flag bit.

F+EXT

The optional EXT field contains additional extended data not decodable by this version of the protocol. If the F bit is '1' it is followed by 7 bits of length information. These are the number of 8-bit quantities contained in the extension field. A receiver compliant with the PVN '0001' must skip over these bits and resume parsing at the start of the next construction event:

```
read 'F' bit
if bit == 0
    continue directly to next message
else
    read 7 bits of length
    skip (length+1)*8 bits
```

PAD

The PAD field contains from 0-7 zero bits to align each BSA construction data to a byte boundary.

STRINGS

The STRINGS field contains the compressed String Table for all of the strings used in the Access Unit Group.

Incident Data (CARID 3)

Carousel id 3 contains the data for accident and incident events. The overall structure of the carousel is shown in Table 52.

TABLE 52

| CARID 3 Structure | | | |
|---|---|---|---|
| Item | | Description | Comments |
| 1 | | AU Header | Access Unit Header |
| 2 | | AU Group Header | Offsets and BSA directory |
| | 3 | Incident Data | Data for $1^{st}$ BSA in directory |
| | 4 | PAD | Alignment bits |

TABLE 52-continued

| CARID 3 Structure | | |
|---|---|---|
| Item | Description | Comments |
| 3 | Incident Data | Data for $2^{nd}$ BSA in directory |
| 4 | PAD | Alignment bits |
| Items 3 and 4 repeat for each BSA in the table | | |
| 5 | Strings | Zipped String Table |

AU Header

Each Access Unit in carousel 3 contains a common header defined in Table 53.

TABLE 53

| CARID 3 AU Header | | | | |
|---|---|---|---|---|
| Item | | Label | Size in Bits | Comments |
| 1 | | PVN | 4 | '0001', protocol version number |
| 2 | | CARID | 4 | '0011', carousel id |
| 3 | | TABLE | 8 | Table Identifier |
| 4 | | F + CTSIZE | 1 + CTSIZE | AU group data. Field Size |
| | 4a | AUTOT | [CTSIZE] + 1 | Total AUs in group |
| | 4b | AUCNT | [CTSIZE] + 1 | AU sequence number |
| | 4c | AUID | 16 | AU assembly identifier |
| 5 | | PAD | 0-7 | Alignment bits |

Items 4a-4c are only present when item 4 is present (F='1').

PVN

The PVN field always contains the value '0001' to identify this AU as conforming to version 1 of the Apogee Protocol.

CARID

The CARID field always contains the value '0011' to identify this carousel as an incident data carousel.

TABLE

The TABLE field contains the number of the corresponding TMC traffic table. Although the different traffic tables are carried on different DMIs, SXM may multiplex multiple low-volume tables on a single DMI. The application must use the TABLE value to determine that this table is one that is in its current list of tables to process. The TABLE field is byte-wide and byte-aligned so that it can easily be inspected when filtering out multiple tables on the same DMI.

F+AUGROUP

As defined in section 8.3.3.

For carousel 3, a multi-group Access Unit will be used whenever the incident data for the whole of a TMC table exceeds 5,120 bytes. The application should concatenate the payload data (following the AU Header) for each Access Unit in the group, and then process the resulting bitstream according to the following protocol. Only Access Units with the same AUID should be joined to form the final group.

PAD

The PAD field contains from 0-7 bits to align the AU Header to a byte boundary.

AU Group Header

Each AU Group starts with an AU group header, immediately following the AU Header of the first AU in the group.

TABLE 54

| AU Group Header | | | |
|---|---|---|---|
| Item | Label | Size in Bits | Comments |
| 1 | STRINGOFF | 16 | Offset to start of string table |
| 2 | STRINGLEN | 16 | Length of string table |
| 3 | COUNT | 8 | Number of BSAs in this AU |
| 4 | BID | 8 | BSA index in traffic table |
| 5 | OFFSET | 16 | Byte offset into AUGoup of BSA |
| 6 | SIG | 16 | Signature of BSA data |

All of the items in the AU Group Header are multiples of 8 bits, so there is no padding required at the end of the Group Header. The length of each BSA entry is the difference between the start of the next entry (or the start of the string table) at the start of the current entry.

STRINGOFF

The STRINGOFF field contains the offset of the first byte of the string table, in bytes from the start of the AU Group Header.

STRINGLEN

The STRINGLEN field contains the number of bytes in the compressed string table.

Count of Entries (COUNT)

The COUNT field contains the number of directory entries that follow. There are COUNT+1 following entries. These entries determine how to decode the Incident Data that follow, the BSA directory for ramp data is complete separate from the directory values used to interpret the speed-and-flow or construction data.

BSA ID (BID)

The BID field contains the BSA index of this entry in the directory. This is the index value in the order defined by the SXM version of the appropriate TMC traffic table, it is not the TMC reference number for the BSA.

Offset to BSA Data (OFFSET)

The OFFSET field contains the byte offset from the start of the Access Unit group at which the data for this BSA starts.

Change Detection Signature (SIG)

The SIG field contains a signature value computed over the data for this BSA. An application can use this value to decide if the data have changed since the last time the application processed an Access Unit for this BSA. If the signature value differs from the one previously processed, the contents of that BSA has definitely changed. If the value is the same, the contents are probably unchanged (with a 1 in 65,536 chance of missing a real change).

Incident Data

Each BSA contains a set of incident data elements defined by Table 55.

TABLE 55

| Incident Data | | | |
|---|---|---|---|
| Item | Label | Size in Bits | Comments |
| 1 | LOCATION | var | Location of start of event within BSA |
| 2 | EVENT | 11 | Alert-C event code |
| 3 | SEVERITY | 2 | Impact of incident on traffic flow |
| 4 | F + ID | 1 + 8 | Event Identifier |

TABLE 55-continued

| Incident Data | | | |
|---|---|---|---|
| Item | Label | Size in Bits | Comments |
| 5 | LANG | 2 | Language Marker |
| 6 | TEXT | 16 | Textual description (offset into string table) |
| 7 | F+ | 1 | additional text fields |
| 7a | LANG | 2 | Language Marker |
| 7b | TEXT | 16 | Text offset |
| 8 | F + EXT | 1 + var | Extension field |

Items 7, 7a and 7b repeat while the F+ flag (item 7) is '1'.

LOCATION

As defined in section 11.3.1.

EVENT

The EVENT field contains an Alert-C event code. The list of events that are used in the Apogee broadcast for incidents is given in Table 27. The application may wish to use this field to select an appropriate icon for the incident on the display.

SEVERITY

The SEVERITY field contains a value to indicate the expected impact of this incident on traffic flow and travel times. The values are defined in Table 56.

TABLE 56

| SEVERITY values | |
|---|---|
| Code | Meaning |
| '00' | Unknown severity or impact |
| '01' | Light impact, no delays or hardly noticeable delays/congestion are expect |
| '10' | Moderate impact, expect delays and/or congestion |
| '11' | Severe impact. Expect major delays. Consider alternate route if possible. |

The severity code may be used to color the border of an icon, or to suppress lesser-impact events when more severe events must be presented.

F+ID

The optional ID field contains am 8-bit value that identifies a unique event at this location (by TMC or georeference). An application can use this field to determine if two events received in different carousels are for the same underlying physical event. If the field is absent, the ID shall be treated as zero for comparison purposes.

LANG

The LANG field describes the language of the following text field. The values are defined in Table 51 above

TEXT

The TEXT field contains a byte offset into the string table. The string value contains the text description of the incident to be displayed as the 'details' in a list or pop-up display.

F+LANG/TEXT

In the case where the same text message is available in more than one language, the optional F+ fields contain additional language+text values. The list of additional values is terminated with the '0' flag bit.

F+EXT

The optional EXT field contains additional extended data not decodable by this version of the protocol. If the F bit is '1' it is followed by 7 bits of length information. These are the number of 8-bit quantities contained in the extension field. A receiver compliant with the PVN '0001' must skip over these bits and resume parsing at the start of the next construction event:

```
read 'F' bit
if bit == 0
    continue directly to next message
else
    read 7 bits of length
    skip (length+1)*8 bits
```

PAD

The PAD field contains from 0-7 zero bits to align each BSA incident data to a byte boundary.

STRINGS

The STRINGS field contains the compressed String Table for all of the strings used in the Access Unit Group.

Predictive Speed and Flow (CARID 4)

Carousel id 4 contains the data for the short-term predictive speed and flow service. This contains the speed and flow data that extends from the current time to up to 1 hour into the future.

TABLE 57

CARID 4 Structure

| Item | Description | Comments |
|---|---|---|
| 1 | AU Header | Access Unit header and BSA directory |
| 2 | AU Group Header | BSA directory |
| 3 | Lane Data | Data for 1st BSA in directory |
| 4 | Linear Data | Data for main roadbed |
| 4 | Linear Data | Data for (e.g.) HOV lanes |
| 5 | PAD | Alignment bits |
| 3 | Lane Data | Data for 2nd BSA in directory |
| 4 | Linear Data | Data for main roadbed |
| 5 | PAD | Alignment bits |

Items 3-5 repeat for all the BSAs in the TMC table.

The overall structure of the carousel is show in Table 57 for an Access Unit covering 2 BSAs. Each AU group starts with an AU header that lists the BSAs covered by that Access Unit. This is followed by data for each BSA in the directory. The per-BSA data comprises a list of lane types covered, then blocks of linear data, one block for each lane type. Padding bits are inserted between the BSA data to align the start of the following BSA data on a byte boundary.

AU HEADER

Each Access Unit in carousel 4 contains a common header defined in Table 58.

TABLE 58

CARID 4 AU Header

| Item | Label | Size in Bits | Comments |
|---|---|---|---|
| 1 | PVN | 4 | '0001', protocol version number |
| 2 | CARID | 4 | '0100', carousel id |
| 3 | TABLE | 8 | Table Identifier |
| 4 | SEQUENCE | 4 | Delta Sequence of this dataset |
| 5 | PCOUNT | 4 | Count of predictive datasets |
| 5a | OFFSET | 5 | Time offsets (PCOUNT + 1 values) |
| 6 | F + CTSIZE | 1 + 4 | AU group data. Field Size |
| 6a | AUTOT | [CTSIZE] + 1 | Total AUs in group |
| 6b | AUCNT | [CTSIZE] + 1 | AU sequence number |
| 7 | PAD | 0-7 | Alignment bits |

Item 5a repeats PCOUNT+1.

Items 6a and 6b are only present when item 6 is present (F='1').

PVN

The PVN field always contains the value '0001' to identify this AU as conforming to version 1 of the Apogee Protocol.

CARID

The CARID field always contains the value '0100' to identify this carousel as a real-time speed and flow carousel.

TABLE

The TABLE field contains the number of the corresponding TMC traffic table. Although the different traffic tables are carried on different DMIs, SXM may multiplex multiple low-volume tables on a single DMI. The application must use the TABLE value to determine that this table is one that is in its current list of tables to process. The TABLE field is byte-wide and byte-aligned so that it can easily be inspected when filtering out multiple tables on the same DMI.

SEQUENCE

Each predictive dataset is delta-coded from the previous predictive dataset. The SEQUENCE field indicates from which dataset this one is coded. SEQUENCE=0 means the dataset is delta-coded from the most recent current conditions, SEQUENCE=1 means the dataset is delta-coded from the first predictive dataset, and so on. The start time for that prediction is contained in the OFFSET[SEQUENCE] value

PCOUNT+OFFSET

The PCOUNT field indicates the number of predictive datasets currently being transmitted. This is followed by PCOUNT+1 values giving the OFFSET times for each dataset. The OFFSET field indicates the start of the valid period for the prediction at sequence number SEQUENCE. The value is coded in units of 5 minutes relative to the time at which the carousel was received. The field may be converted into a unixtime by:

$$unixtime=now+value\times 300$$

Predictions are valid for no more than 30 minutes from the start time, or until the start of a later prediction or forecast point.

F+AUGROUP

As defined in section 8.3.3.

For carousel 4, a multi-group Access Unit will only be used when data for a single BSA will not fit into one Access Unit. When F+AUGROUP is present, the BSADIR will contain only a single entry. When assembling multi-group AUs, only Access Units containing the same BSA and SIG must be concatenated. The resulting protocol data comprises the header from the first AU and all the bytes between the end of the PAD fields and the start of AU-CRC fields, joined end-to-end to form a single continuous bitstream which is then decoded as described below.

PAD

The PAD field contains from 0-7 zero bits to bring the header up to a byte boundary.

AU Group Header

Each AU Group starts with an AU group header, immediately following the AU Header of the first AU in the group, as defined in Table 59.

TABLE 59

AU Group Header

| Item | Label | Size in Bits | Comments |
|---|---|---|---|
| 1 | COUNT | 8 | Number of BSAs in this AU group |
| 2 | BID | 8 | BSA index in traffic table |
| 3 | OFFSET | 16 | Byte offset into AUGroup of BSA |
| 4 | SIG | 16 | Signature of BSA data |

Count of Entries (COUNT)

The COUNT field contains the number of directory entries that follow. There are COUNT+1 following entries. These entries determine how to decode the Speed and Flow Data that follow, the BSA directory for predictive data is complete separate from the directory values used to interpret the real-time speed-and-flow data.

BSA ID (BID)

The BID field contains the BSA index of this entry in the directory. This is the index value in the order defined by the SXM version of the appropriate TMC traffic table, it is not the TMC reference number for the BSA.

Offset to BSA Data (OFFSET)

The OFFSET field contains the byte offset from the start of the Access Unit group at which the data for this BSA starts.

Change Detection Signature (SIG)

The SIG field contains a signature value computed over the data for this BSA. An application can use this value to decide if the data have changed since the last time the application processed an Access Unit for this BSA. If the signature value differs from the one previously processed, the contents of that BSA has definitely changed. If the value is the same, the contents are probably unchanged (with a 1 in 65,536 chance of missing a real change).

Lane Data

As defined in section 9.2

Linear Data

As defined in section 9.3. For predictive data, where the values are being applied against a base pattern, the bucket value 15, as defined in Table 38, may appear, to replace a previously colored sub-segment with 'no coverage'.

PAD

The PAD field contains from 0-7 bits to align each BSA flow data to a byte boundary.

Forecast Speed and Flow (CARD 5)

Carousel id 5 contains the data for the forecast speed and flow service. This contains the data for speed and flow data for the period from 1 hour from now up to 3-4 hours from now.

TABLE 60

CARID 5 Structure

| Item | Description | Comments |
|---|---|---|
| 1 | AU Header | Access Unit header and BSA directory |
| 2 | Forecast Data | Data for 1$^{st}$ BSA in directory |
| 2 | Forecast Data | Data for 2$^{nd}$ BSA in directory |

Item 2 repeats for each BSA into the table

The overall structure of the carousel is shown in Table 60 for an Access Unit covering 2 BSAs. Each AU group starts with an AU header that lists the BSAs covered by that Access Unit. This is followed by data for each BSA in the directory. The per-BSA data comprises values identifying the appropriate traffic pattern that forecast period.

AU Header

Each Access Unit in carousel 5 contains a common header defined in Table 61.

TABLE 61

CARID 5 AU Header

| Item | Label | Size in Bits | Comments |
|---|---|---|---|
| 1 | PVN | 4 | '0001', protocol version number |
| 2 | CARID | 4 | '0101', carousel id |
| 3 | TABLE | 8 | Table Identifier |
| 4 | OFFSET | 6 | Start time of first forecast |
| 5 | DELTA | 4 | Time increment between forecasts |
| 6 | FCOUNT | 4 | Number of forecasts in each group |
| 7 | PAD | 0-7 | Alignment bits |
| 8 | COUNT | 8 | Number of BSAs in this AU |
| 9 | BID | 8 | BSA index in traffic table |
| 10 | OFFSET | 16 | Byte offset in AU of BSA data |
| 11 | SIG | 16 | Signature of BSA data |

For forecast data, the total data volume for a single BSA can never exceed 5,120 bytes, so there are no AUGROUP fields in the AU Header.

PVN

The PVN field always contains the value '0001' to identify this AU as conforming to version 1 of the Apogee Protocol.

CARID

The CARID field always contains the value '0101' to identify this carousel as a forecast carousel.

TABLE

The TABLE field contains the number of the corresponding TMC traffic table. Although the different traffic tables are carried on different DMIs, SXM may multiplex multiple low-volume tables on a single DMI. The application must use the TABLE value to determine that this table is one that is in its current list of tables to process. The TABLE field is byte-wide and byte-aligned so that it can easily be inspected when filtering out multiple tables on the same DMI.

OFFSET

The OFFSET field indicates the start of the valid period for the first forecast in the group. The value is coded in units of 5 minutes relative to the time at which the carousel was received. The field may be converted into a unixtime by:

$$offset=now+value\times300$$

This value is the base value from which the other forecast points are calculated.

DELTA

The DELTA field gives the time increment between forecasts, in units of 5 minutes, so the second forecast is at:

$$unixtime=offset+delta\times300$$

and the third at:

$unixtime=offset+2\times delta\times300$ and so on.

FCOUNT

The FCOUNT field gives the number of forecasts for each group.

PAD

The PAD field contains from 0-7 zero bits to align the following BSA directory on a byte boundary.

Count of Entries (COUNT)

The COUNT field contains the number of directory entries that follow. There are COUNT+1 following entries. These entries determine how to decode the Forecast Data that follows.

BSA ID (BID)

The BID field contains the BSA index of this entry in the directory. This is the index value in the order defined by the SXM version of the appropriate TMC traffic table, it is not the TMC reference number for the BSA.

Offset to BSA Data (OFFSET)

The OFFSET field contains the byte offset from the start of the Access Unit group at which the data for this BSA starts.

Change Detection Signature (SIG)

The SIG field contains a signature value computed over the data for this BSA. An application can use this value to decide if the data have changed since the last time the application processed an Access Unit for this BSA. If the signature value differs from the one previously processed, the contents of that BSA has definitely changed. If the value is the same, the contents are probably unchanged (with a 1 in 65,536 chance of missing a real change).

Forecast Data

TABLE 62

Forecast Data

| Item | Label | Size in Bits | Comments |
|---|---|---|---|
| 1 | PATTERN | 8 | Pattern Number |
| 2 | F + MINVER | 1 + 10 | Minimum Pattern Version |
| 3 | F + MAXVER | 1 + 10 | Maximum Pattern Version |
| 4 | PAD | 0-7 | Padding |

Items 1-3 repeat FCOUNT+1 times.

PATTERN

The PATTERN field contains a reference to a stored pattern to be used as the speed and flow data for that time period.

F+MINVER

The F+MINVER field contains the minimum pattern version that may be used for this forecast. If the stored pattern version is less than this value, the historical pattern shall be used. If the F bit is '0', no minimum-version check shall be performed

F+MAXVER

The F+MAXVER field contains the maximum pattern version that may be used for this forecast. If the stored pattern version exceeds this value, the historical pattern shall be used. If the F bit is '0' no maximum-version check shall be performed.

PAD

The PAD field contains from 0-7 zero bits to align the forecast data to a byte boundary.

RFD-Based File Updates (CARID 6 and CARID 7)

Carousel id 6 is used to transmit the metadata for the update files sent using RFD. Carousel id 7 contains the data blocks. Note that carousel 7 may appear on multiple DMIs.

RFD Metadata (CARID 6)

The format of the Access Units used to carry RFD metadata is defined by the RFD protocol specification. Table 63 refines that definition with the specific values used for Apogee Traffic in the AU header.

TABLE 63

RFD Metadata Settings

| Item | Label | Size in Bits | Comments |
|---|---|---|---|
| 1 | PVN | 4 | '0001', protocol version number |
| 2 | CARID | 4 | '0110', carousel id |

PVN

The PVN field always contains the value '0001' to identify this AU as conforming to version 1 of the Apogee Protocol.

CARID

The CARID field always contains the value '0110' to identify this carousel as the RFD metadata carousel.

The remaining fields are defined by the RFD protocol. The Apogee RFD transmission system also uses the first extension field (in the F+EXT field of the metadata packet) to define the DMI on which the data packets are carried.

Carousel Updates for Ramp Tables (CARID 7)

Ramp data updates are always sent in RFD 'carousel' mode, to reduce the processing requirements. Each file is named Rxxx where xxx is the version number of the update.

The transmission format comprises a set of Access Units as defined by the RFD data transmission protocol, using carousel id '7'. Once the data file has been received and reassembled it can be decoded according to the following specification.

Ramp Update File Header

The file starts with a file header defined in Table 64 which contains an index table for the ramp table updates in the file. The application can use this table as part of a strategy for handling updates that are interrupted by a power or engine-on cycle, by restarting at the most recent incomplete update.

TABLE 64

Ramp Update File Header

| Item | Label | Size in Bits | Comments |
|---|---|---|---|
| 1 | PVN | 4 | '0001', protocol version number |
| 2 | TYPE | 4 | '0001', update file type |
| 3 | VERSION | 16 | Update file version number |
| 4 | UCOUNT | 16 | Count of Ramp Updates |
| 5 | TABLE | 8 | TMC Table Number |
| 6 | BSA | 8 | BSA Index Number |
| 7 | OFFSET | 24 | File Offset to Table Update |

Items 5-7 repeat UCOUNT+1 times.

PVN

The PVN field defines the format of the contents of the Ramp Update File. The format defined below is identified by '0001' in the PVN field.

TYPE

The TYPE field contains '0001' to identify this file as a Ramp Update File.

VERSION

The VERSION field contains the version number of this update. Taken together, the TYPE and VERSION fields identify the function of the file independently from the file name used to transmit the file over RFD, and can be used as a cross-check, or recovery method if the RFD filename is not available. The mapping is Rxxx becomes TYPE='1' VERSION=xxx.

UCOUNT

The UCOUNT field contains the number of update blocks in the file.

TABLE

The TABLE field contains the TMC table number for this update block.

BSA

The BSA field contains the BSA Index number for this update block.

OFFSET

The OFFSET field contains the byte offset from the start of the file at which the File Data for this update block is located.

Ramp Update File Data

Each file data update block contains the items in Table 65.

TABLE 65

| Ramp Update File Data | | | |
|---|---|---|---|
| Item | Label | Size in Bits | Comments |
| 1 | RCOUNT | 16 | Count of Ramps |
| 2 | INDEX | 16 | Starting Ramp Index |
| 3 | TMC | 16 | TMC Point Location |
| 4 | RTYPE | 4 | Ramp Type |
| 5 | SXLLON | 25 | Lower-Left Longitude |
| 6 | SXLLAT | 24 | Lower-Left Latitude |
| 7 | SXURLON | 25 | Upper-Right Longitude |
| 8 | SXURLAT | 24 | Upper-Right Latitude |
| 9 | PAD | 0-7 | Padding bits |

Items 3 and 4 repeat RCOUNT+1 times.

RCOUNT

The RCOUNT field contains the number of update entries in this block.

INDEX

The index field contains the starting index number for the first update record. All updates are ADD operations to the previous version of the table. If a record is found at that index value, due to an update that did not complete, that record should be deleted and the new one inserted.

TMC

The TMC field contains the TMC point location at which the ramp is anchored.

RTYPE

The RTYPE field contains the ramp topology type, as defined in FIG. 5.

MBR

The encoding of the MBR fields (items 5-8) are as define d in section 11.3.1.2.

PAD

The PAD field contains 0-7 bits to align the update block to a byte boundary.

RFD Updates for History and Patterns (CARID 7)

History and pattern update files are sent in ECC1 or ECC2 modes so that the large file may be collected over a period of many days, then reassembled. Each file is named Pxxx where xxx is the version number of the update. The maximum size of any single update file is 4,096 kbytes.

The transmission format comprises a set of Access Units as defined by the RFD data transmission protocol, using carousel id '7'. Once the data file has been received and reassembled is it decoded according to the following specification.

History Update File Header

The file starts with a file header defined in Table 66 which contains an index table for all the pattern updates in the file.

TABLE 66

| History Update File Header | | | |
|---|---|---|---|
| Item | Label | Size in Bits | Comments |
| 1 | PVN | 4 | '0001', protocol version number |
| 2 | TYPE | 4 | '0000', update file type |
| 3 | VERSION | 16 | Update file version number |
| 4 | UCOUNT | 16 | Count of Updates |
| 5 | TABLE | 8 | TMC Table Number |
| 6 | BSA | 8 | BSA Index Number |
| 7 | INDEX | 8 | Pattern Index |
| 8 | OFFSET | 24 | File Offset to Table Update |

Items 5-8 repeat UCOUNT+1 times.

PVN

The PVN field defines the format of the contents of the History and Pattern Update File. The format defined below is identified by '0001' in the PVN field.

TYPE

The TYPE field contains '0000' to identify this file as a History and Pattern Update File.

VERSION

The VERSION field contains the version number of this update. Taken together, the TYPE and VERSION fields identify the function of the file independently from the file name used to transmit the file over RFD, and can be used as a cross-check, or recovery method if the RFD filename is not available. The mapping is Pxxx becomes TYPE='0' VERSION=xxx.

UCOUNT

The UCOUNT field contains the number of update blocks in the file.

TABLE

The TABLE field contains the TMC table number for this update block.

BSA

The BSA field contains the BSA Index number for this update block.

INDEX

The INDEX field contains the pattern index number (0-255) for the pattern being updated.

OFFSET

The OFFSET field contains the byte offset from the start of the file at which the File Data for this update block is located.

History Update File Contents

TABLE 67

| History Update File Contents | | | |
|---|---|---|---|
| Item | Label | Size in Bits | Comments |
| 1 | COUNT1 | 10 | Count of Pre-Moves |
| 2 | COUNT2 | 10 | Count of Post-Moves |
| 3a | INDEX1 | 10 | History Table Index |
| 4a | PATTERN1 | 8 | New Pattern Index |
| 3b | INDEX2 | 10 | History Table Index |
| 4b | PATTERN2 | 8 | New Pattern Index |
| 5 | PAD | 0-7 | Padding Bits |
| 6 | RAMPOFFSET | 16 | Offset to Ramp Data |
| 7 | LANE | var | Lane Directory |
| 8 | LINEAR | var | Linear Data |
| 9 | RAMPDATA | var | Ramp Data |

Items 3a and 4a repeat COUNT1 times, followed by items 3b and 4b which repeat COUNT2 times (note that either or both of COUNT1 and COUNT2 may be zero). Item 8 repeats according to the number of lanes in the lane data.

COUNT1

The COUNT1 field contains the number of pattern SET operations that are to be performed before the pattern update is applied. This field may be zero if no pre-move updates are to be performed. The first COUNT1 entries in items 3a and 4a are the pre-move entries,

COUNT2

The COUNT2 field contains the number of pattern SET operations that are to be performed after the pattern update has been applied. The field may be zero if no post-move updates are to be performed. The last COUNT2 entries in items 3b and 4b are the post-move entries.

INDEX

The INDEX field contains the pattern index value in the history table that is to be updated.

PATTERN

The PATTERN field contains the new pattern index value (0-255) for that history table entry.

PAD

The PAD field contains 0-7 bits to align the move table to a byte boundary.

RAMPOFFSET

The RAMPOFFSET field contains the offset to the start of the Ramp Update portion of the pattern. If this field is zero, there are no ramp values for this pattern.

LANE

The LANE field contains the lane directory for the main roadbed speed-and-flow data, as defined in Table 34.

LINEAR

The LINEAR field contains the linear speed-and-flow pattern data, one set per lane, as defined in Table 36.

RAMPDATA

The RAMPDATA field contains the ramp speed-and-flow pattern data, as defined in Table 42.

Implementation and Integration with SMS

This section considers additional algorithms and suggestions for implementation.

MBR Filtering

MBR filtering can be implemented using only simple comparisons once the map MBR has been established. An MBR can be represented as a C structure with 4 fixed-point values (32-bit integers are adequate for this operation allowing 6 decimal places of accuracy).

```
typedef struct {
        int     ll_lon;     // lower-left longitude
        int     ll_lat;     // lower-left latitude
        int     ur_lon;     // upper-right longitude
        int     ur_lat;     // upper-right latitude
    }GeoMbr;
```

Then determining if a point lies within the MBR is simply:

```
int geombrInside(GeoMbr *this, int x, int y) {
    return (x >= this->ll_lon &&
        x <= this->ur_lon &&
        y >= this->ll_lat &&
        y<= this->ur_lat);
}
```

When processing individual segments within a linear, the following test will detect all lines that either cross or come close to the map MBR:

```
int geombrCross(GeoMbr *this, int x0, int y0, int x1, int y1) {
    return ((sgn(x0-this->ll_lon) != sgn(x1-this->ll_lon) &&
        (sgn(x0-this->ur_lon) != sgn(x1-this->ur_lon) &&
        (sgn(y0-this->ll_lat) != sgn(y1-this->ll_lat) &&
        (sgn(y0-this->ur_lat) != sgn(y1-this->ur_lat));
}
```

Where sgn is the signum (sign of) function.

The basic bounding-box filter, which selects only those GeoMbrs that may potentially have points within the map MBR is calculated by:

```
int geombrIntersects(GeoMbr *this, GeoMbr *other) {
    return (other->ll_lon <= this->ur_lon &&
        other->ll_lat <= this->ur_lat &&
        other->ur_lon >= this->ll_lon &&
        other->ur_lat >= this->ll_lat);
}
```

All these tests use simple arithmetic or comparisons, and no trigonometric functions.

Setting the Overall Apogee Filter

The filter is composed from a set of tables and BSA numbers and bit values, one bit per linear, that says if the linear is to be included ('1') or excluded ('0) from processing. It is recomputed only when the application requests a new map coverage area. The process is:

1. Convert the area into a request MBR using the formula above.
2. For each table in the broadcast. If geombrIntersects (table_MBR, request_MBR):
   a. For each BSA within that table. If geombrIntersects (BSA_MBR, request_MBR):
      i. Mark this table for collection. Mark this BSA for collection. Then
      ii. For each linear index in the BSA:
         1. filter[index]=geombrIntersects(MBR[index], request_MBR);

This completes the filter setting. The receiver then subscribes to the set of DMIs required to collect all the data for the tables marked for collection.

Duplicate Detection

Typically Real-Time Speed and Flow data are recalculated every 150-180 seconds, so the same carousel may be transmitted 3 or 4 times before it changes. If the application has already processed one instance of the carousel it does not need to check and decode an identical copy. It can discard an Access Unit as a duplicate if [and only if]:

1. It is for the same BSA, and time-period [current, forecast etc.].
2. It is the same AUCNT-of-AUTOT as a processed AU.
3. The CRC-32 on the AU matches the one from the previously-processed AU.

These checks can all be made on the AU wrapper and header, without requiring that the contents be decoded. If it is determined that the AU has changed, then each BSA can be examined using the signature field in the header (for the BSA-directory encoding method). If the signature has not changed, then that BSA need not be processed again. Because extents never cross BSA boundaries, the state of those linears will be identical even if other BSAs in the Access Unit have different data.

Skipping Linears

When a linear is not required for display it can be skipped over using the following pseudocode:

```
type = readbits(2);
if (type == '11')
    readbits(4+3);
else
    while (type == '10' || type == '01') {
        readbits(4+3+7);
        type = readbits(2);
    }
```

Unlike the Alert-C encoding, the linear can be skipped over quickly, without requiring any references to external TMC tables or any further calculations.

Processing Linears

Linears that need to be displayed can be processed using the following pseudo-code

```
    type = readbits(2);
    if (type == '00')
        do nothing, no coverage for this linear
    else if (type == '11') {
        code = readbits(4);
        for (point = first_point_in_linear; valid(point); point = next_point_positive)
            if (geombrInside(mapMBR, point)) {
                set all_subsegments_from_point_positive to code;
                set  all_subsegments_from_point_negative to code;
            }
} else {
        point = first_point_in_linear;
        while (type == '01') {              // process +ve side (i.e. starting at
p0 above)
            code = readbits(4);
            extent = readbits(7);
                if (geombrInside(mapMBR, point))
                    set extent positive subsegments from point to code;
            point += extent;
        }
        point = last_point_in_linear;
        while (type == '10') {              // process -ve side (starting at p6)
            code = readbits(4);
            extent = readbits(7);
                if (geombrInside(mapMBR, point))
                    set extent negative subsegments from point to code;
            point -= extent;
        }
    }
```

Filter Operation

Figure 31:
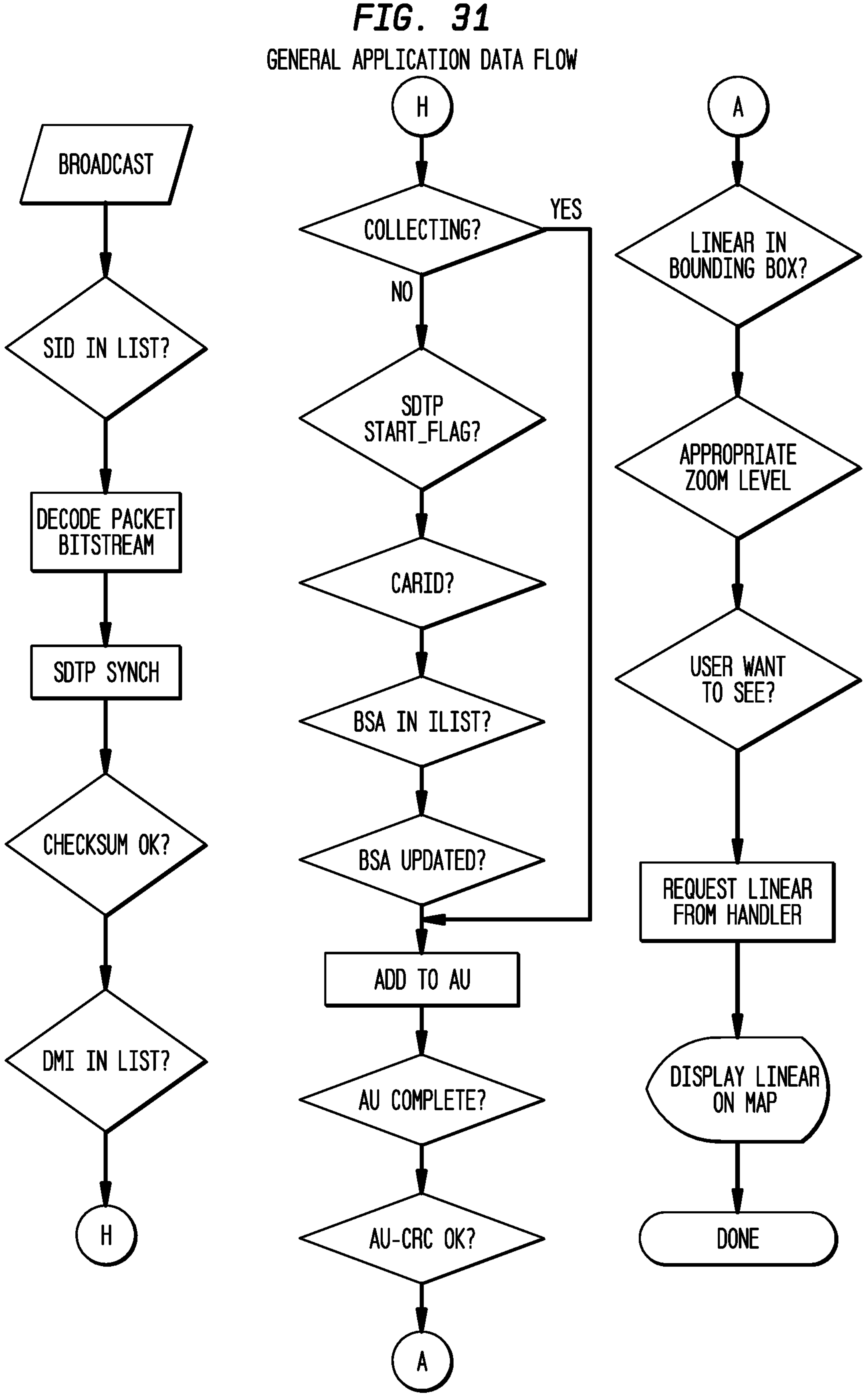
FIG. 31 depicts an exemplary general application data-flow according to an exemplary embodiment of the present invention.

Putting all the pieces together leads to an overall flowchart for efficient processing of Apogee traffic data as shown in FIG. 31.

Integration with SMS

Figure 32:
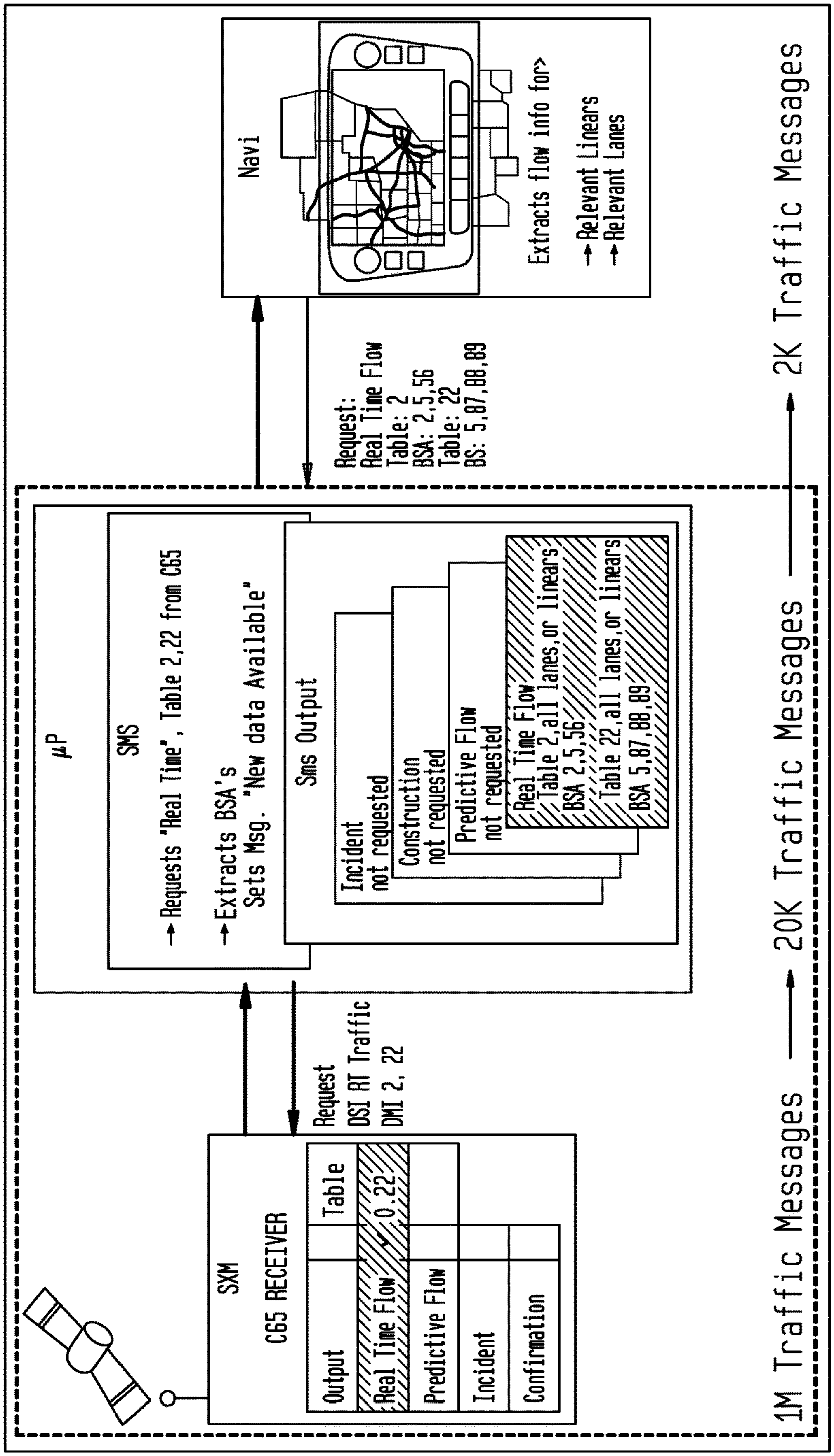
FIG. 32 depicts an SMS Overview according to an exemplary embodiment of the present invention.
Figure 33:
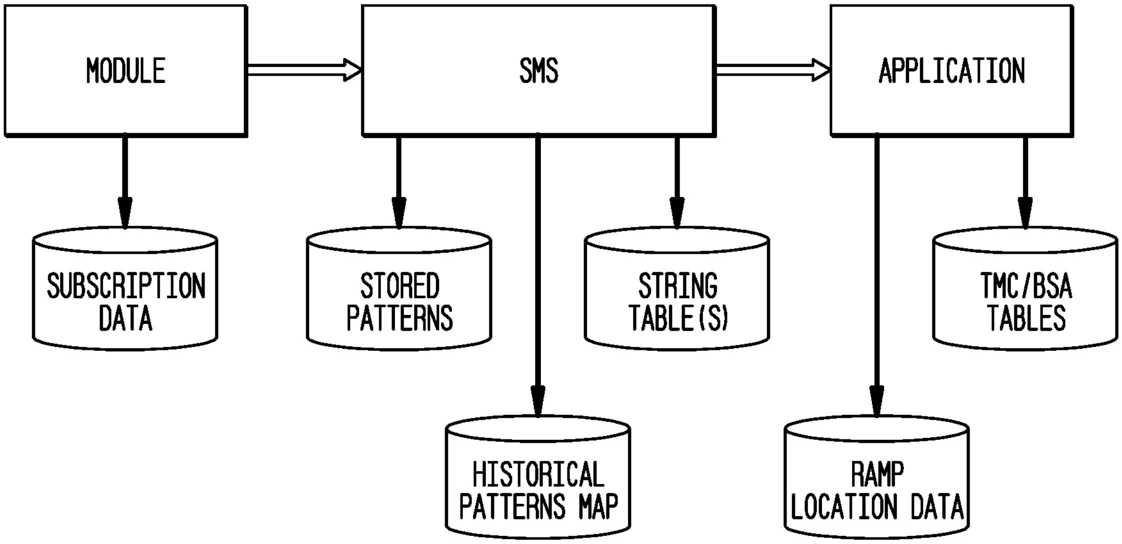
FIG. 33 depicts exemplary SMS integration according to an exemplary embodiment of the present invention.

The overall structure of an exemplary system that uses SMS to process the Apogee protocol is shown in each of FIG. 32 and FIG. 33. In exemplary embodiments of the present invention, the SMS layer can handle many of the filtering operations described above and deliver only those messages that were relevant to, for example, the application's map view, route calculations, arrival-time estimates, or other functions.

Another main advantage of SMS is that it can also manage some of the baseline files and over-the-air database updates on behalf of the application, leaving the application to manage the TMC tables and its own map database. Thus, for example, FIG. 33 shows one possible integration option, where SMS handles the stored patterns and the decompressed string tables, and the application maintains the Ramp and Roadbed tables.

Part II—Exemplary Architecture

The following section describes an exemplary overall architecture and proposed implementation of the Apogee Traffic Service.

As noted, "Apogee" or "Apogee Traffic" is a name given by Applicants to next-generation traffic-based services which may be sent via Satellite Radio, or via other data channels, such as two way data networks. It contemplates improving current traffic information offerings in many ways, including:

- An improved traffic speed/flow service, both in quality of data and quantity of coverage.
- Improved incident reporting.
- Additional features not currently available:
  - Predictive and Forecast traffic data.
  - Other traffic-related data feeds, to include traffic camera images.
- Faster, more responsive delivery times and encoding methods.
- Removal of volume limitations inherent in certain conventional implementations.

Key Features

The following sections introduce some of the key features of Apogee Traffic and lay the groundwork for the more detailed discussions which follow.

Location Referencing

Part I, above, describes aspects of location reference within the service. Because the purpose of the service is to provide information on major, and minor, highways, existing Traffic Messaging Channel tables may be used to provide location references. In an exemplary embodiment of the present invention, Apogee will sub-divide a TMC segment into 8 sub-segments to provide higher spatial resolution than is supported by TMC segments alone; it will encode Alert-C style extent lengths for multiple highway sub-segments reporting similar speed conditions. Retaining TMC tables has three main advantages:

1. No need to invent a location-referencing scheme (or adopt a more bulky representation like AGORA-C) for almost all required references.

2. Navigation-Unit manufacturers are used to converting TMC tables into their own proprietary map formats so the low-level rendering data are already available for the most part.
3. Introducing finer-grained TMC sub-segments requires only that manufacturers refine their existing TMC-to-map tables, it does not require them to develop a whole new geo-registration methodology.

We retain the ability to use other referencing formats as needed, such as, for example, to encode off-highway incidents.

Lanes

In exemplary embodiments of the present invention, Apogee provides the ability to reference lane elements. As shown in FIG. 4, lanes may be grouped into five categories, as follows:

| Category | Type |
|---|---|
| 0 | Main roadbed, or all lanes of the highway (blue) |
| 1 | HOV or other express-category lane (purple) |
| 2 | Right-Hand Junction lane (red) |
| 3 | Left-Hand Junction lane (red) |
| 4 | Exit-only lane, to the side of the Junction lane usually (orange) |

In exemplary embodiments of the present invention, the Junction lane is usually the Right-Hand lane of the main roadbed; it is the lane that may suffer congestion because of vehicles entering or leaving the roadway at an intersection. In cases where the roadway is treated as two separate TMC linears, for example for divided car and truck lanes, the individual linear codes will continue to be used. Ramps (green) are treated separately, as noted below.

Speed Buckets Vs Free-Flow

It is here noted that the Alert-C protocol defines a message code, 124, meaning 'traffic flowing freely' without any definition of the term 'freely'. There is no commonly-agreed TMC/TISA definition for "Traffic Flowing Freely". This code is used heavily by the traffic providers to reduce message volumes by offering a very broad definition of 'free-flow' and aggregating across many segments. The definitions vary according to road class, so we might expect:

For controlled-access highways, 'free-flow' is >80% of the posted speed limit

For other roads, 'free-flow' is >80% of the 'expected' speed, which is (much) less than the posted speed limit.

Rather than persist with this meaningless definition, Apogee traffic uses explicit speed buckets for all road classes (see the discussion on Speed vs Flow below). The term 'S/F' indicating 'Speed or Flow' is used in this document to distinguish this approach from the current 'S&F' 'Speed and Flow' mixture.

Baseline Data

Not all of the data used by Apogee traffic will be transmitted over a Satellite link in real time. We expect TMC location tables to be built into the Navigation Unit, and referenced back to the underlying map database. Apogee will also support historical data that can be used for rough travel-time predictions outside of the more precisely-transmitted service. The historical data can also be pre-loaded into the Navigation Unit, and may be used without reference to the real-time data stream.

Carousels and RFD

In exemplary embodiments of the present invention, Apogee Traffic can use two different methods of data delivery over the satellite broadcast.

Carousels are blocks of data that repeat, in a loop. In order to accept a full carousel the unit must receive the complete set of carousel data in a continuous sequence. While some carousel data may repeat over multiple loops it is more usual for the data to change every couple of loops or so. Data within carousels are grouped into Access Units, and each Access Unit can be processed independently of other Access Units. In particular, Access Units for a particular TMC table or BSA, or set of tables or BSAs can be filtered out from the remaining carousel data without requiring that all table data be fully decoded. Supporting filtering by traffic table within the receiver (module) requires that traffic tables are carried over multiple DMIs.

RFD (Reliable File Delivery) is a method used by Applicant of delivering large amounts of data slowly, without requiring that the receiver operate continuously over the whole of the reception time. It uses an encoding method such that a file of size N (fixed sized) blocks can be recovered from an arbitrary sequence of (N+δ) blocks, where δ is small. However, the file is either received completely, or not at all, and there is no ability to filter only parts of the file, as with the carousel.

It is noted that there is a non-trivial decoding overhead associated with reconstructing an original file from a sequence of RFD blocks, and this may be beyond the capabilities of very low-end consumer units. Therefore, Apogee Traffic Service can be defined to operate without requiring support for RFD, but with the expectation that presentation accuracy may degrade over time for units that do not accept and process updates.

The main use of RFD as described above is to update the set of patterns used for historical data display. For ramp-table updates, the same RFD metadata structure will be used in carousel mode to allow non-GF RFD capable receivers to keep up to date with our ramp definitions. It is noted that various exemplary embodiments may use any convenient method equivalent to RFD.

Service Definition

There are two aspects to the service definition for Apogee Traffic: how to structure the components; and how to divide the components into packages that can be authorized and billed as individual units.

Service Matrix

In exemplary embodiments of the present invention, Apogee Traffic can, for example, comprise some or all of the following service elements:

| | Linear S/F | Ramp S/F | Construction | Incidents |
|---|---|---|---|---|
| Real-Time | ✓ | ✓ | ✓ | ✓ |
| Predictive | ✓ | ✓? | [✓] | [✓] |
| Forecast | ✓ | ✓? | [✓] | x |
| Historical | ✓ | ✓? | x | x |
| Base | ✓ | ✓? | x | x |

Where ✓ elements are fully supported and transmitted by the protocol; [✓] elements are not transmitted explicitly but will affect the values of Predictive or Forecast S/F (for example an uncleared major incident would skew predictive values towards 'congestion' even though we do not transmit an explicit 'predicted incidents' carousel); x elements are not supported; and ✓? implies support for this element may be provided if sufficient data are available.

Geographic Coverage

Legacy traffic services have seen huge increases in coverage. While still at under 10% of the theoretical maximum coverage as defined by the TMC tables, around 60% of the full TMC coverage is for low-functional-class roads for which there is no real basis to justify their inclusion. Even with an explosion in crowd-sourced and telemetry-based probe data, it is still unlikely that we could justify a traffic Speed/Flow service on any of those roads could be justified.

Apogee will remain focused on high-value-travel roads, and the 300,000 miles of high-functional-class roads already covered by data providers. One area where a significant increase in coverage is expected is non-Controlled Access-to-Controlled Access ramps, where we will have to build our own indexes. For this reason we will support a carousel-based (i.e. not the full RFD-GF format) update protocol for those tables.

Service Elements

The following requirements or constraints on the individual service elements pertain:

Real-Time Linear

- Extended linear precision, multiple-lanes, fine-grained speed buckets.
- Highways and arterials [excluding ramps].
- Support for direct decoding/filtering at the individual linear level.
- Must be self-contained in transmission without reference to any updatable stored data [no patterns].
- Must work for all revisions of the TMC tables, since we will not be updating the TMC tables over-the-air.
- May use additional SXM-supplied data (e.g. lists of linear indices and MBRs) as long as they can be built in at manufacture and the system continues to work without requiring updates.

Real-Time Ramps

A ramp component would give S/F data for controlled-access-controlled-access ramps and also possibly lower-class highway-highway ramps.

- Only four possible S/F states [red, yellow, green, none] not explicit speed values, defined relative to the advisory or posted limit of the ramp, when known.
- CA-CA ramps would use per-ramp TMC-based codes.
  - We can use an indexing scheme requiring an explicit data table that we may update over-the-air.
- Other ramps would be located with respect to a known TMC point.
  - Tables can be developed to link our index points back to TMC locations and ramp topologies.
  - The initial table may contain more nonCA-nonCA ramps than are initially covered at service launch, to minimize the amount of over-the-air updates as time goes on.
  - Although four or eight ramps would be the canonical topology, we will support more complex ramp topologies.
  - The ramp tables can be updated over-the-air and a receiver preferably is capable of processing the updates.

Real-Time Construction

This is a TMC-based service containing essentially the same information as the current Alert-C service, with improved sub-segment resolution.

- We send long-term construction events, but only as part of the real-time service. Any other effects on future flow are reflected only indirectly in the non-real-time S/F components.

Real-Time Incidents

This is similar to current services, but includes Apogee improved subsegment resolution, with the added potential to extend to non-TMC-coded roads.

- Provide better descriptive elements than are currently supported with simple Alert-C event codes [with the parallel requirement on the data provider to support more informative incident coding than is currently the case].
- Non-TMC-coded incidents would require explicit lon/lat, or precise offset style encoding. We do not intend to support AGORA-C location references.
- Support additional text-based location coding information, such as a street name, intersection, or venue.

Predictive Linear

The predictive linear service provides short-term S/F data across all the covered linears. The predictions are derived from current states and environment factors and are expected to be reasonably useful for up to one hour into the future.

- We offer at most four predictive datasets and preferably only two, taken from:
  - Every 15 minutes [+15, +30, +45 and +60]
  - Every 20 minutes [+20, +40]
- The resolution of predictive will be less than Real-Time. It may be only at the segment (not sub-segment) level, and be smoothed more heavily that Real-Time.
- Predictive will be delta-coded, either from the current state, or from the previous timeslot. Predictive will be usable without pattern support.

Forecast Linear

In exemplary embodiments of the present invention, Forecast Linear data can extend the predictive data beyond the 1-hour mark, but with less confidence and resolution.

- Forecast estimates can be conditioned by current events and are not just 'historical'.
- Forecasts can select a single stored pattern for each table, but may not necessarily apply updates against the pattern. The patterns will be updated over the air.
- Pattern selection may be determined by season and weather conditions, nature of the day, known construction and other information [sports events, concert and theater events, school schedules etc.] which are inputs to the predictive and forecast models.
- Can transmit the pattern selectors over the air, there is no decision process within the receiver to choose its own pattern.

Historical Linear and Ramp S/F

Historical data refers to the selection of a Base Pattern for Speed and Flow data based solely on its position within a semantic grid.

- In the absence of any broadcast data, pattern selection can be driven from a table built into the receiver at manufacture that links conditions to a specific stored pattern.
- The space of conditions can comprise:
  - Type of day [Mon-Thu, Friday, Saturday, Sunday, holiday]
  - Season [summer, winter] if the pattern data are available
  - Time of day [e.g. in 15-minute or 1-hour timeslots]
- More than one entry in the condition space may point to the same stored base pattern.
- If a broadcast service is available, the default selection may be modified to indicate a closer pattern for a particular point for a given BSA.
- Can update the stored semantic map as we update the patterns. If a receiver does not process updates it must update neither its base patterns nor its historical selection table.

Historical data patterns are linked to service coverage. At any given time, coverage of the historical pattern shall not exceed the coverage of the Real-Time S/F broadcast data. As coverage increases, the patterns will be updated to show the increased coverage. A receiver that does not process the update can continue to show the 'old' coverage when using historical data. This ensures that in no case does there appear to be a loss of coverage when moving from historical to real-time data.

Base Data

Base Data refers to the stored patterns of traffic S/F used by the Predictive, Forecast and Historical components of the service.

- The main purpose of the pattern data is to reduce bandwidth by allowing a short reference (e.g. 8 bits) to select a large amount of coverage data).
- Can select pattern data according to two criteria:
  - Minimizing the bandwidth required for the delta-coded components (forecast)
  - Minimizing the customer-perceived-error in sending forecast points. This requires that we include some extreme patterns as part of the base dataset that may rarely occur during the year.
- Patterns will be updated over the air. Because of the size of the patterns this may be done using RFD.
- There are no explicit semantics attached to pattern index numbers in the receiver [for example, pattern 14 will not always represent a dry weekday rush-hour point in the dataset]. Semantic linkage is provided through the Historical element.

Tiering

Apogee traffic naturally falls into two tiers for pricing and access control.

- Tier 0. Construction and Incident data. RFD data for updates
- Tier 1. Real-Time Flow for roadbeds and ramps. Predictive and forecast data.

These tiers permit a 'basic' and a 'premium' service that may be offered. The division of carousels between DMIs and the allocation of groups of DMIs to services (DSIs) and packages is discussed below.

Minimum Receiver Requirements

Apogee is designed to be usable (and offer value to the customer) on a receiver with only minimal capabilities. Specifically:

- Apogee will work if the implementation does not have access to writable flash storage.
  - There is no requirement that any data be stored over an engine-on cycle.
  - The system will operate even if the receiver does not accept and process any of the RFD file updates.
- Subsets of the full Apogee service can be implemented on systems with low available CPU cycles.
  - The protocol is structured to allow individual service elements to be easily extracted from the Data Services multiplex.
  - The protocol supports filtering at the Table (within the module) and BSA (within the application/handler) using minimal resources.
  - Rebroadcast data can be quickly detected, so the map update frequency can be tied to the provider integration period, not the (much faster) service carousel rates.
  - Linear-based filtering within BSAs reduces the query load on TMC tables, when they are shared between multiple threads in the application.
- Service expansions (new types of services, coverage extensions to existing services) will not break existing receivers [assuming they are able to process the volume of messages] and will not cause anomalous display behavior, such as coverage appearing to 'come and go' as updates are received.

Implementation Options

There are various exemplary levels of implementation arising from the list of service elements:

0. None. Even without subscription for Apogee traffic, the receiver may still be able to receive and process Free-to-Air baseline updates, to give the best consumer experience when a subscription is taken out [Tier 0].
1. Incident-Only Incident-Only means access to data for construction, road closures and accidents only, without the S/F component. This does not include access to the stored historical data (so a customer does not get the wrong impression about our S/F service)[Tier 0].
2. Full Real-Time. This extends 'Incident-Only' to include the Real-Time Linear and Ramp S/F components. This can be implemented without requiring RFD and baseline updates, or any real-time data storage [Tier 1].
3. Real-Time and Historical. If the receiver does not wish to process the Predictive and Forecast components it may use only the Real-Time and fall back to simple Historical for all other time periods [Tier 1].
4. Real-Time+Predictive+Historical. Allows near-term projections without requiring RFD pattern support [Tier 1].
5. Full Service. Includes Predictive, Forecast and all Real-Time, and supports all the service elements listed in the table. Receives and processes pattern and mapping table updates using carousel and RFD protocols. May store real-time data (e.g. long-term construction or predictive) [Tier 1].

In exemplary embodiments of the present invention, real-time data are not stored over an engine cycle. For basic products, there is no engine-on display until the first data carousel has been received. Full-Service products may choose to store predictive and forecast data for route recalculations, and display historical or stored-predictive data at engine-on.

Service Rates

| Data Type | Target Update Rate |
|---|---|
| Speed/Flow Data | <60 seconds |
| Incident Data | 15-30 seconds |
| Construction Data | 15-30 seconds |
| Predictive Data | <90 seconds |
| Forecast or historical data profile | 2 minutes |
| RFD baseline update file (any single file) | 40 minutes × 30 days |

The RFD value is set to ensure a maximum delay of 30 days to receive any GF-encoded update for the average commute (2×20 mins/day). The other values are the maximum times after engine-on before the data would be available for display by the application.

The rate at which we issue baseline pattern updates will be either quarterly, if they need to be tied to TMC table releases, or half-yearly in keeping with our other slowly-changing baseline files.

TMC Sub-Segments

In exemplary embodiments of the present invention, Apogee Traffic provides increased spatial resolution, beyond that offered by existing TMC tables, by dividing each segment into a number of sub-segments. This allows:

a. More accurate color-coding of roads.
b. Improved travel-time calculations.

c. Better dynamic routing around congestion.

d. Improved incident locations (when we use TMC locations to reference incidents).

Preferably, we limit the sub-segment approach to a fixed number of sub-segments per segment, given the following:

For a city-street type grid, it makes no sense to sub-segment a flow between intersections. However is it very useful to be able to place an incident 'at' an intersection or 'between' two intersections [i.e. 1 bit per TMC segment].

For limited access roadways with short distances between access points, there are three useful sub-segments to consider: the portion 'just after' the intersection where flow is controlled by the entering vehicles, the portion 'between' the intersections and the 'approach' to the next intersection, where flow is controlled by the vehicles trying to leave at that exit. Typically, the ramp-controlled portion may extend for 200 yds up to ¼ mile along the main roadbed [minimally 2 bits per TMC segment].

Assuming that we will be providing more granularity in the 'between' portion of longer segments, the minimum sub-segment length is around 200-400 yds. This number suggests that most segments would require between 8-16 sub-segments at maximum resolution [Most TMC segments are under 3 km/2 miles long].

Very long TMC segments (those over 50 miles for a single segment) do occur, but only along roads where there are no significant intersections along that stretch of highway [the middle of upper Quebec, parts of rural Idaho, the everglades in Florida]. There is not going to be enough probe density to support ¼-mile resolution of speed and flow data on these roads. Providing some level of sub-segmentation would be useful for incidents, and for marking areas of construction (e.g. which 10-mile stretch of the highway is affected rather than the whole 50 miles).

However sub-segments are implemented, the protocol encoding for broadcast must be robust and relatively immune to table changes, table versions and must consider receiver decoding complexity.

These points led to the choice of a fixed number of segments in preferred exemplary embodiments since:

a. A 2- or 3-sub-segment approach is purely a coding/bandwidth saving, since we always have the option of rounding the number of sub-segments to smaller numbers. The savings are outweighed by the additionally complexity of determining the correct number of sub-segments for each TMC location [additional protocol bits or tying the broadcast to a specific TMC table version].

b. There is no benefit to dividing a 50-mile TMC segment into 200¼-mile sub-segments. We will never be transmitting data at that granularity over that road.

c. The number of bits used in the coding protocol for sub-segments is fixed for all messages.

Four sub-segments is not enough for interstate highways, where the length of a segment is typically 5-8 miles. The choice is thus between eight or 16 sub-segments. The value 8 was chosen because: for the vast majority of TMC segments (over 80%) this gives 4-mile or better resolution. This is sufficient to represent accurately the effect of the congestion caused by on- and exit-ramps, as well as a means to locate incidents to +/−200 yards. There is no benefit to using 16 sub-segments for segments under 2 miles, or for very long segments.

Speed vs Flow

As noted above, there is a dichotomy in expanding "Speed and Flow" service to non-controlled-access highways. Does one present speed information, or flow information, to the consumer?

Speed

On a controlled-access highway it is theoretically possible to maintain the posted speed limit across many TMC segments. Individual probe vehicles can provide their transit time for each segment, and we can compute a statistic $\langle stt \rangle_{tmc}$ the expected segment transit time for each segment. In exemplary embodiments of the present invention, can then apply very simple rules to assume:

$$\langle ttt \rangle = \sum_{tmc} \langle stt \rangle_{tmc}$$

$$v_{tmc} = l_{tmc} / \langle stt \rangle_{tmc}$$

So the expected total travel time $\langle ttt \rangle$ is the sum of the individual segment transit times, and the speed bucket $v_{tmc}$ is the expected mean speed of the vehicle over the segment (of length $l_{tmc}$).

On non-controlled-access highways there are stretches of roadway where the posted speed limit may be achieved, but also points of enforced delay at traffic lights, yield markers, stop signs etc. Here we must define a realistic minimum segment transit time mstt that is a combination of both factors $$mstt = l_{tmc}/v_p + \delta_{tmc}$$

Where $v_p$ is the posted speed limit of the segment and 8 is the delay associated with any enforced stops on that segment. Hence the maximum speed bucket for that segment becomes:

$$u_{tmc} = \frac{l_{tmc}}{(l_{tmc}/v_p + \delta_{tmc})} = \frac{v_p}{(1 + \delta \times v_p / l_{tmc})} \leq v_p$$

It is possible to estimate $u_{tmc}$ from a statistically and historically meaningful distribution of observed speeds and probe-point locations along a single segment, since stop lights and yield signs will generate clusters of sample points while the faster-moving roadbed between intersections will have a more uniform distribution. However it is done, it remains the case that $\delta_{tmc}$ is a major factor in the equation, for which there is no easy formula.

It is theoretically possible to achieve the posted speed when traffic lights are arranged to create a 'green wave' through the linear, effectively setting≡0. If we publish accurate values of $v_{tmc}$ then the calculation of total travel time is the same whether the segments are on controlled-access highways or not.

Flow

Flow is more related to traffic density than to pure speed. We might define flow as the number of vehicles passing a given point per lane per hour:

$$\text{flow}_{tmc} = \rho_{tmc} \times v_{tmc}$$

Where $\rho_{tmc}$ is the traffic density, in vehicles-per-lane-per-mile and $v_{tmc}$ is the speed bucket for that segment. However these are not [supposed to be] independent variables. If we take the minimum stopping distance between two vehicles at velocity v to be $h_v$ yards, and the average minimum car length to be 15 ft (5 yards, length of the Toyota Camry, for example), then the maximum safe traffic density at velocity v is given by:

$$\rho_v=(1760-5\times\rho_v)/h_v$$

$$\rho_v=1760/(h_v+5)$$

| Speed/mph | Stopping distance | Zero-Reaction | $\rho_v$ |
|---|---|---|---|
| 25 | 19 | 75 | 150 |
| 35 | 32 | 48 | 95 |
| 45 | 49 | 33 | 65 |
| 55 | 69 | 24 | 50 |
| 65 | 92 | 18 | 40 |

The stopping distances are in yards. The 'Zero Reaction' column is the traffic density assuming no driver observes the behavior of the driver in front. If we assume drivers are concentrating we can, for example, support twice this density, which is the value listed in the $\rho_v$ column.

As the actual density approaches $\rho_v$ the traffic slows down to maintain a safe stopping distance, thereby reducing flow. If the traffic density approaches $\rho_0=350$ we have a parking lot which can only crawl forwards at very slow speeds.

Congestion is the complement of flow. We can define a simple measure of congestion by:

$$c=\max\left(\frac{\rho-\rho_l}{\rho_0-\rho_l},\ 0\right)$$

0 indicates no congestion and 1 indicates maximum congestion (stationary traffic) where $\rho$ is the observed traffic density and $\rho_l$ is the value of $\rho_v$ at the posted speed limit. The other interesting value is relative congestion:

$$c_r=\rho/\rho_v$$

Where $\rho_v$ is the maximum supported density at the calculated speed bucket for the segment. If $c_r$ is close to, or above, 1 then congestion will increase at that point. If $c_r$ is significantly smaller than 1 then the road can sustain higher speeds, all other factors being equal.

It is noted that $c_r$ is an order parameter for the approaches that model traffic as analogous to a physical condensed matter system (3- or 4-phase traffic theory) or a travelling wave through a fluid medium (the 'phantom traffic jam' effect).

For controlled-access highways, in the absence of other constraints such as road works, the natural tendency is to drive as fast as the traffic density will permit, so there is a simple relation between observed transit time and congestion.

On other highways the difficulty comes because the inter-segment delay $\delta$ is a function of traffic density, $\delta(p)$ because there comes a point at which the queue at a light does not completely clear during a single green cycle, dramatically increasing the transit time for the segment.

The relationship between congestion and speed is not a direct observable of the system. Vehicle probes indicate speed while sensor loops measure density. Single-loop traffic-flow sensors natively measure occupancy which can be converted in to a estimate of average traffic density over the sampling period, given the loop geometry. This can be converted to speed if the system then assumes an average vehicle length (which it cannot observe). For vehicle probes, with a finite (and small) probe density, true congestion is not an observable of the system.

On a controlled-access highway we can observe $v_{tmc}$ and calculate the appropriate $h_v$ and the assumed traffic density $\rho_v$ that is limiting the speed to $v_{tmc}$ and so calculate c and $c_r$. For non-controlled-access highways we do not know the function $\delta(p)$, it depends on the duty cycle of the lights, staggered phasing and other factors. At best c will be a very approximate value.

Current Alert-C implementations do not transmit either c or $c_r$, they only transmit $v_{tmc}$ and expect the receiver to use its knowledge of $v_p$ to select an appropriate color for that segment. As the discussion above has demonstrated, this is not a good model for future services.

Thus, in exemplary embodiments of the present invention, Apogee traffic will support both speed bucket indicators and congestion level indicators, using information that is available to the data provider, without requiring knowledge of $v_p$ in all receivers.

Free Flow

We to consider the primary purpose of the "Speed or Flow" service. If the primary purpose of the service is to enable navigation units to perform route calculations then:

1. We need to transmit the segment transit time estimates, encoded as $v_{tmc}$.
2. If the routing engine will assume 'no coverage'='free flow'=$v_p$ we do not need to transmit any data where $v_{tmc}\approx v_p$.
3. Transmitting a single bucket value that represents "80% or better of $u_{tmc}$" [a.k.a. Navteq free-flow] is of little value for a routing engine, since that may represent values between $0.5v_p$ all the way up to full $v_p$ depending on how large a rôle $\delta(p)$ plays.

If the primary purpose is to present a visual indication of congestion to a consumer then we need to define a way to convert $v_{tmc}$ into c for presentation.

1. Consumers will assume 'no paint'='no coverage' so sending explicit congestion values including 'no congestion' is important.
2. Congestion is road-class dependent, transit-time speed buckets are not. Thus we consider how transmitted data are used to color roadways in a way that is meaningful to the consumer.

In exemplary embodiments of the present invention, the Apogee Traffic service indicates both $v_{tmc}$ and c for a segment, or subsegment, specifically:

1. sends $v_{tmc}$ explicit values, and ignores the 'free flow' concept.
2. does not suppress $v_{tmc}\approx v_p$ messages, allowing the consumer to see explicit coverage.
3. transmits a congestion indicator [0.7] linked to a color code 4. suggests color-coding based on $v_p$ not $u_{tmc}$ for non-CA highways we so we are not trying to model $\delta(p)$ explicitly.
5. defines simple congestion-buckets for non-CA roads, for example:
   a. Red=0 . . . 25% of $v_p$
   b. Yellow=25 . . . 60% of $v_p$
   c. Green=60% of $v_p$ or greater
   d. No color=no coverage
6. describes the service as 'Congestion Levels' to consumers, and 'Speed Buckets' to developers to emphasize how each should be interpreting the data Speed Buckets For the purpose of transit-time calculation we require fine-grained speed buckets. For linear aggregation the fewer the buckets we have, the better the aggregation. However, these requirements are not mutually exclusive. Thus, in exemplary embodiments of the present invention, Apogee traffic defines fine-grained speed buckets (5 mph granularity) but will not necessarily code all segments at the individual bucket level. An exemplary full 4-bit bucket list can be:

| Code | Bucket |
|---|---|
| 0 | Use existing code value (for pattern updates) |
| 1 . . . 13 | Speed in the range 5 × (code − 1) . . . 5 × code, i.e. 0 . . . 65 mph |
| 14 | 65 mph or above |
| 15 | No coverage available (remove underlying pattern if present) |

For Real-Time S/F codes 0 and 15 are equivalent, since the NULL pattern is 'no-coverage' everywhere. The distinction for non-NULL pattern updates (delta-coding) is described below.

For lower functional-class roads every other bucket can be used, giving 10 mph speed buckets, or group into 15 mph buckets, for example:

| Code | Bucket |
|---|---|
| 2 | Speed in the range 0 . . . 15 mph |
| 5 | 15 . . . 30 mph |
| 8 | 30 . . . 45 mph |
| 11 | 45 or above |

Plus codes 0 and 15 for pattern updates when delta-coding.

Congestion Levels

Congestion levels are intended for presentation to a user as colors on a map, unlike speed buckets which are intended to be input to route-time calculations. For most consumer displays, this limits the choices to a small number (usually 3) of colors, usually Red/Orange/Green. To support more advanced displays, congestion is sent as a 3-bit value, defining one of the following colors

| Code | Full-Color | 3-Color | Indicator |
|---|---|---|---|
| 0 | Light Green | Green | Traffic flowing at or near posted speed indicator |
| 1 | Dark Green | Green | Light congestion |
| 2 | Orange | Orange | Moderate Congestion |
| 3 | Yellow | Orange | Medium-to-Heavy Congestion |
| 4 | Red | Red | Heavy Congestion, stop-and-go traffic |
| 5 | — | | Undefined |
| 6 | Black | None | Road closed |
| 7 | White | None | No congestion information available |

Topology

This section serves to illustrate the Apogee approach to topology management and how a receiver can use topology to provide simple and efficient filtering of the input datastream.

Tables

Figure 34:
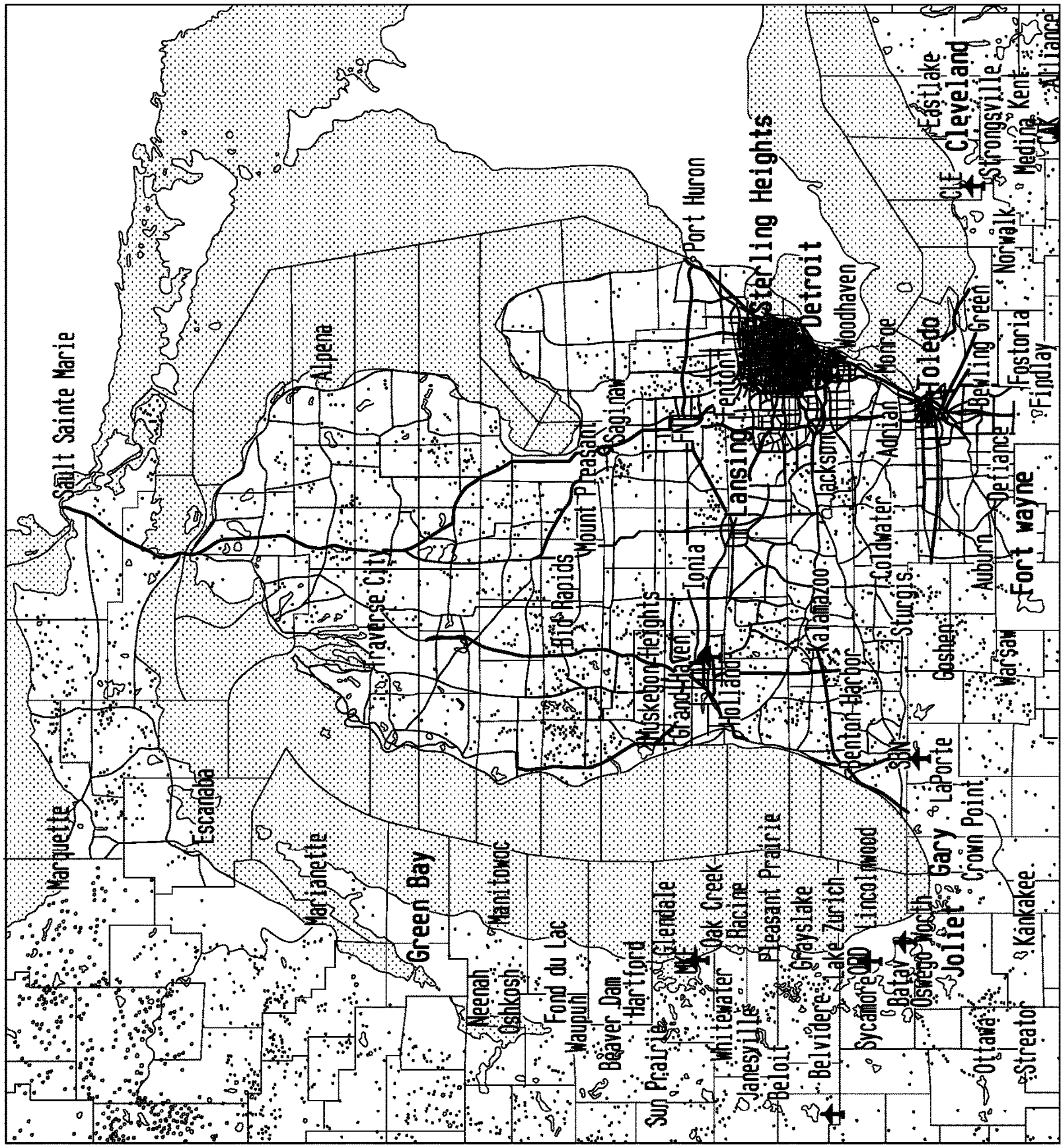
FIG. 34 depicts an exemplary TMC Table according to an exemplary embodiment of the present invention.

In exemplary embodiments of the present invention, the largest unit of transmission in the Apogee system is the TMC table. Typically this will cover an area of 2 or 3 states. FIG. 34 shows the road coverage for Table 8 (Michigan and parts of Ohio). Black roads are in the current coverage, red roads are in the 300 k expansion, and green roads are outside our current planned coverage. Data for separate tables can be carried on separate DMIs, so that a receiver can use, for example, on SXM radio module to filter the Apogee Traffic data stream down to only those tables required for its coverage area. For applications using a 50-mile distance filter, at most 4 tables would be required at any one time. Flow and incident data never cross a table boundary.

BSAs

Broadcast Service Areas are the fundamental unit of transmission for most data. A BSA represents a collection of adjoining counties, usually 5 or 6. Since they follow county boundaries, BSAs have irregular shapes. Each Access Unit within the multiplex contains data for a single BSA. SXM will always break data for a flow at a BSA boundaries. However since many linears cross BSA boundaries, it may be necessary to bring in additional BSAs to avoid coverage gaps at the edges of the map. It is also possible to collect S/F data for one or more BSAs and incident-only data for other BSAs, or for the entire table, without requiring the unit to decode all the unwanted S/F data.

Linears

Linears are the fundamental unit of encoding with Apogee. A linear represents a continuous stretch of roadway, typically 20 miles or more, or a ramp, with the same Functional Class along its length. There are also 'superlinears' in the TMC tables; they represent long stretches of contiguous linears, for example the whole of an interstate as it passes through the area covered by the table. In the native TMC tables, linears cross BSA boundaries, but in Apogee the linears are re-indexed to limit each linear to a single BSA. By supplying the bounding box for a linear, an application can quickly decide if it needs to process the linear as part of its map area, or not.

Figure 35:
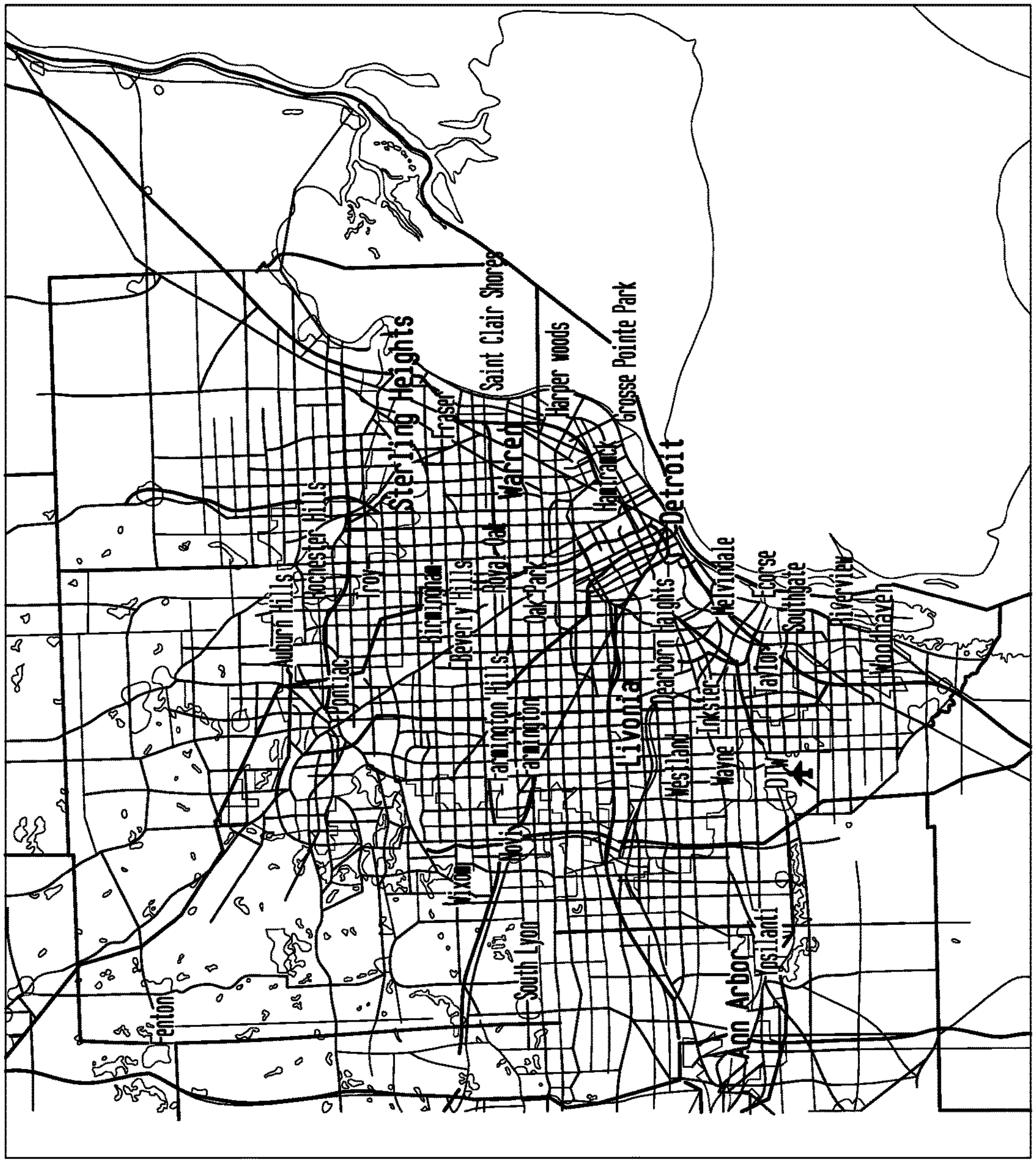
FIG. 35 depicts detail of exemplary linears according to an exemplary embodiment of the present invention.

FIG. 35 shows detail of the linears for Table 8 around the Detroit metropolitan area. Even though this may look quite dense at this scale, it begins to look sparse at 'driving distance' resolution.

Figure 36:
FIG. 36 depicts an exemplary TMC covered road according to an exemplary embodiment of the present invention.
Figure 37:
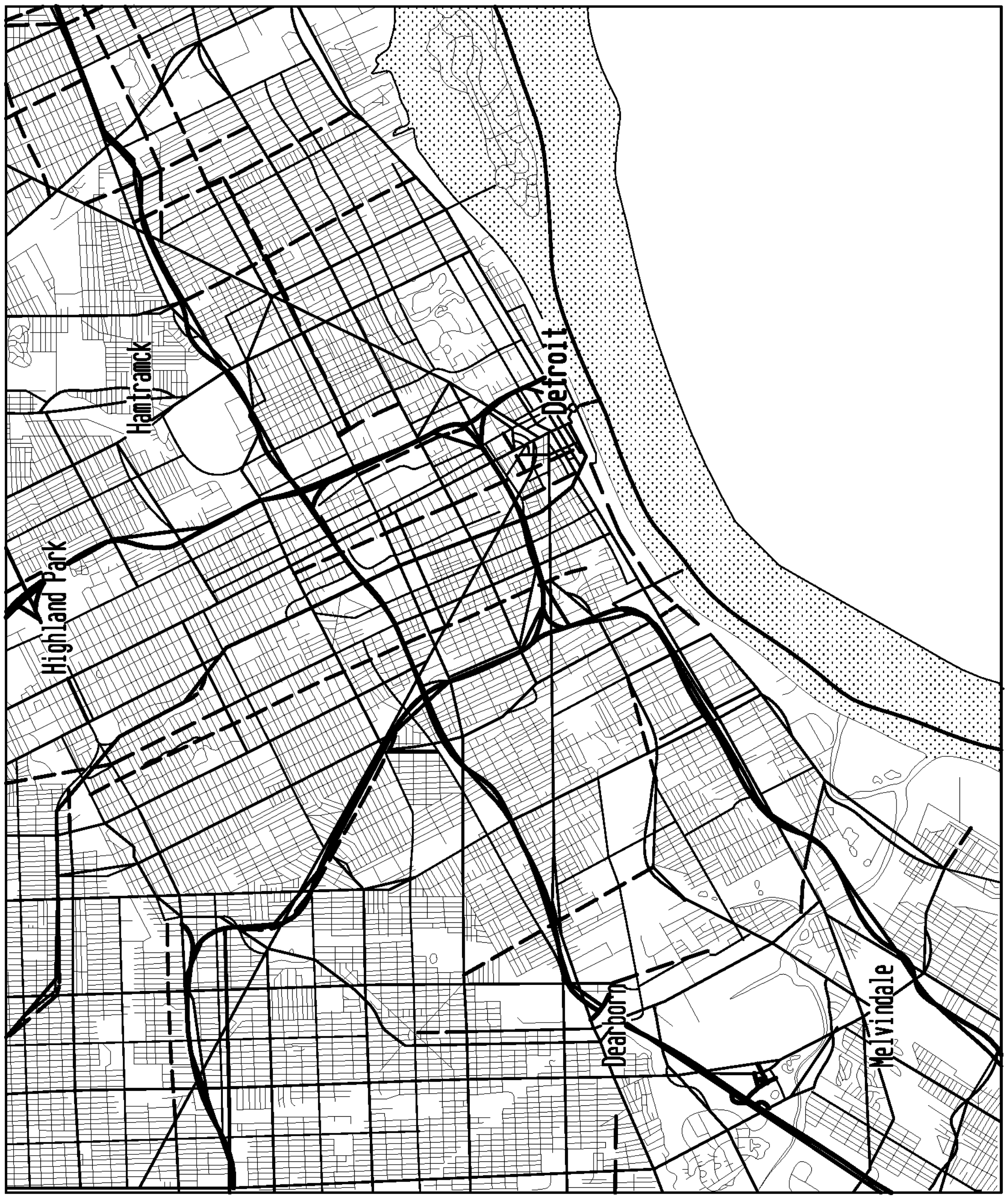
FIG. 37 depicts roads overlaid onto full road mesh according to an exemplary embodiment of the present invention.

FIGS. 36 and 37 show TMC-covered roads (FIG. 36) and those roads overlaid onto the full road mesh (FIG. 37). All roads without coverage will have an impact on the arterial segments, acting as sources and sinks of traffic, particular during rush hours. The number of linears in each table, and the percentage of those linears currently covered, are listed in the "Table Linears" section below.

Points and Segments

In exemplary embodiments of the present invention, a single linear may be made up of a sequence of segments. A segment may be defined as the section of a roadway lying between two TMC points (with lon/lat coordinates). A point usually represents an intersection on the linear (often an intersection with another TMC-coded linear). Each point may be a member of at most one linear, and has a forward and a backward pointer to the next point in either the positive or the negative flow direction. A simple linear would comprise N segments defined as the roadway lying between (N+1) segments. Each point lies within a single BSA, but a segment may cross a BSA boundary.

Extents

Extents refers to a count of sub-segments starting at a particular point, and continuing for that number of sub-segments. Extents count (sub-)segments, not points, so a simple 6-segment linear requiring 7 points would be painted by extent=(6x8) (assuming 8 sub-segments) from its first point. On a point-by-point coloring scheme this leaves the last point [in that direction] 'uncolored'. If that is a terminal point (i.e. does not link with another linear) the color is a 'don't-care' for the application. Apogee will allow that point to take on the color of the previous segment to support 'color all points[segments] the same' in the encoding.

Splitting Linears

To avoid the distracting multiplication-by-8 for sub-segments, this section considers only full-segment extents; the arguments are identical when considering sub-segments. Consider the definition for a linear provided in FIG. 15.

The TMC definition of this example would be:

| | | | | | |
|---|---|---|---|---|---|
| Point | $p_0$ | in BSA B1 | in Linear L1 | negative 0 positive $p_1$ at [$lon_0$, $lat_0$] | |
| Point | $p_1$ | in BSA B1 | in Linear L1 | negative $p_0$ | positive $p_2$ |
| Point | $p_2$ | in BSA B2 | in Linear L1 | negative $p_1$ | positive $p_3$ |
| Point | $p_3$ | in BSA B2 | in Linear L1 | negative $p_2$ | positive $p_4$ |
| Point | $p_4$ | in BSA B2 | in Linear L1 | negative $p_3$ | positive $p_5$ |
| Point | $p_5$ | in BSA B3 | in Linear L1 | negative $p_4$ | positive $p_6$ |
| Point | $p_6$ | in BSA B3 | in Linear L1 | negative $p_5$ | positive 0 at [$lon_6$,$lat_6$] |

In order to break this into three linears, one in each BSA, we need to consider how the two segments $p_1$-$p_2$ and $p_4$-$p_5$ will be represented and colored, in both the positive and negative direction. The segment is coded as follows, assuming a single speed bucket throughout:

| | | | |
|---|---|---|---|
| +ve | B1: | $p_0$ extent 2 | [i.e. up to $p_2$] |
| | B2: | $p_2$ extent 3 | [i.e. up to $p_5$] |
| | B3: | $p_5$ extent 1 | [i.e. up to $p_6$] |
| −ve | B3: | $p_6$ extent 2 | [i.e. up to $p_4$] |
| | B2: | $p_4$ extent 3 | [i.e. up to $p_1$] |
| | B1: | $p_1$ extent 1 | [i.e. up to $p_0$] |

If the left edge of the map MBR lay in B2 somewhere close to the B1-B2 border the application needs to pull in B1 as well as B2 in order to color the $p_1$-$p_2$ segment correctly. This can be handled by Apogee as follows:

Associated with each linear in the Apogee Traffic Table is a bounding-box that can be used for Linear-Bounding-Box filtering as described below. When the bounding box for a linear is calculated, for a particular BSA, all segments within the BSA are fully defined. This means that points $p_1$ and $p_5$ are considered to be within BSA2 for the bounding-box calculation. The overall bounding-box for the BSA is the bounding box of all its linears, which is therefore slightly larger than the bounding-box if only the county boundaries were used, as shown in FIG. 38.

Figure 38:
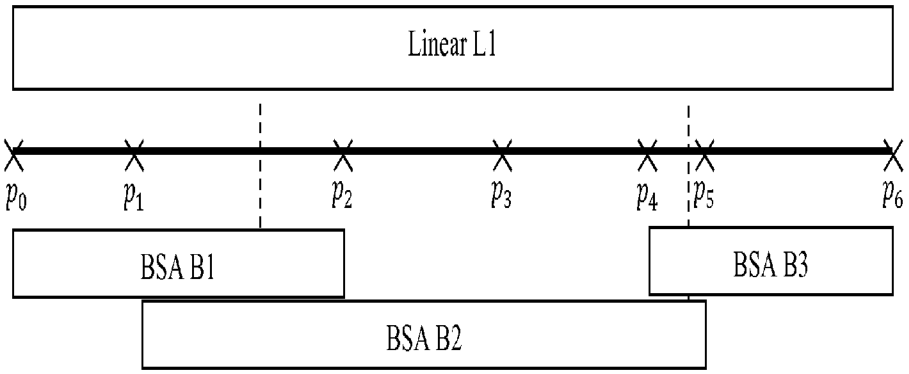
FIG. 38 depicts extended linear MBRs according to an exemplary embodiment of the present invention.

The Apogee linear bounding boxes for the three BSAs are shown in FIG. 38. Even though the bounding boxes overlap, the segment data are only transmitted once, according to the segment coding shown above.

The Apogee definition for this linear now looks like:

| | | | | |
|---|---|---|---|---|
| BSA B1 | | | | |
| | Linear L1a | MBR [$p_0$..$p_2$] | | |
| | | Point | $p_0$ negative 0 positive $p_1$ at [$lon_0$, $lat_0$] | |
| | | Point | $p_1$ negative $p_0$ | positive $p_2$ |
| BSA B2 | | | | |
| | Linear L1b | MBR [$p_1$..$p_5$] | | |
| | | Point | $p_2$ negative $p_1$ | positive $p_3$ |
| | | Point | $p_3$ negative $p_2$ | positive $p_4$ |
| | | Point | $p_4$ negative $p_3$ | positive $p_5$ |
| BSA B3 | | | | |
| | Linear L1c | MBR [$p_4$..$p_6$] | | |
| | | Point | $p_5$ negative $p_4$ | positive $p_6$ |
| | | Point | $p_6$ negative $p_5$ | positive 0 at [$lon_6$,$lat_6$] |

The same strategy holds for a linear that runs directly into another linear (i.e. if $p_6$ had a forward pointer to another point $p_7$ but that point is in Linear L2, not L1). In this case the filtering would bring in that additional BSA to select L2 and provide the negative-direction coverage of the $p_7$-$p_6$ segment.

Figure 39:
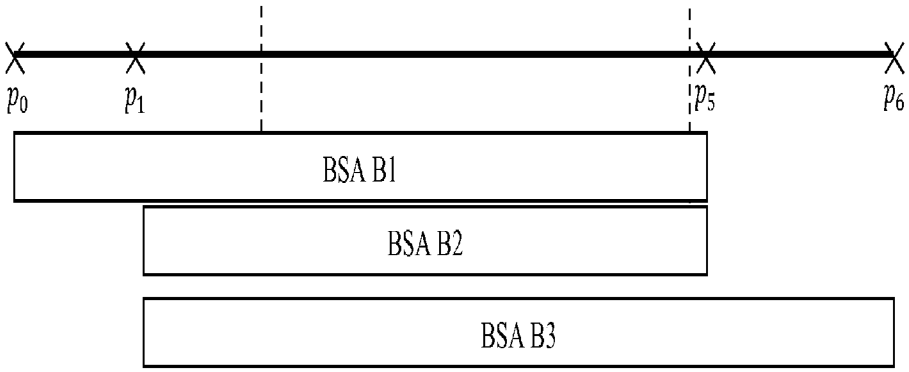
FIG. 39 depicts extended linear MBRs (very long segments) according to an exemplary embodiment of the present invention.

There are rare cases of very long segments that cross BSAs without any point in the BSA, as shown in FIG. 39. In this case the same strategy applies B1 and B3 would be included as part of a map MBR lying wholly within B2 to ensure the linear is picked up.

When the model is extended to consider sub-segments, the same rules apply. A sub-segment is considered to start at the main segment boundary as far as the splitting calculation is concerned, even if the whole of the sub-segment lies within the 'other' BSA. If the $7^{th}$ and $8^{th}$ subsegments of $p_1$-$p_2$ were wholly within BSA B2 they are still painted as part of the BSA B1 portion of the linear. This also ensures consistent behavior if different service elements use different numbers of sub-segments in their storage (e.g. storing historical at only the full-segment level).

Since BSAs may be chosen that contribute only a small number of linears, the two-stage approach of BSA and LBB filtering is highly recommended for efficient processing.

While this scheme may appear complicated, the implementation in the receiver is a straightforward hierarchical filtering model:

1. Select the required Traffic Tables
2. Accept only the AUs for the required BSAs
3. Skip over Linears that are outside the map MBR
4. Process all segments that lie in, or cross, the map MBR Algorithms for efficient implementation of these stages are given in the receiver section, below.

Linear-Bounding-Box Filtering (LBB)

In order to provide a filtering capability in the receiver, Apogee traffic encoding maintains the boundaries between linears in its encoding, and also provides an index of which linears are covered by each lane-coverage type. For example, we may define that in table 8, on the main roadbed, linear index 2 corresponds to linear 69 in the TMC table. We also determine the geographic extent of the linear, as a Mean-Bounding-Rectangle:

From −83.43139,42.38665 to −82.42388,42.43308

And the start points in the positive (04256) and negative (04260) directions.

If the extent of the linear does not cross the requested map area it cannot contribute any data, as shown in FIG. 11.

Figure 12:
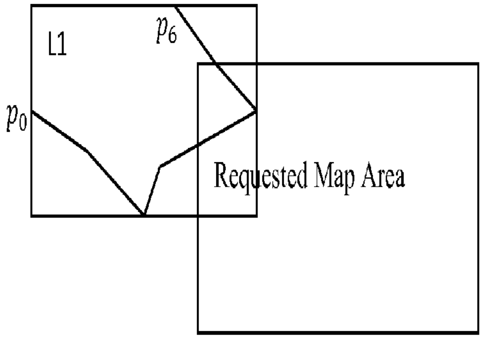
FIG. 12 depicts an exemplary MBR that must be processed according to an exemplary embodiment of the present invention.

As shown in FIG. 12, Since L1 lies completely outside the map, it can be immediately discarded. However, if the areas overlap, the linear will need to be processed: Ramps

| Ramps | |
|---|---|
| 1. | Pre-Pos Main exit to Pos Cross |
| 2. | Post-Pos Main enter from Neg Cross |
| 3. | Post-Neg Main enter from Pos Cross |
| 4. | Pre-Neg Main exit to Neg Cross |
| 5. | Pre-Pos Main enter from Pos Cross |
| 6. | Post-Pos Main exit to Neg Cross |
| 7. | Post-Neg Main exit to Pos Cross |
| 8. | Pre-Neg Main enter from Neg Cross |
| 9. | Pre-Pos Main exit to Neg Cross |

-continued

| Ramps | |
|---|---|
| 10. | Post-Neg Main enter from Neg Cross |
| 11. | Post-Pos Main enter from Pos Cross |
| 12. | Pre-Neg Main exit to Pos Cross |
| 13. | Post-Neg Main exit to Pos Cross |
| 14. | Post-Pos Main enter from Pos Cross |
| 15. | Post-Neg Main enter from Neg Cross |
| 16. | Post-Pos Main exit to Neg Cross |

There are essentially 16 basic types of ramps. For those ramps not coded with TMC codes, we adopt a <TMC LOC>.<RAMP Type> ramp code. Pre & Post refer to the ramp being before or after the interchange, Pos and Neg refer to the roadway's primary direction in the TMC table, using the main road as the reference, as shown in FIG. 5.

Encoder System Architecture

Next described is the overall end-to-end architecture of an exemplary provider side of Apogee traffic implementation.

Processing Stages

Traffic modeling and forecasting for Speed/Flow is very similar to how meteorological forecasting is done, which is essentially a three-stage process.

1. Current conditions [sensor or probe data] are used to drive a set of models.
   Typically more than one model is run, since each of the models [e.g. COAMPS or NOGAPS] has specific strengths and weaknesses. Models are also re-run with perturbed initial conditions to search for instabilities in the output. The results are usually at node values over an irregular finite-element mesh.
2. A skilled meteorologist assesses the output of the models and, knowing their particular weaknesses, develops a maximum likelihood dataset for the various parameters [surface temp, wind speed etc.]. These are now single datasets for future times on a regular lon/lat grid [and you can download them from NOAA].
3. The datasets are further reduced for presentation to the public "sunny with light showers in the evening".

Figure 40:
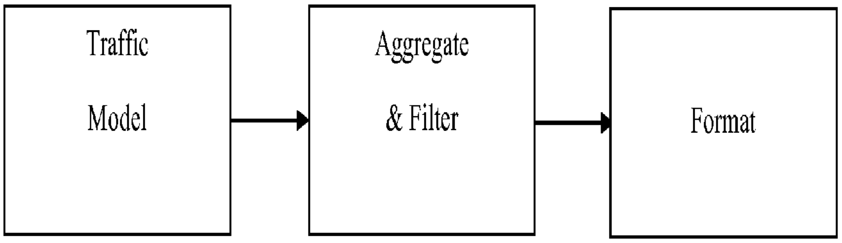
FIG. 40 depicts an exemplary three stage process according to an exemplary embodiment of the present invention.

A three-stage process makes a good starting point for traffic data too, as shown in FIG. 40.

With reference to FIG. 40, the Traffic Model is responsible for taking in all the external data and producing expected speed data, at the granularity of the underlying model (e.g. 1 mph units and map segments). The Aggregate and Filter component then reduces the fine-grained data into the chosen speed buckets and spatial resolution, TMC segments for sub-segments. It can also apply a low-pass filter to smooth out high-frequency components. The output of the second stage is the desired S/F data to be displayed on the end unit. The third component formats these data for transmission, as Alert-C, pattern+delta, or whatever scheme is required.

Dividing the process in three components has a number of advantages:

1. If we define the input format to the aggregator, we can support multiple traffic models. These could be separate models run by the same provider [e.g. a 'standard' model, a 'weighted' model and a model that uses crowd-sourced augmentation data] or, for example, it could be different models operated by different providers.
2. The models are independent of our choice of bucketing or sub-segmenting algorithms, as long as we have the required map-level-to-segment mapping defined.
3. The Aggregation component can be tuned to weight particular models under particular conditions, and gives us the freedom to switch out or add models as they become available (or cost effective).
4. We can tune the filtering component independently of the model processing, to trade off bandwidth against customer experience. By taking the input as the full model dataset we can always leverage the extra model data whenever it's needed (without retraining the model).
5. The output of the aggregate+filter component is a useful observable component (it can be plotted on a map) and is a valuable archive point for resolving customer or OEM issues.

We can decide the way we want to format the data independently of model and filter decisions [though obviously the results are linked together]. Going from pure segments, to pattern+delta to multi-pattern can be developed and evaluated without disturbing an existing service.

The Traffic Model

Figure 41:
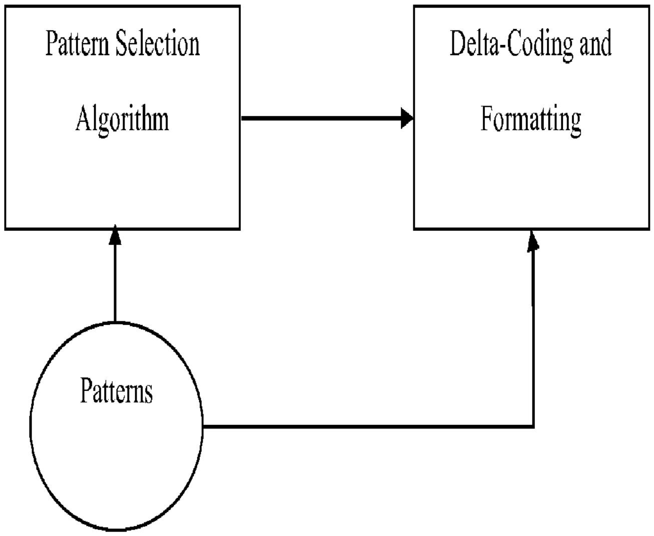
FIG. 41 depicts details of the format block of FIG. 40 according to an exemplary embodiment of the present invention.

Applying the three-stage model to Apogee we can refine and expand some of the components. We can also isolate where information is needed. For example we can split the Format block into two sections, one for pattern selection and one for delta-coding, as shown in FIG. 41.

These blocks would apply to Predictive or Forecast components that are delta-coded. The criteria for pattern selection may be different if the data are to be delta-coded (minimum bandwidth) or are to be displayed unmodified (minimum perceived error).

Figure 42:
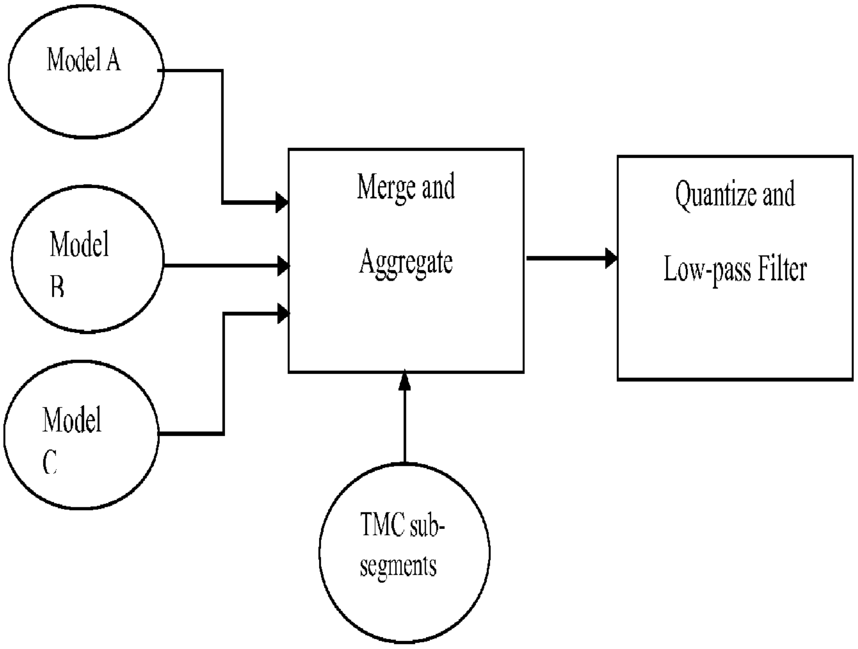
FIG. 42 depicts splitting the filter of FIG. 40 into two components, one which can take in multiple models and produce a consensus or best view result, and one which can quantize and filter the resulting consensus into the desired granularity according to an exemplary embodiment of the present invention.

We can also split up the filter into two components, one which will take in multiple models and produce a consensus or best view result, and one which will quantize and filter the resulting consensus into the desired granularity, as shown in FIG. 42.

Figure 43:
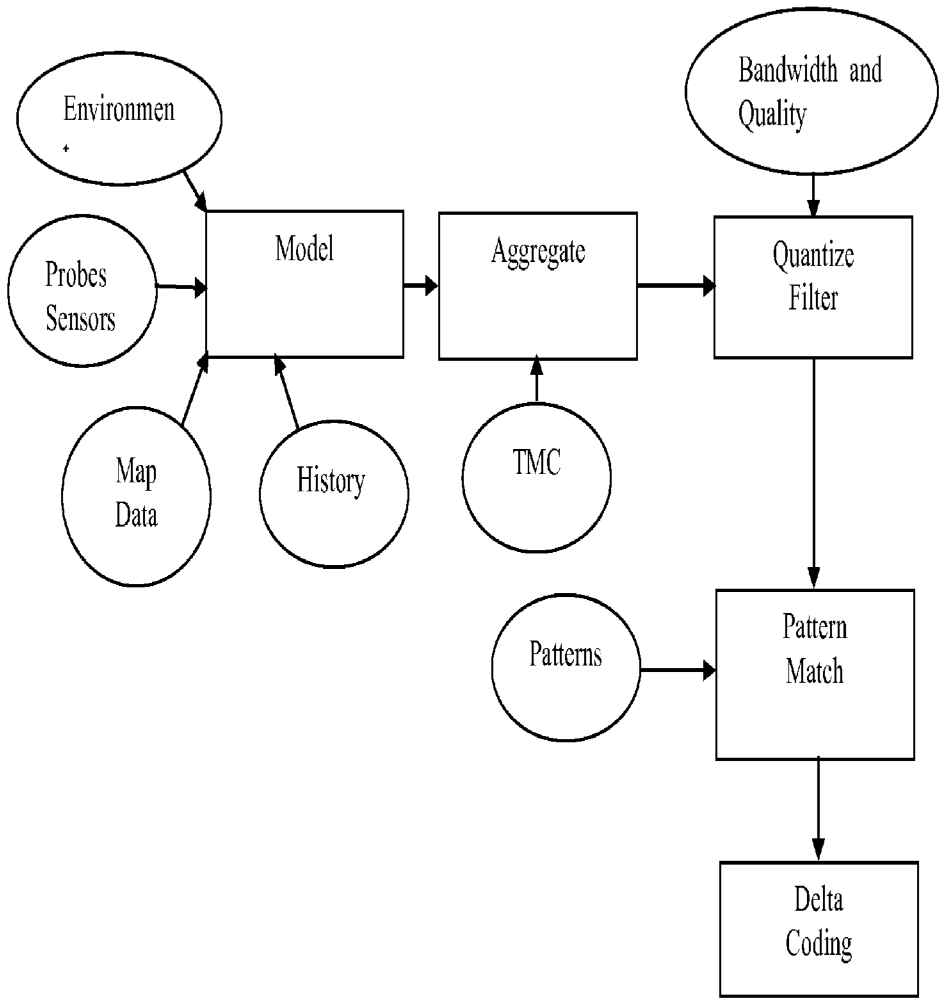
FIG. 43 depicts an exemplary overall traffic engine architecture that provides the opportunity to develop modular approaches to different components, assuming lock down of two key interfaces, the input to the merge/aggregate process and the output of the quantization and filter stage, all according to an exemplary embodiment of the present invention.

This leads to an overall traffic engine architecture providing the opportunity to develop modular approaches to different components, assuming lock down of two key interfaces, the input to the merge/aggregate process and the output of the quantization and filter stage, as shown in FIG. 43.

Algorithms and Requirements

In exemplary embodiments of the present invention, for building historical values, either probe/sensor data or unsmoothed model data should be retained for each integration period. Associated with the stored data should be any environment factors (weather, school holiday etc.) that were used to condition the model at that time.

Probes [and Sensors]

We specify the following three requirements for probe processing:

1. Probes are geo-registered to within 40 m in the direction of travel and to within a single lane-width perpendicular to the direction of travel.
2. Probe data from the same probe vehicle shall be identified as such, so that time-dependent correlations can be done within the model. Periodic anonymization, where the identity of the vehicle is changed, is acceptable if it is required in order to meet privacy constraints.
3. Different behavioral models shall be used for different classes of probe vehicle, for example a commuter journey vehicle as opposed to a commercial delivery vehicle.

Sensor data shall distinguish between single-loop sensors (where vehicle velocity is only inferred) and more precise dual-loop or Doppler sensors where velocity can be measured directly.

The Mesh Model

In exemplary embodiments of the present invention, the Traffic Model may be run over a finite-element mesh representing the network of roadbeds to be modeled. In exemplary embodiments of the present invention, the mesh granularity shall be at least the larger of 50 m or ⅛ the distance between the TMC points on that road segment. Thus, 1. The mesh will contain values for both traffic speed and traffic density at the mesh points where data are available.
2. The mesh topology shall also contain information on the road class, number of lanes, special-function lanes and posted and advisory speed restrictions.
3. Stop lights and other enforced choke points shall be noted on the mesh grid.
4. Probe values will be used to estimate density and the estimator will be a function of the measured probe density, recalibrated as new probe sources are introduced.

The most important part of the production side is the traffic model, or models, that run over the mesh to build the complete state of the network. There are two different aspects to the model, computing the real-time flow, and generating the predictive values.

Table Data

In exemplary embodiments of the present invention, a provider can maintain and supply TMC traffic tables used to convert the Mesh Model into encodable data.

1. The table data shall be supplied for the purposes of implementing Apogee Traffic without regard to any other delivery of table data.
2. The data shall comprise minimally the existing TMC table information augmented by:
   a. Linears shall be broken at BSA boundaries.
   b. The bounding-box of each BSA-Linear shall be supplied for use in the LBB filtering algorithm.
   c. The bounding-boxes of the BSAs (derived from their contained linears) and the table as a whole shall be supplied.
   d. Linears shall be indexed in priority order so that linears with flow coverage shall be assigned lower index numbers that linears with no flow.
   e. TMC-coded Ramps shall be assigned per-BSA index numbers.
   f. Linear and Ramp indices, once assigned, shall not change for the life of the Apogee service.
3. Ramps that do not have TMC codes shall be indexed in a separate table, containing minimally:
   a. The primary (and secondary, if available) TMC point associated with the ramp.
   b. The ramp type (0 . . . 16) defined in our topology
   c. The index number of that ramp within the BSA (fixed for the life of the service).

Real-Time Flow

To obtain Real-Time flow, the mesh model may be run in the spatial domain (i.e. $T,\tau=0$) to 'fill in the gaps' left by incomplete probe data.

1. Ideally, more than one class of model should be chosen from the range of techniques available:
   a. Flow-models, both fluid and solid-state
   b. Travelling wave models (and the 'jamiton' theory)
   c. Statistical models, using Bayesian or Markov learning techniques
2. Different classes of roadway should use, or learn, different model parameters.
3. The model should take into account three mesh inputs:
   a. The previous mesh calculated on the most recent cycle.
   b. Any newly-gathered probe points of sufficient density to be statistically valid
   c. The long-term historical data appropriate to the current conditions
4. The weight assigned to the different inputs shall be a function of the confidence levels placed on each of those data sources at each location in the mesh. The value of previous mesh data shall decay with time unless it is refreshed with new probe input at that location.
5. When historical data are used to seed an initial model, the time of day, nature of the day (workday, weekend, holiday etc.) shall be used to select the appropriate data.
6. Other factors shall also be used as input, to the model, when known:
   a. Weather conditions (good/bad, wet/dry)
   b. Construction and other roadbed modifications
   c. Current Accident or other realtime incident information.
   d. Special Events, such as sports games, concerts or other congestion-causing destinations
7. The output from the Real-Time model shall comprise minimally:
   a. Vehicle velocity along each mesh line (at a granularity of 1 mph).
   b. Traffic density (vehicles/mile/lane) which may be derived from traffic volume.
   c. Gradients (derivatives) of velocity and density with respect to time
   d. Confidence values (according to a specific equation) for all values. A consistent interpretation of confidence values shall be maintained over the whole of the mesh.
8. The model shall also calculate theoretical transit times for segments, taking into account the enforced delays on non-Controlled-Access highways, as defined in the model. Where possible, specific models shall be used for individual stop lights (e.g. relative duty cycle along the principal flow direction) rather than generic values.

Predictive Flow

To obtain Predictive Flow, the same model mesh must be run in the temporal domain (following the spatial extension), i.e. with nonzero and increasing r values.

1. The outputs of the predictive model shall be the same as for the Real-Time model and at the same resolution (not quantized)
2. Two separate model formalisms should be used:
   a. A static look-ahead predictor conditioned on the same set of probe and historical inputs as the real-time mesh; and
   b. A forward-dynamical time-series simulation of the flow within the mesh.
3. For the time-series simulation:
   a. The reaction time constants for different mesh lines (i.e. how fast a jam builds or clears) shall be used as part of forward projections.
   b. Discontinuities in the flow equations shall be used to predict the onset of traffic jams, and weight the congestion values accordingly.

c. Monte-Carlo or perturbation dynamics shall be used to assess the instability of the model output and to examine or predict the affected radius of a traffic density increase.

4. The observed probe values and/or real-time mesh at time (T+T) shall be used to refine the projection equations over time.
5. Observed probe values shall be used for 'ground-truth' testing of the model evolution and be used to adjust confidence levels when the model is known, or expected, to produce low-quality results.

Forecast Flow

In exemplary embodiments of the present invention, the only realistic approach to forecast (greater than 1 hour into the future) is to treat the values as deviations from the expected historic pattern at that time. The key to making forecast data valuable is to use as much of the currently and predictive information as possible when projecting the deviations.

1. Initial deviations may be derived from the output of the Real-Time and Predictive models up to the limits of the predictive accuracy.
2. Other conditional variables (e.g. a sports event starting in 4 hours or a forecast thunderstorm) may be used as input to ensure the forecast data is sufficiently dynamic over the forecast period.
3. In addition to the mesh grid values, the predicted gradients may be used to ensure that the error profile is not just a simple decay. For example, when the expected error gradient is significantly positive, estimating an upcoming peak in the error at time $\alpha$ using $(P-\beta(\tau-\alpha))^2 e^{-\gamma\tau}$ should be used in preference to a simple decay of $e^{-\gamma\tau}$.
4. Actual (observed) conditions shall be used to refine the forecast model.

Historical

Historical data mean stored 'traffic patterns' and the association of a point in time to a pattern. In exemplary embodiments of the present invention:

1. A traffic pattern shall contain the velocity, density and confidence values from which it was derived. In the case of referencing against a stored pattern, the confidence value may be at the BSA level and not be present in the stored pattern.
2. When assigning a parameterized point (time of day etc) to a pattern, the confidence values of the mesh will be used to help select the pattern (i.e. greater weight shall be given to measured points than to inferred values in the mesh).
3. A mesh may be smoothed, both spatially and temporally, best to fit the conditions over the parameterized validity of the pattern point (e.g. averaging over a number of days of 'bad' weather).
4. Patterns shall be recalculated when there are significant changes to the roadbed, such as replacing a stoplight with an overpass.
5. Historical data points shall evolve over time, with values decaying out to be replaced by more recent values.

Confidence Intervals when Using Historical Data and Using Same to Drive Aggregation Decisions It is sometimes the case that historical data is all one has for a given segment of road, at a given time. This occurs when, for example, there is no useable probe data for that road, say, for example, it is an exit ramp from a highway, turnpike or thruway that leads to a suburban shopping district or mall area at 3 AM when all the stores in the district or mall area are long closed for the day. So there is no incident or accident information on that particular segment of road. What do you do? What do you send out? You know, we have to send out something. You have to rely on the historical information at that point. That isn't nothing but it has low confidence.

On the other hand, when dealing with the same or similar highway at peak time, with three cars traversing that particular segment and they are all providing probe values once a second, and they are all highly accurate and they are all correlating to good probe paths and they all correlate with each other, one has a very high confidence that one has a good value at that point for the highway at this peak time. Thus, in addition to actual speed and congestion values obtained by an exemplary system, most raw traffic data providers also provide a confidence interval, or a model confidence value for a given roadway at a given time.

This model confidence value directly affects how much smoothing or aggregation an exemplary system will perform. Smoothing is described in Part III, below, in connection with FIG. 48. As noted below, smoothing is generally performed in order to meet bandwidth requirements. When performing smoothing, an exemplary system is performing its own aggregation, essentially down sampling from the traffic data supplied by a raw traffic data provider. In exemplary embodiments of the present invention, a system can, for example, use the confidence level to drive the amount of aggregation that it performs on a particular linear.

Thus, for example, if you have a model that tells an exemplary system that there is a very small segment of congestion in an otherwise uncongested freeway, this could be noise, or it could be the known fact that at certain times of day, although a freeway or highway is in free flow in both directions and not itself congested, people line up in a far right lane, for example, in a queue that comprises dozens of cars, leading to a popular exit.

In terms of the various Apogee Traffic algorithms that are described herein, we describe smoothing an aggregation. There is the option within various exemplary embodiments of the present invention to suppress that small segment of congestion as being possible noise. Or, for example, the option is also available, with the enhanced Apogee resolution to present that that to a driver. The choice of which to do—suppress as noise or present to a user/driver—needs more information than simply the model says it is congested. What is needed to make a rational choice is the "backstory"—the "why" story which is embodied in the confidence level. Thus, the confidence level can be used as a hint whether to include that which increases the message count, which, of course, takes more bits.

Thus, in various exemplary embodiments of the present invention, confidence levels obtained from raw traffic data providers can both be (i) disclosed to drivers/users to supplement a very low signal (or no signal) speed and congestion report, and can also be used in various system algorithms that decide what local anomalies or aberrations to filter out as noise, or to disclose more granularly (and use additional bits to do so) as an actual highly localized traffic condition.

Value Quantization and Pattern Selection

In exemplary embodiments of the present invention, the operation of the smoothing and aggregation portion of the service will have a direct impact on the bandwidth required for the service, and on the perceived accuracy of the data to the consumer when viewing the results.

1. Model mesh values will be aggregated and smoothed before encoding. Aggregation will minimally group mesh segments into ⅛-TMC units, or ½-TMC units for short segments.
2. For congestion values, perceived error metrics will be used to determine the amount and direction of smoothing, with a heavier penalty for smoothing to less congestion rather than more.
3. For speed buckets, the smoothing shall attempt to preserve the overall transit-time value across the smoothed extent.
4. Confidence values shall be used when deciding which values to smooth, with greater weight being given to actual, rather than historical, data.
5. If we choose to send forecast data with explicit corrections, the choice of pattern shall be governed by the minimum coding requirement to convey the forecast at its required accuracy.
6. For forecast data, where no corrections are applied, the pattern with the least perceptual error shall be used.

Pattern Building

In exemplary embodiments of the present invention, a number of patterns may be built and used as the basis for forecast and historical models.

1. The patterns shall be built to cover the expected coverage range of the initial service launch, i.e. around 300 k road miles.
2. Patterns shall be selected to span the widest range of expected conditions.
3. A pattern need not correspond to any single model output.
4. Patterns shall be spaced out to occupy the anticipated speed/density/linear volume such that:
   a. Expected historical data can be matched to patterns with minimal error (clustering); and
   b. Extreme patterns can be represented with some fidelity (outliers).
5. The method for selecting and updating patterns shall be theoretically sound.

Construction Events and Incidents

Incident data can be supplied for as wide a range of events as possible, not only those lying on roads with Speed/Flow coverage.

1. Incident and Construction data can, for example, include:
   a. Location, by TMC sub-segment or explicit lon/lat
   b. Extent (TMC) or radius of affected area
   c. Nature of the incident/construction
   d. Activity level (planned, active, complete/cleared)
   e. Impact on flow (high, medium low)
   f. Data Source (especially for crowd-sourced information) and Validity/Confidence Level
   g. Textual description suitable for presentation to an end user
2. Textual data should be aligned with a predefined phrase dictionary and redundant or duplicate information removed at source.

Encoding of Service Elements

Next described is an approach to encoding the different service elements within Apogee Traffic, in a way that fits into the SXM data services. Alternate approaches can, of course, be used for other contexts.

The Data Multiplex

Apogee Traffic can, for example, fit within SXM's current Data Services multiplex. To align this service with other services the data are encoded in SDTP packets with the maximum AU size of 5,120 bytes, protected by the same SDTP checksum and AU CRC-32 codes as all other services. Data will be encoded at the TMC table level, using the AUCNT-of-AUTOT markers if the data for a table does not fit into a single Access Unit.

DSI and DMI Allocation

As with the current service, individual tables are carried on their own DMIs (PSIs). This allows a receiver module to filter data down to an individual table. We need four blocks of DMIs, as follows:

| Block | Description | Count |
|---|---|---|
| A | Construction and Incidents | 32 |
| B | Real-Time Flow and Ramps | 32 |
| C | Predictive and Forecasts | 32 |
| D | RFD metadata and data | 2 |

For a total of 98 DMIs to support 32 tables. Within the DMI a carousel identifier can indicate the type of content with the Access Unit, being one of:

| CARID | Contents |
|---|---|
| 0 | Real-time S/F data for roads |
| 1 | Real-time S/F data for ramps |
| 2 | Construction Data |
| 3 | Incident/Accident Data |
| 4 | Predictive Data |
| 5 | Forecast Data |
| 6 | RFD file updates |
| 7 | RFD metadata |

In the current SXM case, the contents of Carousels 6 and 7 are fixed by the RFD protocol. By splitting RFD metadata and RFD data into two separate DMIs the handler can continuously monitor the metadata DMI for new files, but only turn on the RFD data DMI when it needs to collect the incoming RFD blocks. Since there is a limit of 63 DMIs per DSI, this maps to three DSIs and two tiers:

| Tier | DSI | Blocks |
|---|---|---|
| Tier-0 | P | A and D |
| Tier-1 | Q | B |
| Tier-1 | R | C |

If it is desired to separate out Canada this will become 6DSIs. Block D would be included in both the US and Canadian versions of DSI P.

Transport Framing

Figure 44:
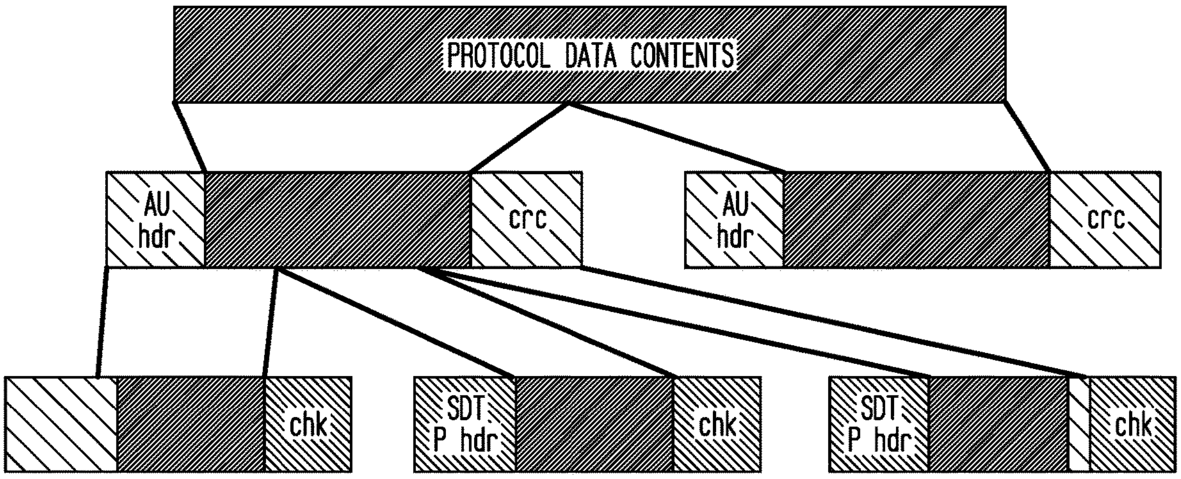
FIG. 44 depicts exemplary transport framing according to an exemplary embodiment of the present invention.

FIG. 44 shows an example of three SDTP packets whose contents together form a single Access Unit ("AU"). Two Access Units together form the complete Data Set.

The multiplex and protocol definitions fix some of the following sizes by their architecture. In this exemplary embodiment:

| | | |
|---|---|---|
| SDTP Header | 32 bits | fixed by multiplex architecture |
| AU Header | | |
| PVN | 4 bits | protocol version number |
| CARID | 4 bits | identifies the carousel, as above |
| Table ID | 8 bits | up to 256 possible tables |
| BSA ID | 8 bits | up to 256 possible markets |
| AU Flags | | |
| F+ | 1 bit | single or multiple AU |
| AUSZ | 4 bits | size of next 2 fields, in bits |
| AUCNT | [AUSZ + 1] bits | AU sequence number |

-continued

| | | |
|---|---|---|
| AUTOT | [AUSZ + 1] bits | total AU count − 1 |
| AU CRC | 32 bits | fixed by PVN = 1 architecture |
| SDTP chk | 8 bits | fixed by multiplex architecture |

In this exemplary embodiment, the maximum size of the SDTP payload is 1,024 bytes. The value of 5,120 for the maximum AU size allows a complete 4,096-byte RFD file block to be contained within a single Access Unit, including its standard wrapper.

Use of AUTOT/AUCNT

For the speed/flow data there are fixed break points at BSA boundaries, and these points will not move from one carousel to the next. Therefore there is no reason to require that the data from one BSA come from the same carousel (or integration period) as the data for another BSA. Nor is it required that the predictive data be tied to a particular instance of the real-time data.

Further, the proposed handler(SMS)→Application interface produces notifications at the BSA level, so there is no requirement for the handler to have to wait for 'a complete carousel' before issuing notifications. It is up to the application, based on the "You must display received S/F updates within x seconds" requirement, to decide when to request the new data to repaint the screen.

Therefore, there is no need for AUTOT/AUCNT to mark the beginning and end of a carousel. This should simplify the receiver processing, and reduce latency between updates and display. However, we do have to account for the possibility that a single BSA of S/F data could potentially exceed 5,120 bytes.

For S/F data (real-time, ramps, predictive) the AUTOT/AUCNT mechanism shall only be used when a single BSA must be split across multiple access units. In such a case, the BSA directory shall contain only one entry, and the SIG field shall be the same across all the AUs in the group (so the handler can detect missed AUs).

For construction and incident data, using zipped text, we would be creating and compressing the strings at the table level, so in this case, it is essential that the handler accumulate the full AU group before attempting to decode the data. So:

For construction and incident data, each table shall be carried as a group of AUs linked using the AUTOT/AUCNT markers (assuming more than one AU is required). The BSA directory and signatures shall be contained in the first AU.

The handler must accumulate all the AUs in the AU-group (using AUTOT/AUCNT) before attempting to decode the data once it has determined that there is data in the AU that it must process.

For forecast data there is no possibility of data for a single BSA requiring more than 5,120 bytes to encode. For patterns and historical data, the BSA division does not arise, because the data are contained within RFD files. For the RFD updates, 5,120 bytes is always sufficient to hold either an RFD data block or a metadata carousel.

Linear Coding

As shown in FIG. 13, both Real-Time and non-Real-Time Speed/Flow elements require a set of linears within a single BSA to be represented as a unit of either storage or transmission. Each set of linears for a BSA may be, for example, encoded as follows:

```
COUNT         14 bits     number of linears in the BSA
F+{
    LCOUNT  2 bits        of non-main-roadbed linears−1
    for LCOUNT lanes {
        TYPE              2 bits          lane type
    }
}
```

The following data can be repeated, linear-by-linear, once for the main roadbed then once per lane type

```
for COUNT linears in the table {
  either:
    '11'              2 bits     constant coverage
    BUCKET            4 bits     speed bucket
    CLEVEL            3 bits     congestion level
  or:
    zero-or-more {
        '01'          2 bits     positive coverage
        BUCKET        4 bits     speed bucket
        CLEVEL        3 bits     congestion level
        EXTENT        7 bits     extent in 1/8 segments
    }
    zero-or-more {
        '10'          2 bits     negative coverage
        BUCKET        4 bits     speed bucket
        CLEVEL        3 bits     congestion level
        EXTENT        7 bits     extent in 1/8 segments
    }
    '00'    2 bits    end of linear
}
```

This is an update protocol, it modifies the 'current-state' of the set of linears according to the '11' '01' and '10' codes. The '00' code means "No more updates for this linear". For Real-Time S/F the current state is "no coverage anywhere", in which case a '00' leaves any unreferenced segments as uncolored. In cases where the changes are applied to a non-NULL pattern, bucket 15 is used to remove existing coverage, and bucket 0 is used to skip over pattern values which are unchanged.

In exemplary embodiments of the present invention, a linear with only negative coverage would have a '10' code as its first element.

If there are no additional lanes required in the AU, the F+ field for LCOUNT is zero and only the main roadbed is present. There is a 2-bit-per-linear overhead for each lane included in the AU for which there is no coverage for that lane.

The counts of linears with coverage in the table at the end of the document suggests that a careful choice of indexing may be beneficial to the encoding. If we assume that every linear must be present, then for table 8 (Detroit) there will be 873 '00' pairs for the linears with no coverage. If the 87 covered linears were near the front of the index table, the scan could stop when there are no more covered linears in the table. This allows the receiver to end its scan as soon as all the covered linears have been presented, rather than requiring it to skip the 873 linears with no coverage to reach the end of the dataset.

Since was have to index the linears anyway, and fix the index for a particular implementation version, we can choose the linear order best to suit ourselves. As long as we never re-use a linear index [very unlikely] and only add to the end, the indexing will work across all future products.

Real-Time Speed/Flow

Real-Time Speed/Flow data are the bulk of the data transported by the Apogee Traffic service. Of these data, most refer to S/F conditions along the main roadway.

Additional lane coverage is only supported for those linears that have the additional lanes. Lane information is transmitted in the same Access Unit as the main roadbed, to remove the need for the application to have to correlate and align traffic data across multiple datasets for the same road segment.

This forms the basis of the S/F data encoding. Each linear is assigned an index in the Access Unit, and the receiver knows the MBR for each linear so can filter at the linear level using simple comparison tests. The details are further explained in the Receiver section below.

Data Encoding

There are currently two possible encoding scheme for real-time S/F data.

The 1-BSA-per-AU model would wrap the linear data block in header and trailer data:

| | | |
|---|---|---|
| PVN+CARID | 8 bits | |
| TABLE | 8 bits | |
| BSA | 8 bits | BSA index of this AU |
| F+{ | | |
| AUSZ/AUTOT/AUCNT | | |
| START | 14 bits | index of first linear in this AU |
| } | | |
| [BSA Data Defined Above] | | |
| AU-CRC32 | | |

The START field gives the index of the first linear in the encoded data. This is desirable when the total table coverage exceeds 5,120 bytes and it is split between multiple AUs. An example of filtering and processing of this encoding is described more fully in the receiver section below, and the bandwidth estimates for a service based on this coded are addressed at the end of the document.

The AU-CRC is used as the 'signature for determining if the BSA data have changed since the last received AU.

The BSA-directory mode encodes multiple BSAs in a single AU, with a directory at the top:

| | | |
|---|---|---|
| PVN+CARID | 8 bits | |
| TABLE | 8 bits | |
| F+{ | | |
| AUSZ/AUTOT/AUCNT | | |
| } | | |
| COUNT | 8 bits | BSAs in this table |
| for COUNT { | | |
| BID | 8 bits | BSA index in Table |
| OFFSET | 16bits | byte offset of BSA data |
| SIG | 16 bits | signature of BSA data |
| } | | |
| [Data for first BSA in directory] | | |
| [Data for second BSA in directory] | | |
| ... | | |
| [Data for last BSA in directory] | | |

In this encoding the SIG field is used to determine if the BSA data have changed or not. By using byte-wide values for the fields, and for the offset, the receiver can locate the start of each BSA using simple pointer arithmetic. This scheme also separates the AU CRC from the individual 'version' markers on the BSAs, which is probably a cleaner solution overall.

Bandwidth

Detailed bandwidth calculations are presented below. This section merely illustrates the properties of the encoding, using an exemplary carousel transmitted at 16:00 on 6 Mar. 2011 for table 8 (Detroit/Michigan). The Alert-C encoding for the whole of the table required 2480 bytes to transmit. The cost for the various encodings above are:

| Type of Coverage | Bit Cost |
|---|---|
| No coverage on linear | 2 |
| Constant value on linear | 9 |
| Mixed values, per value | 16 |

If we simply encode the whole of the table, without splitting at BSA boundaries, using the full-scan approach the sample requires 976 bytes to encode. By ordering the linears so the 87 covered linears are at the front of the table, this value is reduced to 757 bytes, corresponding to a saving of 873×2-bit '00' codes. This ordering approach becomes even more significant when we are considering delta-coding where the number of codes is much smaller than for full Real-time S/F.

The 87 covered linears comprise 46 with a constant (free-flow) value on both sides of the linear, and 41 with mixed values, which require 341 '01' and '10' type messages to encode. The 757-byte cost is broken down as follows:

| Type | Count | Bit Cost |
|---|---|---|
| No coverage | 0 | 0 |
| Constant value | 46 × 9 | 414 |
| Mixed values | 41 × 2 (end markers) | 82 |
| | 341 × 16 (value points) | 5456 |
| AU Header | 1 | 32 |
| AU Trailer | 1 | 32 |
| SDTP Overhead | 1 packet | 40 |
| Total | | 6056 (or 757 bytes) |

Using BSA-level Access Units, the AU header increases to 5 bytes, and one AU is required for each BSA in which there is a covered linear. The table of 'Michigan BSAs' below shows how the whole of table 8 is divided into individual BSAs. Only 17 of these BSA contain covered linears, and the details are given in the 'BSA Coding' table below, for a total of 979 bytes.

Although this is a large (30%) overhead, it is entirely accounted for by the additional 16 AUs required to carry the data. This does mean that as the coverage increases, say by a factor of three, the BSA overhead will remain constant in size, and therefore account for only 10% of the data transmission. This is still only 40% of the bandwidth required to carry the Alert-C data.

Using a single AU with a directory-plus-signature header, the value is reduced to 871 bytes which is 35% of the Alert-C value.

Ramp Speed/Flow

Ramps are the short segments of roadway linking major highways. Using the following properties of ramps, and noting with so little data currently available on ramps, and their impact on travel time and user experience, the following assumptions were used:

1. Ramps (and ramp closures) are important for travel and deserve consideration.
2. Ramp delays contribute significantly to travel-times under congested conditions.
3. The ability to place an incident on a specific ramp is very useful.
4. Ramps are usually short [and not worth sub-segmenting].
5. True probe density on ramps will be very low. However, sensors are sometimes placed on ramps, so some valid data can be expected.

6. Ramps are narrow [and not worth splitting into individual lanes].
7. Ramps usually have lower suggested or posted speeds that the main roadway.
8. There can be up to 8 ramps [cloverleaf] in an intersection.
9. There are two major classes of ramps:
   a. Controlled-Access-to-Controlled-Access Ramps. These have their own individual TMC codes.
   b. Other ramps. These do not have TMC codes and are unlikely to get them.
10. Ramps may be associated with one, or two, TMC points [one or two roadways]. For CA-CA ramps the TMC tables do not provide that association, and it is difficult to extract from the current table structure.
11. There is no continuity of ramp state across a linear [one ramp congested does not imply the ramp at the next exit is congested].
12. Ramp congestion is very likely correlated with congestion on either the 'from' roadway or the 'to' roadway.
13. Ramp congestion will be highly correlated with exit-lane congestion when the exit lane is feeding the ramp.

If most cases, we are unlikely to get very accurate speed bucket data for ramps, and 16 possible values is excessive. Hence, we focus on the 'congestion indicator' for ramps. If a routing engine wishes to use these indicators to weight a ramp more or less favorably then it can choose to do so. The ramp coding schemes use only 2 bits per ramp to indicate:

| Code/Color | Ramp State |
|---|---|
| 0/White | Ramp state unknown, do not color |
| 1/Green | Ramp flowing at or near its expected advised speed limit |
| 2/Orange | Ramp flow at 50% or below of its advised speed limit |
| 3/Red | Stop-and-Go traffic on the Ramp |

For transit-time calculation, the difference between green (say 50 mph) and orange (20 mph) for a ½ mile ramp is only 36 s vs 90 s, whereas stop-and-go can easily extend that to minutes or tens of minutes. This indicates that for short ramps (those that are likely to have transit speeds significantly below highway speeds) only the very heavy congestion will materially affect the route calculation, but the color indicator will give value for the observing consumer.

It is also very likely that most ramps are in a 'default' state that can be inferred from the surrounding conditions, for example:

1. If there is an exit lane code on the A side, use that state
2. If there is a RH-lane or main-lane state on the B side, use that state
3. Default to green In exemplary embodiments of the present invention, this algorithm can be enabled as an alternative interpretation of '0' instead of 'do not color'.

CA-CA Ramps

These are the ramps for which we can currently obtain data. There are approximately 11,000 of these ramps across the country, and using conventional TMC-style style coding for individual ramp flow will be very cumbersome if it requires one message element per ramp.

Since these are only the CA-CA ramps, they are not clustered along linears, so the linear-indexing scheme use for main S/F will not work. We can still offer BSA-level clustering of ramp states. This can be in separate AUs if we have a large number of ramps (when combined with 'other ramps' below) or by indexing into a single AU with ramps grouped by BSA, Other Ramps There are many significant ramp locations that fall outside the CA-CA ramp definition, for example the 1-95 to US.1 intersections. However, they are associated with TMC location points. We would have to develop our own tables if we are going to support other ramps within the service. Using the ramp topology defined above we can encode each ramp as a TMC.ramp-type value, indexed from the main TMC point.

Ramp Coding

We assume that we can reverse-engineer the ramp topology data and associate each ramp with a TMC point location on a linear. This gives the following structure:

```
[0]: Linear (64) <bounding-box> {
    [0]:Point (04534) <lon,lat> {
        [0]:Ramp (56192)
        [1]:Ramp (56193)
        ....
```

The ramp data are then transmitted in linear+point+ramp order, 2 bits per ramp. From the linear index the receiver can perform LBB filtering as with S/F data and skip over the number of ramps in that linear. It can also do a simple point-in-rectangle check on each point. We may wish to transmit two sets of ramp data, one for the CA-CA ramps and a potentially much larger set of the other ramps.

Construction Events

Construction Events are typically long-lasting, unlike incidents. Since construction events can occur at any place, even on roads with no S/F coverage, and are not correlated, the encoding reverts back to the pure TMC reference model, but using the extended precision sub-segment definition to improve resolution. There is no filtering support for message rejection below the table level.

Construction Events occupy almost 50% of the feed volume in the research feed we are analyzing. Partly this figure is so high because the events are present in every carousel. Since these are usually long-lasting events, there is some bandwidth savings to be gained by sending construction events separately from other incidents, and more slowly.

The Alert-C coding of construction relies on the event code to carry a multitude of semantic markers, for example "Q sets of roadworks during off-peak periods", that requires essentially message-by-message handling to interpret, particularly if the message is being used to adjust route or timing calculation. Apogee construction events continue to use the Alert-C style code point, which is useful for selecting an icon for a screen display, but they also contain a semantic breakdown of some of the fields to assist in automated processing of the event. This also allows multiple 'roadworks' events from different messages classes to be combined into a single coherent representation.

Events that Cross BSA Boundaries

The Apogee architecture allows the application to filter at the BSA level. Therefore any construction event (or accident) that has an extent that crosses multiple BSAs must be included in each BSA (or it might get filtered out).

If the event lies outside the set BSAs that an application is processing then it is outside of the product's area of interest. It is therefore unimportant, or even impossible, accurately to place the start location of the event (because the start location is in the adjacent BSA which is outside the area of interest). However, the portion of the extent that lies within the BSA being processed (which is within the area of interest) should be rendered.

For events that have their head location within the BSA of interest but extend into adjacent BSAs outside of the area of interest, the rendering should terminate at the BSA boundary (because beyond that would be outside of the area of interest).

However, we must also ensure that a single event does not become represented multiple times, with multiple icons or popups, if more than one of the BSAs through which it passes is being processed by the application. These cases are handled by the F+HEAD element in the construction encoding (and the HEAD control operation in incident encoding) as follows:

1. For events with start locations outside of the BSA of interest and have extents into adjacent BSA's, the LOCATION field is the 1st TMC location.
2. The extent length is the remainder distance from the BSA boundary to the event's tail location (or to the BSA boundary if the extent is beyond that).
3. The F+HEAD field is present and signifies the event's head location is really located in another BSA outside of this one being processed. It's value is the TMC location where the head is actually located.
4. For Events with Start locations inside the BSA of interest and extent lengths that extend into adjacent BSA's, the LOCATION field remains at the start of the event, the extent is truncated to end at the BSA boundary and the F+HEAD field is not present (because the head is in the current BSA).

At the Application level:

1. If the application only cares about the BSA of interest, it may place the event icon at the LOCATION marker and highlight the extent within the BSA of interest. (The head location is not accurate, but the application cannot since it is outside of what is being displayed on the screen )
2. If the application is processing both the BSA containing the head location and the BSA containing the extended tail location, it plots the event icon at the head location and highlights the extent to the BSA boundary; it does not place an icon at the second start location but it does highlight the remaining extent into the adjacent BSA.
3. The application knows not to plot the icon at the second start location because the F+HEAD value tells it that the head location exists in an adjacent BSA, and that BSA is part of the products list of BSA's within its area of interest.

These protocol elements and rules permit a long event to be split and filtered at each BSA boundary without causing additional icons to appear on the screen.

Construction Encoding

In exemplary embodiments of the present invention, each construction event may be coded as follows:

| | | |
|---|---|---|
| LOCATION | 20 bits | |
| | | TMC-loc 16 bits |
| | | Sub-segment 3 bits |
| | | Direction 1 bit |
| EVENT | 5 bits | major Alert-C event type [class 11 only] |
| EXTENT | 7 bits | [in 1/8 segment units] |
| DURATION | 4 bits | |
| | | '0' 8 hrs or more, today |
| | | '1' . . . '7' 1 day . . . 7 days |
| | | '8' . . . 'E' 1 week . . . 8 weeks |
| | | 'F' Until further notice |
| LANES | 4 bits | Affected lanes |
| | | 1 bit for each of the 4 lane categories |
| ACTIVE | 3 bits | |
| | | 1 bit for 'working during the day' |
| | 1 bit for 'off-peak daytime' | |
| | | 1 bit for 'working during the night' |
| REAL | 1 bit | '0' planned or not yet started |
| | | '1' visible signs of activity |
| IMPACT | 2 bits | |
| | | '00' Unknown |
| | | '01' Minor [e.g. 1 lane blocked in a multilane] |
| | | '10' Major [1-lane roadway with flag/lights] |
| | | '11' Severe [roadway blocked] |
| F + START | 20 bits | ½ hour units since 1, Jan. 2010 |
| F + END | 20 bits | ½ hour units since 1, Jan. 2010 |
| F + HEAD | 16 bits | head TMC location |
| TEXT | 16 bits | offset into a text table |

That puts a construction message around 40 bits, including all our extended references. The TEXT component is intended to add 'color' to the construction message, without duplicating the location or construction event. The value is an byte offset into a table of strings, transmitted as part of the construction data using a gzip-compressed section of the Access Unit. The overall structure of the construction AU-group then becomes:

| | |
|---|---|
| AU Header | PVN/CARID/market etc. |
| F + AUSZ/AUTOT/AUCNT/AUVER | (AUVER links all AUS together) |
| StringTable offset and size | |
| BSA-directory | listing BSAs in the carousel, SIG etc. |
| [Construction data for first BSA in list] | |
| [Construction data for second BSA in the list] | |
| . . . | |
| [Construction data for last BSA in the list] | |
| [gzipped String Table - same format as for EPG] | |

In order to maximize the compression, the string table is compressed at the table layer, so construction messages will always be sent out as multiple-AU groups where the F+ fields link together the individual AUs.

For AUs other than the first (or only) AU, the start of the AU contains only the AU Header and F+ fields, plus padding to a byte boundary. The receiver shall:

1. Verify the correct AUVER and that AUTOT/AUCNT are in the correct sequence
2. Append the payload of the Access Unit to the previously-collected Access Units, excluding the CRC-32.
3. Check if this is the last AU in the sequence unzip the text segment and process the required BSA data sections, otherwise wait for the next AU.

We can probably limit the maximum size of a single TMC table of data to 4 AUs (20,480 bytes), based on the numbers we have seen so far.

Incidents

The Incident component of Apogee Traffic is the most open-ended aspect of the service, after S/F and Construction. Analysis of the research feed from NavTeq (trafficML) shown in the "Events" tables at the end of the document show that there are many more events in their full coverage than we are used to seeing in the Alert-C data.

On the one hand, Alert-C defines around 2,000 potential incident types with parameters to display additional information (counts of vehicles involved etc.). On the other hand our 1-day AlertOC sample contains under 50 distinct message codes, and no parameters, while the trafficML feed contains only 110 distinct codes, and only 93 if the construction events are removed. However, these events do contain text phrases that can be used to augment the meager Alert-Ccodes.

Design Assumptions

If we take the view that our incident coverage will include the full trafficML coverage, we can start with the following assumptions to guide the design:

The majority of our incidents will be on TMC-coded segments, but there will be significant numbers of non-TMC-coded incidents in the feed.

We should be leveraging our capabilities for improved resolution when reporting incidents.

Most incidents will fall into a small number of basic categories, for example:

Vehicle accident [requiring EMS attention]

Vehicle breakdown [not requiring EMS]

Mobile object(s) on roadway [e.g. animal]

Downed objects [tree, power line] blocking roadway

We should plan to support non-TMC-coded locations.

We should plan to support more detailed information on single incidents, similar to the TMC parameters.

We should plan to support 'arbitrary' incidents that fall outside the scope of the service as originally planned.

The atomic Access Unit model means we do not need to send incident cancel messages.

We do not require messages classes and the 'only one message per class per location' restriction.

We may want to support text-to-speech for incidents.

Encoding of Incidents

Both Alert-C and TPEG consider their encoding to be based around 'phrases' that can be put together to produce an incident description. Apogee also follows this approach and uses the same coding syntax that we use for the Weather Alerts Data Service, with appropriate changes to accommodate the different location referencing schemes. The main difference from the Weather Service is that a Phrase Table is not used; instead text strings are encoded as byte offsets into a gzipped string table in the same format described above for Construction messages.

Each table-level component comprises a list of messages. Each message comprises a mandatory location element and zero-or-more control elements followed by an end marker.

Each message can, for example, be then coded as follows:

```
LOCATION   20 bits
    TMC location reference: 20-bits
repeat {
    CONTROL                4 bits
        +Control Operation arguments [see below]
}
CONTROL '0000'                 end-of-message code
```

Each CONTROL operation comprises a four-bit Operation Code and optional parameters. The current list of control operations is:

| Code | Operation | FMT? | Parameters |
|---|---|---|---|
| 00 | End of Message | N | None [unless we want to add a 16-bit signature marker] |
| 01 | String | Y | Byte offset into string table |
| 02 | Integer | Y | Length + Bits for Integer |
| 03 | Location | N | Additional TMC location |
| 04 | Offset | N | Lon, lat offset from location |
| 05 | Radius | N | Radius of affected area in 1/10 miles |
| 05 | Lane | Y | 4-bit mask for lane indications |
| 06 | Extent | N | 7-bit extent code |
| 07 | Report Time | Y | Time when incident was reported |
| 08 | End Time | Y | Anticipated end time |
| 09 | HEAD | N | Head of incident |

The FMT field is a 4-bit field used to control the presentation of the element on a display screen:

FMT 4-bit 1-bit controls initial CAP state of String 2-bits control punctuation after String 1-bit controls line-break after String and punc The signature marker on END may be required if we want to detect when new incidents arrive (for text-to-speech) for example, similar to the requirement for Weather Alerts.

The Offset control operation allows us to specify an arbitrary point location with respect to an pre-existing TMC point, without requiring that the incident be associated with the point. The offset is coded as:

| | | |
|---|---|---|
| TIE | 1 bit | '0' offset is not tied to location for display<br>'1' offset is tied to TMC location for display |
| LON | 20 bits | longitude difference from point |
| LAT | 20 bits | latitude difference from point |

The Location control allows an incident to span multiple TMCs, as in the example of the Fire at a Mall in the Location Reference document. As an alternative, the Radius control gives a radius for the affected incident, up to 3.2 miles using 5 bits.

The HEAD operation is used to define the starting point of an incident when it lies outside the current BSA, as described in the construction section above.

The overall structure of the incident data carousel is then identical to the structure defined above for the construction data, and the same rules for AUTOT/AUCNT and zip string processing apply.

Predictive Speed/Flow

Predictive S/F is a short-term projection of likely traffic conditions based on current conditions, environment, and history. Typically predictive values decay towards historical the further out in time that the projection extends. Apogee traffic limits predictive to no more than 1 hour from current. Predictive values are coded in exactly the same way as Real-Time S/F, except that the encoding assumes that the segments have already been colored with the previous set of buckets. The first predictive (+15 or +20 mins) is coded as a difference from the latest real-time, the second predictive (+30 or +40 mins) is coded as the difference from the first predictive, and so on.

This coding method explains the need for the 'skip' code, code 0, in the bucket table. It directs the receiver to leave the underlying values alone. Other values replace the previous codes with the encoded value. There is, of course, no requirement that the original extents match the replacement extents, only that the correct number of extents are processed. An end marker '00' signifying 'end of linear' means that all other segments retain their original values—it does not mean 'paint the segment white' which is the purpose of code 15 in the bucket table.

Forecast Speed/Flow

As we move more than 1 hour away from real time, the accuracy of a full predictive dataset decreases, and the effort of maintaining multiple pattern deltas increases. However it is likely that knowledge of current conditions may be able to suggest a better forecast than relying purely on historical data. The essence of the forecast S/F service is to suggest a 'most likely' pattern for a time in the future, selected from a set of previously stored patterns, and optionally encode significant changes from that pattern.

Coding

Forecast data provides 9 forecast points at 15 min intervals from +1 hr out to +3 hr out in time from the current conditions, encoded in one or more Access Units as follows:

```
EPOCH+ETIME
COUNT          8 bits          of BSAs with patterns
for COUNT {
    BID                        8bits
    SIG                        16 bits
}
```

-continued

```
for COUNT {
    PATT                       9 × 8 bits
}
```

The starting offset of each pattern in the Access Unit is determined by the index position in the initial BSA directory. Each PATT references one of 256 stored base historical patterns.

Base Historical Patterns

The Historical Traffic Pattern element assigns semantics to some of the stored base patterns to they can be used to give rough approximations of traffic conditions beyond the Forecast Period. This aspect of the service is also usable without any Real-Time service, using a static table that can be built in to the application at manufacture. Hence the historical data only references stored patterns, unlike the forecast data which may modify the pattern to produce a result closer to the predicted state.

Because it only makes sense to update the mapping table if is it also possible to update the stored pattern table, the mapping can be sent over RFD, and linked to specific table versions. Each map is a list of 960 8-bit table references, comprising:

24 1-hour slots during the day×
  [4×15-min slots per hour×]
    5 type of day×
      2 seasons We can then link a particular slot (8:15 am, weekday etc.) to a particular Index.Version for each BSA in the table.

Patterns

Finally, we also have the base patterns themselves. Apogee supports up to 256 individual base patterns for each table. The patterns are encoded using the same method as Real-Time S/F. Groups of patterns are sent to the receiver using RFD. Because we are using RFD, we can ensure that groups of patterns and the associated mappings are applied in the correct order.

Pattern Encoding

A pattern for a table is defined as a BSA directory for all of the BSAs in that table. If we define and update patterns at the table level (rather than the country level) the RFD update structure for pattern updates would then become:

```
COUNT          16 bits         of patterns to update
for COUNT {
    Table      8 bits
    Index      8 bits
    Version    16 bits
    Offset     16 bits
}
[BSA-directory + data for first pattern in list]
[BSA-directory + data for second pattern in list]
. . . .
[BSA-directory + data for last pattern in list]
```

Pattern Metrics

There are three possible metrics to use when choosing a set of base patterns (or groups of patterns using a combination of metrics).

M1. The minimum coding metric. It measures the number of bytes required to code an Access Unit that will precisely convert the base pattern to a given state. This is obviously tied to our choice of encoding algorithm. Different algorithms will tend to select different pattern sets. Since our encoding algorithm requires the same number of bits to update from code 12→code 1 as to update code 3→code 1, the coding metric is not a measure of how 'good' the pattern is when displayed to the user.

M2. RMS error. The Root-Mean-Square error is a measure of the point-by-point deviation between the pattern and the required state. Many of the statistical techniques use RMS errors (or a simple function of them), and if the underlying distributions can be approximated to Gaussians, RMS error has many useful properties.

$$\mathrm{RMS} = \frac{1}{\sqrt{N}}\sqrt{\sum (x_a - x_p)^2}$$

Where $x_a$ is the actual and $x_p$ is the pattern value at a point.

M3. Perceived Error. M2 treats an error of +2 bucket values as equal to an error of −2 bucket values. This causes M1 to assign equal weight (distance) to a pattern that under-estimates congestion as to one that over-estimates congestion. We know that consumers react more strongly to being placed in unmarked congestion, rather than seeing congestion but moving rapidly. The M3 metric assigns higher weights to underestimated congestion so preferring a pattern that shows more congestion. If we set:

$$\delta=(x_a-x_p)$$

$$PE=\Sigma\vartheta(\delta)$$

Where $\vartheta$ is the pointwise perceived error function:

$$\vartheta(0)=0$$

$$\vartheta(\delta>0)=2\delta-1$$

$$\vartheta(\delta<0)=-2\delta$$

This is a measure of how bad a consumer would think the pattern was.

The choice of metric depends on the purpose of the pattern. For predictive data we require patterns with low coding overhead (M1). For historical data, where the pattern is used unmodified we require low perceived error (M3) or its statistically valid relative M2.

We may use one method, e.g. M2, to build a set of base patterns because of its known mathematical stability, but other metrics, M1 or M3, to select the most appropriate pattern for a given purpose.

Processing

This set of encodings, using BSA directories, provides a common processing path for all service elements whether real-time, predictive, forecast or historical with only a single representation of the linear-level encoding:

1. Determine if this is changed data (Table or BSA level)
2. Locate the BSA data within the bitstream (file or Access Unit)
3. Clear any old data in the output (i.e. set the NULL pattern)
4. If a base pattern is required (Predictive, Forecast) use the common decoder to apply the base pattern to the output
5. Use the common decoder to apply the update to the output The common decoder is the pseudocode (LBB filtering and bucket coloring) described in the main document.

Provider Questions

The following sections covers issues that may be asked of a provider to coordinate with an exemplary embodiment or implementation.

Probes [and Sensors]

Assume we have already covered the value metrics for their probes:

How accurately can a probe reading be geo-registered to a linear mesh?

Do we get temporal continuity between data points from the same probe [i.e. can we identify a probe or are all reading anonymous and therefore uncorrelated]?

What behavioral models exist for different classes of probe data? We might expect that the inferring models of a long-haul truck driver are very different from an urban delivery van or a suburban commuter.

Mesh Construction

Assuming that the traffic model runs over some form of finite-element linear mesh and that the probe and sensor values are used to seed the grid over which some form of evolutionary equations are run:

Is this assumption correct, or is the model run over a segmented/subsegmented network of TMC segments observing important intersections, like a network of pipes?

What is the granularity of this mesh or network?

How are probe values used to estimate traffic density? Does the estimator need to be recalibrated as the probe density increases, or is it somehow self-adjusting?

Are there reliable estimators for both traffic density gradients and group velocity gradients that can be derived from the model?

Real-Time Flow

To obtain Real-Time flow, the mesh model must be run in the spatial domain (i.e. T,τ=0) to 'fill in the gaps' left by incomplete probe data:

What types of equations are used to provide spatial extensions? There are flow models (solid-state and fluid), travelling-wave models (and the 'jamiton' theory) and statistical models (Bayesian, Markov etc.).

Are different models used for different classes of roadway?

How is the streaming nature of probe data leveraged into real-time estimates of traffic conditions—are traffic conditions on a segment persisted at the current value until a new point arrives and updated every time a new datapoint arrives or are they updated using some sliding window approach. The latter will add effective latency to the computation, how is the window designed to minimize effective incremental latency, what is the effective latency?

How much weight is placed on the historical or stored values vs the output from the previous run of the model? How are relative error assessments of these different base data sources combined? How is the combination of historical, recent-real-time, predictive and real-time data assessed as being an optimal combination for representing current real-time conditions?

What environment or parametric space is used to select the initial conditions (time of day, nature of day, weather, construction and other perturbations etc.)?

How are maximum theoretical transit times calculated and how are they validated? Is there an explicit model for a particular stop light etc. or is a generic value used, or inferred?

How are confidence values obtained and used? How are these to be interpreted in terms of the quoted confidence value in the TrafficXML feed? What is the minimum threshold in terms of statistical confidence for real-time data to be computed? (X % error at the Y % confidence level)

Predictive Flow

To obtain Predictive Flow, the same model mesh must be run in the temporal domain (following the spatial extension), i.e. with nonzero and increasing r values.

Do the predictive models predict average-speed, segment travel time, or vehicle congestion/density?

Is the model based on a forward dynamical (time series) simulation of the traffic flow system, or based on static look-ahead predictions, conditioned on the same set of input attributes but not on one another?

Are predicted and forecast target values quantized or continuous?

If the model is based on a forward dynamical simulation

We might expect that the linear reaction time constants will vary for individual mesh elements. How is this captured in the temporal evolution (i.e. jams will clear more slowly on some roads than others)?

How are discontinuities in the flow equations handled?

Do you do monte-carlo or perturbation dynamics on the predictive model to assess its convergence and to delimit regions of instability?

Are the actual values at time $(T+\tau)$ used to refine the projection equations?

What fraction of the predictive data is usable as feedback data for the real-time component?

How is the predictive data ground-truth tested?

Forecast Flow

Assuming that the only realistic approach to forecast (greater than 1 hour into the future) is to treat the values as deviations from the expected historic pattern at that time.

How is the evolution profile for forecast data obtained?

What conditional variables are aggregated such that the forecast data is dynamic and changing relative to baseline temporal historical data?

How much weight is given to the gradient data in projecting forwards? That is, under what conditions will the projected error increase over time, or is it always assumed to be a decay? There's a big difference between always using $e^{-\gamma\tau}$ and estimating an upcoming peak in the error at time $\alpha$ using $(P-\beta(\tau-\alpha))^2e^{-\gamma\tau}$ How are actual conditions used to improve forecast flow predictions?

Historical

Assuming historical to mean stored 'traffic patterns', and the association of a point in time to a pattern:

How do the historical values (traffic patterns) evolve over time?

How are traffic patterns invalidated when a significant roadbed change occurs (e.g. replacing a stoplight with an overpass)?

How long does it take for a pattern to be re-established following such a change?

What is the minimum number of sample datapoints used to generate a historical traffic condition value for a given segment in a given time-bucket? How are spatial and temporal smoothing techniques employed to maximize converage while ensuring statistical confidence in the value presented, but retaining spatio-temporal relevance. How is this confidence level reported/presented in the product itself such that the customer can make decisions on when/how to use it?

Value Quantization

If the provider is also performing quantization:

Can we control value quantization according to our own error metric(s), specifically for perceived congestion values as opposed to accuracy of overall transit times?

Can we control quantization to ensure the resulting dataset encodes within a certain number of total bytes?

Receiver Operation

Next described are aspects of receiver design and operation needed to implement Apogee Traffic in various exemplary embodiments.

Receiver Complexity

It is not easy to provide a single measure of 'receiver complexity', since varying tradeoffs of CPU/Memory/Disk may be made in the design space.

1. Bitstream decoding complexity. Not only does a very verbose protocol require more bandwidth in the satellite, it also requires more bandwidth in the receiver, for example doubling the size of a carousel requires twice as many UART interrupts, twice as much memory for buffers, twice the number of memory-move cycles etc. Whereas super-compressed schemes (like adaptive Huffman) may cost many more cycles to expand that they save in reduced transfer sizes.
2. Stored-State complexity. Storing dynamic state increases the complexity of the receiver implementation, particularly if must be intelligent in deciding when to update its stored state, based on version changes etc. Writing critical data to disk must be managed carefully to avoid corruptions at arbitrary power-off points, and updating flash memory can be very computer intensive. On the other hand, if the system can reference stored data that are only slowly changing, this provides a simpler system—the receiver does not need to decode the bitstream every time to extract the data, indeed the receiver does not need to reference the data at all unless it needs it.
3. Presentation complexity. The data, specifically traffic data, needs to be processed for presentation. Typically this might comprise three stages: firstly filtering or selecting data that are appropriate [with the map MBR for example]; then converting from internal form (tmc+extent+code) to a common geospatial format; thirdly rendering that format on the screen, by painting pixels. Particularly for the filtering component, we need to evaluate how much work will be down only to be thrown away against the complexity of retaining only the required data from the bitstream.

Components

Figure 45:
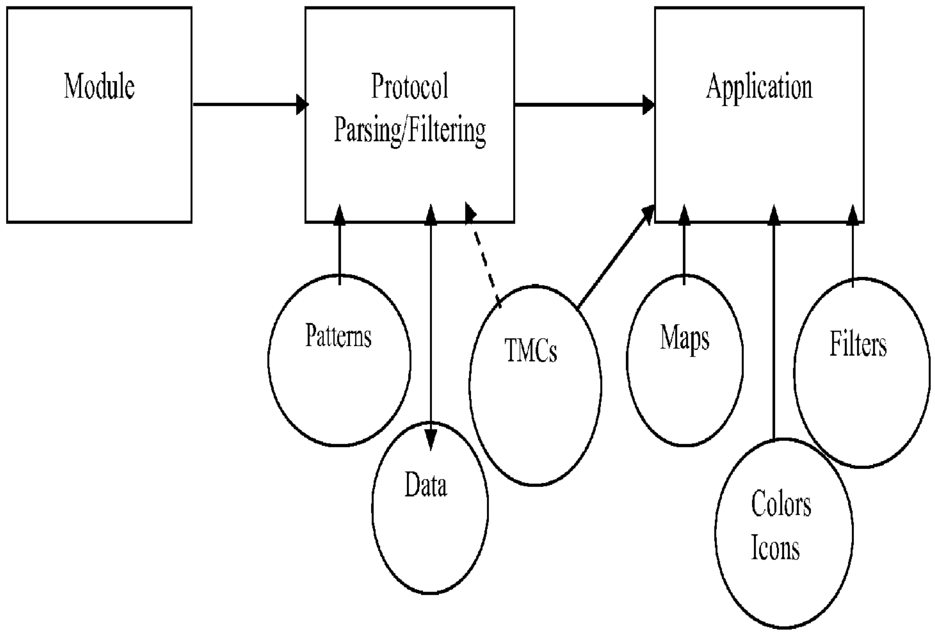
FIG. 45 depicts exemplary receiver components according to an exemplary embodiment of the present invention.

FIG. 45 illustrates three main receiver components as far as traffic is concerned. Each performs its own part of the processing, and contributes to reducing the complexity of the system.

The dashed line linking the TMC tables to the filtering code indicates that if linear-level filtering is done in the protocol handler, then it will require access to the TNC tables. If, as is proposed below, that level of filtering is handled by the application, the protocol handler can operate with requiring access to the TMC location tables.

The Module and the BitStream

In exemplary embodiments of the present invention, the module is responsible for handling the subscription and entitlement components of Apogee, for receiving and decoding the overlay satellite stream, for extracting and validating SDTP packets and for filtering down to only those DMIs required by SMS.

Protocol Handler

Similarly, the Protocol Handler is responsible for the bulk of the protocol interpretation for Apogee traffic. We need to ensure that marketing requirements are met for the all the service and resource constraints for the end-to-end system, specifically dynamic memory, CPU cycles and non-volatile storage. SXM will continue to offer SMS as its preferred method for parsing and filtering Apogee Traffic data; applications are free to choose their own implementation, subject to UIRR and TA requirements. In this case the following sections may be taken as 'best practice' guidelines for that implementation. We will decide how best to encourage best practices through documentation, flowcharts, pseudo-code, code fragments, SDKs all the way up to a full implementation such as SMS.

The Handler will need to have permanent storage for the following information:

Basic TMC Tables

These are minimally required in order to follow the forward and backward pointers that link TMC point locations into linears. This table may be shared with the Application, in which case the number of times the tables must be consulted is a resource that needs to be quantified (and minimized). If this is not possible, the handler would need to obtain a second copy of the tables for its use.

Extended TMC Tables

It may, in various exemplary embodiments, be useful to supply additional data related to TMC tables for Apogee Traffic to be usable, or decodable. Possible extensions to the basic TMC tables include:

- The index of linears used to code S/F states with their MBRs.
- An index of ramp points used to interpret ramp S/F data.
- Additional topology information for linking ramps to road segments and travel directions.
- Additional data on functional classes [e.g. posted speed limits] if not part of a map database.

In exemplary embodiments of the present invention, it is possible that all these additional data may be integrated into a single extended TMC table by a data provider. Whether they are separate tables or part of the TMC baseline they may be stored for use by the handler.

Patterns

A pattern is a way of defining an initial S/F state of a traffic market. Patterns are a valuable tool in reducing the information that needs to be carried in the bitstream, as well as providing fall-back points when data are unavailable. In order to limit the need for a receiver to support pattern data, and pattern updates, patterns are used only as an approximation to the traffic state at a time that is outside the predictive window [i.e. history as a predictor of future].

The main factor in determining the size of a pattern is the granularity with which the pattern is stored. To be useful in the historical-as-predictive function there are only two viable levels of granularity:

1. Per-TMC segment values [same as current non-Apogee traffic]
2. Full sub-segment resolution.

Even though we have limited the number of distinct patterns per table to 256, and the true number may be much less.

RFD Update

In exemplary embodiments of the present invention, RFD may be used to present updates to stored data. This requires storage for incoming RFD blocks, up to the size of the file being updated, plus the overhead for the RFD metadata and equation coefficients used to reconstruct the file. For ramp data we will send the file 'carousel' form, not GF-encoded, so the handler need only store the file blocks as they arrive, and maintain the mask of which blocks are still outstanding.

Other Data

One issue is whether or not to store any of the dynamic data. There are only two types of dynamic data that may, for example, be stored.

1. Long-term construction data. This changes only slowly and its impact is reflected in the S/F data, rather than being required to interpret it. Storing construction data makes sense if we want to send it out only very slowly.
2. Predictive data. Again, values that change slowly, and the +30 min prediction is still valid after the typical 5 min engine-off time needed to refill a gas tank and visit the convenience store.

There are many ramifications in the handler when dynamic data need to be stored. Flash write time, flash wear, and stability across power cycles all argue for writing as little data to disk as possible. When we impose the requirement that we do not store identical data over the top of itself we start to need version markers on data carousels. The impact of this requirement is not so much on the bitstream as on the failover capabilities on the broadcast side (the feeder). A true information-preserving failover is almost impossible to support given that systems or network links can fail at any time. Alternative solutions, like comparing checksums, require that the data carousels are constructed identically every time, i.e. that event messages are always inserted in the same order, which would place additional restrictions on the output format from the provider.

CPU and Memory

These requirements tend to be linked since various techniques can trade one off against the other. The main variables are:

- Update rate. The handler must handle the various components of the service at the specified update rates, at least to the level of detecting changes in data it needs to process.
- Decoding complexity. We can usually trade off bitstream use against decoding complexity. For example we could reduce the S/F carousel size by using an adaptive Huffman code, but recreating and deciphering those tables in the receiver is non-trivial.
- Coverage area. How many markets does the handler need to decode in parallel? Three? Or four? If we specify a coverage radius of 50 miles around the vehicle, and we are updating every 20 seconds (max travel distance ⅓ mile) do we need to decode more than 50 miles at a time?
- Integration Period. If we only change the S/F data every 3 minutes, that's 3 carousels at 60 seconds/carousel. Since the module can detect exact repetitions of the carousel very easily (same AU CRC-32) it need not process or notify the application on every duplicate. Reducing the integration period would increase the number of times the data have to be processed.

Data Caching

A perfect transmission and reception system, cannot be assumed. We can, however, assume that an access unit will be received completely and without error, or not at all. The atomic unit of presentation is the BSA. Since the encoding boundaries between the BSAs are precisely defined the application can use BSA data from different carousel cycles with causing dropouts or 'come-and-go' flow on the display. It is also possible to mix historical data for one BSA with live data from another BSA during the initial engine-on startup. It is not possible to go back from live to historical, since the historical data may have less coverage than the live data.

In the case when all the data for a BSA is contained within a single Access Unit, newer data can immediately replace cached older data. If the BSA data are split over multiple Access Units, that BSA will need to be double-buffered and a complete AU collected before it can replace the older data.

Persistence

The following table states the persistent requirements for the different data elements in the service. Persistence means persistence across engine (power) cycles. All data are expected to persist while power is applied to the receiver, there are no data timeouts in Apogee.

| Element | Persistence |
|---|---|
| Real-Time S/F, Ramps | No |
| Incidents | No |
| Construction | Optional |
| Predictive | No |
| Forecast | Optional |
| Ramp Table Updates | Yes |
| Historical | Yes |
| Patterns | Yes |

'No' means that data shall never persist across an engine/power cycle. 'Optional' means that the application may choose to retain those data elements. 'Yes' means that an application that implements those service elements is required to store the data, and any updates to the data received over the air.

It is here noted that it is possible to implement an Apogee traffic service without using writable persistent storage, using only the tables (TMC, ramps, patterns etc.) built in to the system at the time of manufacture.

LBB Filtering

Linear-Bounding-Box Filtering is the means by which the handler can reduce the processing requirements for clipping a full BSA dataset down to a map area, expressed as a geographic MBR. The encoding for this method was presented above, but without any justification for its utility, which is now given here.

Firstly, we have removed any requirement for filtering to a precise radius as part of the handler functionality. We require only filtering down to an arbitrary geographic rectangle. Using a map rectangle rather than a 50-mile circle is more natural for a map display. Given a point and radius the extent of the MBR latitude is $\pm 180r/3963\pi$ degrees and the extent of the MBR longitude is $\pm 180r/3963\pi.\cos(\varphi)$ where $\varphi$ is the latitude of the center point and r is the desired coverage radius.

In considering the filtering algorithm, we must accept that the handler cannot be expected to do a perfect job of guaranteeing that every single linear within the map MBR will be colored, and only those segments. Without using the full-resolution map database it cannot determine if a linear with endpoints outside the MBR crosses into the MBR or not. The handler can choose between three options:

1. Minimum points—only those points that lie within the map MBR are returned—there will be some coloring gaps at the edges of the MBR [not a problem if the MBR extends well beyond the map displayed].
2. Minimum lines—include points where either end of the segment lies within the map MBR (or comes close to the map MBR)—this will remove almost all coloring gaps but requires both ends of the linear to be tested.
3. Maximum points—all points on all linears that might intersect the map MBR—this is the cheapest algorithm for the handler to use (other than no filtering at all) but results in the largest point dataset delivered to the application.

In exemplary embodiments of the present invention, all three filtering methods can be implemented using only simple comparisons once the map MBR has been established. If we represent the MBR as a structure with 4 fixed-point values (32 bit integers are adequate for this operation allowing 6 decimal places of accuracy) we have:

```
typedef struct {
   int      l_lon;      // lower-left longitude
   int      ll_lat;     // lower-left latitude
   int      ur_lon;     // upper-right longitude
   int      ur_lat;     // upper-right latitude
}GeoMbr;
```

Then determining if a point lies within the MBR is simply:

```
int geombrInside(GeoMbr *this, int x, int y) {
   return (x >= this->ll_lon &&
      x <= this->ur_lon &&
       y >= this->ll_lat &&
      y <= this->ur_lat);
}
```

The following test will detect all lines that either cross or come 'close to' the map MBR:

```
int geombrCross(GeoMbr *this, int x0, int y0, int x1, int y1) {
   return ((sgn(x0-this->ll_lon)      ! = sgn(x1-this->ll_lon) &&
      (sgn(x0-this->ur_lon)           ! = sgn(x1-this->ur_lon) &&
     (sgn(y0-this->ll_lat)            ! = sgn(y1-this->ll_lat) &&
     (sgn(y0-this->ur_lat)            ! = sgn(y1-this->ur_lat));
  }
```

Where sgn is the signum (signof) function. Finally, we have the basic linear-bounding-box filter, which selects only those linears that may potentially have points within the map MBR. Given two MBRs the test for this condition is:

```
int geombrIntersects(GeoMbr *this, GeoMbr *other) {
   return (other->ll_lon          <= this->ur_lon &&
     other->ll_lat                <= this->ur_lat &&
     other->ur_lon                >= this->ll_lon &&
     other->ur_lat                >= this->ll_lat);
}
```

All these tests using simple arithmetic (or even just comparisons if you wish to code sign that way) and no trigonometric functions.

The other operation not covered above is the conversion of the MBR latitude to MBR longitude by division by $\cos(\varphi)$. A reasonable fixed-point representation for geographic co-ordinates is to use 20 bits of binary precision for the floating part, leaving 11 for the integer and 1 bit for the sign. This gives an accuracy of 1/1,000,000 degree which is more than adequate for traffic displays. The calculation of the MBR latitude is quite easy, it is 15160r where r is in miles, or 758000/1048576 for 50 miles. We can build a table of $1/\cos(\varphi)$ for integer values of degrees in the useful range (0 . . . 80° N). For 42°N (near Detroit), the value is 1.3456. Writing this as 1+354/1024 we have the integer calculation:

758000×1+(758000×354>>10)=1020043

Which is within 1% of the true value, even at 42.5°

Using a point in the outskirts of Detroit, for example, and all the S/F data in table 8 for a single day, filtering all the Alert-C coded points one at a time involved examining 2,678,671 individual TMC locations (including delete processing). Using the LBB encoding and filtering required examination of only 1,219,477 individual locations, or 45.5% of the encoded data.

Table Data

In exemplary embodiments of the present invention, to implement a filtering algorithm we need to supply the MBRs for each linear in the BSA, and index the linears for reference in the broadcast, giving a structure that would look like:

| | |
|---|---|
| Table 8: | M=−87.325980:40.989530:−82.424480:46.670640 |
| [0] BSA 00007: ADRIAN | M=−84.406430:41.716130:−83.766260:42.148810 |
| County LENAWEE | F=26091 |
| [0] Linear 00472: US-223 M=−84.349540:41.797500:−3.766260:42.038080;P=8906:5729 | |
| Point 08906 RIGA HWY 00007,00472,08905,08907,41.81959,−83.82567, | |
| Point 08907 US-223 00007,00472,08906,08908,41.83483,−83.86862, | |

Here table 8 extends over a certain MBR and contains a number of BSAs. The first BSA has its own MBR and contains a single county, and a number of linears. The first linear is linear 00472 in the TMC table and the portion within BSA 7 extends over a certain MBR. The portion within the BSA covers points [8906 . . . 5729] in the TMC table and those points and their linkage are given below the Linear.

These data amount to little more than a re-ordering of the existing TMC table, and the addition of the MBR (M=) county code (F=) and point range (P=) to the relevant rows, which can be accomplished by adding a single extra column to the standard TMC CSV (or XLS) files.

Next, described are the various components of the Apogee filter.

Setting the Filter

In exemplary embodiments of the present invention, the filter is a set of tables and BSA numbers and bit values, one bit per linear, that says if the linear is to be included ('1') or excluded ('0) from processing. It is recomputed only when the application requests a new map coverage area. An exemplary process is:

1. Convert the area into a request MBR using the formula above.
2. For each table in the broadcast. If geombrIntersects (table MBR, request_MBR):
   a. For each BSA within that table. If geombrIntersects (BSA_MBR, request MBR):
      i. Mark this table for collection. Mark this BSA for collection. Then
      ii. For each linear index in the BSA:
         1. filter[index]=geombrIntersects(MBR[index], request_MBR);

This completes the filter setting. The receiver then subscribes to the set of DMIs required to collect all the data for the tables marked for collection.

Duplicate Detection

Typically Real-Time S/F data are recalculated every 150-180 seconds, so the same carousel will be transmitted 3 or 4 times before it changes (assuming a target of <60 seconds for the S/F data repeat rate). If the handler has already processed one instance of the carousel it does not need to check and decode an identical copy. It can discard an Access Unit as a duplicate if [and only if]:

1. It is for the same BSA, and time-period [current+15 min forecast etc.]
2. It is the same AUCNT-of-AUTOT as a processed AU
3. The CRC-32 on the AU matches the one from the previously-processed AU.

These checks can all be made on the AU wrapper and header, without requiring that the contents be decoded. If it is determined that the AU has changed, then each BSA can be examined using the signature field in the header (for the BSA-directory encoding method). If the signature has not changed, then that BSA need not be processed again. Because extents never cross BSA boundaries, the state of those linears will be identical even if other BSAs in the Access Unit have different data.

Broadcast Encoding

As described above, data for each linear in the table are presented in the order defined by the linear index. Each linear comprises either:

'00' No coverage for this linear (or end-of-coverage of a covered linear)

'11' Linear fully covered by a single speed bucket

A list of '01' positive direction and '10' negative direction coverages, followed by a '00' marker A single coverage is a <speed-bucket><extent> pair

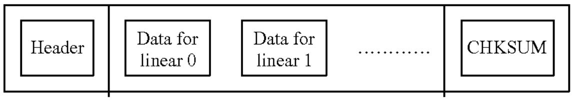

An example for four linears might look like:

| | | |
|---|---|---|
| Linear = 0: | No coverage | '00' |
| Linear = 1: | bucket 8 (e.g. "45 mph") | '11' 8 |
| Linear = 2: | inbound congestion 8 TMCs | '01' 8 32 '01' 1 32 '10' 8 64 '00' |
| Linear = 3: | outbound congestion 12 TMCs | '01' 8 96 '10' 1 32 '10' 8 32 '00' |

Where speed bucket 8 is 45 mph, and 1 is high stop-and-go-traffic. Note the extents are given in ⅛-segment units according to the sub-segmentation methodology.

SDTP Handling

In exemplary embodiments of the present invention, efficient filtering of the incoming SDTP packet stream, the following may be performed. Assume that we run one instance of the following state machine per DMI:

| | IDLE | PARTIAL | ENDING |
|---|---|---|---|
| S- | start<br>if wanted<br>if seq == 0 → ENDING<br>→PARTIAL | start<br>if !wanted<br>→ IDLE<br>if seq == 0 →ENDING | start<br>if !wanted<br>→ IDLE<br>if seq != 0 →PARTIAL |
| — | | if !insert<br>→IDLE<br>if seq == 0 →ENDING | →IDLE |
| -E | | → IDLE | append<br>complete<br>→IDLE |
| SE | start<br>if wanted<br>complete | start<br>if wanted<br>complete<br>→IDLE | start<br>if wanted<br>complete<br>→IDLE |

S and E refer to SDTP.start_flag and SDTP.end_flag respectively being set in the packet header.

Where

| | | |
|---|---|---|
| start | ::= | copy data to start of data_buffer<br>data_ length = SDTP.packet_length<br>if !SDTP.end_flag<br>seq = SDTP.seq_number − 1 |
| wanted | ::= | callback into handler code to<br>check PVN and CARID<br>decode BSA table and determine if any data are required<br>return TRUE if AU is wanted, else FALSE |
| insert | ::= | if SDTP.seq_number == seq<br>append data to data_buffer<br>data_length += SDTP.packet_length<br>seq—<br>return TRUE<br>else<br>return FALSE |
| append | ::= | append data to data_buffer<br>data_length += SDTP.packet_length |
| complete | ::= | callback to handler code with complete data packet<br>at this point the handler should verify AU.crc before proceeding. |

Filter Operation

FIG. 31 demonstrates how the filtering applies at each portion of the receiver processing system, from the module, through the handler, to the application.

Data Processing

In exemplary embodiments of the present invention, there can be two different models for data processing. The first model assumes that all the processing is performed within a single application (i.e. the handler passes up a complete BSA bitstream to the application). In this model, if a linear does not need to be processed it can be skipped over directly in the data stream, without reference to any other tables or calculation:

```
type = readbits(2);
if (type== '11')
    readbits(4);
else
  while (type == '10' || type == '01') {
      readbits(4+7);
      type = readbits(2);
  }
```

For each linear that needs to be processed, the linear index table gives the starting TMC locations for the positive and negative directions. The usual TMC table point linkage then gives all the intermediate points to complete the linear. In pseudo-code this appears as:

```
type = readbits(2);
if (type == '00')
    do nothing, no coverage for this linear
else if (type == '11') {
    code = readbits(4);
    for (point = first_point_in_linear, valid(point);
    point = next_point_positive)
        if (geombrInside(mapMBR, point)) {
            set all_subsegments_from_point_positive to code;
            set  all_subsegments_from_point_negative to code;
        }
} else {
    point = first_point_in_linear;
    while (type == '01') {          // process +ve side
                                    (i.e. starting at p0 above)
        code = readbits(4);
        extent = readbits(7);
        if (geombrInside(mapMBR, point))
            set extent positive subsegments from point to code;
        point += extent;
    }
    point = last_point_in_linear;
    while (type == '10') {          // process −ve side
                                    (starting at p6)
        code = readbits(4);
        extent = readbits(7);
        if (geombrInside(mapMBR, point))
            set extent negative subsegments from point to code;
        point −= extent;
    }
}
```

The 'set' operations depend on how the data are to be delivered from the handler to the application. They also require traversing the TMC table at the sub-segment boundaries to move to the next segment in the appropriate direction. The example code assumes filtering for the minimum-point option, but the filtering calls can easily be substituted to achieve either of the other two methods.

In a second model, the handler extracts and formats the data for the application, without filtering to the linear level. This model is suitable for handlers like SMS, for example, which need to avoid accessing the TMC tables to perform LBB filtering, based on the Data Partitioning section below. This requires an application data model and the definition of an interface between the handler and the application. One such combination is offered below.

Data Partitioning

Figure 46:
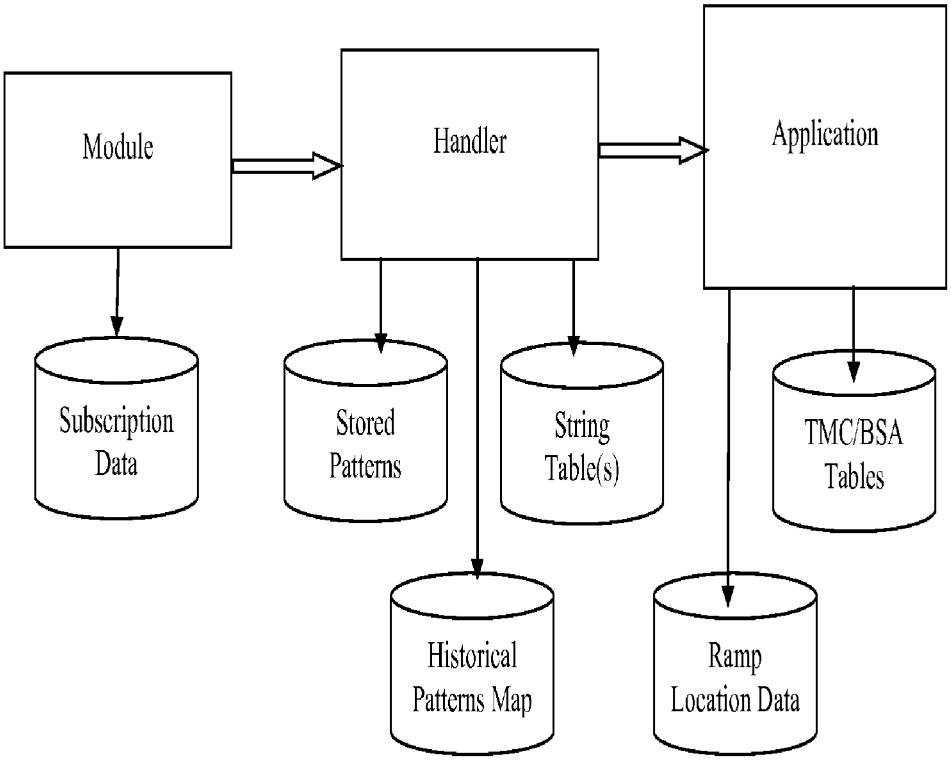
FIG. 46 depicts exemplary data partitioning according to an exemplary embodiment of the present invention.

One of the goals of processing architecture is to localize accesses to stored data in such a way as to minimize cross-component data accesses that require data locks, particularly across the handler-application interface. This leads to the partition depicted in FIG. 46.

Within this partitioning, the Handler component 'owns' the Stored Pattern Table and the Map to those patterns that is the Historical Data element of the service. Both of these are updated using RFD. The Handler also owns the String Tables used to convert incident and construction messages into human-readable text. This is extracted in real time from the construction and incident data carousels.

The application owns the TMC tables built-in to the product at manufacture, and not subsequently updated. It also owns the Ramp location table, which is updated by RFD. Assuming that the Handler is responsible for all of the RFD decoding (if the application developers choose to include update-over-RFD in their product), this requires the following logic in the Handler-RFD interface.

1. Initialize RFD library from incoming metadata
2. Pass incoming RFD data packets to RFD library
3. On file completion:
   a. If this is pattern or phrase data, update local file copy
   b. If this is Ramp data, pass the file reference to the Application
4. Clean up temporary RFD files.

The Data Model described below also conforms to this partitioning of the access to stored data. None of the Speed and Flow Data Elements require access to the TMC table in order to construct the object (for example it is not necessary to know how many TMC points are contained along a linear to build a complete Linear element).

Application Data Model

The complete set of Speed and Flow Elements may be constructed from the following data model:

SpeedFlow::=bucket, color, extent
Directed::=SEQ OF SpeedFlow
Linear::=ARRAY[2] OF Directed (+ve−ve direction)
Bsa::=ARRAY[L;5] OF Linear (5 lane types)
Table::=ARRAY[B] of Bsa
DataService::=ARRAY[T] of Table where:

bucket, color, extent are byte integer quantities
L is the variable number of linears in the BSA
B is the variable number of BSAs in the table
T is the number of tables in the service The Service Elements are constructed from these basic structures as follows:

RealTime::=DataSet
Predictive::=ARRAY[2, 3 or 4] of DataSet (dimension still TBD)
Pattern::=DataSet
BasePatterns::=ARRAY[P] OF Pattern
PatternIndex::=index (0 . . . P−1) INTO BasePatterns
Forecast::=ARRAY[A] OF PatternIndex
ForecastTable::=ARRAY[B] OF Forecast
ForecastService::=ARRAY[T] OF ForecastTable
History::=ARRAY[96;2;4] OF PatternIndex
HistoryTable::=ARRAY[B] OF History
HistoryService::=ARRAY[T] OF HistoryTable where:

index is a byte integer quantity
P is the number of patterns we support (up to 256)
A is the number of forecast times we support The Data Model for ramps comprises the following elements:

RampFlow::=color
RampBsa::=ARRAY[R] OF RampFlow
RampTable::=ARRAY[B] OF RampBsa
RampService::=ARRAY[T] OF RampTable
color is a byte value containing one of the four defined ramp colors Incident and Construction Data are transmitted as packed versions of a data structure as defined in the Information Elements section above.

Incident::=SEQ OF IncidentFields (see above)
IncidentBsa::=SEQ OF Incident
IncidentTable::=ARRAY[B] OF IncidentBsa
IncidentService::=ARRAY[T] OF IncidentTable
Construction::=SEQ OF ConstructionFields (see above)
ConstructionBsa::=SEQ OF Construction
ConstructionTable::=ARRAY[B] OF ConstructionBsa
ConstructionService::=ARRAY[T] OF ConstructionTable In addition to the transmitted Data Elements described above there are also the updatable tables and non-updatable tables which share indices with the transmitted elements:

TPoint::=lon,lat,description (TMC point)
TLinear::=mbr, SEQ OF TPoint
TBsa::=mbr, ARRAY[L] OF TLinear
TTable::=mbr, ARRAY[B] OF TBsa
TTableSet::=ARRAY[T] OF TTable
TRamp::=CHOICE tmcref OR tmcref,ramptype
TRampBsa::=ARRAY[R] OF Tramp
TRampTable::=ARRAY[B] OF TRampBsa
TRampSet::=ARRAY[T] OF TRampTable
PhraseSet::=ARRAY[WV] OF string
PhraseIndex::=index (0 . . . W−1) INTO PhraseSet where:

lon,lat are floating point numbers representing longitude and latitude
mbr is an array of 4 floating point numbers representing a bounding-box
tmcref is a 16-bit number indexing a point in the TMC table
ramptype is a byte containing one of the 16 defined ramp topologies
W is the number of words (phrases) in the phrase dictionary The Handler—Application API The Data Model and Data Partition also determine, to a large extent, the interface between the Handler and the Application and the nature of the objects that can be shared across the interface. [Note, this is not to say the interface must be 'Object-Oriented', only that the collection of information and how it can be referenced will have certain constraints].

Filtering

Because the handler does not have access to the spatial topology of the TMC table, it cannot perform spatial filtering of the incoming data. It is the responsibility of the Application to decide which BSAs it wishes to monitor and inform the Handler. The Application is also responsible for applying the LBB filter (if it so chooses) to the individual linears in the BSA, or for selecting only a subset of the Linears based on a map zoom level etc. To assist the Application, the Handler returns an indication that a particular BSA has been updated, and then allows essentially random (indexed) access to the Linear data, without requiring the Application to iterate over all the SpeedFlow data for unwanted linears.

Setup

App→Handler collect type for bsa
App→Handler ignore type for bsa

Where type is one of the Service offerings and bsa is a Table.Bsa index (determined from the TMC/BSA table).

Dynamic Data Delivery

| | | |
|---|---|---|
| Handler → App | available bsadata of type | |
| App→ Handler | linear [linear, lane] from bsadata | (returns Linear) |
| App → Handler | linear [tau; linear, lane] from bsadata | |
| App → Handler | ramp [index] from bsadata | (returns color) |
| App → Handler | next-incident from bsadata | (returns Incident) |
| App → Handler | next-construction from bsadata | (returns Construction) |

Where bsadata is a reference handle to a Bsa, RampBsa, IncidentBsa or ConstructionBsa object, inferred from the type value on the 'available' indication. For predictive data, the tau value indicates which of the (2, 3 or 4) future predictions should be accessed. For incidents and construction, since there is no meaningful external index, the events are simply returned one-at-a-time through an iterator.

Pattern Data

For the stored-pattern data, the first step is to obtain a pattern index and then convert that into a bsadata object reference.

| | | |
|---|---|---|
| App → Handler | forecast time for bsa | (returns PatternIndex) |
| App → Handler | history [time; season; day] for bsa | (returns PatternIndex) |
| App → Handler | pattern index for bsa | (returns bsadata) |

The linear data can then be extracted from the patter using the linear operation above.

Updates

If the handler is processing RFD updates, a set of indications will inform the application about changes to the stored data:

| | | |
|---|---|---|
| Handler → App | updated type | (Forecast or History) |
| Handler → App | update-ramps with fileref | |
| App → Handler | ramps-updated | |

These indications would cause the application to refresh any stored information it has that resulted from use of the forecast or historical data. For ramps, the application should secure the ramp data to disk, then acknowledge the update with a ramps-updated operation.

String Table Lookup

Because the Handler owns the String Tables it is responsible for expanding the compressed text in construction and incident data objects:

| | | |
|---|---|---|
| App → Handler | expand-string object | (returns string) |

Where object is an Incident or Construction Data Object returned by the iterator.

The Application

In exemplary embodiments of the present invention, the following include some of the functions of the display application and how they might affect the design. The application is expected to:

Maintain the filter state used by the handler to select traffic data. Minimally this would include the location of the centerpoint of the display [vehicle GPS] and the desired radius. It might also include environmental information used to select patterns or historical values: type of day, time of day, season, weather conditions etc.

Process, at some timely rate, the S/F and incident data as supplied by the handler, interpreting our congestion indications as appropriate colors for the display.

Render incident icons and S/F markings. For S/F this will require converting between a TMC segment or sub-segment and those elements of the internal map database representing the actual path on the ground followed by that sub-segment.

Use of Apogee Data

The following guidance will help application developers make the best use of Apogee data.

| Element | Application |
|---|---|
| Real-Time S/F | Coloring of the road map. Short-term route calculation |
| Incident/Construction | Icon placement. Popup descriptions. Rerouting or diversion suggestions. |
| Predictive | "Time-Dial" display. Route and time-of-travel calculations for journeys of up to 1 hour |
| Forecast | "Time-Dial" display. Calculations for journeys of up to 3 hours |
| Historical | "Instant-on" data display. "Time-Dial" display. Default data display when no signal is available. Calculations for journeys extending beyond 5 hours. |

Historical data may be used for route and travel-time calculations immediately following engine-on, but the values should be re-calculated once the Real-Time data are available.

A sufficiently powerful Navigation Unit may attempt to display data from more than one S/F dataset at a time, for example by blending Real-Time and Predictive values onto the same screen. Otherwise the recommended way to present these data is through a 'time dial' described below.

Scale-Based Displays

Noting that Apogee transmits a lot of data, more than can be displayed on a small screen at over a large coverage area, the application should apply 'intelligent' filters to the data to decide what is appropriate to display at each zoom-level on a map. The following levels are possible:

| | |
|---|---|
| 1 | Red/Yellow on FC1's only - long range trip planning |
| 2 | All FC1 coverage |
| 3 | FC1 + Red/Yellow on FC2's - local trip planning |
| 4 | All FC2 coverage |
| 5 | FC2 + Red/Yellow on FC3's |
| 6 | All FC3 |
| 7 | FC3 + Red/Yellow on remaining roadways |
| 8 | All covered roadways |

Similarly, per-lane views may only be appropriate in ground-view style navigation map displays as intersections are being displayed for turn-by-turn directions.

The Time Dial

In exemplary embodiments of the present invention, a simple way to display non-Real-Time S/F data is through a "Time-Dial" where the user can scroll the application forwards in time, and the screen will display coverage data from the most appropriate dataset.

| Element | Display Choice |
|---|---|
| Speed/Flow | Use Real-Time, Predictive, Forecast, Historical as appropriate. |
| Incident | Incident data should be displayed only when Real-Time S/F is being displayed (i.e. close to 'now') unless the application is also processing the end-time markers (if any) in the incident data feed. |
| Construction | Construction data may be displayed for future times only if the application interprets the start and end time values in the construction messages correctly. Otherwise construction data should not be displayed. |

Preferably the Time-Dial knob can operate in either 10 min or 15 min increments, but not anything smaller. In exemplary embodiments of the present invention, the datasets can be used as follows:

| Time difference (τ) | Service Element |
|---|---|
| 00:00-00:10 | Real-Time |
| 00:10-00:30 | First Predictive (20 minute value) |
| 00:30-00:50 | Second Predictive (40 minute value) |
| 00:50-01:15 | +1:00 hr Forecast |
| 01:15-01:30 | +1:15 hr Forecast |
| <03:00 | Appropriate 15 min Forecast |
| >03:00 | Appropriate Historical Pattern |

Filtering

Filtering and smoothing the data points produced by the model may reduce the bandwidth required to encode the data, and also reduce any barber-pole striping on the roadway which may be distracting to the driver. There are two main techniques that can be applied to the raw S/F data.

Spike Removal

Figure 47:
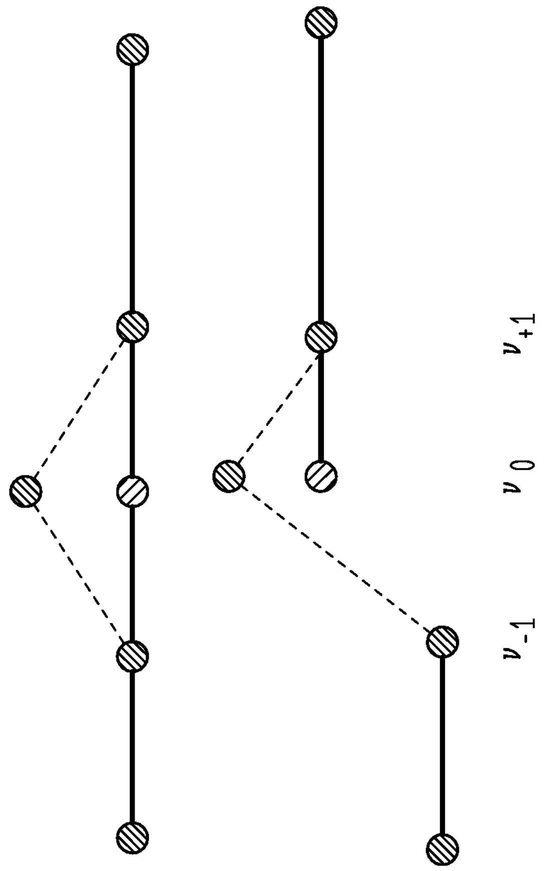
FIG. 47 depicts exemplary spike removal according to an exemplary embodiment of the present invention.

In exemplary embodiments of the present invention, removing 'small' spikes in the data improves aggregation, for example, as shown in FIG. 47.

In the upper line of FIG. 42, the number of messages is reduced from 3 to 1, and in the lower line the number is reduced from 3 to 2.

The current algorithm for spike removal first requires that $$\operatorname{sgn}\left(\frac{dv}{dL}\bigg|^{+}\right) \neq \operatorname{sgn}\left(\frac{dv}{dL}\bigg|^{-}\right)$$

and then that the filtered point $(v_{-1}+2v_0+v_{+1})/4$ be equal to either $v_{-1}$ or $v_{+1}$ Otherwise if the spike is sharper, it is retained.

In exemplary embodiments of the present invention, a better algorithm would take into account the relative confidence values of the three points. Essentially we would not want to suppress a spike generated by probe data when surrounded only by historical approximations. If the confidence values for the three points are $\rho_{-1}$, $\rho_0$ and $\rho_{+1}$ then a better filtered value would be $(\rho_{-1}v_{-1}+2\rho_0v_0+\rho_{+1}v_{+1})/(\rho_{-1}+2\rho_0+\rho_{+1})$ which can then be compared to $v_{-1}$ or $v_{+1}$. However, without knowing the mathematical derivation of the ρ values, we cannot assign any meaning to this value, other than a subjective belief that it is 'better' than ignoring ρ entirely.

Mean-Value Smoothing

Figure 48:
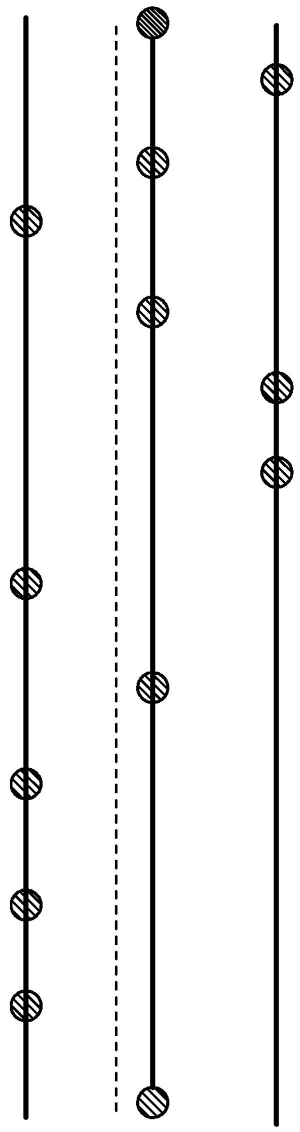
FIG. 48 depicts exemplary mean value smoothing according to an exemplary embodiment of the present invention.

In exemplary embodiments of the present invention, the purpose of mean-value smoothing is to reduce low-amplitude ripples in the data by replacing a sequence of values by their mean bucket value. Since these values can then be aggregated into a single 'message', it reduces the total number of messages at the expense of allowing small errors in buckets over a long range of the linear, as shown in FIG. 48.

Consider a sequence of data values $\{x_j\}$, and let $\lfloor x_j \rfloor$ be the bucket value assigned to that value, as shown above (blue dots are bucket values). The values have a mean $\bar{x}$ (dotted line) which itself has a bucket value $\lfloor \bar{x} \rfloor$ (red dot). The sequence is smoothable iff:

$$\forall x_j \in \{x\} : |\lfloor x_j \rfloor - \lfloor \bar{x} \rfloor| \leq 1$$

i.e. the algorithm tolerates an error ≤1 bucket value in each direction from the proposed mean value. All the points in the set can be replaced by the red value and no value will have an error of more than one bucket from its 'true' position. Since the test is on the range of values, the set {x} can be replaced by its extreme values, so the set is smoothable iff:

$$\max(\lfloor x_j \rfloor) - \lfloor \bar{x} \rfloor \leq 1 \text{ and } \lfloor \bar{x} \rfloor - \min(\lfloor x_j \rfloor) \leq 1$$

The filter accumulates a set of data points and their minimum, mean and maximum values. The next point on the linear is accepted into the set iff the new mean lies within ±1 of the new maximum and minimum (i.e. the new set is still smoothable). Otherwise all the points in the current set of data are replaced with the current mean and the accumulation process starts again.

Bandwidth Estimates and Analyses

Next described are detailed analyses of the encoding approach and the resulting estimates for bandwidth and future growth.

Summary of Results

The following two tables summarize results of encoding the 300 kmiles of trafficML feed. The sample data used for the detailed analysis comprise:

- Coverage for 5 selected tables at hourly intervals.
- Full-resolution extents (7 bits per extent code), but all messages aligned to a segment boundary.
- 4-bit speed buckets, including explicit no-coverage markers.
- Dummy values for congestion using 3-bits per value.
- No additional messages due to sub-segmentation or finer-grained buckets.
- A single lane element representing the main roadbed.
- Linear-Index table ordered with the covered linears appearing first in the table.
- Construction messages for all TMC-coded locations
- Incident messages for all traffic-related incidents (excluding Weather) whether on a TMC segment or not.

The estimates for the various service elements are as follows:

| Feature | Bandwidth impact |
|---|---|
| New Coding method for current dataset | (3.5 kbps) not part of total |
| 90k to 300k expansion | 22 kbps |
| CA-to-CA ramps | 1 kbps |
| Other ramps | 1.5 kbps (in addition to CA-CA) |
| Predictive: 3 datasets delta coded vs real-time | 11 kbps |
| Forecast | 1.2 kbps |
| Construction and Incidents | 21 kbps |
| Pattern Updates | 9 kbps (16 patterns per cycle) |
| Historical Map Updates | 2.6 kbps |
| All Features | 70 kbps |

These values assume the carousel rates used in the service definition section above.

Modifiers to the Bandwidth Calculation

| Feature | Knobs to turn to reduce bandwidth usage | NEW Bandwidth impact |
|---|---|---|
| 90k to 350k expansion (assumes that HOV/express lane coverage will be minimal. Also, exit lane and junction lane coverage is minimal.) | Number of sub segments (going from 8 to 4 will reduce the bandwidth need by about 1 kbps)<br>Number of colored congestion levels (going from 7 to 3 will reduce the bandwidth need by about 1 kbps)<br>Number of speed buckets (going from 14 to 7 will reduce the bandwidth need by about 1 kbps). But this will mean no improvement over the current TMC/AlertC standard.<br>Coarse/fine filtering for aggregation over sub-segments<br>Update rate (current assumption is 60 sec)<br>Reduce FC4 miles of coverage<br>FC1-2, FC3-4 data on different carousels | 22 kbps plus 5% to 10% (there is a risk that this could be higher because of sub-segment resolution could result in much higher message volume than 5% to 10%.) |
| CA-to-CA ramps | | 1 kbps |
| Other ramps | | 1.5 kbps |
| Predictive: 3 datasets delta coded vs real-time | Number of datasets is 2 (20 min interval datasets)<br>Coarse/fine filtering after delta coding<br>Update rate is 90 sec | 8 kbps |
| Forecast | Number of datasets is 8 (for 2 hour period at 15 min intervals)<br>Update rate is 2 min | 1 kbps |
| Construction and Incidents | Compressed free form text using gzip<br>Limit amount of compressed free form text (FC1-2 only or, Incidents only, Kbyte limit per carousel etc)<br>Update rate (currently 30 sec) | 10 kbps |
| Pattern Updates | Reduce update rate from 40 min (1 day) to 30 × 40 min (30 days) | 1 kbps (Pattern + Historical) |
| Historical Map Updates | Reduce update rate from 40 min (1 day) to 30 × 40 min (30 days) | [included in line above] |
| All Features | | 45 kbps |

Encoding the Current Broadcast

To understand how those figures relate to the current SiriusXM traffic services, for example, we can compare the current SXM broadcast to the coding scheme described above.

The 'Recoding Current' table below shows the before-and-after AU sizes. The first number is the number of bytes in the current carousel, including SDTP overhead. The results are summarized by traffic table below:

| Table | Alert-C bytes | Linear bytes | BSA-AU bytes | BSA-dir bytes |
|---|---|---|---|---|
| Florida | 101025 | 32709 (32.4%) | 38599 (38.2%) | 35414 (35.1%) |
| Los Angeles | 72575 | 18219 (25.1%) | 20073 (27.7%) | 19214 (26.5%) |
| Detroit | 44085 | 11379 (25.8%) | 16369 (37.1%) | 13767 (31.2%) |
| Seattle | 50420 | 16469 (32.7%) | 20664 (41.0%) | 18420 (36.6%) |
| NYC | 129135 | 35602 (27.6%) | 43672 (33.8%) | 40205 (31.1%) |
| Totals | 397240 | 114378 (28.8%) | 139467 (35.1%) | 127047 (32.0%) |

Improving Resolution

Since we have improved the spatial resolution of the service by introducing the sub-segment concept, we need to estimate how many additional messages might be introduced as a result of increased resolution.

Looking at the nature of the messages in the carousel, there are a number of cases where the speed bucket jumps by more than one bucket between adjacent TMC segments. If we assume that sub-segmenting does not introduce any additional transitions within an extent, then we need to estimate how many additional messages might be generated during the large skips.

Since we would be able to choose the amount of smoothing applied to the data before broadcast, we might choose between one of the following two options:

1. Full accuracy. All intermediate values are present in the dataset, even if they have very short extents.
2. Stepped Filtering. Only steps of more than two buckets will generate intermediate values.

With option 1, a jump of 76-72 would generate 3 additional messages (75, 74, 73). With option 2 it would only generate one additional message (74). Option 2 makes sense when the speed change really is quite sharp, when approaching or leaving an area of high congestion. Option 1 may better represent the 'inchworm' condition John describes where there is a slow slowdown and buildup of speed.

Using 'Detroit 16:00' as the sample, implementing option 1 requires an additional 211 transitions in the data stream. Obviously none of these affect the 'all-segments-the-same' coding, so they require an additional:

$$211\times16=3376 \text{ bits}=422 \text{ bytes}$$

Option 2, where steep transitions are aggregated into fewer steps, required 92 transitions or:

$$92\times16=1472 \text{ bits}=184 \text{ bytes}$$

| Alert-C | BSA-Dir | +Precise-1 | +Precise-2 |
|---|---|---|---|
| 2480 | 871(35.1%) | 1293(52.1%) | 1055(42.5%) |

These numbers suggest that LBB coding by BSA at full resolution would require approximately ⅓-½ of the bandwidth used by Alert-C for the same carousel rates.

TrafficML Coverage Analysis

This analysis is based on the Michigan DOT database of roadways in the state. Although table 8 extends into Ohio covering Toledo, the bulk of the road miles lies within Michigan, but these figures should be treated as being ±5% accurate because of the additional out-of-state coverage.

There are a total of 776,038 roadline records in the whole of the state. The geospatial shape file contains roughly 4,400,000 points so each record represents a line with about 3 internal points (5.5 points per line). Lines that connect have duplicate endpoints, so the number of distinct mesh points would be closer to 3,600,000. The vast majority of those points are on non-TMC coded roads, as shown in the figures in the Topology section above.

The database (.dbf) file categorizes each map segment in two different ways, according to National Function Class (USDOT system) and Framework Classification Code. The following table shows the breakdown of Michigan DOT map segments by National Function Class

| Code | Count | Description |
|---|---|---|
| NFC-1 | 14099 | Interstates |
| NFC-2 | 6831 | Other Freeways |
| NFC-3 | 37622 | Other Principal Arterials |
| NFC-4 | 62965 | Minor Arterials |
| NFC-5 | 82208 | Major Collectors |
| NFC-6 | 11468 | Minor Collectors |
| NFC-7 | 427451 | Local |
| NFC-0 | 133354 | Not a certified public road |

The NFC codes were used to color the map above, NFC-1 roads are wide blue, NFC-2 roads are medium green, NFC-3 roads are medium red, NFC-4 roads are narrow red and NFC-5 and above are narrow grey.

The FCC codes are more detailed and allow us to estimate ramp counts and other data. The following tables enumerate each of the major classifications and their subclasses.

A0 describes roads under construction

| Code | Count | Description |
|---|---|---|
| A00 | 33 | Future road under construction |

A1 describes Limited-Access Highways

| Code | Count | Description |
|---|---|---|
| A11 | 9805 | Limited access Interstate |
| A12 | 5426 | Limited access non-Interstate |
| A13 | 5246 | Ramp to or from a limited access highway |
| A14 | 488 | Rest Area on A11 or A12 road |
| A15 | 394 | Collector/Distributor (between A1 roads) |
| A16 | 1061 | Restricted-use turnaround |

A2 describes US and State Highways

| Code | Count | Description |
|---|---|---|
| A21 | 37470 | Unlimited Access US and State Highways |
| A22 | 1201 | Unsigned State Trunkline Highways |
| A23 | 337 | Ramp to or from an unlimited access highway |
| A24 | 31 | Rest Area on A2 road |
| A25 | 464 | Service drives to limited access freeways |
| A26 | 710 | State Trunkline boulevard turnaround |
| A29 | 86 | Unlimited Access ramp end within boulevard |

A3 describes arterials and collectors based on the NFC system

| Code | Count | Description |
|---|---|---|
| A31 | 153778 | Principal Arterial Roads (other than NFC-7) |
| A32 | 417641 | Minor Arterial Roads (NFC-7) |
| A33 | 9614 | Residential Court or cul-de-sac |
| A36 | 0 | Directional turnarounds |

A4 describes non-certified roads

| Code | Count | Description |
|---|---|---|
| A41 | 107044 | General non-certified |
| A42 | 140 | Turnarounds (median crossings) |
| A43 | 3302 | Non-certified residential court or cul-de-sac |
| A44 | 277 | University-owned roads |
| A45 | 1704 | Forest Roads |
| A46 | 0 | Institutional Roads |
| A47 | 140 | Roads to an Airport |
| A48 | 23 | Roads to an Airport |

A6 describes roads with special characteristics or purposes

| Code | Count | Description |
|---|---|---|
| A61 | 1013 | Unnamed road within cemetery |
| A62 | 2162 | Driveways around malls, etc. |
| A63 | 192 | Driveways |
| A64 | 5347 | Internal Roads in parks |
| A65 | 2154 | Unnamed residential roads (e.g. in trailer parks) |
| A66 | 202 | Vehicular Trails |
| A67 | 789 | Boating Access |
| A68 | 233 | Indian Reservation Roads |
| A69 | 1704 | Other, or yet-to-be-classified roads |

A7 describes non-vehicular 'roads'

| Code | Count | Description |
|---|---|---|
| A71 | 830 | General Trails or Paths |
| A72 | 2590 | Rail-to-Trail |
| A73 | 669 | Pedestrian Overpasses |
| A74 | 0 | Ferry Routes |
| A75 | 318 | Transportation Structure |

A9 describes artificial road features not seen on a map

| Code | Count | Description |
|---|---|---|
| A90 | 1206 | Certified Right of way (not drivable) |
| A91 | 194 | Road whose existence is questioned |
| A92 | 13 | Artificial Road Construct (control break) |

-continued

| Code | Count | Description |
|---|---|---|
| A93 | 6 | Artificial Road Construct (pseudo break) |
| A94 | 1 | Artificial Road Construct (road break) |

The TMC Table 8 breaks down into the following data points

| Code | Count | Description |
|---|---|---|
| L1.1 | 36 | Motorway |
| L1.2 | 38 | National Road |
| L1.3 | 112 | Regional Road |
| L1.4 | 718 | Other Road |
| L3.0 | 88 | Order-1 segment |
| L7.0 | 385 | Ramp |
| P1.1 | 137 | Motorway Intersection |
| P1.11 | 7934 | Crossroads |
| P1.13 | 9 | Intermediate Node |
| P1.3 | 1104 | Motorway Junction |
| P2.0 | 8 | Intermediate Point |
| P3.1 | 1 | Tunnel |
| P3.14 | 93 | Border/frontier |
| P3.16 | 6 | Toll Plaza |
| P3.2 | 8 | Bridge |
| P3.3 | 2 | Service Area |
| P3.4 | 11 | Rest Area |
| P4.0 | 385 | Ramp |

A table at the end of the document correlates the NFC and FCC encodings for the dataset.

Ramps

It is noted that the TMC table identifies 137 points as P1.1, or interstate—interstate intersections. If there are two TMC points per intersection (one on each roadbed), that means there are about 68 interstate intersections in the table. With only 385 ramp points/linears, that indicates an average of only 5.5 ramps per intersection.

This number cannot be compared directly to the count of A13 values in the DOT table because the shape file uses multiple segments to represent a single ramp (for example to render accurately the cloverleaf shape). The 1-275/1-95 intersection has six ramps, but 13 A13 segments, and we can average 2-3 segments per ramp.

Figure 49:
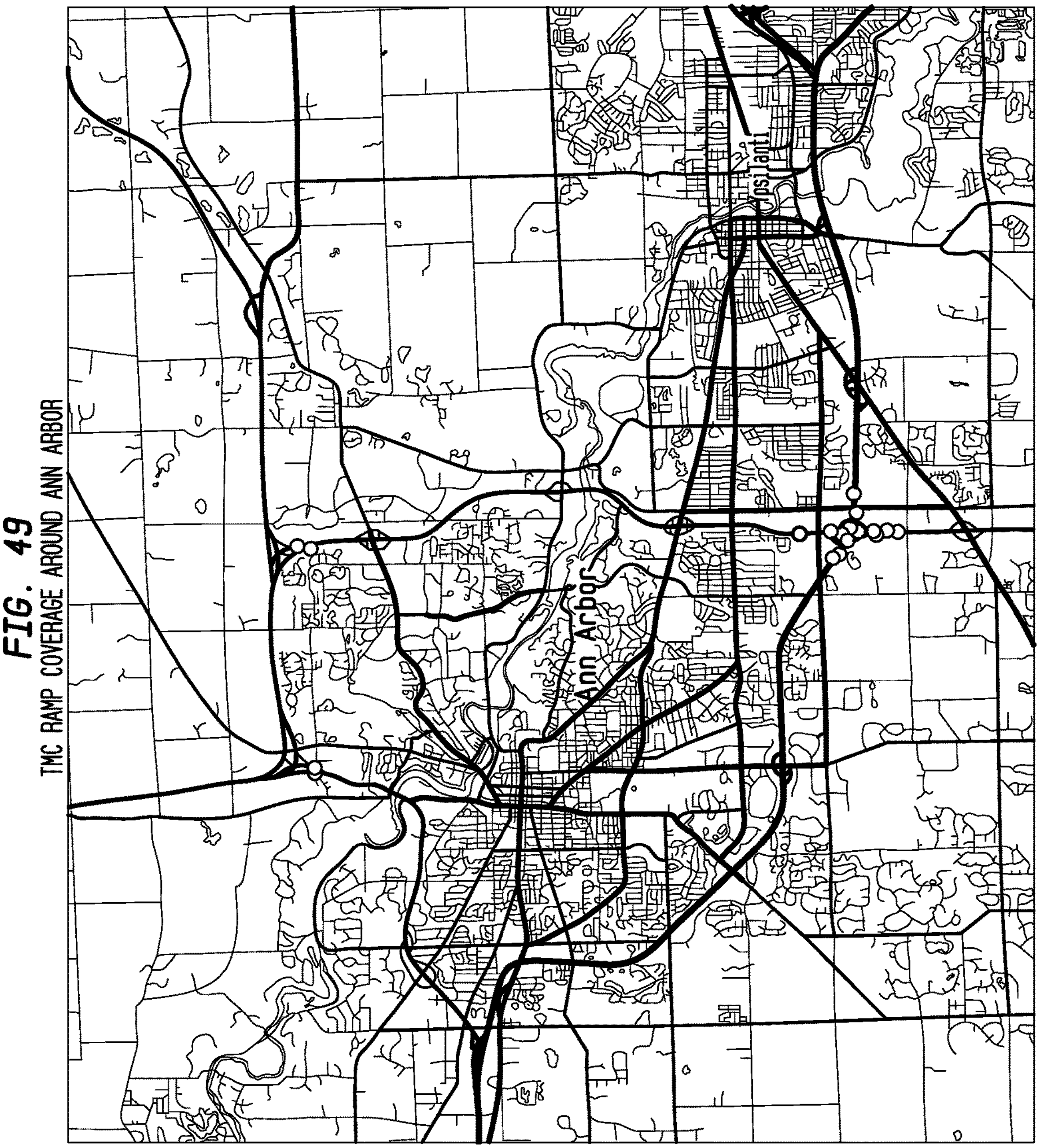
FIG. 49 depicts TMC ramp coverage around Ann Arbor according to an exemplary embodiment of the present invention.
Figure 50:
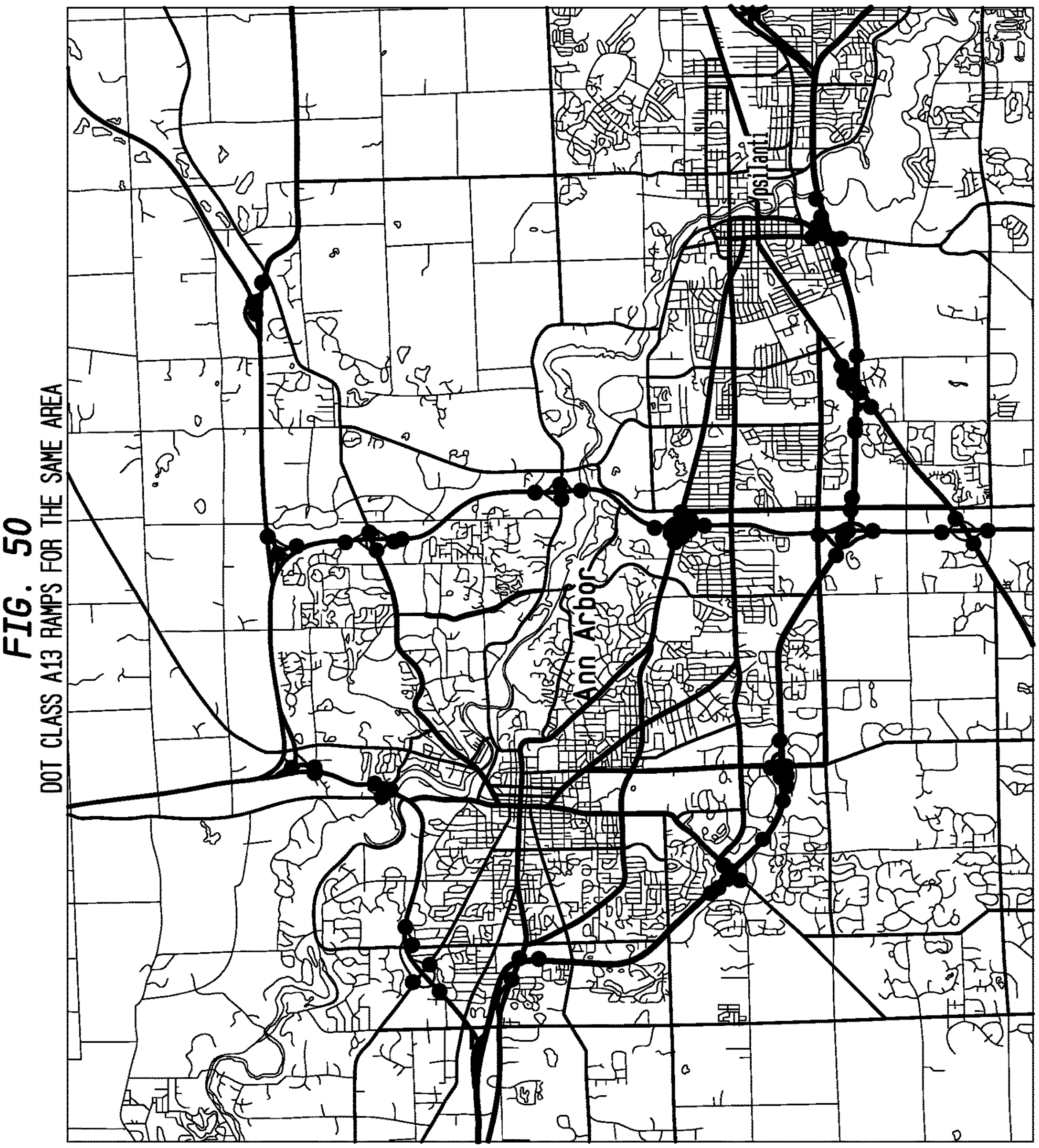
FIG. 50 depicts DOT class A13 ramps for the same area according to an exemplary embodiment of the present invention.

FIG. 49 shows the TMC ramp coverage around Ann Arbor (green dots). Only 3 of the intersections have TMC coded ramps. In contrast, FIG. 50 shows all the DOT class A13 ramps for the same area (yellow dots).

There are 15 separate intersections covered in the same area as the TMC map above.

The DOT table does not distinguish ramps between interstates from other ramps, but comparing a sample of the intersections between the TMC and DOT tables, there are approximately 2-3×the number of DOT segments used to code the same intersection. So from the DOT tables we might expect the true number of ramps to be around 5,200/2.5, or 5,500/2.5 if we include the A23 codes as well (that is around 2,200 ramps). This suggests we would expect a 5.5× increase in data if we coded all the ramps to and from the freeways in the state (which agrees with the 15:3 ratio from the Ann Arbor map).

CA-CA Ramps

Table 8 has fewer than CA-CA 400 ramps, which will take 100 bytes to encode at 2 bits/ramp. The BSA directory structure [Id+Offset+Signature] takes 5 bytes per BSA, or 100 bytes if the ramps span 20 BSAs. Using the standard BSA-directory mode we have:

| | | |
|---|---|---|
| AU overhead | 9 bytes | (1 SDTP packet + CRC-32) |
| Table overhead | 4 bytes | PVN/CARD etc. |
| Per-BSA overhead | 5 bytes | [Id + off + sig] |
| Per-Ramp cost | 2 bits | |
| Alignment overhead | 1 byte/BSA | worst-case |
| Then | | |
| AUs | 32 | 288 bytes |
| Tables | 32 | 128 |
| BSAs | 735 | 3,675 |
| Ramps | 11,000 | 2,750 |
| Alignment | 735 | 735 |

Giving a total for CA-CA ramp coverage of 7,576 bytes assuming that there is at least one ramp in each BSA (which may not be the case for some tables). If we assume the same carousel time as Speed/Flow (60 s) this requires 1 kbps of bandwidth.

It is worth comparing these numbers to the pure Alert-C coding of 1 x5-byte message per TMC ramp location (11,000x5) requiring 55,000 bytes. We can probably code our ramps service for around 5% of the Alert-C code, even when all ramps in the table have coverage.

All Ramps

From the Michigan State analysis, it can be estimated that 385 CA-CA ramps becomes 2,200, so there is roughly a 5.5× increase in the number of ramps. The other parameters remain the same, giving:

| | | |
|---|---|---|
| AUs | 32 | 288 bytes |
| Tables | 32 | 128 |
| BSAs | 735 | 3,675 |
| Ramps | 55,000 | 13,750 |
| Alignment | 735 | 735 |

For a total of 18,576 bytes, or 2.5 kbps.

Incidents & Construction

The following table is constructed from a single carousel of the trafficML data feed

| Class | With TMC | Without TMC | Total |
|---|---|---|---|
| Accident | 193 | 37 | 230 |
| Alert | | 6 | 6 |
| Congestion | 220 | | 220 |
| Construction | 1368 | 742 | 2110 |
| Disabled Veh. | 26 | 1 | 27 |
| Mass Transit | | 58 | 58 |
| Misc. | 14 | 12 | 26 |
| Other News | 31 | 36 | 67 |
| Planned Event | 19 | 20 | 39 |
| Road Hazard | 27 | 27 | 54 |
| Weather | | 96 | 96 |
| Total (ex construction) | 530 | 293 | 823 |

Analysis of Free Text Components

The following are typical of the 'short' and 'normal' construction descriptions:

<TRAFFIC_ITEM_DESCRIPTION TYPE="short_desc">
US-82 between Hwy-25 and CR-20—construction
</TRAFFIC_ITEM_DESCRIPTION>
<TRAFFIC_ITEM_DESCRIPTION TYPE="desc">
US-82 between Hwy-25 and CR-20—construction—Road and bridge work consisting of grade, drain and bridge culvert
</TRAFFIC_ITEM_DESCRIPTION>

The short desc adds no information to the Alert-C code (802=long-tem roadworks) and the TMC+extent data (loc=08479,extent=3), so I used the standard desc.

Accident descriptions follow the same pattern.

<TRAFFIC_ITEM_DESCRIPTION TYPE="short_desc">
SR-61 Carrollton Villa Rica Hwy (#24) on ramp—accident involving an overturned tractor trailer
</TRAFFIC_ITEM_DESCRIPTION>
<TRAFFIC_ITEM_DESCRIPTION TYPE="desc">
SR-61 Carrollton Villa Rica Hwy (#24) on ramp—accident involving an overturned tractor trailer on the right shoulder—fire department, police on the scene
</TRAFFIC_ITEM_DESCRIPTION>

Again, most of the 'color' is in the longer description.

Taking all the of construction events with TMC codes (i.e. those on covered highways), and all of the incident events except class=WEATHER and cleared-accident, we can build the per-table gzipped text files to hold all of the TYPE=desc text fields for a single carousel of all markets:

| Type | Text Size | Compressed Size |
|---|---|---|
| Construction | 172645 | 57470 |
| Incident | 56203 | 26396 |
| Total | 228848 | 83866 |

This would take 22 kbps to send at 30 s intervals, excluding any bits needed to represent the structured form of the event.

Looking at the various forms of the free text for construction, it seems there is a common structure comprising:

<location data>"-"<event data>["-"<timing data><routing data>]

Where <routing data> are introduced by "DETOUR" or "ALTERNATE" in the text. If we assume that any description having a "-" in the middle is minimally in the 'location+event' style, and that the location data is essentially a duplicate of the Alert-C data, we can strip off anything up to that first "-" in the text. Examples of that approach yielded the following strings:

Road work consisting of pavement rehabilitation, planning, resurfacing.

Road and bridge work consisting of grade, drain and bridge culvert

Road work consisting of additional lanes, grade, drain, base, pave, signing and ramp modifications. Lane closures at various times.

Road work consisting of pavement rehabilitation. One lane closure permitted from 7:00 pm to 6:00 am Sunday through Thursday, from 8:00 pm to 9:00 am Friday and from 6:00 pm to 11:00 am Saturday.

Road and bridge work consisting of additional lanes, grade, drain, base, pave, bridge widening and raising, signing and traffic signals.

construction blocking the left lane

Road and bridge work consisting of consisting of grade, drain, base, pave, signing, lighting, and ramp modifications. Closures and delays possible.

Check for Updates When Blinking.

Road and bridge work consisting of grade, drain, base, pave, signing, lighting, and ramp modifications The current triangle area large intersection is being split into two separate intersections.

Road and bridge work consisting of additional lanes, grade, drain, base, pave, bridge widening and raising, signing and traffic signals.

In exemplary embodiments of the present invention, this exemplifies the level of detail to supply in the text. Removing the first phrase from all construction events brings the compressed string tables down to 33139 bytes, or 8.8 kbps at 30 s. Removing any diversion information then brings that to 7.4 kbps. That results in 14.5 kbps for the compressed tables (at 30 s).

Construction—Structured Data

The protocol for construction includes both a structured component and (now) a compressed free text component. We can map the trafficML fields to the proposed protocol;

| Protocol | TrafficML | Notes |
|---|---|---|
| LOCATION | RDS-TMC.ORIGIN.LOCATION_ID | May be multiple locations in a single event (e.g. +ve and −ve directions) |
| DIRECTION | RDS-TMC.DIRECTION | One per LOCATION |
| EVENT | RDS-TMC.ALERTC.TRAFFIC_CODE | Not all construction events are presented as class = 11 alert-c codes |
| EXTENT | RDS-TMC.ALERTC.EXTENT | One per LOCATION |
| DURATION | From end date? | AlertC DURATION is not coded |
| LANES | LANES_BLOCKED.LANE | Sometimes contain the lane details, sometimes just the count of lanes blocked, sometimes text “intermittent lane blockages” |
| ACTIVE | Embedded in text | No explicit trafficML field |
| REAL | TRAFFIC_ITEM_STATUS | Always ACTIVE in the sample we have |
| IMPACT | CRITICALITY | Need to match trafficML definitions |
| START | START_TIME | |
| END | END_TIME | |

The first major difference between the inventive protocol and trafficML is that the trafficML data will contain multiple location references within a single construction event, for example if both sides of the roadway are affected, they will be placed in the same event message.

The second difference is that there is almost always a start and end date given explicitly in the trafficML message. According to Navteq, future events are suppressed from the feed, but we could request that they be supplied, so we should plan to retain start date as an option in the protocol.

An issue is with our LANES and ACTIVE values. Other than the vague descriptions in LANES_BLOCKED both of the values do not appear in tML elements. However they often appear in the free text, for example:

US-24 between CR-4A and CR-221 Hertzfield Rd—road reconstruction one lane gets by in each direction—until November 2012.

11 Mile Rd in both directions between I-696 Reuther Frwy and I-94—ongoing construction blocking the left lane—through August between 44th St (#79) and past 36th St (#80)—road work—expected to block the two right lane at 36th St with a traffic shift until mid-August. Also expect a 10 minute full closure to set the brg beams on Tuesday I-94 in both directions between 30 Mile Rd and 21 Mile Rd—scheduled 6 am-6 pm roving work crew expected to block various lanes until early November.

In the last example we would be able to set the ACTIVE-.daytime bit in our protocol if we could extract that information from the free text description. These examples are all from table 8, which has very detailed descriptions. Other tables may have less details in the descriptions, and also a different structure to the order of the elements in the text.

Implications

In exemplary embodiments of the present invention, there is a good match between the information content in the trafficML feed (for construction) and our protocol. However there is a very poor match between the two structures. The is especially true of the description field since:

i) There is duplication of location information between the TMC portion and the free text.

ii) There is duplication of the duration portion between END_TIME and free text.

iii) There is structured information present only in the free text:

(a) Start and stop times during the day (b) Affected lanes iv) The text field is not limited to 128 characters As an example, the 11 Mile Rd description above could be entirely coded in structured form:

```
<TRAFFIC_CODE>738</TRAFFIC_CODE>
  <LOCATION_ID>10170</LOCATION_ID><EXTENT>1</EXTENT><DIRECTION
>0</DIRECTION>
  <LOCATION_ID>09736</LOCATION_ID><EXTENT>1</EXTENT><DIRECTION
>1</DIRECTION>
  <END_TIME>08/31/2011 21:43:00</END_TIME>
```

Or we could convert END_TIME into ‘4 weeks’ (the sample was taken on 2$^{nd}$ August).

Even the other text descriptions could be cut down for our purposes:

One lane gets by in each direction

Expect traffic shift

Roving work crew blocking various lanes

If a provider can structure the construction data in this format, we can get the free text fields down by probably another 30-50% around 5 kpbs at 30 s if we exclude detour information. Adding in 2 kbps for the structured components (1400 events at 40 bits/event at 30 s/carousel) gives 7-8 kpbs for construction data at 30 seconds.

Incidents

The incident data also has a location component and additional text. Removing the location component brings the zip files down to 19718 bytes, or 5.3 kbps at 30 seconds. If we assume a similar 40-bit encoding for an incident for 700 incidents, that's another 1 kpbs again at 30 s.

Bandwidth Estimates

Assuming we can segment the text fields to remove duplicate information, then using a simple per-table zip file plus a structured encoding we have the following bandwidth estimates:

| Type | Carousel Rate | BitRate |
|---|---|---|
| Construction Strings | 30 s | 5 kbps |
| Construction Data | 30 s | 2 kbps |
| Incident Strings | 30 s | 5.5 kbps |
| Incident Data | 30 s | 1 kpbs |
| Total | | 13.5 kbps |

Bandwidth Reduction Options

The following may be implemented to reduce the bandwidth

Slowing the construction data to 60 s: 5 kbps→3.5 kbps for a total of 10 kbps.

Not transmitting text for a particular table (the strings are zipped at the table level, not the BSA level).

Not transmitting construction events for roads for which we do not have coverage.

Reducing incident coverage to only TMC-coded roads.

Predictive

In exemplary embodiments of the present invention, archives of actual data can be used to estimate the bandwidth required for a predictive service. Assuming perfect knowledge, then the actual data transmitted at (T+τ) is an ideal approximation to the +τ prediction computed at time T.

Delta Coding

Predictive data are delta-coded from a previous state. The first predictive dataset is delta-coded from the most recent Real-Time Speed/Flow data. The second predictive dataset is delta-coded from the first, and so on.

Because we cannot guarantee which 'current' dataset is in the receiver, the delta-coding mechanism uses an absolute replacement value, rather than an increment/decrement to the current speed bucket. When the dataset is prepared, it is computed against a particular current dataset, but the resulting pattern will work against any stored values, with improved results. The following table shows how the code operates:

| From | To | Coded As | Description |
|---|---|---|---|
| No cover | 8 | 8 | Replace missing coverage by 8 |
| 8 | 8 | 0 | 0 means 'do not change the value' |
| 8 | 9 | 9 | Replace 8 by 9 |
| 8 | No cover | 15 | 15 means 'replace with no coverage' |

Given two patterns, the delta-difference is then just another pattern which is encoded using exactly the same rules as for ordinary patterns. In the case where the whole of a linear is unchanged between the two patterns, the resulting pattern is zero everywhere along the linear, which is compactly encoded using just '00' in the bitstream, meaning 'do not change any values in this linear'.

Filtering and Smoothing

The bandwidth required for predictive datasets depends on the choice of filtering and smoothing that is applied to the two original datasets. Since we are delta-coding against a transmitted pattern, the calculation of the delta code must match the pattern that is transmitted, so it must be computed after the pattern has been filtered and smoothed. It makes no sense to filter the delta-coding less aggressively than the original data, but we may choose to filter it more aggressively. The calculations also assume that Predictive data are transmitted at TMC-segment granularity, not subsegment. The proposed algorithm for the delta-coding against the fine-grained real-time values uses a fixed mean-value filter on the real-time data as follows:

```
if (real_time_sum_of_sub_segments >> 3) == predictive_TMC_value
    code = 0;                    // no change from pattern
else
    code = predictive_TMC_value;
```

At the receiver, when code==0, all 8 sub-segments for that segment are set to: (real_time_sum_of_sub_segments>>3).

The table below gives examples of the encoded sizes for various filtering options. Each cell contains two values, the upper value is the basic delta code, the lower value has an additional mean-value smoothing filter applied after the delta values have been computed.

| | | 15550 Raw | 12830 L- | 12714 H- | 6814 -S | 6257 LS | 5890 HS |
|---|---|---|---|---|---|---|---|
| 15459 | Raw | 6662<br>5558 | | | | | |
| 12755 | L- | | 5685<br>4873 | | | | |
| 12629 | H- | | | 5623<br>4735 | | | |
| 6827 | -S | | | | 3710<br>3562 | 2913<br>2773 | 3635<br>3507 |
| 6219 | LS | | | | | 3843<br>3615 | 2532<br>2432 |
| 5872 | HS | | | | | | 3106<br>2993 |

The values running down the left-hand side are the encoding sizes for the first dataset (taken at 17:00:57). The values running across the top row are the encoding sides for the second dataset (taken at 17:15:23).

More aggressive filtering does not always result in a smaller encoded dataset since this may increase the number of differences between the two datasets, which increases the encoding.

Delta Reduction

There is one other operation that can be performed on the difference data, to reduce encoding size. Looking at the Raw-Raw data (most detailed), the table below shows the actual delta values bucket-by-bucket in the output.

| | | | | | | | | | | |
|---|---|---|---|---|---|---|---|---|---|---|
| — | | | | | | | | | 1 | |
| | — | 2 | | 1 | | | | | | 1 |
| | 2 | — | 5 | 5 | | 2 | 1 | | 1 | 1 |
| | 1 | 10 | — | 59 | 22 | 13 | 1 | 1 | 2 | |

-continued

| | | | | | | | | | | | |
|---|---|---|---|---|---|---|---|---|---|---|---|
| 6 | 79 | — | 190 | 51 | 9 | 1 | 1 | | | | 2 |
| 2 | 15 | 202 | — | 303 | 42 | 5 | 1 | 1 | | | 1 |
| | 1 | 30 | 226 | — | 152 | 26 | 4 | | | | |
| | 3 | 7 | 49 | 171 | — | 85 | 8 | 5 | | 2 | |
| | | 1 | 7 | 23 | 88 | — | 57 | 15 | 3 | 2 | |
| | | | 1 | 5 | 15 | 51 | — | 50 | 5 | 2 | 2 |
| | 1 | | 1 | 2 | 1 | 10 | 51 | — | 66 | 8 | 0 |
| | | 2 | 1 | 1 | | 7 | 10 | 55 | — | 13 | 3 |
| | | | | | 1 | 2 | 3 | 2 | 31 | — | 95 |
| | | | | | | 1 | | 2 | 9 | 83 | — |

Each column is a speed bucket in the current dataset [1 . . . 14]. Each row is a speed bucked in the predictive dataset [1 . . . 14]. Each cell is the count of delta-coded points for that transition, the diagonal is trivially zero since unchanged values are not delta-coded. The immediate observation from the table is that most of the changes are only a single bucket-value, ±1. If we consider those to be insignificant changes, we can remove those values before delta coding. We might consider two options: the first is only to suppress +1 changes (i.e. places where the predicted speed is one bucket faster than the current speed); the second is to suppress both +1 and −1 values. The former is in keeping with our generally pessimistic view of congestion, while the second will reduce bandwidth, probably with little visible effect.

+1 Removal Only

| | | | | | | | | | | | | | |
|---|---|---|---|---|---|---|---|---|---|---|---|---|---|
| — | | | | | | | | | | | | 1 | |
| | — | | | 1 | | | | | | | | | 1 |
| | 2 | — | | 5 | | 2 | 1 | | | | | 1 | 1 |
| | 1 | 10 | — | | 22 | 13 | 1 | 1 | | | | 2 | |
| | | 6 | 79 | — | | 51 | 9 | 1 | 1 | | | | 2 |
| | | 2 | 15 | 202 | — | | 42 | 5 | 1 | 1 | | | 1 |
| | | | 1 | 30 | 226 | — | | 26 | 4 | | | | |
| | | | 3 | 7 | 49 | 171 | — | | 8 | 5 | | 2 | |
| | | | | 1 | 7 | 23 | 88 | — | | 15 | 3 | 2 | |
| | | | | | 1 | 5 | 15 | 51 | — | | 5 | 2 | 2 |
| | | | 1 | | 1 | 2 | 1 | 10 | 51 | — | | 8 | 0 |
| | | | | 2 | 1 | 1 | | 7 | 10 | 55 | — | | 3 |
| | | | | | | | 1 | 2 | 3 | 2 | 31 | — | |
| | | | | | | | | 1 | | 2 | 9 | 83 | — |

This requires only 4415 bytes to encode (compared to 6662 for the original dataset).

±1 Removal

| | | | | | | | | | | | | | |
|---|---|---|---|---|---|---|---|---|---|---|---|---|---|
| — | | | | | | | | | | | | 1 | |
| | — | | | 1 | | | | | | | | | 1 |
| | | — | | 5 | | 2 | 1 | | | | | 1 | 1 |
| | 1 | | — | | 22 | 13 | 1 | 1 | | | | 2 | |
| | | 6 | | — | | 51 | 9 | 1 | 1 | | | | 2 |
| | | 2 | 15 | | — | | 42 | 5 | 1 | 1 | | | 1 |
| | | | 1 | 30 | | — | | 26 | 4 | | | | |
| | | | 3 | 7 | 49 | | — | | 8 | 5 | | 2 | |
| | | | | 1 | 7 | 23 | | — | | 15 | 3 | 2 | |
| | | | | | 1 | 5 | 15 | | — | | 5 | 2 | 2 |
| | | | 1 | | 1 | 2 | 1 | 10 | | — | | 8 | 0 |
| | | | | 2 | 1 | 1 | | 7 | 10 | | — | | 3 |
| | | | | | | | 1 | 2 | 3 | 2 | | — | |
| | | | | | | | | 1 | | 2 | 9 | | — |

This requires only 1712 bytes to encode.

Combined Options

The table below shows the dataset sizes for the lower-right-hand corner of the table above.

| | None | +1 removal | ±1 removal |
|---|---|---|---|
| LS-LS | 3843 | 2792 | 1750 |
| | 3615 | 2768 | 1742 |
| LS-HS | 2532 | 2087 | 1385 |
| | 2432 | 2050 | 1377 |
| HS-HS | 3106 | 2520 | 1593 |
| | 2995 | 2490 | 1583 |

The 'None' column matches the values in the original table, as expected. The two values, upper and lower and without and with additional mean-value smoothing.

These values suggest that each predictive pattern takes approximately 25% of the original pattern to encode. Sending 3 predictive datasets every 90 seconds would then require:

$$(3\times 0.25\times B)\times\frac{2}{3}=0.5\times B$$

Bits/second, where B is the bandwidth of the Real-Time service with a 60 s carousel time.

Estimated bitrate for predictive data: 11 kbps

Forecast Data

In exemplary embodiments of the present invention, forecast Data extend the range of predictive to the point where the data are approaching historical. For each forecast point we transmit a pattern index that is closest to the desired forecast state, using the perceived error M3 metric. If we send 1 hour forecasts for the next 24 hours, for each BSA in the country we don't need a BSA directory, since the BSA indexes of offsets are fixed. For only 24 values, the burden on the receiver to do change detection is minimal, and we do not need to supply a signature value.

| | | |
|---|---|---|
| AU overhead | 9 bytes | (1 SDTP packet + CRC-32) |
| Table overhead | 4 bytes | PVN/CARD etc. |
| Forecast cost | 24 bytes | per BSA |
| Then | | |
| AUs | 32 | 288 bytes |
| Tables | 32 | 128 |
| Forecasts | 735 | 17,640 |

For a total of 18,056 bytes, or 1.2 kbps at a carousel rate of 120 s.

Historic Patterns

Historic Patterns are transmitted as single-byte pattern selectors, according to the M3 metric. Each map is 960 bytes per BSA (24×4×2x5) or 706 kbytes, requiring 2.6 kbps to deliver in 40 minutes.

Base Patterns

Base Patterns are coded in exactly the same way as Real-Time S/F patterns, though we may choose to quantize the data more aggressively (e.g. at the segment rather than sub-segment level).

Navteq Patterns

In exemplary embodiments of the present invention, the analysis of coding and bandwidth for Base Patterns is based on the data to which we currently have access, namely the Navteq 'traffic pattern' product. The Navteq traffic pattern dataset is a 68 Mbyte zip archive containing seven pattern datasets, one for each day of the week. Each dataset is a CSV file approximately 136 Mbyte in size, containing 464,476 data records, covering the entire country (approx 1 Gbyte of data).

Each data record is for a single TMC point and direction and contains 96 speed values at 15 minute intervals, as integer miles per hour, for example:

| Table | Direction | Point | 00:00 | 00:15 | 00:30 | 00:45 | 01:00 | 01:15 | 01:30 |
|---|---|---|---|---|---|---|---|---|---|
| 108 | P | 06859 | 35 | 35 | 35 | 35 | 35 | 35 | 35 |

The structure of these data does not match the proposed Apogee model, but all the data are present that we need to build datasets to our own specifications, by extracting individual patterns by table. The first observation is that the history patterns cover all the TMCs in the table, not just those for which we have Apogee flow coverage, so any patterns must first be reduced to our coverage area before encoding.

The next step is to break the patterns down by BSA. This leads to datasets containing 1,500 points (3,000 rows) for BSA 13 (Detroit) and 2,000 points (4,000 rows) for BSA 25 (North Detroit).

We can now treat each of the 672 datasets for each BSA as a pattern, and look for pattern clusters. To do this we first round each speed value down to its bucket value (using 5 mph buckets) and then group the datasets into clusters that are sufficiently similar to each other.

The definition of 'sufficiently' similar is:

Pattern X is a sufficiently similar approximation to pattern Y if and only if, for each TMC point and direction:
- the value of pattern Y does not exceed the value of pattern X by more than two buckets; and
- the value of pattern X does not exceed the value of pattern Y by more than one bucket Note that this definition is not symmetric, we weight errors indicating incorrect free-flow more heavily than errors indicating spurious congestion. This gives the basis for building a cluster model. With only 672 datasets it is possible to enumerate the number of patterns similar to each pattern in the dataset.

For BSA 25 (North Detroit), the dataset representing Tuesday at 22:00 is sufficiently similar to another 171 patterns. This pattern is an obvious contender for inclusion in the master list of patterns we would use. It roughly corresponds to the generic 'nighttime' pattern. We can remove that pattern, and all its similar patterns (172 in total), from the dataset, and rebuild the similarity counts, now with only 500 patterns.

Repeating this procedure for all the 672 patterns in the dataset yields the following table:

| Cluster Size | Number of Clusters | Cumulative Patterns | Cumulative Coverage |
|---|---|---|---|
| 172 | 1 | 1 | 172 |
| 17 | 1 | 2 | 189 |
| 16 | 2 | 4 | 221 |
| 15 | 2 | 6 | 251 |
| 11 | 1 | 7 | 262 |
| 10 | 5 | 12 | 312 |
| 9 | 1 | 13 | 321 |
| 8 | 5 | 18 | 361 |
| 7 | 11 | 29 | 438 |
| 6 | 11 | 40 | 504 |
| 5 | 15 | 55 | 579 |
| 4 | 11 | 66 | 623 |
| 3 | 6 | 72 | 641 |
| 2 | 6 | 78 | 653 |
| 1 | 19 | 97 | 672 |

This implies that 97 patterns are sufficient to represent all the historical data for North Detroit according to the (quite strict) ‘sufficiently-similar’ definition given above. 64 patterns would account for 90% of the historical data.

Repeating the same process for BSA 13 (Detroit) yields similar numbers

| Cluster Size | Number of Clusters | Cumulative Patterns | Cumulative Coverage |
|---|---|---|---|
| 194 | 1 | 1 | 194 |
| 20 | 1 | 2 | 214 |
| 16 | 2 | 4 | 246 |
| 15 | 2 | 6 | 276 |
| 14 | 1 | 7 | 290 |
| 12 | 2 | 9 | 314 |
| 11 | 3 | 12 | 347 |
| 10 | 4 | 16 | 387 |
| 9 | 4 | 20 | 423 |
| 8 | 6 | 26 | 471 |
| 7 | 6 | 32 | 513 |
| 6 | 9 | 41 | 567 |
| 5 | 9 | 50 | 612 |
| 4 | 4 | 54 | 628 |
| 3 | 6 | 60 | 646 |
| 2 | 6 | 66 | 658 |
| 1 | 14 | 80 | 672 |

So 80 patterns will cover Detroit, and 64 patterns will cover 96% of the historical data.

Looking at one of the smaller BSAs (Flint), the number of patterns is even fewer:

| Cluster Size | Number of Clusters | Cumulative Patterns | Cumulative Coverage |
|---|---|---|---|
| 232 | 1 | 1 | 232 |
| 63 | 1 | 2 | 295 |
| 31 | 1 | 3 | 326 |
| 24 | 1 | 4 | 350 |
| 21 | 1 | 5 | 371 |
| 19 | 1 | 6 | 390 |
| 17 | 2 | 8 | 424 |
| 16 | 1 | 9 | 440 |
| 15 | 1 | 10 | 455 |
| 13 | 2 | 12 | 481 |
| 12 | 2 | 14 | 505 |
| 11 | 2 | 16 | 527 |
| 10 | 2 | 18 | 547 |
| 9, 8, 7 | 2, 1, 2 | 23 | 587 |
| 6, 5, 4 | 6, 4, 2 | 35 | 651 |
| 3, 2 | 2, 5 | 42 | 667 |
| 1 | 5 | 47 | 672 |

Requiring only 47 patterns to cover the complete history.

Encoding of Patterns

The analysis above uses the ‘raw’ data supplied by Navteq. The patterns that are extracted are exact patterns out of the supplied dataset. Since each pattern is guaranteed to match itself, the process will always terminate (with some 1-element clusters). In reality we would want to apply our filtering and smoothing algorithms to the patterns to prepare them for transmission. However, applying the strict similarity test between the smoothed patterns and the original datasets does not terminate, since spike removal causes a pattern no longer to match itself (comparing smoothed against original).

Our approach will require extracting the exact patterns using the algorithm (or a similar one) described above, then smoothing the resulting pattern set, followed by a second phase to redistribute exact patterns into the new clusters.

Bandwidth

If we quantize at the segment level, the pattern sizes will be similar to those in the coding samples. From the trafficML table, a complete pattern will be somewhere between 150 kbytes and 300 kbytes depending on how heavily it is smoothed. Taking the lower value, we can encode 16 patterns into a 2.4 Mbyte dataset, which is a good number for RFD transmission (that’s 600 RFD blocks). Assuming the usual +10 overhead and feeding those numbers into the RFD calculator, we require 9 kbps to deliver that update in 40 minutes. This assumes that we only update 16 patterns at a time.

Use of Patterns for History

As supplied, the Navteq dataset is a 7-day model, unlike the proposed Apogee model (Mon-Thu, Fri, Sat, Sun, Holiday). Comparing the two models, the Navteq dataset does not have data for explicit ‘Holidays’ only for generic weekdays. Also the Navteq dataset does not distinguish seasonal data. From the cluster analysis, the datasets align more through the day, rather than across the days. For example there is an identifiable cluster that represents “Thursday lunchtime”, but it not sufficiently close to “Monday lunchtime” that they fall into the same cluster.

If we wish to maintain the Mon-Thu model we need to generate suitable patterns that run across the days, then apply the clustering algorithms to those datasets. Without knowing if Navteq has retained the original input data with timestamps, we cannot determine f we can map their temporal model into ours.

Pattern Evolution

The analysis above has determined that the Navteq pattern dataset could be used a basis for the Apogee Forecast and Historical service elements. We can convert their patterns into at most 128 patterns for each BSA, leaving room for more refined data (e.g, Summer/Winter or holidays). However we may also wish to specify that our chosen provider start to build a more accurate dataset over the next 2 years to our specifications, closer the Apogee architecture. We can choose to focus on high-probe-density roads and build an update that has improved parametric separation on FC1-2 roadways while using the same base data for lower-class roads.

| Table Linears | | | | | | | | |
|---|---|---|---|---|---|---|---|---|
| | | Table Data | | | Current Alert-C | | TrafficML | |
| Table ID | Table Name | Distinct Linears | BSA Linears | Distinct Points | Covered Linears | Covered Points | Covered Linears | Covered Points |
| 1 | Atlanta | 1008 | 1452 | 10136 | 51 | 700 | 581 | 3483 |
| 2 | Florida | 1985 | 2174 | 12583 | 175 | 2054 | 1543 | 9509 |
| 3 | Philadelphia | 1398 | 1674 | 8938 | 97 | 1074 | 1231 | 6297 |
| 4 | Pittsburgh | 611 | 826 | 6947 | 79 | 773 | 492 | 3742 |
| 5 | San Francisco | 1993 | 2140 | 13953 | 90 | 1741 | 1355 | 9282 |
| 6 | Los Angeles | 2108 | 2179 | 14344 | 105 | 1985 | 1827 | 12795 |
| 7 | Chicago | 810 | 1075 | 11214 | 92 | 1213 | 673 | 6701 |
| 8 | Detroit | 960 | 1197 | 9313 | 87 | 1177 | 781 | 6023 |
| 9 | Ontario | 755 | 845 | 6623 | 3 | 27 | 425 | 2901 |
| 10 | Baltimore | 1257 | 1541 | 10035 | 128 | 1570 | 1070 | 6813 |
| 11 | Dallas | 1316 | 1575 | 13454 | 141 | 1968 | 948 | 7939 |
| 12 | Houston | 860 | 1039 | 9539 | 103 | 1823 | 603 | 5385 |
| 13 | Memphis | 532 | 745 | 6454 | 44 | 666 | 307 | 2450 |
| 14 | Seattle | 1951 | 2088 | 9273 | 72 | 1126 | 996 | 4760 |
| 15 | Phoenix | 589 | 668 | 6222 | 46 | 860 | 458 | 4387 |
| 16 | Denver | 745 | 955 | 5900 | 58 | 957 | 559 | 3272 |
| 17 | IO-MT-WY | 129 | 188 | 2051 | — | — | 27 | 599 |
| 18 | Minneapolis | 1030 | 1490 | 12902 | 115 | 1282 | 672 | 4700 |
| 19 | St. Louis | 832 | 1175 | 10155 | 75 | 1046 | 500 | 3738 |
| 20 | New York | 3125 | 3438 | 18469 | 190 | 2441 | 2707 | 14300 |
| 21 | Nashville | 507 | 794 | 6302 | 47 | 417 | 372 | 2475 |
| 22 | Cincinnati | 1251 | 1559 | 10589 | 97 | 866 | 794 | 5067 |
| 23 | B. Columbia | 513 | 545 | 2978 | — | — | 109 | 702 |
| 24 | Quebec | 519 | 619 | 4033 | — | — | 142 | 1094 |
| 25 | Charlotte | 1397 | 1793 | 10840 | 93 | 1062 | 848 | 5023 |
| 26 | (Hawai`i) | 90 | 90 | 605 | — | — | 50 | 320 |
| 27 | (Alberta) | 255 | 255 | 1790 | — | — | 152 | 950 |
| 28 | (Manitoba) | 62 | | | — | — | | |
| 29 | Boston | 1450 | 1561 | 8778 | 70 | 907 | 1078 | 5860 |
| 30 | New Brunswick | 45 | | | — | — | | |
| 31 | (Sasketchewan) | 71 | | | — | — | | |
| 33 | (Alaska) | 146 | | | — | — | | |
| 34 | (Newfoundland) | 51 | | | — | — | | |
| 35 | (NW Territories) | 6 | | | — | — | | |
| 36 | (Mexico) | 1104 | | | — | — | | |

Michigan BSAs

The Michigan (table 8) BSAs cover a region of −87.325980, 40.989530 to −82.424480, 46.670640. It includes 32 'superlinears', i.e. linears that are the parent of other linears, and have no points as immediate children. The remaining linears and points are divided as follows.

| | | Table Data | | | | | | | |
|---|---|---|---|---|---|---|---|---|---|
| | | | | | | Current Alert-C | | TrafficML | |
| Id | Name | Counties | Total Non-ramp Linears | Non-ramp Points | Ramps | Covered Linears | Covered Points | Covered Linears | Covered Points |
| 7 | Adrian | 1 | 7 | 60 | 0 | 0 | 0 | 1 | 1 |
| 8 | Ann Arbor | 1 | 103 | 491 | 27 | 7 | 43 | 72 | 354 |
| 9 | Big Rapids | 5 | 11 | 113 | 0 | 1 | 15 | 1 | 15 |
| 10 | Bowling Green | 5 | 46 | 413 | 35 | 10 | 85 | 31 | 232 |
| 11 | Clinton Co. | 1 | 9 | 65 | 0 | 0 | 0 | 9 | 64 |
| 12 | Coldwater | 1 | 5 | 21 | 0 | 0 | 0 | 1 | 5 |
| 13 | Detroit | 1 | 222 | 1690 | 157 | 15 | 203 | 185 | 1470 |
| 14 | East Lansing | 1 | 22 | 159 | 0 | 0 | 0 | 22 | 158 |
| 15 | Flint | 1 | 28 | 242 | 0 | 8 | 58 | 28 | 197 |
| 16 | Grand Rapids | 3 | 101 | 792 | 64 | 12 | 145 | 51 | 443 |
| 17 | Hillsdale Co. | 1 | 5 | 43 | 0 | 0 | 0 | 1 | 1 |
| 18 | Jackson | 1 | 10 | 96 | 0 | 0 | 0 | 3 | 26 |
| 19 | Kalamazoo | 6 | 33 | 324 | 0 | 6 | 60 | 13 | 130 |
| 20 | Lansing | 1 | 9 | 57 | 0 | 0 | 0 | 9 | 57 |
| 21 | Ludington | 2 | 4 | 29 | 0 | 1 | 9 | 2 | 10 |
| 22 | Monroe | 1 | 24 | 169 | 4 | 4 | 37 | 7 | 42 |
| 23 | Montpelier | 3 | 12 | 137 | 0 | 1 | 4 | 1 | 4 |
| 24 | Muskegon | 2 | 9 | 78 | 0 | 3 | 22 | 6 | 42 |
| 25 | North Detroit | 5 | 307 | 2358 | 72 | 17 | 203 | 242 | 1991 |
| 26 | Northern Michigan | 15 | 32 | 277 | 0 | 3 | 63 | 6 | 93 |
| 27 | Saginaw | 4 | 19 | 303 | 0 | 3 | 30 | 5 | 32 |

-continued

| | | | Table Data | | | Current Alert-C | | TrafficML | |
|---|---|---|---|---|---|---|---|---|---|
| Id | Name | Counties | Total Non-ramp Linears | Non-ramp Points | Ramps | Covered Linears | Covered Points | Covered Linears | Covered Points |
| 28 | Shiawassee Co. | 1 | 5 | 55 | 0 | 1 | 5 | 3 | 11 |
| 29 | St Joseph | 3 | 18 | 178 | 0 | 3 | 30 | 3 | 30 |
| 30 | Toledo | 1 | 125 | 823 | 26 | 14 | 165 | 79 | 615 |
| 31 | Traverse City | 4 | 8 | 95 | 0 | 0 | 0 | 0 | 0 |
| 32 | Alpena | 6 | 7 | 95 | 0 | 0 | 0 | 0 | 0 |
| 33 | Petoskey | 3 | 6 | 49 | 0 | 0 | 0 | 0 | 0 |
| 34 | Alger County | 3 | 7 | 62 | 0 | 0 | 0 | 0 | 0 |
| 35 | Sanilac | 1 | 3 | 39 | 0 | 0 | 0 | 0 | 0 |

The count of non superlinears increases from 960 without BSA splitting to 1197 after linears are split at BSA boundaries.

| Recoding Current | | | | | | | | | | | | | | | | | | | | |
|---|---|---|---|---|---|---|---|---|---|---|---|---|---|---|---|---|---|---|---|---|
| | Florida | | | | Los Angeles | | | | Detroit | | | | Seattle | | | | NYC | | | |
| Hr | A-C | Table | BSA | BSA dir | A-C | Table | BSA | BSA dir | A-C | Table | BSA | BSA dir | A-C | Table | BSA | BSA dir | A-C | Table | BSA | BSA dir |
| 0 | 3130 | 856 | 1075 | 938 | 2895 | 698 | 789 | 752 | 1735 | 414 | 625 | 517 | 1720 | 517 | 684 | 589 | 4885 | 1149 | 1453 | 1306 |
| 1 | 3135 | 836 | 1058 | 920 | 2585 | 557 | 641 | 605 | 1705 | 410 | 608 | 500 | 1610 | 436 | 631 | 535 | 4290 | 982 | 1322 | 1177 |
| 2 | 3215 | 822 | 1033 | 896 | 2845 | 677 | 766 | 730 | 1660 | 389 | 598 | 490 | 1605 | 473 | 649 | 555 | 4170 | 970 | 1286 | 1140 |
| 3 | 3100 | 811 | 1014 | 878 | 2580 | 542 | 630 | 594 | 1670 | 394 | 605 | 497 | 1565 | 462 | 622 | 527 | 4205 | 1006 | 1356 | 1210 |
| 4 | 3085 | 786 | 1003 | 867 | 2535 | 651 | 708 | 672 | 1650 | 394 | 596 | 487 | 1505 | 475 | 637 | 543 | 3905 | 906 | 1235 | 1090 |
| 5 | 3105 | 817 | 1048 | 910 | 2570 | 568 | 625 | 589 | 1620 | 377 | 586 | 478 | 1585 | 452 | 614 | 519 | 4120 | 954 | 1234 | 1139 |
| 6 | 3080 | 816 | 1035 | 899 | 2600 | 625 | 709 | 672 | 1575 | 369 | 571 | 462 | 1645 | 490 | 651 | 556 | 4315 | 1014 | 1365 | 1220 |
| 7 | 3160 | 901 | 1122 | 935 | 2650 | 574 | 635 | 599 | 1535 | 328 | 526 | 418 | 1545 | 445 | 613 | 518 | 4395 | 1129 | 1443 | 1296 |
| 8 | 3415 | 1018 | 1265 | 1134 | 2630 | 609 | 668 | 632 | 1555 | 350 | 548 | 440 | 1580 | 439 | 623 | 527 | 4470 | 1151 | 1492 | 1345 |
| 9 | 3680 | 1127 | 1404 | 1273 | 2750 | 569 | 651 | 615 | 1565 | 344 | 545 | 437 | 1650 | 484 | 655 | 559 | 4695 | 1261 | 1556 | 1408 |
| 10 | 4050 | 1306 | 1589 | 1458 | 2830 | 677 | 762 | 725 | 1625 | 387 | 586 | 478 | 1590 | 449 | 635 | 539 | 4960 | 1367 | 1689 | 1543 |
| 11 | 4700 | 1632 | 1900 | 1769 | 2810 | 711 | 782 | 746 | 1830 | 470 | 679 | 569 | 1740 | 542 | 715 | 620 | 5315 | 1459 | 1794 | 1648 |
| 12 | 5660 | 2058 | 2331 | 2204 | 2835 | 651 | 747 | 710 | 2115 | 610 | 822 | 713 | 1790 | 540 | 718 | 623 | 5945 | 1782 | 2117 | 1973 |
| 13 | 6470 | 2442 | 2728 | 2600 | 3115 | 810 | 868 | 831 | 2395 | 770 | 980 | 871 | 2080 | 657 | 812 | 718 | 6425 | 1946 | 2282 | 2141 |
| 14 | 6365 | 2396 | 2686 | 2559 | 3200 | 802 | 884 | 848 | 2400 | 727 | 958 | 849 | 2440 | 827 | 997 | 903 | 6435 | 1957 | 2310 | 2168 |
| | 6400 | 2456 | 2731 | 2605 | 3310 | 850 | 933 | 897 | 2475 | 760 | 932 | 874 | 2880 | 1038 | 1217 | 1126 | 6760 | 2103 | 2444 | 2303 |
| 16 | 6450 | 2440 | 2719 | 2592 | 3485 | 998 | 1077 | 1043 | 2480 | 757 | 979 | 871 | 2955 | 1038 | 1220 | 1131 | 6875 | 2139 | 2451 | 2308 |
| 17 | 6345 | 2358 | 2646 | 2519 | 3490 | 963 | 1039 | 1002 | 2445 | 765 | 986 | 878 | 3050 | 1101 | 1266 | 1177 | 7035 | 2189 | 2590 | 2450 |
| 18 | 5720 | 2069 | 2343 | 2216 | 3690 | 1093 | 1159 | 1127 | 2230 | 647 | 867 | 759 | 3095 | 1102 | 1282 | 1192 | 7170 | 2253 | 2631 | 2490 |
| 19 | 4460 | 1486 | 1760 | 1627 | 3545 | 957 | 1037 | 1000 | 1780 | 458 | 657 | 547 | 3065 | 1156 | 1325 | 1235 | 6485 | 1890 | 2248 | 2108 |
| 20 | 3155 | 858 | 1061 | 925 | 3720 | 1019 | 1083 | 1050 | 1500 | 295 | 503 | 394 | 3100 | 1128 | 1309 | 1221 | 6210 | 1804 | 2154 | 2007 |
| 21 | 3035 | 785 | 982 | 846 | 3565 | 1062 | 1153 | 1121 | 1520 | 320 | 520 | 412 | 2630 | 918 | 1117 | 1024 | 5705 | 1450 | 1790 | 1646 |
| 22 | 3115 | 816 | 1036 | 900 | 3395 | 886 | 964 | 928 | 1515 | 324 | 522 | 414 | 2285 | 789 | 974 | 880 | 5360 | 1354 | 1667 | 1522 |
| 23 | 3085 | 817 | 1030 | 894 | 2945 | 670 | 763 | 726 | 1505 | 320 | 520 | 412 | 1710 | 511 | 698 | 603 | 5005 | 1387 | 1713 | 1567 |

Bandwidth Estimates for trafficML

'Raw' column simply encodes the full dataset at 5 mph granularity. L- and H- indicate removal of Low and High spikes (only). -S indicates mean-value smoothing. LS and HS are mean-value smoothed after removal of Low and High spikes, respectively.

| Market | Raw | L- | H- | -S | LS | HS |
|---|---|---|---|---|---|---|
| Atlanta | 10643 | 9118 | 8986 | 5473 | 5045 | 4740 |
| Florida | 26210 | 22160 | 21920 | 12302 | 11158 | 10511 |
| Philadelphia | 17906 | 15529 | 15389 | 9141 | 8455 | 8080 |
| Pittsburgh | 10366 | 8755 | 8669 | 5059 | 4572 | 4280 |
| San Francisco | 23649 | 20057 | 19809 | 11145 | 10285 | 9651 |
| Los Angeles | 32911 | 27248 | 26964 | 14164 | 12783 | 12114 |
| Chicago | 17274 | 14118 | 13952 | 7491 | 6726 | 6278 |
| Detroit | 15459 | 12755 | 12629 | 6827 | 6219 | 5872 |
| Ontario | 7572 | 6361 | 6269 | 3728 | 3431 | 3215 |
| Baltimore | 18245 | 15603 | 15378 | 8796 | 8030 | 7564 |
| Dallas | 16848 | 14456 | 14347 | 7858 | 7311 | 6951 |
| Houston | 13526 | 11248 | 11126 | 6375 | 5844 | 5479 |

-continued

| Market | Raw | L- | H- | -S | LS | HS |
|---|---|---|---|---|---|---|
| Memphis | 5935 | 5078 | 5018 | 2913 | 2702 | 2594 |
| Seattle | 13055 | 11398 | 11342 | 6730 | 6361 | 6143 |
| Phoenix | 10872 | 8921 | 8843 | 4715 | 4262 | 3954 |
| Denver | 8400 | 7165 | 7093 | 4077 | 3758 | 3561 |
| IO-MT-WY | 799 | 727 | 723 | 366 | 344 | 310 |
| Minneapolis | 11651 | 9899 | 9793 | 5782 | 5375 | 5039 |
| St. Louis | 9254 | 7810 | 7762 | 4482 | 4090 | 3895 |
| New York | 32935 | 29045 | 28909 | 15299 | 14611 | 14103 |
| Nashville | 6513 | 5570 | 5462 | 3487 | 3272 | 3110 |
| Cincinnati | 13769 | 11770 | 11621 | 6557 | 6133 | 5847 |
| B. Columbia | 2001 | 1655 | 1643 | 965 | 855 | 830 |
| Quebec | 2759 | 2295 | 2269 | 1404 | 1277 | 1198 |
| Charlotte | 13988 | 12189 | 12069 | 7325 | 6900 | 6568 |
| Hawai`i | 822 | 712 | 698 | 405 | 367 | 353 |
| Alberta | 2725 | 2258 | 2222 | 1256 | 1146 | 1067 |
| Boston | 16361 | 14010 | 13836 | 7668 | 7028 | 6584 |
| Totals | 362448 | 307910 | 304741 | 171790 | 158340 | 149891 |
| Rate for a 60 second carousel | 48.3 kbps | 41.1 | 40.6 | 22.9 | 21.1 | 20.0 |

These values are for the main roadbed only, not including the HOV lanes.

BSA Coding

For the full-table mode at 16:00 and 18:00 on the sampled day we have:

| Time | A-C | Same | Mixed | Mixed Msgs | Encoded |
|---|---|---|---|---|---|
| 16:00 | 2480 bytes | 46 | 41 | 341 | 757 bytes |
| 18:00 | 2230 bytes | 50 | 37 | 284 | 647 bytes |

'Same' and 'Mixed' are the count of linears with the same bucket, or mixed buckets. 'Mixed Msgs' are the number of '01' and '10' messes required to encode the 'Mixed' linears. Each 'Same' linear takes 9 bits to code, and each 'Mixed' linear takes 16 bits/message+2 bits per linear.

We can compare these values with the per-BSA coding as follows:

| | 16:00 | | | | 18:00 | | | |
|---|---|---|---|---|---|---|---|---|
| BSA | Same | Mixed | Msgs | Bytes | Same | Mixed | Msgs | Bytes |
| 8 | 7 | 0 | 0 | 22 | 7 | 0 | 0 | 22 |
| 9 | 0 | 1 | 3 | 21 | 0 | 1 | 3 | 21 |
| 10 | 6 | 4 | 24 | 70 | 7 | 3 | 15 | 53 |
| 13 | 7 | 8 | 46 | 116 | 8 | 7 | 36 | 97 |
| 15 | 8 | 0 | 0 | 23 | 8 | 0 | 0 | 23 |
| 16 | 5 | 7 | 65 | 152 | 6 | 6 | 53 | 129 |
| 19 | 2 | 4 | 17 | 52 | 4 | 2 | 9 | 37 |
| 21 | 0 | 1 | 3 | 21 | 0 | 1 | 3 | 21 |
| 22 | 3 | 1 | 9 | 36 | 3 | 1 | 8 | 34 |
| 23 | 1 | 0 | 0 | 16 | 1 | 0 | 0 | 16 |
| 24 | 1 | 2 | 6 | 28 | 2 | 1 | 3 | 23 |
| 25 | 6 | 11 | 61 | 146 | 7 | 10 | 51 | 127 |
| 26 | 1 | 2 | 14 | 44 | 1 | 2 | 17 | 50 |
| 27 | 3 | 0 | 0 | 18 | 2 | 1 | 3 | 23 |
| 28 | 1 | 0 | 0 | 16 | 1 | 0 | 0 | 16 |
| 29 | 3 | 0 | 0 | 18 | 2 | 1 | 4 | 25 |
| 30 | 7 | 7 | 78 | 180 | 7 | 7 | 63 | 150 |

Giving 979 bytes at 16:00 and 867 bytes at 18:00 as reported in the previous table.

Correlation between NFC and FCC Encodings

| FCC | NFC-1 | NFC-2 | NFC-3 | NFC-4 | NFC-5 | NFC-6 | NFC-7 | NFC-0 |
|---|---|---|---|---|---|---|---|---|
| A00 | | 6 | | | | | | 27 |
| A11 | 9801 | 4 | | | | | | |
| A12 | 161 | 5252 | 10 | 3 | | | | |
| A13 | 3804 | 1433 | 6 | | 3 | | | |
| A14 | | | | | | | | 488 |
| A15 | 276 | 118 | | | | | | |
| A16 | | | | | | | | 1061 |
| A21 | 1 | 3 | 20083 | 16029 | 1320 | | 31 | 3 |
| A22 | 5 | 0 | 554 | 355 | 259 | 1 | 27 | |
| A23 | 12 | 5 | 253 | 42 | 18 | | 5 | 2 |
| A24 | | | | | | | | 31 |
| A25 | | 4 | 127 | 30 | 303 | | | |
| A26 | 25 | | 538 | 26 | 121 | | | |
| A29 | 14 | 6 | 51 | 13 | 2 | | | |
| A31 | | | 15914 | 46373 | 80029 | 11462 | | |
| A32 | | | | | | | 417641 | |
| A33 | | | | | 2 | | 9612 | |
| A41 | | | 59 | 90 | 136 | 5 | | 106754 |

-continued

Correlation between NFC and FCC Encodings

| FCC | NFC-1 | NFC-2 | NFC-3 | NFC-4 | NFC-5 | NFC-6 | NFC-7 | NFC-0 |
|---|---|---|---|---|---|---|---|---|
| A42 | | | | | | | | 140 |
| A43 | | | | | | | | 3302 |
| A44 | | | | 2 | 8 | | | 267 |
| A45 | | | | | | | | 1704 |
| A47 | | | 56 | | 4 | | | 80 |
| A48 | | | 10 | 1 | | | 1 | 11 |
| A61 | | | | | | | | 1013 |
| A62 | | | | | | | | 2162 |
| A63 | | | | | | | | 192 |
| A64 | | | | | | | | 5347 |
| A65 | | | | | | | | 2154 |
| A66 | | | | | | | | 202 |
| A67 | | | | | | | | 789 |
| A68 | | | | | | | | 233 |
| A69 | | | | | | | | 1704 |
| A71 | | | | | | | | 830 |
| A72 | | | | | | | | 2590 |
| A73 | | | | | | | | 669 |
| A75 | | | | | | | | 318 |
| A90 | | | | 1 | 3 | | | 1202 |
| A91 | | | 1 | | | | 134 | 59 |
| A92 | | | | | | | | 13 |
| A93 | | | | | | | | 6 |
| A94 | | | | | | | | 1 |

The following values are from 3-4 days of the full trafficML research feed from Navteq.

Events with no/few Alert-C codes

| | Alert | Mass Transit | Other News | Weather |
|---|---|---|---|---|
| No Code | 3984 | 33306 | 22037 | 54435 |
| With Code | | | Code 1: 20526 | |
| Total | 3984 | 33306 | 42563 | 54435 |

Events with multiple Alert-C codes

| Accident | | Congestion | | Construction | | Disabled Vehicle | | Misc. | | Planned Event | | Road Hazard | |
|---|---|---|---|---|---|---|---|---|---|---|---|---|---|
| Code | Num | Code | Num | Code | Num | Code | Num | Code | Num | Code | Num | Code | Num |
| — | 7715 | — | 111 | — | 489278 | — | 507 | — | 1784 | — | 15641 | — | 19128 |
| 201 | 29056 | 101 | 2 | 24 | 25242 | 211 | 2652 | 214 | 2042 | 476 | 36 | 61 | 1032 |
| 202 | 1308 | 108 | 7982 | 52 | 4668 | 212 | 51 | 396 | 421 | 1462 | 184 | 401 | 755 |
| 203 | 13 | 2115 | 28184 | 473 | 48497 | 213 | 254 | 401 | 1399 | 1501 | 5884 | 476 | 20 |
| 204 | 38 | 122 | 8289 | 476 | 54243 | 323 | 512 | 473 | 153 | 1502 | 3917 | 903 | 58 |
| 240 | 1083 | | | 520 | 178410 | 324 | 876 | 476 | 45 | 1503 | 2065 | 905 | 179 |
| 241 | 1972 | | | 702 | 26985 | 325 | 125 | 507 | 152 | 1527 | 2234 | 907 | 128 |
| 242 | 224 | | | 707 | 35840 | 326 | 405 | 508 | 6 | 1541 | 120 | 908 | 378 |
| 243 | 1615 | | | 735 | 112887 | 327 | 826 | 509 | 90 | 1559 | 43 | 913 | 5 |
| 244 | 3218 | | | 736 | 54416 | 328 | 25 | 510 | 71 | | | 916 | 15 |
| 245 | 410 | | | 737 | 2970 | 329 | 2 | 520 | 167 | | | 919 | 44 |
| 246 | 87 | | | 738 | 53648 | 346 | 8 | 965 | 19 | | | 920 | 14 |
| 333 | 9332 | | | 740 | 16792 | 396 | 2025 | 1033 | 365 | | | 926 | 157 |
| 337 | 209 | | | 741 | 2723 | 401 | 8 | | | | | 938 | 10521 |
| 338 | 86 | | | 800 | 2971 | 476 | 38 | | | | | 957 | 24 |
| 369 | 37 | | | 802 | 344254 | 520 | 118 | | | | | 961 | 73 |
| 370 | 56 | | | 815 | 6327 | 965 | 64 | | | | | 973 | 145 |
| 371 | 5 | | | 817 | 4890 | | | | | | | 980 | 2643 |
| 372 | 59 | | | | | | | | | | | 982 | 6 |
| 373 | 24 | | | | | | | | | | | 984 | 4 |
| 473 | 53 | | | | | | | | | | | 987 | 19 |
| 476 | 190 | | | | | | | | | | | 989 | 32 |

-continued

Events with multiple Alert-C codes

| Accident Code | Accident Num | Congestion Code | Congestion Num | Construction Code | Construction Num | Disabled Vehicle Code | Disabled Vehicle Num | Misc. Code | Misc. Num | Planned Event Code | Planned Event Num | Road Hazard Code | Road Hazard Num |
|---|---|---|---|---|---|---|---|---|---|---|---|---|---|
| 520 | 2294 | | | | | | | | | | | 1031 | 2 |
| | | | | | | | | | | | | 1032 | 7 |
| | | | | | | | | | | | | 1045 | 44 |
| | | | | | | | | | | | | 1058 | 14 |
| | | | | | | | | | | | | 1309 | 18 |
| | | | | | | | | | | | | 1804 | 219 |
| | | | | | | | | | | | | 1805 | 604 |
| | | | | | | | | | | | | 1867 | 246 |
| | | | | | | | | | | | | 1875 | 393 |
| | 59203 | | 44568 | | 1465041 | | 8496 | | 6714 | | 30124 | | 36927 |

Total Number of distinct Alert-C codes: 110

Part III—Exemplary Software Development Kit

Introduction

This part describes an exemplary interface to the Apogee Traffic service, the functionality, implementation and architecture of which are provided in Parts I and II, above. As above, all references in what follows to "uses" "should use" "is" "are" or the like, are illustrative and merely exemplary, and not limiting, referring only to one or more exemplary embodiments, but certainly not defining how the invention may be implemented. Additionally, the same exemplary, and not at all limiting, character applies all variable names, function names, data structure names, etc., which appear in this Part III with an SXM designator, such as, for example: "SXM _________" or "SXMApogee _________." Moreover, any reference to a particular software library, or to a particular messaging protocol, anywhere in Part I, Part II or Part III of this Specification is exemplary and illustrative only, and not intended to be limiting in any way.

Resources

CPU ~1VMIPS

Memory 400-512 kbytes for up to 8 parallel requests

External Files 'locations' file 2 Mbytes

In one embodiment, for example, the SXM-supplied locations file is compiled into a binary form and must be present in the read-only portion of the file storage system. The path to this file must be returned by a call to makepath with parameters:

'R', "apogee", "locations"

When mitgrating to a different version of SXe SDK, the "locations" baseline must be replaced with the recompiled baseline databases using the skdfiles utility. The baseline databases are not always compatible between releases and must be replaced when migrating to a different version of SXe.

The historical maps are pattern data are updatable through a rapid file delivery application or service, such as Sirius XM Rapid File Delivery, or RFD, described above, and must be located in the updatable portion of the filing system.

The TrafficPlus (Apogee Traffic) Module

The SXe TrafficPlus (Apogee Traffic) SDK decodes the TMC broadcasted information using a "locations" database to assist in decoding and provides traffic information to the application through the APIs. Even though a TMC segment is defined as the path between two TMC points, the actual roadbed is unlikely to be a straight line between those two points. In order to draw the roadbed, indicate congestion, and place incident markers, the TMC segment must be converted to a set of map links. A map link is a straight-line drawn between two points, at sufficient resolution that the map follows the actual road topology for a map at a given zoom level.

Links are supplied from a map database, which must be purchased from a map vendor. SiriusXM does not require a specific map-link database, nor does it require the map be obtained from a particular vendor. The Apogee protocol is vendor- and database-agnostic. It is the responsibility of the application developer to obtain both a map database and the TMC consortium traffic tables and to integrate them into their product.

The application developer should be aware the TrafficPlus service uses a mutex to serialize most APIs calls and care should be exercised to insure a deadlock condition does not occur. The sxr_apogee_status API is not serialized by the mutex and therefore will never block. See "Thread Safety" section in the core design guide SX-9845-0339 for additional information.

Status Return Code

The usual way in which errors are reported is through the return code on most interface calls. Except where noted, SXM_E_OK usually indicates a successful call or an error otherwise. In some cases this may simply mean the operation was 'accepted' it does not imply that the requested action will be performed successfully.

It is convenient to consider API return codes as falling into three classes, for any given call:

TABLE 1

Strength Return Classes

| Code | Name | Description |
|---|---|---|
| N | Normal | An expected non-zero return code that does not affect status or operations |
| W | Weak | An error that caused the current operation to fail, but the module as a whole is still operational |
| S | Strong | An error that caused the module to become non-operational. |

An example of a Normal return is 'No more items in list' for a data extraction. A Weak error indicates that the API call is not going to work, but other calls may, for example starting a service when the service is already running. A Strong error indicates that the whole of the service is non-operational. A possible Strong error could be: "Out of Memory" when starting the service. Other services may continue to operate, but the requested service is unable to initialize, and will not operate correctly (or at all).

The Module Interface sxm_apogee_start

The start routine starts the Apogee traffic service,

```
int                sxm_apogee_start (
                        void (*callback)(int, int),
                        int debugLevel
                   )
     callback           a routine that will receive apogee
module-level event indications
     debugLevel         the debug level for the apogee module
```

| Routine | Return | Strength | Description |
|---|---|---|---|
| start | SXM_E_OK | N | Success |
| | SXM_E_STATE | S | One of: already started; sdk not started; link not started |
| | SXM_E_FAULT | W | NULL parameter |
| | SXM_E_NOMEM | S | Memory Allocation Failed |
| | SXM_E_THREAD | S | Thread creation Failed |
| | SXM_E_PIPE | S | No radio device |
| | SXM_E_NO_LOCS | S | No locations database |
| | SXM_E_BAD_LOCS | S | Locations database corrupt |

The module-level callback is described in the "Error Detection and Reporting" section of the SX-9845-0340 Introduction Design Guide. The following errors may be indicated on the callback interface

| Routine | Return | Strength | Description |
|---|---|---|---|
| Callback | SXM_E_NOMEM | S | Internal Memory allocation failed |
| | SXM_E_TIMEOUT | W | An SXi operation timed out |
| | SXM_E_THREAD | S | Thread creation Failed |
| | SXM_E_PIPE | S | No radio device |

sxm_apogee_status

The status routine updates the data service status structure SXMStatus with the current state and subscription status. A return code of SXM_E_OK indicates the status structure SXMStatus has been updated, otherwise it has not.

```
int        sxm_apogee_status (
                SXMStatus *ret
                )
           ret       the status structure for the Images service
```

| Routine | Return | Strength | Description |
|---|---|---|---|
| status | SXM_E_OK | N | Success |
| | SXM_E_FAULT | W | NULL ret argument |

The SXMStatus structure can be examined to determine the service state and subscription level for the service.

Service States are:

| State (service level status) | Description |
|---|---|
| SXM_SERVICE_OK | Service is running and available for use. |
| SXM_SERVICE_STOPPING | Service is stopping and is not available for use. |
| SXM_SERVICE_STOPPED | Service is stopped and is not available for use. |

Service subscription levels are:

| Subscription Level | Description |
|---|---|
| SXM_SUBS_NONE | Service is unsubscribed. |
| SXM_SUBS_FULL | Service is fully subscribed and all content is available. |

sxm_apogee_stop

The stop routine terminates the service int sxm_apogee_stop( )

| Routine | Return | Strength | Description |
|---|---|---|---|
| Stop | SXM_E_OK | N | Function completed as expected |
| | SXM_E_STATE | S | Service is not running |
| | SXM_E_FAULT | W | NULL pointer to service handle encountered |
| | SXM_E_BUSY | N | Attempt to stop the service from its own callback |

The routine will block if there is an extraction currently in progress, and will fail if it is called from within a notification callback routine.

An unrecoverable SXe service event has occurred when calling the sxm_apogee_stop function with one of the error codes of SXM_E_STATE or SXM_E FAULT are returned with that status.service being SXM_SERVICE_OK. In this event, the application developer shall reset the SXe system so that the service(s) and the supporting framework can be reinitialized to a pristine condition The Request Interface Exemplary SXMApogeeRequest Structure Apogee collection requests operate on a geographic area defined as a list of table and BSA pairs. These are passed across the API using the SXMApogeeRequest structure

```
typedef struct {
     ushort
     bsaref[["SXM_APOGEE_MAX_REQ_BSAREF_COUNT];
     // table << 8 | bsa
     ushort bsac;          // count of active
}SXMApogeeRequest;
     bsamf          an array of up to
                    SXM_APOGEE_MAX_REQ_BSAREF_COUNT
                    pairs, each pair packed into a 16-bit ushort
     bsac           the number of valid entries in the bsaref array
```

Collection requests are for a specific type of Apogee data. Multiple types may be combined over a single collection area by OR'ing the values together from the following list:

| | |
|---|---|
| SXM_APOGEE_REQ_FLOW | real-time flow on main linears |
| SXM_APOGEE_REQ_RAMPS | real-time flow on ramps |
| SXM_APOGEE_REQ_CONSTRUCTION | construction messages |

-continued

| | |
|---|---|
| SXM_APOGEE_REQ_INCIDENT | incident messages |
| SXM_APOGEE_REQ_P1 | first predictive flow |
| SXM_APOGEE_REQ_P2 | second predictive flow |
| SXM_APOGEE_REQ_P3 | third predictive flow |
| SXM_APOGEE_REQ_P4 | fourth predictive flow |
| SXM_APOGEE_REQ_FORECAST | all forecast flows |
| SXM_APOGEE_REQ_HISTORICAL | historical flows |

Two combination fields are also useful:

| | |
|---|---|
| SXM_APOGEE_REQ_REALTIME | all real-time components |
| SXM_APOGEE_REQ_PREDICTIVE | all predictive components |

sxm_apogee-request

The request routine submits a request and starts collecting its data. The Traffic Plus allows for a maximum of 8 concurrent requests at a time.

```
    int              sxm_apogee_request (
                         SXMApogeeRequest *request,
                         int types,
                         void (*data_notify)(ptr, int, int, int, ptr),
                         ptr usercx,
                         ptr *handle
                     )
        request          a pointer to a request structure containing
the list of BSAs to be collected
        types            one of more of the
                         SXM_APOGEE_REQ values
        data_notify      a pointer to the notification callback routine
        usercx           an opaque user-context value that is
                         passed back in the
notification
        handle           a returned value to be supplied on
                         subsequent calls
```

| Routine | Return | Strength | Description |
|---|---|---|---|
| Request | SXM_E_OK | N | Request has been created |
| | SXM_E_BAD_LOCS | S | Locations baseline database corrupt |
| | SXM_E_BUSY | W | Maximum number of requests active |
| | SXM_E_FAULT | W | NULL parameter |
| | SXM_E_INVAL | W | Invalid parameter (max out of range) |
| | SXM_E_STATE | S | Service in wrong state |

data_notify Callback

The notification routine is called from within the SDK whenever data in a BSA is changed or refreshed:

```
        void             data_notify(
                             ptr handle,
                             int types,
                             int bsaref,
                             int changed,
                             ptr usercx
            )
            handle           identifies the internal request
    (the same handle returned by the request)
            types            one or more of the
                             SXM_APOGEE_REQ types
            bsaref           the BSA references of the changed item
            changed          0 if the data are the same as last time,
```

-continued

```
    1 if the data have changed
            usercx           the user context value supplied in the
                             original request.
```

The notification routine may be called many for each collection request, and many times for each BSA, since the different components of the service are updated at different rates. It is strongly recommended that the notification routine does as little processing as possible, just noting the change of state, and leaving the extraction and display to the main application sxm_apogee-modify The modify routine can be used to change the area or collection types of an active request.

```
    int              sxm_apogee_modify(
                         ptr handle,
                         SXMApogeeRequest* request,
                         int types
                     )
        handle           the internal handle for the collection request
        request          a pointer to a collection request
        types            the set of types to be collected
```

| Routine | Return | Strength | Description |
|---|---|---|---|
| modify | SXM_E_BUSY | W | Request currently extracting |
| | SXM_E_ERROR | S | Service is in ERROR state |
| | SXM_E_FAULT | W | NULL parameter |
| | SXM_E_INVAL | W | Invalid parameter (max out of range) |
| | SXM_E_STATE | W | Service in wrong state |

sxm-apogee-remove

The difference between modifying a request and removing then resubmitting the request is that any data common to the old and new requests will be retained by modify, but deleted if the request is removed.

The remove routine deletes a request. Once a request is deleted, the handle for that request must not be used again.

```
    int              sxm_apogee_remove(
                         ptr handle
                     )
        handle           the internal handle for the collection request
```

| Routine | Return | Strength | Description |
|---|---|---|---|
| remove | SXM_E_BUSY | W | Request currently extracting |
| | SXM_E_ERROR | S | Service is in ERROR state |
| | SXM_E_FAULT | W | NULL parameter |
| | SXM_E_STATE | W | Service in wrong state |

Removing a request will stop the collection of any data not otherwise required by other requests, and remove any stored data collected as part of the request.

The Extraction Interface

The notification routine described above only informs the application that data have changed, it does not process the data in any way.

Service Objects

The extraction interface allows the application to retrieve ServiceObjects contained the decoded protocol information. Three ServiceObjects are offered through this interface, The FlowVector object contains the speed and flow data for a single linear in a BSA

```
typedef struct {
    ushort tmc_start, tmc_end;
    byte speed[1024][2];
    byte flow[1024][2];
    ushort valid;
}SXMApogeeFlowVector;
tmc_start     the starting TMC Point index in the linear
tmc_end       the ending TMC Point index in the linear
speed         up to 1,024 speed bucket values, in each direction
flow          up to 1,024 flow (congestion) values, in each
              direction
valid         the number of valid entries in the speed and
              flow vectors
```

The first row of speed values represents the positive direction in RDS/Alert-C and runs from tmc_start to timc_end, the second row represents the negative direction and runs from tinc_end to tmc_start. All four arrays are in units of ⅛ TMC segment.

The valid value is the maximum of the two directions. For a flow vector that terminates in both directions, valid would be 8×(number_of_tmc_points−1) In the case where the flow vector continues into another vector in one or both the other directions, valid would be 8×number_of_tmc_points. The actual number of points is determined by the topology in the TMC tables.

The RampVector object contains all the Ramp flow values for a single BSA, either the TMC-defined ramps or the SXM-defined ramps.

```
typedef struct {
    byte flow[1024];
    ushort valid;
}SXMApogeeRampVector;
flow       up to 1,024 ramp congestion levels
valid      the number of valid entries in the flow vector
```

Each byte contains the congestion level for a single ramp, in BSA index order.

The CIMessage object contains either a Construction Message or an Incident

```
typedef struct {
        ushort event;
        byte etype;          // 0=> tmc, 1=>//
        union {
            struct {
                ushort tmc;
                byte offset;
                byte direction;
                byte extent;
                ushort start_tmc;
                byte start_offset;
            }tmc;
            struct {
                SXMPoint geo;
                char desc[256];
            }//;
        }loc;
        byte severity;
        char text[256];
}SXMApogeeCIMessage;
    event           the Alert-C event code for this message
    etype           the type of location reference in the union
    tmc             the starting TMC point location within the BSA
    offset          the sub-segment offset of the starting location
    direction       the Alert-C direction (of queue growth) for the message
    extent          the number of 1/8-TMC subsegments for which the event extends
    start_tmc       the starting TMC point location if not within this BSA
    start_offset    the starting sub-segment offset
    geo             a georeference point (longitude and latitude values)
    desc            a mappable street address for the georeference
    severity        the severity level of this message
    text            free text description of the event (in addition to the event code)
typedef struct {
    uint lf[(SXM_APOGEE_MAX_BSA_LINEAR_COUNT + 31) >> 5];
    uint lc;
}SXMApogeeBSAFilter;
lf                  bitfield for linears
lc                  count of active filter bits
typedef struct {
    SXMApogeeBSAFilter f[SXM_APOGEE_MAX_REQ_BSAREF_COUNT];
    uint bsac;
}SXMApogeeFilter;
bsac                count of active BSAs
```

Routines

The begin routine starts an extraction, and locks the data against updates by the SDK.

```
int              sxm_apogee_begin(
                     ptr handle,
```

-continued

```
                int type,
                int index,
                int bsaref,
                int *c1,
                int *c2
            )
    handle      the request handle
    type        one (only) of the collection types in the request
    index       a subtype for a specific collection type
    bsaref      the BSA reference to be extracted
    c1          a returned counter
    c2          a returned counter
```

| Routine | Return | Strength | Description |
|---|---|---|---|
| begin | SXM_E_BUSY | W | Request currently extracting |
| | SXM_E_ERROR | S | Service is in ERROR state |
| | SXM_E_FAULT | W | NULL parameter |
| | SXM_E_STATE | W | Service in wrong state |

Since only one type of data can be extracted at a time, the type field should be only a single bit from the SXM_APOGEE_REQ types, and it must match one of the bits set in the original request. For forecast and historical data, the index value specifies which particular forecast point, or historical data value, is required. For ramps it selects either the TMC-coded ramps (index=0), or the SXM-coded ramps (index=1). The bsaref value is the value of an element in the bsaref array on the original request.

For flow requests, c1 is set to the number of items available in the extraction and c2 is set to the number of lane types available for that request type.

Unlike the Alert-C protocol delivered over RDS/TMC, the full data for any type are available during an extraction. Therefore the application does not need to maintain state between extractions, though it may choose so to do to reduce processing (for example when looking at only a few segments in a linear during a route or travel-time calculation).

The ServiceObjects are extracted using one of the following three calls, sxm_apogee_extract_flow All roadbed (non-ramp) flow types (current, predictive, forecast, historical, by-lane) are extracted into the same data structure, the FlowVector. The parameters on the call determine which particular type is used.

```
int         sxm_apogee_extract_flow(
                ptr handle,
                uint lane,
                uint ix, SXMApogeeFlowVector *out,
                int *changed
            )
    handle      the request handle
    lane        the lane index; 0 is always the main roadbed
    ix          the linear index within the BSA
    out         a pointer to the FlowVector which is filled in by the
                SDK
    changed     a pointer to a change marker
```

| Routine | Return | Strength | Description |
|---|---|---|---|
| extract | SXM_E_NOENT | N | End of list |
| | SXM_E_ERROR | S | Service is in ERROR state |

-continued

| Routine | Return | Strength | Description |
|---|---|---|---|
| | SXM_E_FAULT | W | NULL parameter |
| | SXM_E_STATE | W | Service in wrong state |

To support efficient processing, the following constraints are placed on the sequence of calls to sxm_apogee_extract_flow:

1. If the lane index is the same as the previous call, the ix value must be strictly greater than the ix value on the previous calls.
2. f the lane index is different from the previous call, it must be strictly greater than the previous lane index. There is no constraint on the value of ix in this case.

The changed value is set to zero if the contents of the FlowVector are the same as the last time it was extracted, or one if something in the FlowVector has changed. In both cases the FlowVector values are filled in. The application can use the changed value to skip processing for that index, or may need to process it anyway.

sxm_apogee_extract_ramp

Ramp flow values are extracted into a RampVector structure

```
int         sxm_apogee_extract_ramp(
                ptr handle,
                SXMApogeeRampVector *out
            )
    handle      the request handle
    out         a pointer to a RampVector which is filled in by the
                SDK
```

| Routine | Retur | Strength | Descriptio |
|---|---|---|---|
| extract | SXM_E_NOENT | N | End of list |
| | SXM_E_ERROR | S | Service is in ERROR state |
| | SXM_E_FAULT | W | NULL parameter |
| | SXM_E_STATE | W | Service in wrong state |

There are no restrictions on the order in which the two type values can be extracted.

sxm_apogee_extract_ci

Construction and Incident messages share a common format, and are extracted from a single interface.

```
int         sxm_apopgeo_extract_ci(
                ptr handle,
                SXMApogeeCIMessage *out
            )
    handle      the request handle
    out         a pointer to a CIMessage which is filled in by the SDK
```

| Routine | Return | Strength | Description |
|---|---|---|---|
| extract | SXM_E_NOENT | N | End of list |
| | SXM_E_ERROR | S | Service is in ERROR state |
| | SXM_E_FAULT | W | NULL parameter |
| | SXM_E_STATE | W | Service in wrong state |

Unlike flow vectors, although messages have a unique reference numbers, there is no guarantee that the messages will be returned in any specific order, or that a particular reference number is present in the collection. As a result, the extraction interface behaves more like an iterator, where subsequent calls simply return the next available message. The sequence number om the event acts as the change marker, but it is the responsibility of the application to track the most-recently-extracted sequence number to implement any change-detection scheme.

sxm_apogee_end

The end routine terminates the extraction, and unlocks the data for update

```
int        sxm_apogee_end(
               ptr handle
           )
  handle       the request handle
```

| Routine | Return | Strength | Description |
|---|---|---|---|
| end | SXM_E_ERROR | S | Service is in ERROR state |
| | SXM_E_FAULT | W | NULL parameter |
| | SXM_E_STATE | W | Service in wrong state |

Apogee Utility Functions

Utility functions help create requests, and allow the application to determine which products are available.

Language Options

The Apogee extraction interface for Construction and Incidents will return the event descriptive text in the user's preferred language, if available, as determined by the SDK-level "lang" option.

Building Filters

The Apogee collection request is a list of BSAs, using the standard TMC table numbers and the BSA index values as defined in the SXM-supplied location.xslx spreadsheet. To collect data for BSAs 9 and 10 in table 20, the following structure would be presented to sxm_apogee_request:

```
SXMApogeeRequest request;
    request.bsaref[0]=(20<<8)|9;
    request.bsaref[1]=(20<<8)|10;
    req.bsac=2;
```

It is usually easier for the application to determine a collection area based on a point location and a distance. The sxm_mbr_about routine can turn a point and distance into a map bounding rectangle. The rectangle can then be turned into the list of BSA references which will cover that area.

```
int        sxm_apogee_add bsas(
               SXMApogeeRequest *request;
               SXMMBR *mbr
           )
  request      a pointer to a collection request structure
  mbr          the map bounding rectangle for the collection request
```

| Routine | Return | Strength | Description |
|---|---|---|---|
| add | SXM_E_BAD_LOCS | W | Locations database corrupt |
| | SXM_E_ERROR | W | Service is in ERROR state |
| | SXM_E_FAULT | W | NULL parameter |
| | SXM_E_INVAL | W | invalid parameter (e.g. lon, lat out of range) |
| | SXM_E_NOMEM | W | Memory allocation failed |

-continued

| Routine | Return | Strength | Description |
|---|---|---|---|
| | SXM_E_RESOURCE | W | Area too large for collector resources |
| | SXM_E_STATE | W | Service in wrong state |

The resulting request structure is then suitable for passing directly to sxm_apogee_request along with the collection type.

sxm_apogee_add_linears

Extraction filters are handled entirely within the application, but the filter can be constructed by the SDK. The application can build a filter for a single BSA reference given a map bounding rectangle using sxm_apogee_add_linears. The result is an array of bits where each bit is one if that linear intersects the map rectangle, and zero otherwise.

```
int        sxm_apogee_add_linears(
               SXMApogeeBSAFilter
               *filter, SXMMBR *mbr,
               ushort bsaref
           )
  filter       a pointer to a filter structure to be initialized
  mbr          the map bounding rectangle for the extraction request
  bsaref       the BSA reference for this filter
```

| Routine | Return | Strength | Description |
|---|---|---|---|
| add | SXM_E_BAD_LOCS | W | Locations database corrupt |
| | SXM_E_ERROR | W | Service is in ERROR state |
| | SXM_E_FAULT | W | NULL parameter |
| | SXM_E_INVAL | W | Invalid parameter (e.g. lon, lat out of |
| | SXM_E_STATE | W | Service in wrong state |

sxm_apogee_add_all_linears

If linear filtering is going to be applied to all the BSAs in a collection, a set of filters can be built from the original collection request using sxm_apogee_add_all_linears. The returned bitmaps are in the same order as the BSA references in the collection request.

```
int        sxm_apogee_add_all_linears(
               SXMApogeeFilter *filters,
               SXMMBR *mbr,
               SXMApogeeRequest *request
           )
  filters      a pointer to a structure containing an array of
  filters mbr  a map bounding rectangle for the extraction
  request
  request      a pointer to a request structure initialized with a
               BSA list
```

| Routine | Return | Strength | Description |
|---|---|---|---|
| add | SXM_E_BAD_LOCS | W | Locations database corrupt |
| | SXM_E_ERROR | W | Service is in ERROR state |
| | SXM_E_FAULT | W | NULL parameter |

-continued

| Routine | Return | Strength | Description |
|---|---|---|---|
| | SXM_E_INVAL | W | Invalid parameter (e.g. lon, lat out of |
| | SXM_E_STATE | W | Service in wrong state |

sxm_apogee_add_ramps

The same filter structure can also be used for ramp flow vectors. In this case the bit is one if the ramp at that index lies within the map rectangle, and zero otherwise.

```
int          sxm_apogee_add_ramps(
                  SXMApogeeBSAFilter *filter,
                  SXMMBR *mbr,
                  ushort bsaref,
                  int type
             )
   filter       a pointer to a BSA filter to be initializes
   mbr          the map bounding rectangle for the filter
   bsaref       the bsa reference
   type         0 for TMC-coded ramps, 1 for SXM-coded ramps
```

| Routine | Return | Strength | Description |
|---|---|---|---|
| add | SXM_E_BAD_LOCS | W | Locations database corrupt |
| | SXM_E_ERROR | W | Service is in ERROR state |
| | SXM_E_FAULT | W | NULL parameter |
| | SXM_E_INVAL | W | Invalid parameter (e.g. lon, lat out of |
| | SXM_E_STATE | W | Service in wrong state |

sxm_apogee_add_all_ramps

The filter can be built on a per-BSA basis, or for the whole collection, using sxm_apogee_add_all_ramps.

```
int          sxm_apogee_add_all_ramps(
                  SXMApogeeFilter *filter,
                  SXMMBR *mbr,
                  SXMApogeeRequest *request,
                  int type
             )
   filter       a pointer to a BSA filter to be initializes
   mbr          the map bounding rectangle for the filter
   bsaref       the bsa reference
   type         0 for TMC-coded ramps, 1 for SXM-coded ramps
```

| Routine | Return | Strength | Description |
|---|---|---|---|
| add | SXM_E_BAD_LOCS | W | Locations database corrupt |
| | SXM_E_ERROR | W | Service is in ERROR state |
| | SXM_E_FAULT | W | NULL parameter |
| | SXM_E_INVAL | W | Invalid parameter (e.g. lon, lat out of |
| | SXM_E_STATE | W | Service in wrong state |

Note that to filter all possible data, three separate filter banks are required, one for the main roadbeds, one for TMC-coded ramps and one for SXM-coded ramps. A single filter is 204 bytes long, and a 64-BSA collection filter is 13,060 bytes (so around 40 kbytes is required to support full 3-way filtering).

Product Availability

Three aspects of the service are not fixed by the protocol, and may vary from BSA to BSA over a collection. If a REQ_FLOW extraction indicates that more than one lane type is available, the lane types for each index can be retrieved using sxm_apogee_get lanes:

```
   sxm_apogee_get_lanes
      int                  sxm_apogee_get_lanes(
                                ptr handle,
                                int *ltypes
                           )
           handle               the request handle
           ltypes               an array of 8 integers
```

| Routine | Return | Strength | Description |
|---|---|---|---|
| get | SXM_E_BAD_LOCS | W | Locations database corrupt |
| | SXM_E_ERROR | W | Service is in ERROR state |
| | SXM_E_FAULT | W | NULL parameter |
| | SXM_E_INVAL | W | Invalid parameter (e.g. not a flow request) |
| | SXM_E_RESOURCE | W | Bad handle or wrong state |

The number of valid entries in the ltypes array is the c2 value returned by sxm_apogee_begin. ltype[0] will always be 0, indicating the main roadbed. The other lane types are defined in the Apogee Protocol Specification.

sxm_apogee_get_predictive

If predictive datasets are being collected, the time ranges of the currently-available datasets can be retrieved using the sxm_apogee_get_predictive call.

```
   int                sxm_apogee_get_predictive(
                           ptr handle,
                           int *ptypes
                      )
        handle             the request handle
        ptypes             an array of 4 integers
```

| Routine | Return | Strength | Description |
|---|---|---|---|
| get | SXM_E_BAD_LOCS | W | Locations database corrupt |
| | SXM_E_ERROR | W | Service is in ERROR state |
| | SXM_E_FAULT | W | NULL parameter |
| | SXM_E_INVAL | W | Invalid parameter (e.g. not a predictive |
| | SXM_E_RESOURCE | W | Bad handle or wrong state |

The ptypes values are the starting time range, in minutes, for which that prediction index is valid.

If forecast datasets are being collected, the time ranges of the currently-available datasets can be retrieved using the sxm_apogee_get_forecast call.

```
  int             sxm_apogee_get_forecast(
                       ptr handle,
                       int *ftypes
                  )
      handle           the request handle
                            ftypes          an array of 16 integers
```

| Routine | Return | Strength | Description |
|---|---|---|---|
| get | SXM_E_BAD_LOCS | W | Locations database corrupt |
| | SXM_E_ERROR | W | Service is in ERROR state |
| | SXM_E_FAULT | W | NULL parameter |

-continued

| Routine | Return | Strength | Description |
|---|---|---|---|
| | SXM_E_INVAL | W | Invalid parameter (e.g. not a forecast |
| | SXM_E_RESOURCE | W | Bad handle or wrong state |

The ftypes values are the starting time range, in minutes, for which that forecast is available.

The Development Interface

The debug interface allows the application to change the logging level on the apogee module once it has been initialized.

sxm_apogee_set_debug int sxm_apogee_set_debug (int debugLevel)

debugLevel debug level 32-bit mask for the apogee module. A simple approach is to set the debug bit mask to all ones (0xffffffff) which turns on all the debugging levels.

| Routine | Return | Strength | Description |
|---|---|---|---|
| set_debug | SXM_E_OK | N | Filter was built successfully |
| | SXM_E_STATE | S | Service in wrong state |

sxm apogee_get_debug int sxm_apogee_get_debug (int *pDebugLevel)

pDebugLevel returned debug level for the Apogee module

| Routine | Return | Strength | Description |
|---|---|---|---|
| get_debug | SXM_E_OK | S | Success |
| | SXM_E_STATE | S | Service is not running. |
| | SXM_E_FAULT | W | NULL pDebugLevel parameter |

EXAMPLES

The purpose of this section is to show how the various calls fit together to provide a full service to the application. This is not a complete application ready to drop into an automotive system and provide a full Apogee traffic service. The other aspect that it is difficult to capture in example code is appropriate error handling, Application techniques for handling errors may be quite different during initial development, pre-production validation and final production-level builds, so the generic directive of 'handle error here' serves as an indication that error processing will be required in that code path.

Appendix A contains the complete listing of the code fragments explained here, to show how it all fits together.

The example illustrates the following operations:

- starting the sdk and audio service
- starting the apogee traffic service
- building a collection request for an area around Detroit
- building an extraction request for linears for a smaller area
- submitting a request for all real-time data
- handling updates to the collection data
- filtering and extracting flow data for linears
- extracting flow data for ramps

- extracting construction and incident messages
- handling subscription changes and process errors The following operations are not illustrated, and must be developed by the application

- Any non-Apogee functions, such as tuning to a SXM radio station
- Converting TMC-based location references to map coordinates and map links
- Drawing a map and placing flow and incident information upon it
- Incident selection and incident detail display
- User interactions for panning and zooming the map
- Adjusting the collection area and display area as the vehicle moves
- Route and travel-time calculations
- Error screens, popups, "Contact SiriusXM" etc. messaging Main Routine

```
#include <sxm_apogee.h>
int main(int argc, char *argv[ ]) {
    if (sxm_sdk_start(makedev, makepath, puts) != 0)
        handle error here
    if (sxm_audio_start(callback _audio, 0) != 0)
        handle error here
    if (sxm_apogee_start(callback_apogee, 0) != 0)
        handle error here setup_apogee_collection_request( );
    while (1==1) {
        do some application
        processing
        check_apogee_changes( );
    }
    return 0;
}
```

The main routine initializes the SDK with the three configuration routines, then starts the audio service and the Apogee Traffic service.

It then sets up a request to collect data for an area (this assumes that the user has selected a map region, or the system GPS input has determined an area over which to start collecting.

In the example, the main processing loop is very simple, it assumes that the application goes away and does some processing and at some point returns to check for any changes to the traffic data. In a larger application, this call would only be made when the system was displaying traffic data, or calculating routes and travel times.

Configuration Callbacks

```
char *makedev(char *out, char *sfx) {
    sprintf(out, "/dev/x65h/%s", sfx);
    return out;
}
char *makepath(char *out, char type, char *module, char *file) {
    sprintf(out, "/sirius-xm/%c/%s/%s", type, module, file);
    return out;
}
```

These routines are identical to the test routines used in the SDK CLI, as described herein.

Module-Level Callbacks

```
    void callback_audio(int type, int parameter) {
        SXMStatus stat;
        sxm_audio_get_status(&stat);
        handle general subscription and error states here
```

-continued

```
    }
    void callback_apogee(int type, int parameter) {
        SXMStatus stat;
        sxm_apogee_get_status(&stat);
        handle apogee subscription and error states here
    }
```

These two routines request the status information from the appropriate module. The most likely states that would need to be handled are:

SXM_SERVICE_OK+SXM_SUBSCRIPTION_FULL normal operating mode

"Weak Signal/Check antenna" messages from the audio module

"No subscription—call SiriusXM" messages from the audio module

"No subscription—call SiriusXM" messages from the traffic module

More severe messages, such as "No Apogee Location Table" would indicate an incorrectly installed system (and a visit to the dealership).

Requesting an Apogee Data Collection

```
SXMApogeeRequest request;
SXMApogeeFilter filter;
ushort changed[64];
ptr response;
void setup_apogee_collection_request( ) {
    SXMMBR coll_mbr, ext_mbr;
    coll_mbr.ll_lon = -84.00000;              build a box around Detroit
    coll_mbr.ll_lat = 41.75000;
    coll_mbr.ur_lon = -82,75000;
    coll_mbr.ur_lat = 42.75000;
    sxm_apogee_add_bsas(&request, &coll_mbr);   convert the MBR to a list of BSAs
    memset(changed, 0, sizeof(changed));          clear the change markers
    if (sxm_apogee_request(&request, SXM_APOGEE_TYPE_REALTIME,
                indication_apogee, 0, &response) != 0)
        handle error here
    ext_mbr.ll_lon = -83.25000;               build a smaller box for the map
    ext_mbr.ll_lat = 42.25000;
    ext_mbr.ur_lon = -83.00000;
    ext_mbr.ur_lat = 42.50000;
    sxm_apogee_add_all_linears($filter, &ext_mbr, &request);
}
```

The routine builds a collection request for the area from 84.00° W 41.75° N to 82.75° W 42.75° N which contains the center of Detroit and extends for approximately 70 miles (35 miles in each direction from the center point). A real application would be using values from a GPS system to determine the collection area. The map area is then converted to a list of Tables and BSAs.

The strategy for handling notifications is to accumulate changes for later processing. The changed array is used to hold the change markers for each BSA in the collection, and this is initially set to zero.

The routine the submits a collection request for all of the realtime data components, passing in the address of the collection-change routine and receiving the response handle (in the response variable).

To illustrate linear filtering, the routine then constructs a separate extraction map rectangle covering the area from 83.25°W 42.25°N to 83.00°W 42.5°N which includes the center of Detroit. Again, in a real application, these values would be determined from a map display and zoom level. The map MBR is then converted into an array of bitmaps, one for each BSA in the collection, using the response handle to match up the BSA references between the collection request and the filter array.

Collection Change Notification

```
void indication_apogee(ptr cx, int types, int j, int changeflag, ptr user) {
    if (changeflag)
        changed[j] |= types;
}
```

This routine is called by the Apogee SDK to inform that application that data for a particular BSA in a collection request has changed or been refreshed (without change). j is the index in the array of BSA references in the original collection request and types is a bitmask of which collection types are being reported on.

The routine merges the change indications with any unprocessed changes (and ignores the refreshed data), but otherwise does not attempt to process the changes in any way.

Application Change Processing

```
void check_apogee_changes( ) {
    int i;
    for (i = 0; i < request.bsac; i++) {
        if (changed[i] & SXM_APOGEE_REQ_FLOW)
            do_flow_extraction(i);
        if (changed[i] & SXM_APOGEE_REQ_RAMPS)
            do_ramp_extraction(i);
        if (changed[i] & SXM_APOGEE_REQ_CONSTRUCTION)
            do_construction_extraction(i);
        if (changed[i] & SXM_APOGEE_REQ_INCIDENT)
            do_incident_extraction(i);
        changed[0] = 0;
    }
}
```

When the application is ready to process Apogee traffic changes, it calls this routine, which examines the change markers for each of the BSAs in the collection area (as set in request.bsac). Unlike the collection request, here each individual collection type must be examined individually, and processed according to its own type.

Once any changes have been processed, the changed markers for that BSA are cleared. Strictly, this approach to setting and clearing change markers is not thread-safe, since a collection update callback could set a change flag while the routine is scanning and processing the flags. However, this is not a real problem since the change may already have been processed, and if it was missed it will be signaled on the next round, That being said, it would be only a small extension to copy and reset the flags under a mutex, and add a mutex around the update in the indication apogee routine.

Linear Filtering and Extraction

```
SXMApogeeFlowVector fv;
void do_flow_extraction(int bsaix) {
    int i, lin, lane, changed;
    if (sxm_apogee_begin(response,
    SXM_APOGEE_REQ_FLOW,
                0, bsaix, &lin, &lane) != 0)
        handle error here
    for (i = 0; i < lin; i++)
        if (BITTST(filter[bsaix].lf, i)) {
            if (sxm_apogee_extract_flow(response, 0, i, &fv,
            &changed) == 0)
                if (changed)
                    process this linear in the application
        }
    sxm_apogee_end(response);
}
```

The flow extraction routine demonstrates the use of the filter bitfield to narrow down the list of Flow Vectors that needs to be extracted. The routine first locks the extraction data, and collects the number of vectors available (fin) and the number of lane types in this BSA (lane). The example code only processes the main roadbed (zero as the second parameter in the extraction call).

The filter code uses a macro defined as:

#define BITTST(_a, _i) ((_a)[(_i)>>5] & (1<<((_i) & 31)) which tests the $i^{th}$ bit in a bitfield contained in an array of uint values. Only if the bit is set is the FlowVector extracted, into the statically-allocated fv structure. Further, the FlowVector itself is only processed by the main application if it is marked as changed since the last extraction.

Once all the flow vectors have been examined, the routine unlocks the data for further updates.

Ramp Flow Extraction

```
SXMApogeeRampVector rv;
void do_ramp_extraction(int bsaix) {
    int i;
    if (sxm_apogee_begin(response,
    SXM_APOGEE_REQ_RAMPS,
            0, bsaix, NULL, NULL) !=0)
        handle error here
    sxm_apogee_extract_ramp(response, &rv);
    for (i = 0; i < rv.valid; i++)
            handle TMC-coded ramp i with flow level rv.flow[i]
    sxm_apogee_end(response);
    if (sxm_apogee_begin(response,
    SXM_APOGEE_REQ_RAMPS,
            1, bsaix, NULL, NULL) != 0)
        handle error here
    sxm_apogee_extract_ramp(response, &rv);
    for (i = 0; i < rv.valid; i++)
        handle SXM-coded ramp i with flow level rv.flow[i]
    sxm_apogee_end(response);
}
```

The routine to process ramps needs to handle both TMC-coded ramps, and SXM-coded ramps. Unlike linears, all the ramp flow values for a BSA of a given type can be extracted in a single call. The routine uses a statically-allocated rv structure to extract first the TMC-coded ramps, then the SXM-coded ramps.

This example could also be extended to support MBR filtering of ramps by creating a pair of ramp filters (one for each type) and using the same BITTST code used above for linears.

Construction and Incident Extraction

```
SXMApogeeCIMessage ci;
void do_construction_extraction(int bsaix) {
    int i;
    if (sxm _apogee_begin(response,
    SXM_APOGEE_REQ_CONSTRUCTION,
            0, bsaix, NULL, NULL) != 0)
        handle error here
    while (sxm_apogee_extract_ci(response, &ci) == 0)
        process construction message
    sxm_apogee_end(response);
}
void do_incident_extraction(int bsaix) {
    int i;
    if (sxm_apogee_begin(response,
    SXM_APOGEE_REQ_INCIDENT,
            0, bsaix, NULL, NULL) != 0)
        handle error here
    while (sxm_apogee_extract &ci) == 0)
        process incident message
    sxm_apogee_end(response);
}
```

The logic for extracting construction and incident messages is identical for both message types, the only difference being the type request when the extraction is started. The routines loop over all the messages, extracting them one-at-a-time into a statically-allocated ci structure, until the SDK indicates there are no more messages left for that BSA.

The CLI commands for Apogee

When running the CLI in pure-SDK mode (i.e. not under control of the SMS CLI) the:

audio start commands must be issued before any of the apogee operations except for the demonstration commands.

The user should refer to the "The SDK CLI" section of the "SX-9845-0340 Introduction Design Guide" for setting up the necessary files and how to run the SDK data services CLI application.

Demonstration

The apogee traffic system may be easily verified using the built-in demonstration command apogee demo [options]

The options are as follows r_phi use a collection area around Philadelphia (default)

r_la use a collection area in Los Angeles (with multiple lane types)

i[sec] check for changes every [sec] seconds (default 20)

l[min] run the demo for [min] minutes (default 1440)

d[hex] set the apogee debug level to[hex] (default 0)

no-p_flow_vec do not print flow vector values p_flow_all print all vector events

EXAMPLES

Run the default demonstration around Philadelphia:

apogee demo

Process data in the Los Angeles MBR for 60 minutes processing change every 31 seconds with the debug level 0x0ff2f007:

apogee demo r_la i31 l60 d0x0ff2f007

Control

The following commands control the module as a whole:

apogee start [debug] starts the apogee module with debug level [debug] (or 0)

apogee debug [debug] resets the apogee debug level to [debug] (or 0)

apogee status returns and displays the apogee status object apogee stop terminate the apogee service Requests Collection Requests are built up using a sequence of CLI operations req=apogee vrequest allocates an empty request object and stores it in the req variable apogee add bsas $req; $rnbr; adds all the BSAs that intersect mbr into the allocated req apogee req request $req; types $handle;

submits the collection request req to the apogee module and saves the returned request handle in handle. The types parameter is a bitfield of the collection types as given in section 2.2 apogee req_modify $handle; $req; types modifies an existing submitted request handle, with a new BSA list in req and a new set of collection types in types apogee req_remove $handle; remove a previously-submitted request Filters There are two types of filter. A single BSA filter will filter linears for a BSA while a full filter will filter for all linears in the collection request.

f=apogee vbsafilter create an empty single-BSA filter and store it in the f variable apogee add_linears $f; $mbr; bsaref add all the linears in bsaref that are also within mbr apogee add ramps $f; $mbr, bsaref type add all the ramps of type that are in bsaref and also within mbr (currently only type=0 is supported)

f=apogee vfilter create an empty full-filter and store it in the fvariable apogee add_all_linears $f: $mbr, $req;

add into the filter all linears that lie within the BSA list in req and the mbr apogee add_all_ramps $f $rnbr; $req; type add into the filter all ramps of type that list within the BSA list in req and the mbr (currently only type=0 is supported)

Extractions

Data are extracted into Apogee Service Objects, which must first be allocated by the CLI.

v=apogee vflowvec create an empty flow vector and store it in the v variable v=apogee vrampvec create an empty ramp vector and store it in the v variable ci=apogee vcimsg create an empty Cl message and store it in the ci variable lt=apogee vlanetype create an empty lanetype object and store it in the lt variable These objects can then be in the extractions apogee ext_begin $handle; type subtype bsaix $c1; $c2; begin an extraction apogee ext_flow $handle; lane linearIndex $out; $changed;

extract a flow vector apogee ext_ramp $handle;$out;

extract a ramp vector apogee ext_ci $handle; $out;

extract a construction or incident message apogee ext_get_lanes $handle; $out;

extract lane information apogee ext_end $req;

end the extraction and allow updates

Displays

The extracted data can be displayed using the show command apogee show $variable; display the contents of variable The output depends on the type of the variable:

integer show integer value req show apogee request bsafilter show apogee bsa filter filter show apogee full filter lanetype show list of lane types flowvector show apogee flow vector rampvector show apogee ramp vector cimessage show apogee Cl message

Example

The following example script is similar to the Philadelphia demonstration, but showing how the individual commands can be joined into a set of test cases. The user should refer to the "Running the CLI" section of "SX-9845-0340 Introduction Design Guide" for setting up the necessary files and how to run the SDK data services CLI application.

```
say "START"
audio start
apogee start 0x00000000
#Let the service come up.
say "Wait 5 sec for service to start..."
sleep 5
say "Wait end."
#
# Philly area requests
#
say "Request Philly area."
req = apogee vrequest
mbr1 = mbr −75.212 39.693 −75.093 39.995
apogee add_bsas $req; $mbr1;
apogee show $req;
filter = apogee vfilter
apogee add_all_linears $filter; $mbr1; $req;
apogee show $filter;
apogee add_all_ramps $filter; $mbr1; $req; 0
apogee show $filter;
apogee add_all_ramps $filter; $mbr1; $req; 1
#used for subsequent extractions in phillyextract scripts
vlanecount = integer
vlinearcount = integer
vflowvec = apogee vflowvec
vchanged = integer
vlanetype = apogee vlanetype
vrampvec = apogee vrampvec
vnull = null
vcimsg = apogee vcimsg
col1handle = handle
apogee req_request $req; 0x1 $col1handle;
apogee show $col1handle;
col2handle = handle
apogee req_request $req; 0x2 $col2handle;
apogee show $col2handle;
col3handle = handle
apogee req_request $req; 0x4 $col3handle;
apogee show $col3handle;
col4handle = handle
apogee req_request $req; 0x8 $col4handle;
apogee show $col4handle;
#
# Let data collect
#
say "Wait 120 sec for data..."
```

```
sleep 120
say "Wait end."
#
# Extract
#
apogee ext_begin $col1handle; 0x01 0 2 $vlinearcount; $vlanecount;
apogee show $vlinearcount;
apogee show $vlanecount;
apogee ext_get_lanes $col1handle; $vlanetype;
apogee show $vlanetype;
say "SHOULD WORK: extract vec 0."
apogee ext_flow $col1handle; 0 0 $vflowvec; $vchanged;
apogee show $vchanged;
apogee show $vflowvec;
say "SHOULD WORK: extract vec 40."
apogee ext_flow $col1handle; 0 40 $vflowvec; $vchanged;
apogee show $vchanged;
apogee show $vflowvec;
say "SHOULD FAIL: SXM_E_INVAL- Backward vector index."
apogee ext_flow $col1handle; 0 39 $vflowvec; $vchanged;
```

```
apogee show $vchanged;
apogee show $vflowvec;
say "SHOULD SXM_E_NOENT: No vector in broadcast data."
apogee ext_flow $col1handle; 0 75 $vflowvec; $vchanged;
apogee show $vchanged;
apogee show $vflowvec;
say "SHOULD SXM_E_NOENT: Vector out of locations db range."
apogee ext_flow $col1handle; 0 999 $vflowvec; $vchanged;
apogee show $vchanged;
apogee show $vflowvec;
apogee ext_end $col1handle;
apogee req_remove $col1handle;
apogee req_remove $col2handle;
apogee req_remove $col3handle;
apogee req_remove $col4handle;
apogee stop
say "DONE"
```

Apogee Sample Code Listing

```
#include <sxm_apogee.h>
SXMApogeeRequest request;
SXMApogeeFilter filter;
ushort changed[64];
ptr response;
SXMApogeeFlowVector fv;
SXMApogeeRampVector rv;
SXMApogeeCIMessage ci;
void callback_audio(int type, int parameter) {
    SXMStatus stat;
    sxm_audio_get_status(&stat);
    // printf("Audio service callback\n");
}
void callback_apogee(int type, int parameter) {
    SXMStatus stat;
    sxm_apogee_get_status(&stat);
    // printf("Apogee service callback\n");
}
void indication_apogee(ptr cx, int types, int bsaref, int changeflag, ptr user) {
    if (changeflag)
        changed[bsaref] |= types;
}
void setup_apogee_collection_request( ) {
    SXMFixMBR coll_mbr, ext_mbr;
    coll_mbr.ll_lon = -84.00000;                    // build a box around Detroit
    coll_mbr.ll_lat = 41.75000;
    coll_mbr.ur_lon = -82.5000;
    coll_mbr.ur_lat = 42.75000;
    sxm_apogee_add_bsas(&req, &coll_mbr);           // convert MBR to a list of BSAs
    memset(changed, 0, sizeof(changed));            // clear the change markers
    if (sxm_apagee_request(&request, SXM_APOGEE_TYPE_REALTIME,
                indication_apogee, 0, &response) != 0) {
        printf("Apogee Request error\n");
        return;
    }
    ext_mbr.ll_lon = -83.25000;                     // build smaller box for the map
    ext_mbr.ll_lat = 42.25000;
    ext_mbr.ur_lon = -83.00000;
    ext_mbr.ur_lat = 42.50000;
    sxm_apogee_add_all_linears(&filter, &ext_mbr, &request);
}
void do_flow_extraction(int bsaix) {
    int i, lin, lane, changed;
    if (sxm_apogee_begin(response, SXM_APOGEE_REQ_FLOW,
                0, bsaix, &lin, &lane) != 0) {
        printf("Apogee begin error\n");
        return;
    }
    for (i = 0; i < lim, i++)
        if (BITTST(filter[bsaix].lf, i)) {
            if (sxm_apogee_extract_flow(response, 0, i, &fv, &changed) == 0)
                if (changed)
                    ;//process this linear in the application
        }
    sxm_apogee_end(response);
}
```

-continued

```
void do_ramp_extraction(int bsaix) {
      int i;
      if (sxm_apogee_begin(response, SXM_APOGEE_REQ_RAMPS,
                              0, bsaix, NULL, NULL) != 0) {
            printf("Apogee begin error\n");
            return;
      }
      sxm_apogee_extract_ramp(response, &rv);
      for (i = 0; i < rv.valid; i++)
            ; //handle TMC-coded ramp i with flow level rv.flow[i]
      sxm_apogee_end(response);
      if (sxm_apogee_begin(response, SXM_APOGEE_REQ_RAMPS,
                              1, bsaix, NULL, NULL) != 0) {
            printf("Apogee begin error\n");
            return;
      }
      sxm_apogee_extract_ramp(response, &rv);
      for (i = 0; i < rv.valid; i++)
            ; //handle SXM-coded ramp i with flow level rv.flow[i]
      sxm_apodee_end(response);
}
void do_construction_extraction(int bsaix) {
      int i;
      if (sxm_apogee_begin(response, SXM_APOGEE_REQ_CONSTRUCTION,
                              0, bsaix, NULL, NULL) != 0) {
            printf("Apogee begin error\n");
            return;
      }
      while (sxm_apogee_extract_ci(response, &ci) == 0)
            ; //process construction message
      sxm_apogee_end(response);
}
void do_incident_extraction(int bsaix) {
      int i;
      if (sxm_apogee_begin(response, SXM_APOGEE_REQ_INCIDENT,
                              0, bsaix, NULL, NULL) != 0) {
            printf("Apogee begin error\n");
            return;
      }
      while (sxm_apogee_extract_ci(response, &ci) == 0)
            ; //process incident message
      sxm_apogee_end(response);
}
void check_apogee_changes( ) {
      int i;
      for (i = 0; i < request.bsac; i++) {
            if (changed[i] & SXM_APOGEE_REQ_FLOW)
                  do_flow_extraction(i);
            if (changed[i] & SXM_APOGEE_REQ_RAMPS)
                  do_ramp_extraction(i);
            if (changed[i] & SXM_APOGEE_REQ_CONSTRUCTION)
                  do_construction_extraction(i);
            if (changed[i] & SXM_APOGEE_REQ_INCIDENT)
                  do_incident_extraction(i);
            changed[0] = 0;
      }
}
char *makepath(char *out, unit size, char type, char *module, char *file) {
   int res;
   res = snprintf(out, size, "/sirius-xm/%c/%s/%s", type, module, file);
   return res;
}
int main(int argc, char *argv[ ]) {
      if (sxm_sdk_start(port_path, makepath, puts) != 0) {
            printf("SDK init error\n");
            return 1;
      }
      if (sxm_audio_start(callback_audio, 0) != 0) {
            pritnf("Audio init error\n");
            return 1;
      }
      if (sxm_apogee_start(callback_apagee, 0) != 0) {
            printf("Apogee start error\n");
            return 1;
      }
      setup_apogee_collection_request( );
      while (1==1) {
            ; //do some application processing
            check_apogee_changes( );
```

-continued

```
    }
    return 0;
}
```

The Apogee locations file may be built and analyzed using the sdkfiles utility.

The builder takes as input (-i) a CSV file containing one line for each SiriusXM locations table in the service.

```
TABLE,BSAC,PATH
1,54,c:/sirius-source/traffic/4Q2012/sxm/tables/locations01.csv
2,27,c:/sirius-source/traffic/4Q2012/sxm/tables/locations02.csv
3,20,c:/sirius-source/traffic/4Q2012/sxm/tables/locations03.csv
4,24,c:/sirius-source/traffic/4Q2012/sxm/tables/locations04.csv
5,19,c:/sirius-source/traffic/4Q2012/sxm/tables/locations05.csv
```

The first column is the table number, the second column is the number of BSAs in the table, and the third column is the path to the SiriusXM location file. The format of the location file is specified in the Protocol Document, The output is the binary locations file, which has the following structure. It is organized as a transaction file (even though the file is read-only). The root block of the file contains an array of Table entries, one per TMC table in the service.

```
typedef struct {
    fix ll_lon;
    fix ll_lat;
    fix ur_lon;
    fix ur_lat;
    ushort offset;
    ushort count;
}Table;
    ll_lon,ll_lat,ur_lon,ur_lat     the MBR of the table
    offset                          the block number of the
                                    start of the BSA data
    count                           the number of BSAs in
                                    the BSA data
```

Note that the stored values are in fixpoint (integer) format, so the same locations database can be used whether or not the application builds the SDK with native floating-point support.

The blocks addressed at offset contain an array of count BSA entries.

-continued

```
typedef struct {
    fix ll_lon;
    fix ll_lat;
    fix ur_lon;
    fix ur_lat;
    ushort linear;
    ushort lcount;
    ushort ramp;
    ushort rcount;
}BSA;
    ll_lon,ll_lat,ur_lon,ur_lat     the MBR of the BSA
    linear                          the block number of the
                                    start of the linear entries
    lcount                          the number of linear entries
    ramp                            the block numbrt of the
                                    start of the ramp entries
    rcount                          the number of ramp entries
```

The linear and ramp blocks both contain arrays of Linear entries

```
typedef struct {
    fix ll_lon;
    fix ll_lat;
    fix ur_lon;
    fix ur_lat;
    ushort tmc1;
    ushort tmc2;
    ushort count;
    ushort type;
}Linear;
    ll_lon,ll_lat,ur_lon,ur_lat     the MBR of the Linear
                                    or Ramp
    tmc1                            the starting TMC point of
                                    the Linear
    tmc2                            the ending TMC point of
                                    the Linear
    count                           the number of TMC points
                                    in the linear
    type                            '0' for TMC ramp
                                    '1' for SXM ramp
Ramps have ll_lon = ur_lon, ll_lat = ur_lat, tmc1 = tmc2 and
count = 1;
```

The resulting file can be analyzed using the -t option of sdkfiles:

sdlkfiles -f apogee -t locations

The output first reports the tfile header integrity:

```
Checking locations
Header Block 0 is valid (seq 1)
Allocation Map 0 is valid
Header Block 1 is valid (seq 1)
Allocation Map 1 is valid
Using Header Block 0
  Sequence Number: 1
    Block Size: 1024
      File Size: 2048
    Map Pointer: 0
      Map CRC: e2efbae2
    Root Pointer: 8
      Root Size: 1
      Root CRC: 7f181312
```

It then formats all the table BSA and linear data:

```
Table 1: (10, 2) [−88.467987 30.362122 −80.841309 35.005157]
    BSA 0: [−84.087830 30.622955 −83.008026 32.341003] 12:18 0:0
        Linear 0: [−83.766846 30.626312 −83.172546 32.332794] 4867..4908 42:0
        Linear 1: [−83.796295 30.622955 −83.118591 32.341003] 10445..10485 54:0
        Linear 2: [−84.047089 31.635925 −83.476990 31.726624] 10305..10310 7:0
        Linear 3: [−83.954254 31.955658 −83.598145 31.964020] 8617..8623 9:0
```

Exemplary Systems

In exemplary embodiments of the present invention, any suitable programming language may be used to implement the routines of particular embodiments of the present invention including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. This may be true in either a transmission end device (e.g., pre-processor, aggregator, etc.) or a receiver, for example. Particular embodiments may be implemented in the form of control logic in software or hardware or a combination of both. The control logic, when executed by one or more processors, may be operable to perform that which is described in particular embodiments.

Particular embodiments may be implemented by using one or more programmed general purpose digital computers, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a" "an", and "the" includes plural references unless the context clearly dictates otherwise. Also, as used in the description herein and throughout the claims that follow, the meaning of "in" includes "in" and "on" unless the context clearly dictates otherwise.

While there have been described methods for providing a traffic collection, aggregation and transmission system, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed:

1. A system, comprising:

at least one processor;

a display; and memory containing instructions that, when executed, cause the at least one processor to:

obtain a set of location intervals from a traffic data provider;

for each location interval in the set:

select, by at least one processor, a location interval from a map database, the location interval representing a road segment;

subdivide, by at least one processor, the respective location interval into a fixed number of sub-segments such that the sub-segments are equal in length, identify, by at least one processor, each sub-segment as an offset with respect to the respective location interval, and map, by at least one processor, traffic data to each sub-segment;

aggregating, by at least one processor, the mapped traffic data from all the sub-segments of all the location intervals in the set;

processing, by at least one processor, the aggregated traffic data into a defined flow vector format;

transmitting, by at least one processor, the processed flow vectors to a user device over a one-way broadcast and/or a two-way data communications network.

2. The system of claim 1, wherein the location interval is a Traffic Management Channel (TMC) segment.

3. The system of claim 1, wherein said traffic data includes one or more of speed, traffic flow, incidents or construction events.

4. The system of claim 1, wherein the location interval includes lane elements.

5. The system of claim 4, wherein the lane elements are designated as one or more of: main roadbed, High Occupancy Vehicle (HOV) or other express lane; right hand junction lane, left hand junction lane, or exit only lane.

6. The system of claim 4, where the lane elements are designated by a color or other visual iconographic scheme.

7. The system of claim 1, wherein the traffic data includes speed buckets for all road classes.

* * * * *